US00RE46738E

(19) United States
(12) Reissued Patent
Sasaki et al.

(10) Patent Number: US RE46,738 E
(45) Date of Reissued Patent: Feb. 27, 2018

(54) GAMING MACHINE WITH DICE SHAKING UNIT PERFORMING DICE SHAKING MOTIONS WITH VARYING AMPLITUDES

(71) Applicant: ARUZE GAMING AMERICA, INC., Las Vegas, NV (US)

(72) Inventors: Yoshitomo Sasaki, Tokyo (JP); Akira Shimizu, Tokyo (JP); Katsuhiro Kido, Tokyo (JP); Kenta Kitamura, Tokyo (JP); Hideaki Kishi, Tokyo (JP); Hiroatsu Ike, Tokyo (JP)

(73) Assignee: ARUZE GAMING AMERICA, INC., Las Vegas, NV (US)

(21) Appl. No.: 15/398,961

(22) Filed: Jan. 5, 2017

Related U.S. Patent Documents

Reissue of:
(64) Patent No.: 8,926,438
Issued: Jan. 6, 2015
Appl. No.: 13/062,717
PCT Filed: Sep. 8, 2009
PCT No.: PCT/JP2009/065643
§ 371 (c)(1),
(2) Date: Mar. 8, 2011
PCT Pub. No.: WO2010/029912
PCT Pub. Date: Mar. 18, 2010

U.S. Applications:
(60) Provisional application No. 61/095,821, filed on Sep. 10, 2008, provisional application No. 61/095,828,
(Continued)

(51) Int. Cl.
*A63F 9/04* (2006.01)
*G07F 17/32* (2006.01)

(52) U.S. Cl.
CPC ..... *G07F 17/32* (2013.01); *G07F 17/3216* (2013.01)

(58) Field of Classification Search
CPC ..... A63F 9/0415; A63F 9/0413; G07F 17/32; G07F 17/3216
(Continued)

(56) References Cited

U.S. PATENT DOCUMENTS 5,263,715 A * 11/1993 Matsumoto et al. ..... 463/22
6,220,594 B1 4/2001 Peng
(Continued)

FOREIGN PATENT DOCUMENTS

JP U 61-067787 5/1986
JP U 7-001976 1/1995
(Continued)

OTHER PUBLICATIONS

International Search Report issued in PCT/JP2009/065643, mailed Dec. 1, 2009. (with English-language translation).
(Continued)

*Primary Examiner* — Beverly M Flanagan
(74) *Attorney, Agent, or Firm* — Lex IP Meister, PLLC

(57) ABSTRACT

Provided is a gaming machine having a cabinet. Between the back as a back face and the right side face of the sides of the cabinet, the gaming machine has a right end side, which is formed by cutting a plane parallel to the gravitational direction in a manner to join lines spaced at predetermined distances in the individual directions of the back and the right side face from a line of intersection, on which the back and the right side face intersect when extended. The gaming machine also has a left end side between the back and a left side face. Moreover, the right end side and the left end side are symmetric with respect to a plane dividing the cabinet equally to the right and left.

9 Claims, 155 Drawing Sheets

Related U.S. Application Data filed on Sep. 10, 2008, provisional application No. 61/095,846, filed on Sep. 10, 2008, provisional application No. 61/096,146, filed on Sep. 11, 2008, provisional application No. 61/096,162, filed on Sep. 11, 2008, provisional application No. 61/096,344, filed on Sep. 12, 2008, provisional application No. 61/096,348, filed on Sep. 12, 2008, provisional application No. 61/114,799, filed on Nov. 14, 2008.

(58) Field of Classification Search
USPC ..... 463/46; 273/145 R, 145 C, 146
See application file for complete search history.

(56) References Cited

U.S. PATENT DOCUMENTS

| | | | | |
|---|---|---|---|---|
| 6,932,340 | B1 * | 8/2005 | Schaefer et al. | 273/146 |
| 7,361,090 | B2 * | 4/2008 | Lin | 463/22 |
| 7,857,310 | B2 * | 12/2010 | Yoshizawa | 273/146 |
| 2002/0183106 | A1 | 12/2002 | Cole | |
| 2003/0162591 | A1 | 8/2003 | Nguyen et al. | |
| 2007/0026947 | A1 | 2/2007 | Chun | |
| 2007/0029726 | A1 * | 2/2007 | Ohira | 273/145 R |
| 2008/0096641 | A1 | 4/2008 | Yoshizawa | |
| 2008/0099988 | A1 * | 5/2008 | Yoshizawa | 273/146 |
| 2008/0108401 | A1 * | 5/2008 | Baerlocher et al. | 463/12 |
| 2008/0113820 | A1 | 5/2008 | Tedsen et al. | |
| 2009/0224475 | A1 * | 9/2009 | Hsu et al. | A63F 9/0402 273/146 |

FOREIGN PATENT DOCUMENTS

| | | |
|---|---|---|
| JP | A 8-021875 | 1/1996 |
| JP | A 9-305827 | 11/1997 |
| JP | A 2003-079919 | 3/2003 |

OTHER PUBLICATIONS

International Style Search Report and Office Action issued in MO Application No. I/000980, mailed Dec. 1, 2010.

* cited by examiner

FIG. 10G

WIRELESS IC TAG MEMORY INFORMATION SUMMARY (DIE: RED)

| DIE FACE | UNIQUE ID | MEMORY ADDRESS | | | | | | |
|---|---|---|---|---|---|---|---|---|
| | | 00 | 01 | 02 | 03 | 04 | 05 | 06 |
| 1 | aaaa | RED:6 | 0EA0A6FB | | | | | xxxxxxxx |
| 2 | bbbb | | RED:5 | 9CD765BB | | | | xxxxxxxx |
| 3 | cccc | | | RED:4 | 04F168BA | | | xxxxxxxx |
| 4 | dddd | | | | RED:3 | 45B7A9BF | | xxxxxxxx |
| 5 | eeee | | | | | RED:2 | 8BA07D02 | xxxxxxxx |
| 6 | ffff | FC7A4685 | | | | | RED:1 | xxxxxxxx |

FIG. 11E

INSTRUCTION IMAGE DISPLAY DETERMINATION TABLE

| DEALER'S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 12E

BET EXISTENCE DETERMINATION TABLE

| | STATION NUMBER | | | | | |
|---|---|---|---|---|---|---|
| | 1 | 2 | 3 | 4 | 5 | |
| BET | A | P | P | A | A | ..... |
| VALUE | — | 10 | 5 | — | 15 | |

FIG. 13E

IC TAG DATA TABLE

| IDENTIFICATION DATA 1 | | IDENTIFICATION DATA 2 | | IDENTIFICATION DATA 3 | |
|---|---|---|---|---|---|
| TYPE | NUMBER OF DOTS | TYPE | NUMBER OF DOTS | TYPE | NUMBER OF DOTS |
| RED | 6 | WHITE | 3 | BLACK | 5 |

FIG. 14E

INFRARED CAMERA CAPTURING DATA TABLE

| X | Y | 181 | 182 | 183 | 184 | 185 | 186 | 187 |
|---|---|---|---|---|---|---|---|---|
| -50 | 55 | ○ | ○ | × | ○ | × | ○ | ○ |

FIG. 15E

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 16E

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 17A

INSTRUCTION IMAGE DISPLAY DETERMINATION TABLE

| DEALER'S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18A

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19A

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 17B

INSTRUCTION IMAGE DISPLAY DETERMINATION TABLE

| DEALER'S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18B

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19B

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 17C

INSTRUCTION IMAGE DISPLAY DETERMINATION TABLE

| DEALER' S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18C

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19C

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 17D

INSTRUCTION IMAGE DISPLAY DETERMINATION TABLE

| DEALER'S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18D

BET EXISTENCE DETERMINATION TABLE

| STATION NUMBER | 1 | 2 | 3 | 4 | 5 | 6 | 7 | 8 | 9 | 10 |
|---|---|---|---|---|---|---|---|---|---|---|
| BET INFORMATION | P | A | A | P | P | A | A | A | A | P |
| GAME START SIGNAL | P | A | A | P | P | A | A | A | A | P |

FIG. 19D

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 20A

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21A

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22A

INFRARED CAMERA CAPTURING DATA TABLE

| X | Y | 181 | 182 | 183 | 184 | 185 | 186 | 187 |
|---|---|---|---|---|---|---|---|---|
| -50 | 55 | ○ | ○ | × | ○ | × | ○ | ○ |

FIG. 20B

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21B

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22B

INFRARED CAMERA CAPTURING DATA TABLE

| X | Y | 181 | 182 | 183 | 184 | 185 | 186 | 187 |
|---|---|---|---|---|---|---|---|---|
| -50 | 55 | ○ | ○ | × | ○ | × | ○ | ○ |

FIG. 20C

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21C

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22C

INFRARED CAMERA CAPTURING DATA TABLE

| X | Y | 181 | 182 | 183 | 184 | 185 | 186 | 187 |
|---|---|---|---|---|---|---|---|---|
| −50 | 55 | ○ | ○ | × | ○ | × | ○ | ○ |

FIG. 20D

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21D

IC TAG DATA TABLE

| IDENTIFICATION DATA 1 | | IDENTIFICATION DATA 2 | | IDENTIFICATION DATA 3 | |
|---|---|---|---|---|---|
| TYPE | NUMBER OF DOTS | TYPE | NUMBER OF DOTS | TYPE | NUMBER OF DOTS |
| RED | 6 | WHITE | 3 | BLACK | 5 |

FIG. 22D

INFRARED CAMERA CAPTURING DATA TABLE

| X | Y | 181 | 182 | 183 | 184 | 185 | 186 | 187 |
|---|---|---|---|---|---|---|---|---|
| −50 | 55 | ○ | ○ | × | ○ | × | ○ | ○ |

FIG. 23A

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24A

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 23B

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24B

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 23C

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24C

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 23D

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24D

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG.25A

| CLASSIFICATION OF DICE | RED | NUMBER OF DOTS | X | Y | NUMBER OF DOTS | X | Y | ··· | NUMBER OF DOTS | X | Y | ··· | NUMBER OF DOTS | X | Y | ··· |
|---|---|---|---|---|---|---|---|---|---|---|---|---|---|---|---|---|
| | | 3 | 44 | 62 | 5 | 62 | −50 | ··· | 5 | −54 | −90 | ··· | 1 | 70 | 5 | ··· |
| | WHITE | NUMBER OF DOTS | X | Y | NUMBER OF DOTS | X | Y | ··· | NUMBER OF DOTS | X | Y | ··· | NUMBER OF DOTS | X | Y | ··· |
| | | 2 | −35 | 50 | 5 | −30 | −45 | ··· | 3 | 1 | 38 | ··· | 6 | 40 | −10 | ··· |
| | BLACK | NUMBER OF DOTS | X | Y | NUMBER OF DOTS | X | Y | ··· | NUMBER OF DOTS | X | Y | ··· | NUMBER OF DOTS | X | Y | ··· |
| | | 6 | 48 | −20 | 4 | −20 | 55 | ··· | 2 | 1 | −36 | ··· | 2 | 20 | −50 | ··· |

TYPE AND NUMBER OF DOTS DATA TABLE

| | NUMBER OF GAMES | 1 | 2 | ... | 100 | ... | 500 | ... |
|---|---|---|---|---|---|---|---|---|
| TYPE OF DICE | RED | NUMBER OF DOTS | NUMBER OF DOTS | ... | NUMBER OF DOTS | ... | NUMBER OF DOTS | ... |
| | | 3 | 5 | ... | 5 | ... | 1 | ... |
| | WHITE | NUMBER OF DOTS | NUMBER OF DOTS | ... | NUMBER OF DOTS | ... | NUMBER OF DOTS | ... |
| | | 2 | 5 | ... | 3 | ... | 6 | ... |
| | BLACK | NUMBER OF DOTS | NUMBER OF DOTS | ... | NUMBER OF DOTS | ... | NUMBER OF DOTS | ... |
| | | 6 | 4 | ... | 2 | ... | 2 | ... |

GAMING MACHINE WITH DICE SHAKING UNIT PERFORMING DICE SHAKING MOTIONS WITH VARYING AMPLITUDES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. patent application Ser. No. 13/062,717, filed Mar. 8, 2011, now U.S. Pat. No. 8,926,438, which is a National Stage application of PCT/JP2009/065643 filed on Sep. 8, 2009, which claims the benefit of U.S. Provisional Application Ser. Nos. U.S. 61/114,799 filed on Nov. 14, 2008, U.S. 61/096,348 filed on Sep. 12, 2008, U.S. 61/096,344 filed on Sep. 12, 2008, U.S. 61/096,146 filed on Sep. 11, 2008, U.S. 61/096,162 filed on Sep. 11, 2008, U.S. 61/095,828 filed on Sep. 10, 2008, U.S. 61/095,821 filed on Sep. 10, 2008, and U.S. 61/095,846 filed on Sep. 10, 2008, the contents of which are all hereby incorporated by reference herein in their entirety.*

TECHNICAL FIELD

The present invention relates to a gaming machine that requires a smaller installation area in a case where a plurality of terminals is installed, and provides enhanced visibility.

BACKGROUND ART

Conventionally, various table games are known. Among these table games, there are games hosted by a dealer and hosted by a computer in place of the dealer. In a case where the computer hosts a game, the game can be executed either in only one terminal or simultaneously in a plurality of terminals via a network.

In addition, in a case where such games are provided in a predetermined building, a large number of terminal devices, on which the games can be executed, are often installed in a predetermined region in the building. Furthermore, each of the terminal devices can provide a plurality of games to a player, for example, as disclosed in Patent Document 1.

In such a case, regarding the terminals providing a game, it is required to install as many as possible within a predetermined area in a gaming hall, so that a large number of players can participate in the game.

Patent Document 1: U.S. Patent Application Publication No. 2007/0026947

DISCLOSURE OF THE INVENTION

Problems to be Solved by the Invention

However, if the terminals are simply reduced in size, operating devices, a display for displaying the game, and the like also must be smaller. In such a case, there was a problem in that the terminals cannot give users a superior operational sensation and the display becomes difficult to recognize.

In addition, the terminals are generally required to be movable for changing an arrangement thereof in the gaming hall. However, if a handle and the like used for moving the terminal is always visible to players, appearance of the terminal is deteriorated.

Given this, the present invention aims at providing a gaming machine that allows a larger number of terminals to be installed in a limited area while improving visibility.

Means for Solving the Problems

In a first aspect of the present invention, a gaming machine includes: a cabinet that houses devices for executing a game, and has an opening on an upper side; a top door disposed to cover the opening; a control unit that executes the game; and an operating unit that is disposed along a peripheral edge on a front side of the top door, and can be operated by a player, in which the cabinet includes: a back face, which is a face on a back side that is an opposite side to a side on which the operating unit is disposed, a right lateral face, which is a face on a right side when the back face is viewed from a direction of the operating unit, a left lateral face, which is a face opposed to the right lateral face of the cabinet, a right end face shaped in a plane parallel to a direction of gravitational force so as to connect two points that are on the back face and the right lateral face respectively, each of which is separated predetermined distances from a point of intersection at which an extended line of the back face and an extended line of the right lateral face intersect each other, and a left end face shaped in a plane parallel to a direction of gravitational force so as to connect two points that are on the back face and the left lateral face respectively, each of which is separated predetermined distances from a point of intersection at which an extended line of the back face and an extended line of the left lateral face intersect each other, and in which the right end face and the left end face are positioned to be plane-symmetrical to each other across a plane vertically dividing the cabinet into two equal parts.

According to the first aspect of the present invention, the gaming machine includes a cabinet, a top door disposed to cover an opening in the cabinet, and a control unit. When the operating unit is viewed from a front, between a back face that is on a back side of the cabinet and a right lateral face that is on a right side of the cabinet, is located a right end face, which is shaped in a plane parallel to a direction of gravitational force so as to connect two points that are on the back face and the right lateral face respectively, each of which is separated predetermined distances from a point of intersection at which an extended line of the back face and an extended line of the right lateral face intersect each other. Similarly, between the back face and the left lateral face, is located a left end face. In addition, the right end face and the left end face are positioned to be plane-symmetrical to each other across a plane vertically dividing the cabinet into two equal parts.

In such a configuration, in a case where a plurality of the gaming machines is installed in a substantially circular manner, an installation diameter can be reduced by contacting the right end face and the left end face of the gaming machine with the left end face and the right end face of the adjacent gaming machines, respectively, thereby allowing more gaming machines to be installed within a limited area.

According to a second aspect of the present invention, in the gaming machine as described in the first aspect, the cabinet includes a handle portion formed on at least one of the right end face and the left end face.

According to the second aspect of the present invention, in addition to the gaming machine as described in the first aspect, the cabinet includes a handle portion formed on at least one of the right end face and the left end face. The abovementioned configuration is useful for moving the gaming machine and can improve visibility since the handle portion is hidden when a plurality of the gaming machines is installed in a substantially circular manner.

According to a third aspect of the present invention, a gaming machine is provided which includes: a display that displays an image relating to a game; a playing unit on which a plurality of dice rolls and comes to rest; a sensor that receives identification data of a number of dots on the dice by performing communication with the dice; memory that stores a classification and number of dots of the dice for each game; and a controller that executes processing of: (a) driving the sensor and receiving from the sensor identification data converted by the sensor; (b) determining a classification and number of dots of the dice based on the identification data thus received; (c) storing the classification and number of dots on the dice thus determined in the memory for each game; (d) calculating a frequency at which each number of dots appears over a predetermined number of games for each classification of the dice; and (e) displaying, in a case in which a frequency at which a specific number of dots on a specific die appears at least a predetermined number of times, as a result of calculation in the processing (d), an indication thereof on the display.

According to the third aspect of the present invention, since the controller calculates a frequency at which each number of dots appears over a predetermined number of games for each classification of the dice and displays, in a case in which the frequency at which a specific number of dots on a specific die appears at least a predetermined number of time, an indication thereof on the display, in a case in which a specific number of dots of a specific classification of a die appears frequently and the like, it is possible to detect damage to a die or fraudulence related to a die.

According to a fourth aspect of the present invention, in a gaming machine according to the third aspect, the controller executes processing for interrupting a game, in a case in which a frequency at which a specific number of dots on a specific die appears at least a predetermined number of times, as a result of the calculation in the processing (d).

According to the fourth aspect of the present invention, since the controller calculates a frequency at which each of the numbers of dots appears over a predetermined number of games for each classification of the dice, and interrupts a game in a case in which a frequency at which a specific number of dots on a specific die appears at least a predetermined number of times, whereby it is possible to detect damage to a die or fraudulence related to a die in a case in which a specific number of dots of a specific classification of a die appears frequently and the like.

According to a fifth aspect of the present invention, a gaming machine is provided which includes: a display that displays an image relating to a game; a playing unit on which a plurality of dice rolls and comes to rest; a sensor that identifies and converts a classification and number of dots of the dice to imaging data memory that stores a classification and number of dots of the dice for each game; and a controller that executes processing of: (a) driving the sensor and receiving from the sensor imaging data converted by the sensor; (b) determining a classification and number of dots of the dice based on the imaging data thus received; (c) storing the classification and number of dots of the dice thus determined in the memory for each game; (d) calculating a frequency at which each number of dots appears over a predetermined number of games for each classification of the dice; and (e) displaying, in a case in which a frequency at which a specific number of dots on a specific die appears at least a predetermined number of times, as a result of calculation in the processing (d), an indication thereof on the display.

According to the fifth aspect of the present invention, since the controller calculates a frequency at which each of the numbers of dots appears over a predetermined number of games for each classification of the dice and, in a case in which a frequency at which a specific number of dots on a specific die appears at least a predetermined number of times, displays an indication thereof on the display, whereby it is possible to detect damage to a die and fraudulence related to a die in a case in which a specific number of dots of a specific classification of a die appears frequently and the like.

According to a sixth aspect of the present invention, in a gaming machine according to the fifth aspect, the controller executes processing for interrupting a game, in a case in which a frequency at which a specific number of dots on a specific die appears at least a predetermined number, as a result of calculation in the processing (d).

According to the sixth aspect of the present invention, since the controller calculates a frequency at which each number of dots appears over a predetermined number of games for each classification of the dice and, in a case in which a frequency at which a specific number of dots on a specific die appears at least a predetermined number of times, interrupts a game, it is possible to detect damage to a die or fraudulence related to a die in a case in which a specific number of dots of a specific classification of a die appears frequently and the like.

According to a seventh aspect of the present invention, a gaming machine is provided which includes: a playing unit on which a plurality of dice rolls and comes to rest; an oscillation device that causes the playing unit to oscillate; memory that stores a plurality of types of rendered effect data corresponding to a plurality of types of oscillation modes in which the playing unit is oscillated by the oscillation device; and a controller that executes processing of: (a) starting a unit game; (b) determining the oscillation mode when the unit game starts; (c) extracting the rendered effect data corresponding to the oscillation mode thus determined from the memory; and (d) performing rendered effects based on the rendered effect data thus extracted.

According to the seventh aspect of the present invention, since the rendered effects corresponding to the oscillation mode of the playing unit in the unit game are performed, a gaming machine having game play that does not become monotonous and is more amusing can be provided.

According to a eighth aspect of the present invention, a gaming machine according to the seventh aspect further includes a speaker that outputs sound relating to game play, in which the processing (d) causes sound to be output from the speaker based on the rendered effect data thus extracted.

According to the eighth aspect of the present invention, since the rendered effects corresponding to the oscillation mode of the playing unit in the unit game are performed by way of sound, a gaming machine having a game that does not become monotonous and is more amusing can be provided.

According to a ninth aspect of the present invention, a gaming machine according to the seventh aspect further includes a light emitting body that emits light relating to game play, in which the processing (d) causes light to be emitted from the light emitting body based on the rendered effect data thus extracted.

According to the ninth aspect of the present invention, since the rendered effects corresponding to the oscillation mode of the playing unit in the unit game are performed by way of light, a gaming machine having a game that does not become monotonous and is more amusing can be provided.

According to a tenth aspect of the present invention, a gaming machine is provided which includes: a plurality of stations; a plurality of input devices that is respectively provided to the plurality of stations, and through which a bet can be performed on a number of dots on dice; and a controller that executes the following processing of: (a) starting a unit game, and accepting a bet during a first predetermined time from each of the plurality of input devices; (b) when the first predetermined time elapses, accepting a bet for a subsequent game during a second predetermined time from each of the plurality of input devices; and (c) when the second predetermined time elapses, starting a subsequent game.

According to the tenth aspect of the present invention, the controller starts a unit game and accepts a bet during a first predetermined time from each of the plurality of input devices, when the first predetermined time elapses, and accepts a bet for a subsequent game from each of the plurality of input devices during a second predetermined time. Thus, a gaming machine can be provided through which betting can be performed for a subsequent game even if the unit game is in the middle of execution.

According to a eleventh aspect of the present invention, a gaming machine is provided which includes: a plurality of stations; a plurality of input devices that is respectively provided to the plurality of stations, and through which bettering can be performed on a number of dots on dice; and a controller that executes the following processing of: (a) starting a unit game, and accepting a bet during a first predetermined time from each of the plurality of input devices; (b) when the first predetermined time elapses, determining whether a bet has been made during the first predetermined time for each of the plurality of stations; (c) accepting a bet for a subsequent game during a second predetermined time from the input device provided to a station at which a bet has been determined not to have been made in the processing (b); and (d) when the second predetermined time elapses, starting a subsequent game.

According to the eleventh aspect of the present invention, the controller accepts a bet for a subsequent game during a second predetermined time from the input device provided to a station at which a bet has been determined not to have been made in the processing (b). Thus, a gaming machine can be provided in which a player who has not participated in the unit game can place a bet on a subsequent game even if the unit game is in the middle of execution.

According to a twelfth aspect of the present invention, a gaming machine includes: a plurality of stations; a plurality of input devices that are provided to the plurality of stations and through which a bet can be placed on a bet target; and a controller that executes the following processing of: (a) setting a bet time for accepting a bet by the plurality of input devices; (b) accepting a bet from each of the plurality of input devices; (c) accepting a game start signal from an input device that has accepted a bet among the plurality of input devices; (d) shortening the bet time, in a case of accepting the game start signal; and (e) starting a game when the bet time has elapsed.

According to the twelfth aspect of the present invention, the controller sets a bet time for accepting a bet by the plurality of input devices; accepts a bet from each of the plurality of input devices; accepts a game start signal from an input device that has accepted a bet among the plurality of input devices; shortens the bet time, in a case of accepting the game start signal; and starts a game when the bet time has elapsed.

Thus, in the gaming machine provided with a plurality of stations that executes a mass game, the bet time set by the controller can be shortened by the game start signal accepted from the input devices of the stations.

Accordingly, a gaming machine that can shorten a bet time in a mass game can be provided.

Thus, for example, by providing in the input device a start button that is operated by a player and may transmit the game start signal, for example, if there is a single player, this player can play the game at the his/her own pace by operating the start button without waiting for the bet time set by the controller.

According to a thirteenth aspect of the present invention, a gaming machine includes: a plurality of stations; a plurality of input devices that are provided to the plurality of stations and through which a bet can be placed on a bet target; and a controller that executes the following processing of: (a) setting a bet time for accepting a bet by the plurality of input devices; (b) accepting a bet from each of the plurality of input devices; (c) accepting a game start signal from all of the input devices that have accepted a bet among the plurality of input devices; (d) shortening the bet time, in a case of accepting the game start signal from all of the input devices that have accepted the bet; and (e) starting a game when the bet time has elapsed.

According to the thirteenth aspect of the present invention, in the processing (c) and (b) in the first aspect, the controller accepts a game start signal from all of the input devices that have accepted a bet among a plurality of input devices and, in a case in which the game start signal has been accepted from all of the input devices that have accepted the bet, shortens the bet time.

Thus, for example, in a case in which a plurality of players have been playing, since the bet time is shortened when a game start signal has been transmitted from all of the players, the bet time can be shortened while waiting for bets from all of the players.

Therefore, a gaming machine can be provided that can shorten a bet time while waiting bets from all of the players in a mass game.

According to a fourteenth aspect of the present invention, a gaming system includes: a dice movable unit having a plurality of dice and a shaking device that causes the plurality of dice to shake; a game terminal having an operation device that a player can operate; and a controller that executes processing of: (a) receiving a bet end signal, which indicates that betting has ended, from the game terminal; (b) transmitting a permission signal, which permits an operation by the operation device, to the game terminal; (c) receiving an operation signal that indicates that the operation device has been operated; and (d) transmitting a shaking motion start signal, which causes a shaking motion by the shaking device to start, to the dice movable unit, in which the dice movable unit (d1) performs the shaking motion by the shaking device in response to having received the shaking motion start signal from the controller.

According to the fourteenth aspect of the present invention, when a controller receives from a game terminal a bet end signal indicating that a bet operation has ended, the controller transmits a permission signal that permits an operation by an operation device. In the game terminal, when the operation device is operated and an operation signal is transmitted, in response to having received the operation signal, the controller transmits a shaking motion start signal that causes a dice movable unit to be shaken, and a shaking device of the dice movable unit performs a shaking motion. Thus, by providing an opportunity for a player can shake the dice, it allows the player to participate in the game actively, and can provide a live aspect.

According to a fifteenth aspect of the present invention, a gaming system includes: a dice movable unit having a plurality of dice and a shaking device that causes the plurality of dice to roll; a game terminal having an operation device that a player can operate; and a controller that executes processing of: (a) receiving a bet end signal, which indicates that betting has ended, from the game terminal; (b) transmitting a first shaking motion start signal, which causes a first shaking motion by the shaking device to start, to the dice movable unit; (c) transmitting a permission signal, which permits a operation by the operation device, to a predetermined game terminal; (d) receiving an operation signal, which indicates that the operation device has been operated, from the predetermined game terminal; and (e) transmitting a second shaking motion start signal, which causes a second shaking motion by the shaking device to start, to the dice movable unit; in which the dice movable unit (b1) starts the first shaking motion in response having received the first shaking motion start signal from the controller; and (e1) performs the second shaking motion, which has an amplitude larger than that of the first shaking motion, in response to having received the second shaking motion start signal from the controller.

According to the fifteenth aspect, when the controller receives from the game terminal a bet end signal indicating that a bet operation has ended, the controller transmits a first shaking motion start signal for causing the dice movable unit to be shaken, and the dice movable unit that has received this causes the shaking device to perform the first shaking motion. Then, the controller transmits a permission signal, which permits an operation by the operation device, to a predetermined game terminal. The operation device is operated at the game terminal and the operation signal is transmitted. The controller transmits a second shaking motion start signal that causes the dice movable unit to perform the second shaking motion in response to having received the operation signal, and a shaking device of the dice movable unit performs the second shaking motion. At this time, the amplitude of the second shaking motion is larger than that of the first shaking motion. Thus, by providing an opportunity for a player to be able to shake the dice, it allows the player to participate in the game actively, and can provide a live aspect.

According to a sixteenth aspect of the present invention, a gaming system includes: a dice movable unit having a plurality of dice and a shaking device causes the plurality of dice to roll; a game terminal having an operation device that a player can operate; memory that stores bet data that indicates an amount of a bet that the game terminal has accepted; and a controller that executes processing of: (a) receiving a bet end signal, which indicates that a bet has been ended, along with bet data that the game terminal has accepted, from the game terminal; (b) storing the bet data thus received in the memory; (c) transmitting a first shaking motion start signal that causes a first shaking motion by the shaking device to start, to the dice movable unit; (d) comparing the bet data thus stored in the memory by the processing (b) and transmitting a permission signal, which permits an operation by the operation device, to the game terminal that has transmitted a value of largest amount; (e) receiving an operation signal, which indicates that the operation device has been operated, from a game terminal that has transmitted the permission signal; and (f) transmitting a second shaking motion start signal, which causes a second shaking motion by the shaking device to start, to the dice movable unit, in which the dice movable unit; (b1) starts a first shaking motion in response to having received the first shaking motion start signal from the controller; and (f1) performs the second shaking motion, which has an amplitude larger than that of the first shaking motion, in response to having received the second shaking motion start signal from the controller.

According to the sixteenth aspect of the present invention, when the controller receives from the game terminal a bet end signal, which indicates that a bet operation has been ended, along with bet data, which indicates an amount thus bet, the controller stores the bet data in the memory. Then, the controller transmits a first shaking motion start signal that causes the dice movable unit to perform a first shaking motion, and the dice movable unit that has received this causes the shaking device to start the first shaking motion. Next, the controller compares the bet data thus stored in the memory and transmits a permission signal by an operation device to the game terminal that has transmitted bet data indicating a value of largest amount. In the game terminal to which the permission signal has been transmitted, the operation device is operated, and in response to having received the operation signal, the controller transmits a second shaking motion start signal that causes the dice movable unit to perform a second shaking motion, and the shaking device of the dice movable unit performs a second shaking motion. At this time, the amplitude of the second shaking motion is larger than that of the first shaking motion.

Thus, by providing an opportunity for a player to be able to shake the dice, it allows the player to participate in the game actively, and can provide a live aspect.

According to a seventeenth aspect of the present invention, a gaming system includes: a dice movable unit having a plurality of dice and a shaking device that causes the plurality of dice to roll; a game terminal having a display device that performs display relating to a game and an operation device that a player can operate; memory that stores bet data indicating an amount of a bet that the game terminal has accepted; and a controller that executes processing of: (a) receiving a bet end signal, which indicates that betting has ended, along with bet data that the game terminal has accepted, from the game terminal; (b) storing the bet data thus received in the memory; (c) transmitting a first shaking motion start signal, which causes a first shaking motion by the shaking device to start, to the dice movable unit; (d) comparing the bet data thus stored in the memory by the processing (b) and transmitting a permission signal, which permits an operation by the operation device, to the game terminal that has transmitted a value of largest amount; (e) receiving an operation signal indicating that the operation device has been operated from a game terminal that has transmitted the permission signal; and (f) transmitting a second shaking motion start signal, which causes a second shaking motion by the shaking device to start, to the dice movable unit and the game terminal, in which the dice movable unit (b1) starts a first shaking motion in response to having received the first shaking motion start signal from the controller; and (f1) performs the second shaking motion, which has an amplitude larger than that of the first shaking motion, in response to having received the second shaking motion start signal from the controller, in which the game terminal (f2) performs processing of changing an image displayed on the display device in a case having received the second shaking motion start signal from the controller.

According to the seventeenth aspect of the present invention, when the controller receives a bet end signal that indicates that a bet operation has been ended along with bet data that indicates an amount thus bet, from the game terminal, the controller stores the bet data in the memory. Then, the controller transmits a first shaking motion start signal that causes the dice movable unit to perform a first shaking motion, and the dice movable unit that has received this causes the shaking device to start the first shaking motion. Next, the controller compares the bet data thus stored in the memory and transmits a permission signal by an operation device to the game terminal that has transmitted bet data indicating a value of largest amount. In the game terminal to which the permission signal has been transmitted, when the operation device is operated, an operation signal is transmitted from the game terminal. Then, in response to having received the operation signal, the controller transmits a second shaking motion start signal that causes the dice movable unit to perform a second shaking motion, and the shaking device of the dice movable unit performs a second shaking motion. At this time, the amplitude of the second shaking motion is larger than that of the first shaking motion. Furthermore, the game terminal that has received the second shaking motion start signal from the controller performs processing of shaking an image displayed on the display device.

Thus, by providing an opportunity for a player to be able to shake the dice and by shaking an image of the display displayed on the game terminal upon the shaking motion, it allows the player to participate in the game actively, and can provide a live aspect by prompting so that the player gets the feeling of participating in the game.

A eighteenth aspect of the present invention is the gaming system according to the fourth aspect in which the processing of changing the image in the processing (f2) is processing that causes an image to momentarily shake.

According to the eighteenth aspect of the present invention, in addition to the gaming system according to the fourth aspect, the game terminal causes an image displayed on the display device to shake momentarily in response to having received the second shaking motion start signal.

According to a nineteenth aspect of the present invention, a die used in a gaming machine, which detects a number of dots on a die using RFID tags, includes a first foam member; a second foam member that covers an outside of the first foam member and has a foam expansion ratio relative to an original volume thereof which is lower than that of the first foam member; and a covering member that covers an outside of the second foam member, in which the RFID tags are disposed at each face of the first foam member and are held between the first foam member and the second foam member.

According to the nineteenth aspect of the present invention, since a foam member is used for a base material, weight reduction of the die is possible. Furthermore, since the RFID tags are disposed in the vicinity of the foam member with the three-piece structure of the core portion 71, the intermediate portion 72, and the covering portion 73, buffering shock transmitted to the RFID tags 51 to 56 due to shock to the dice is possible by way of the foam member, whereby the RFID tags 51 to 5 can be protected. Furthermore, the RFID tags are disposed between the first foam member and the second foam member, and the second foam member is made of a foam member that is relatively harder than the first foam member. Therefore, an amount of deformation of the second foam member due to shock to the dice is reduced, and it is possible to prevent failure such as by damage to an RFID tag due to deformation of the RFID tag along with deformation of the second foam member. Thus, it is possible to provide a weight reduction in dice and dice that realize protection of the RFID tags thereof.

According to a twenty third aspect of the present invention, a detection device that is used in a gaming system that detects a number of dots of a die, and detects a number of dots of a die having a wireless tag, includes: a reader that reads data stored in the wireless tag; and a controller that processes information thus read by the reader, in which the wireless tag includes: a unique information storage portion that stores unique information of the wireless tag, a number of dots information storage portion that stores number of dots information of a die in any of a plurality of storage locations, a serial information storage portion that stores die serial information unique to the die, and an error detection information storage portion that stores error detection information, and in which the controller performs processing of: (a) acquiring address information indicating a location at which the number of dots information is stored among the plurality of storage locations in the number of dots information storage portion, using the unique information read from the unique information storage portion by the reader, (b) acquiring the number of dots information from the number of dots information storage portion of the wireless tag using the reader, based on the address information, (c) acquiring the die serial information from the die serial information storage portion and the error detection information from the error detection storage portion using the reader, (d) calculating a CRC value according to a CRC method using the unique information, the unique number of dots information, and the die serial information, and (e) comparing the error detection information with the CRC value calculated in the processing of (d).

According to the twenty third aspect of the present invention, with the detection device according to the present invention, after having acquired from the reader address information indicating the location, among the plurality of storage locations in the number of dots information storage portion, at which the number of dots information is stored using the unique information stored in the wireless tag, the controller acquires number of dots information from the address via the reader.

In addition, the controller acquires die serial information unique to the die from the die serial information storage portion of the wireless tag, and error detection information from the error detection information storage portion.

Thereafter, processing of calculating the CRC value according to the CRC method using the unique information, number of dots information and die serial information, and of comparing the error detection information and the CRC value thereof is performed.

It is thereby possible to acquire correct number of dots information from the wireless tag, since it is revealed that there are no errors in the information read if the error detection information and the CRC value newly calculated are the same.

According to a twenty fourth aspect of the present invention, in addition to the detection device as described in the twenty third aspect, the processing of (a) is processing for obtaining the address information using the unique information and a predetermined function stored in a storage portion of the controller.

According to the twenty fourth aspect of the present invention, in addition to the detection device as described in the twenty third aspect, the processing of (a) performed by the reading device obtains address information using unique information and a predetermined function.

It is thereby possible to read number of dots information from a plurality of storage locations without mistakes.

According to a twenty fifth aspect of the present invention, in addition to the detection device as described in the twenty third aspect, color information of the die is included in the number of dots information.

According to the twenty fifth aspect of the present invention, in addition to the detection device as described in the twenty third aspect, color information of the die is included in the number of dots information.

It is thereby also possible to use the color of a die as number of dots information.

According to a twenty sixth aspect of the present invention, in addition to the detection device as described in the twenty third aspect, the wireless tag is respectively provided to each face of the die.

According to the twenty sixth aspect of the present invention, in addition to the detection device as described in the twenty third aspect, the wireless tag is provided in each face of the die.

The reading device can thereby read precise detection information, since what the number of dots of the die is can be read from the wireless tags disposed in individual faces.

According to a twenty seventh aspect of the present invention, a method for detecting a number of dots of a die having a wireless tag includes the steps of: (a) calculating an address at which number of dots information of a die is stored, using unique information of the wireless tag read from the wireless tag; (b) acquiring the number of dots information from the address thus calculated in step (a); (c) acquiring die serial information indicating unique information of the die stored in the wireless tag, and error detection information used in error detection; (d) calculating a CRC value according to a CRC method using the unique information, the die serial information, and the number of dots information; and (e) comparing the error detection information and the CRC value calculated in step (d).

According to a twenty eighth aspect of the present invention, in the detection method as described in the twenty seventh aspect, step (a) is a step for obtaining the address information using the unique information and a predetermined function stored in a storage portion of a controller.

According to a twenty ninth aspect of the present invention, in the detection method as described in the twenty seventh aspect, color information of the die is included in the number of dots information.

According to a thirtieth aspect of the present invention, in the detection method as described in the twenty seventh aspect, the wireless tag is respectively provided to each face of the die.

According to a thirty first aspect of the present invention, a detection device that is used in a gaming system that detects a number of dots of a die, and detects a number of dots of a die having a plurality of wireless tags, includes: a reader that reads data stored in the wireless tag; and a controller that processes information thus read by the reader, in which the wireless tag includes: a unique information storage portion that stores unique information of the wireless tag; and a number of dots information storage portion that stores number of dots information of a die in any of a plurality of storage locations, and in which the controller performs processing of:

(a) acquiring address information indicating a location at which the number of dots information is stored among the plurality of storage locations in the number of dots information storage portion, using the unique information read from the unique information storage portion by the reader, and (b) acquiring the number of dots information from the number of dots information storage portion of the wireless tag using the reader, based on the address information.

In the detection device according to the present invention, when the controller acquires unique information stored in the unique information storage portion of the wireless tag via the reader, using this unique information, the controller acquires the address information indicating at which storage location, among the plurality of storage locations, the number of dots information stored in the number of dots information storage portion of the wireless tag is stored.

Then, based on the address information thus acquired, it is possible to further acquire the number of dots information of the wireless tag via the reader.

With this, it is possible to configure so that the addresses at which number of dots information is stored differs, and it is possible to prevent fraudulent reading.

According to a thirty second aspect of the present invention, in the detection device as described in the thirty first aspect, the number of dots information storage portion includes, in any of the plurality of storage locations, an error detection information storage portion that stores error detection information, and the controller further performs processing of:

(a2) acquiring second address information indicating a location of the error detection information storage portion, among the plurality of storage locations in the number of dots information storage portion, using the unique information read from the unique information storage portion by the reader, and (b2) acquiring the error detection information from the error detection information storage portion of the wireless tag using the reader, based on the second address information.

According to the thirty second aspect of the present invention, in addition to the detection device as described in the thirty first aspect, the number of dots information storage portion of the wireless tag has an error detection information storage portion that stores error detection information in any among the plurality of storage locations, and the second address information set as the error detection information storage portion is acquired using the unique information of the wireless tag acquired via the reader.

Then, the controller can acquire number of dots information stored in the number of dots information storage portion with the reader, based on the second address information.

According to a thirty third aspect of the present invention, in the detection device as described in the thirty first aspect, the wireless tag further includes a serial information storage portion that stores die serial information unique to the die, and the die serial information is a value common in the plurality of wireless tags included by the die.

According to the thirty third aspect of the present invention, in addition to the detection device as described in the thirty first aspect, the wireless tag further has a die serial information storage portion that stores die serial information unique to the die, the die serial information being a common value to the plurality of wireless tags possessed by one die.

It is thereby possible to easily recognize with which die a fraudulent act has been performed, since the die serial information will differ among the plurality of wireless tags in a case of the information of one wireless tag having been fraudulently replaced.

According to a thirty fourth aspect of the present invention, in the detection device as described in the thirty first aspect, the wireless tag further includes a serial information storage portion that stores die serial information unique to the die, in which the number of dots information storage portion includes, in any of the plurality of storage locations, an error detection information storage portion that stores error detection information, and the controller further performs processing of:

(a2) acquiring second address information indicating a location of the error detection information storage portion, among the plurality of storage locations in the number of dots information storage portion, using the unique information read from the unique information storage portion by the reader, (b2) acquiring the error detection information from the error detection information storage portion of the wireless tag using the reader, based on the second address information, (c) calculating a CRC value according to a CRC method using the unique information, the number of dots information, and the die serial information, and (d) comparing the error detection information and the CRC value calculated in the processing of (c).

After having acquired address information of the number of dots information storage portion from the reader based on the unique information, the controller acquires number of dots information from the address via the reader.

The die serial information is acquired from the die serial information storage portion that stores the die serial information unique to the die.

In addition, error detection information is acquired from the error detection information storage portion.

Thereafter, processing of calculating the CRC value according to the CRC method using the unique information, number of dots information and die serial information, and of comparing the error detection information and the CRC value thereof is performed.

It is thereby possible to acquire correct number of dots information from the wireless tag, since it is revealed that there are no errors in the information read if the error detection information and the CRC value newly calculated are the same.

According to a thirty fifth aspect of the present invention, in the detection device as described in the thirty first aspect, the processing of (a) is processing for obtaining the address information using the unique information and a predetermined function stored in a storage portion of the controller.

According to a thirty sixth aspect of the present invention, in the detection device as described in the thirty second aspect, the processing of (a2) is processing for obtaining the address information using the unique information and a predetermined function stored in a storage portion of the controller.

According to a thirty seventh aspect of the present invention, in the detection device as described in the thirty first aspect, color information of the die is included in the number of dots information.

According to a thirty eighth aspect of the present invention, in the detection device as described in the thirty first aspect, the wireless tag is respectively provided to each face of the die.

Effects of the Invention

According to the present invention, it is possible to provide a gaming machine that allows a larger number of terminals to be installed in a limited area while improving visibility.

BRIEF DESCRIPTION OF THE DRAWINGS

FIGS. 6A to 9A show IC tag readable areas by IC tag readers according to the embodiment of the present invention;

FIG. 25A is a position, classification, and number of dots data table according to the embodiment of the present invention;

FIG. 26A is a classification and number of dots data table according to the embodiment of the present invention;

FIGS. 27A to 31A show examples of display screens according to the embodiment of the present invention;

FIGS. 6B to 9B show IC tag readable areas by IC tag readers according to the embodiment of the present invention;

FIGS. 25B to 29B show examples of display screens according to the embodiment of the present invention;

FIGS. 6C to 9C show IC tag readable areas by IC tag readers according to the embodiment of the present invention;

FIGS. 25C to 29C show examples of display screens according to the embodiment of the present invention;

FIGS. 6D to 9D show IC tag readable areas by IC tag readers according to the embodiment of the present invention;

FIG. 24D is a number of dots-dot pattern data table according to the embodiment of the present invention;

FIGS. 25D to 29D show examples of display screens according to the embodiment of the present invention;

FIG. 30D is a flowchart showing dice game processing executed in a gaming machine according to the embodiment of the present invention; and FIG. 31D is a flowchart showing bet processing executed in a gaming machine according to the embodiment of the present invention.

FIG. 1E is a flowchart schematically showing a processing sequence of a gaming system according to an embodiment of the present invention;

FIG. 2E is a perspective view schematically showing an example of a gaming machine according to an embodiment of the present invention;

FIG. 3E is a perspective view showing a game terminal according to an embodiment of the present invention;

FIG. 4E is a perspective view showing a dice movable unit according to an embodiment of the present invention;

FIG. 5E shows a sheet attached to each face of a die according an embodiment of the present invention;

FIG. 6E shows an image in which a die according to an embodiment of the present invention that has come to rest on a playing board, is captured substantially in the vertically upward direction by an infrared camera;

FIG. 7E is a diagram showing an example of an image displayed on a display screen of a history display unit according to an embodiment of the present invention;

FIG. 8E is a diagram showing an example of a display screen displayed on a display device according to an embodiment of the present invention;

FIG. 9E is a block diagram showing an internal configuration of a controller according to an embodiment of the present embodiment;

Figure 10A:
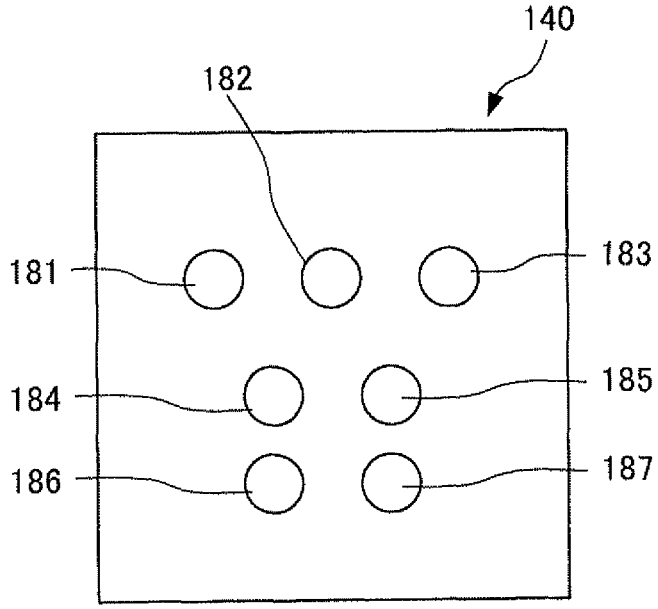
FIG. 10A shows a sheet attached to each face of a die according the embodiment of the present invention.
Figure 10B:
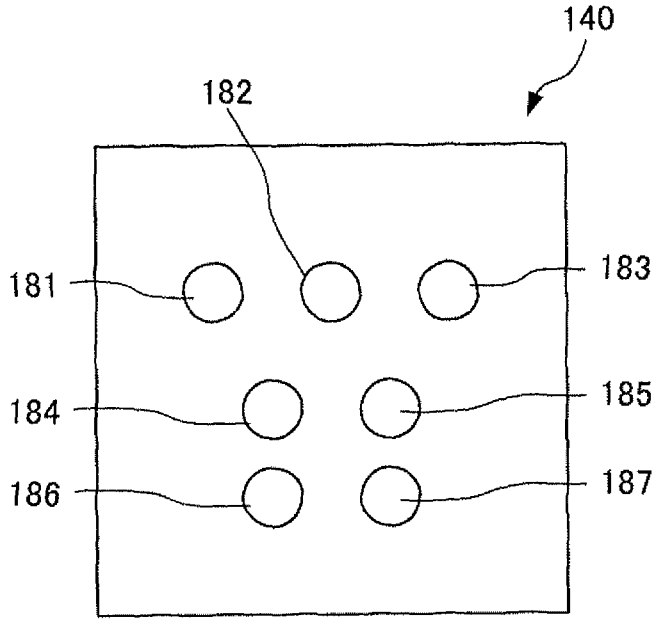
FIG. 10B shows a sheet attached to each face of a die according the embodiment of the present invention.
Figure 10C:
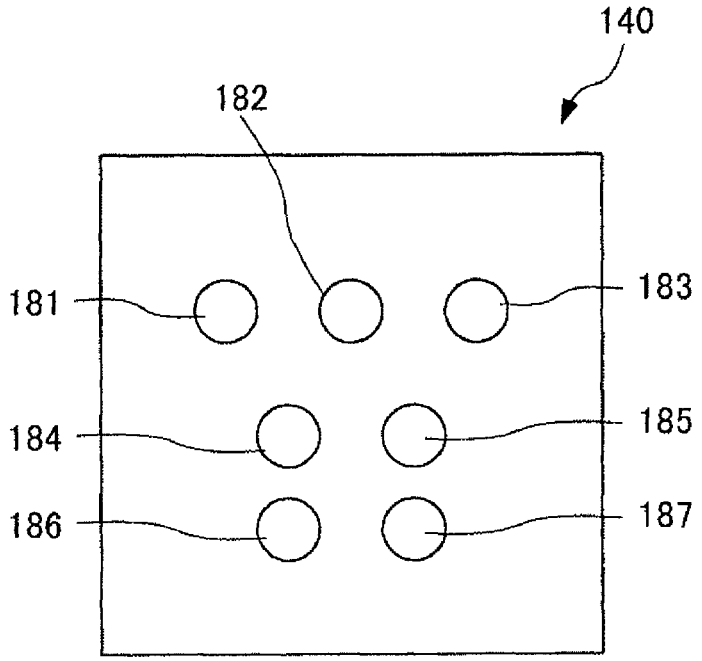
FIG. 10C shows a sheet attached to each face of a die according the embodiment of the present invention.
Figure 10D:
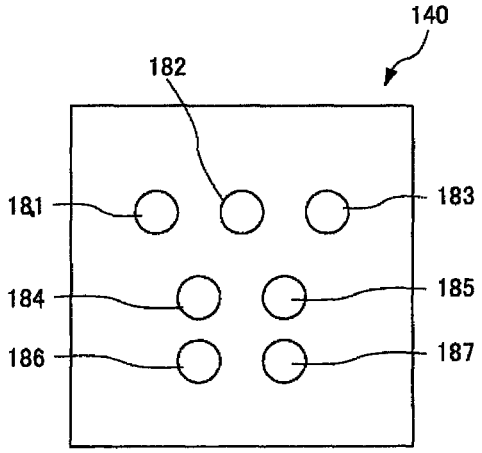
FIG. 10D shows a sheet attached to each face of a die according the embodiment of the present invention.
Figure 10:
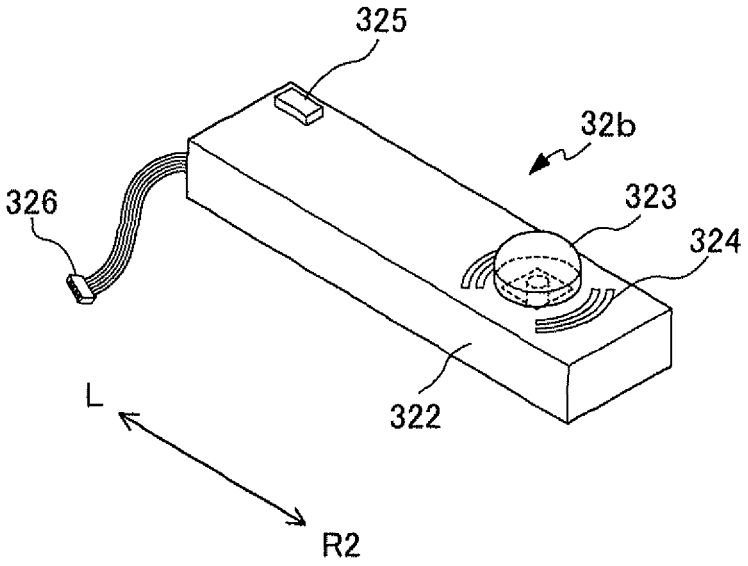
FIG. 10 is an enlarged view of an operating unit 32b according to the embodiment of the present invention.
Figure 10E:
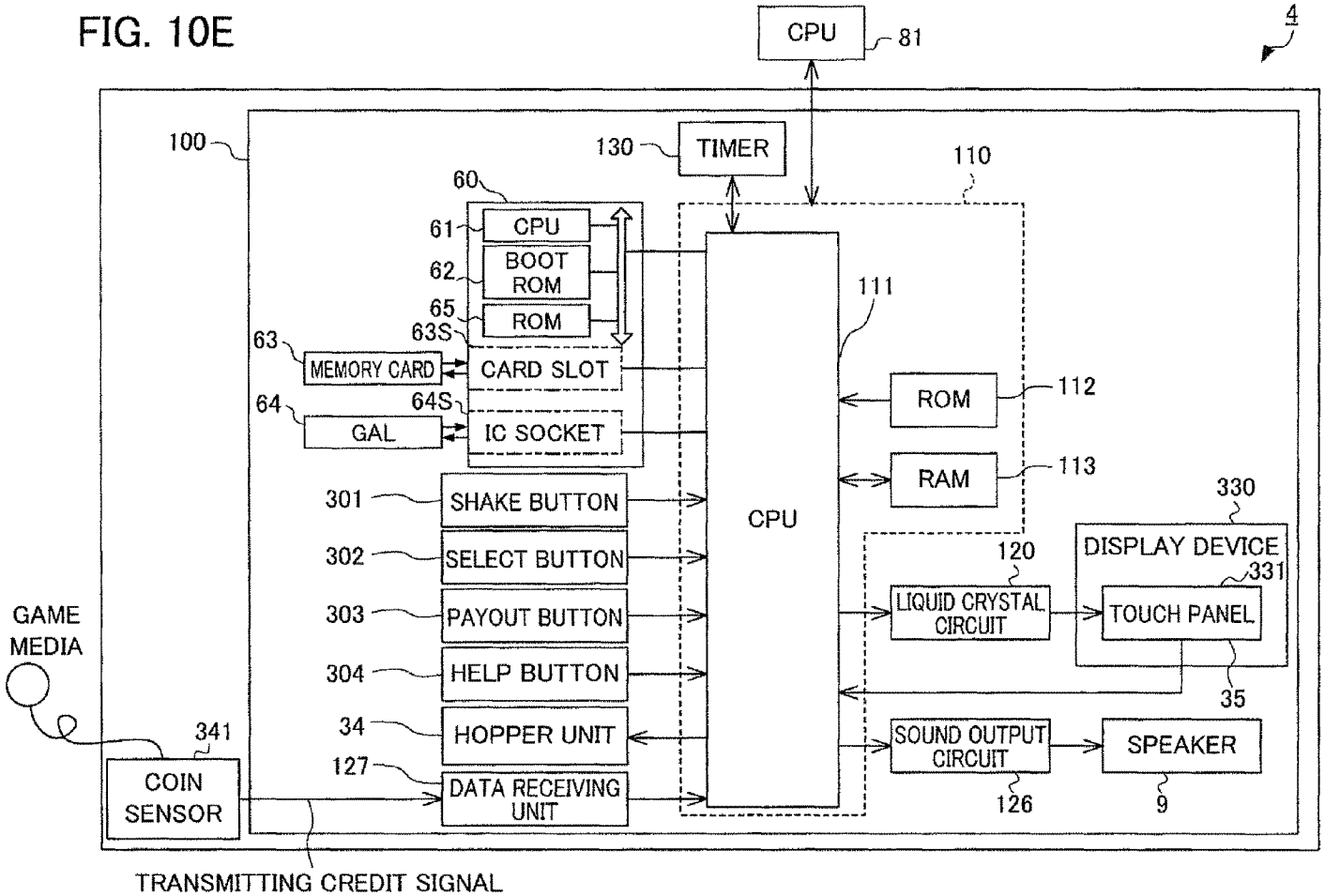
Figure 17:
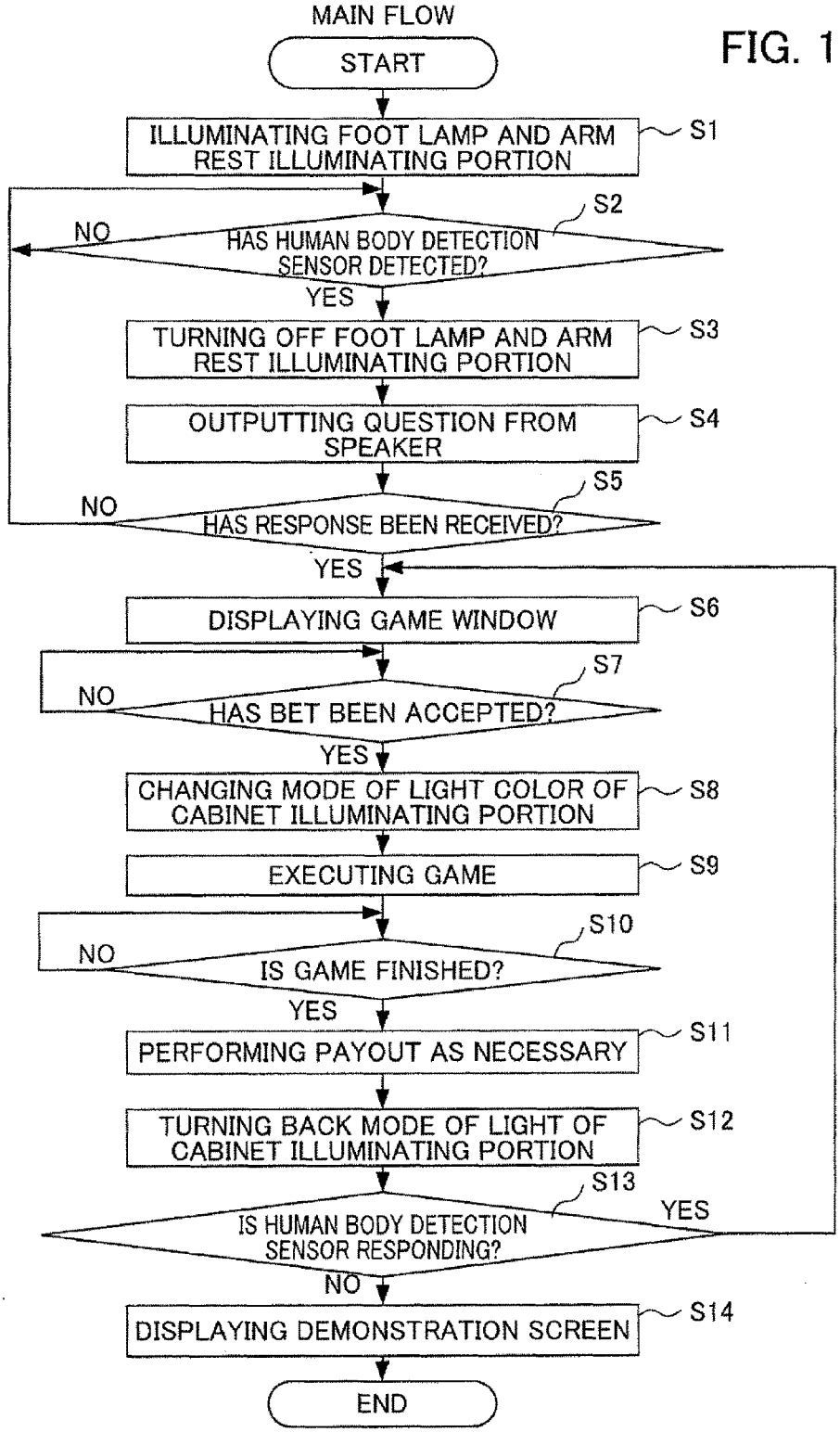
FIG. 17 is a diagram showing a main flow according to the embodiment of the present invention.
Figure 17E:
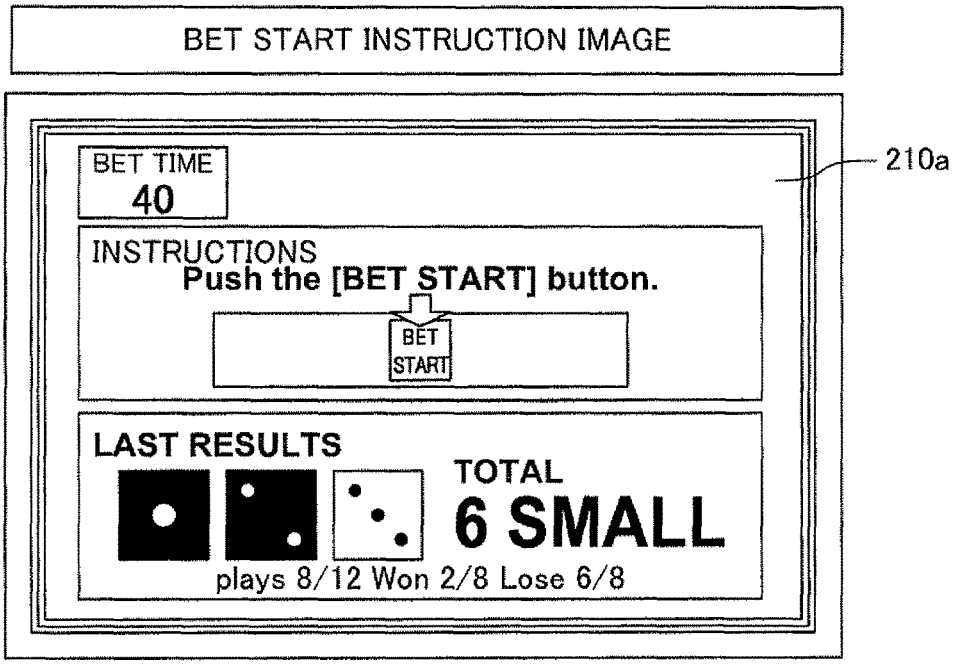
FIG. 17A is a diagram showing an instruction image display determination table according to the embodiment of the present invention.
FIG. 17B is a diagram showing an instruction image display determination table according to the embodiment of the present invention.
FIG. 17C is a diagram showing an instruction image display determination table according to the embodiment of the present invention.
FIG. 17D is a diagram showing an instruction image display determination table according to the embodiment of the present invention.
Figure 18E:
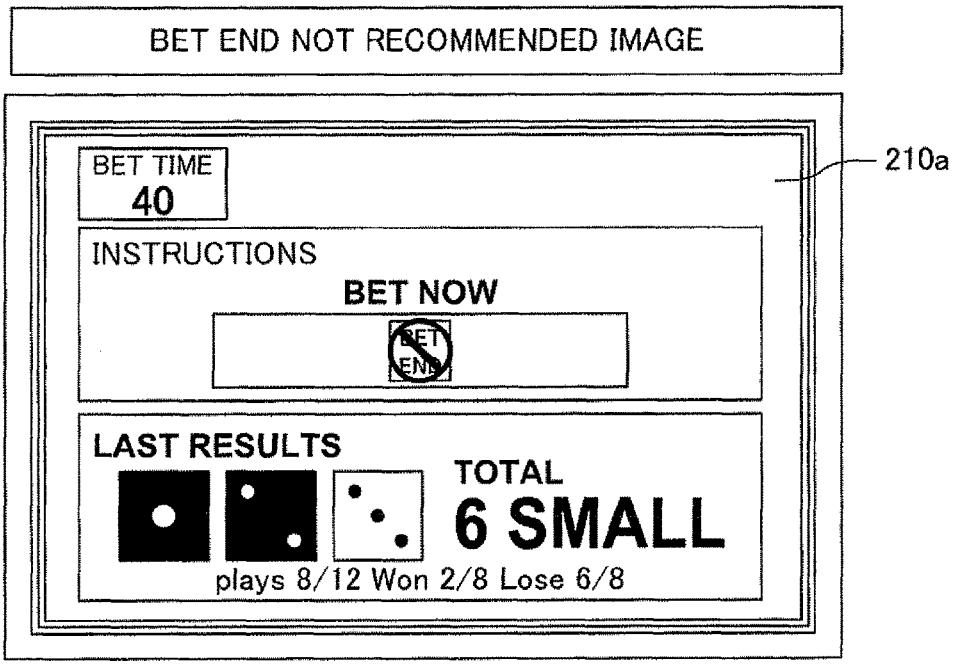
FIG. 18 is a diagram showing a flow of the operating unit during game execution in a case of playing Sic Bo according to the embodiment of the present invention.
FIG. 18A is a diagram showing a bet existence determination table according to the embodiment of the present invention.
FIG. 18B is a diagram showing a bet existence determination table according to the embodiment of the present invention.
FIG. 18C is a diagram showing a bet existence determination table according to the embodiment of the present invention.
FIG. 18D is a diagram showing a bet existence determination table according to the embodiment of the present invention.
Figure 19E:
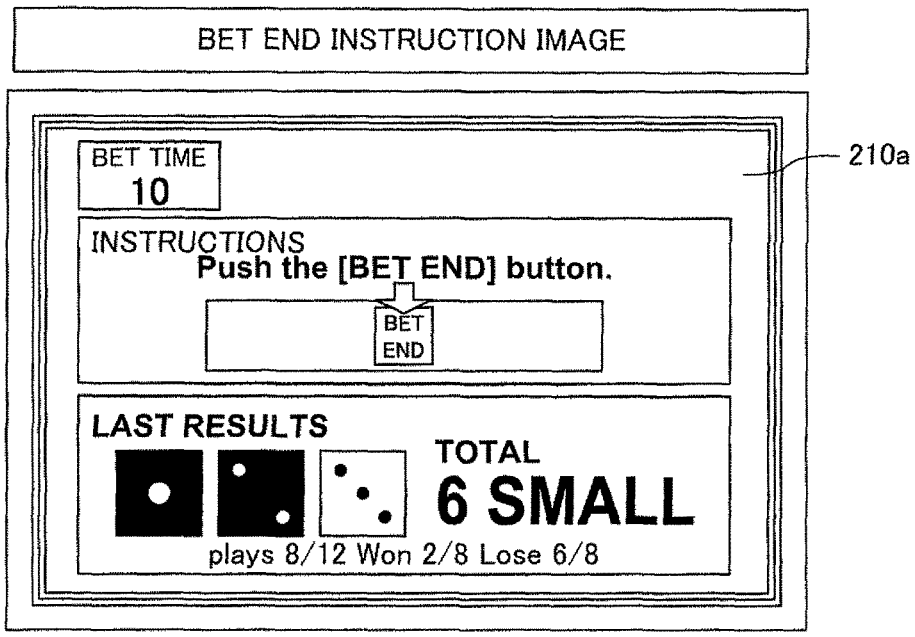
FIG. 19A is a diagram showing an oscillation mode data table according to the embodiment of the present invention.
FIG. 19B is a diagram showing an oscillation mode data table according to the embodiment of the present invention.
FIG. 19C is a diagram showing an oscillation mode data table according to the embodiment of the present invention.
FIG. 19D is a diagram showing an oscillation mode data table according to the embodiment of the present invention.
Figure 20E:
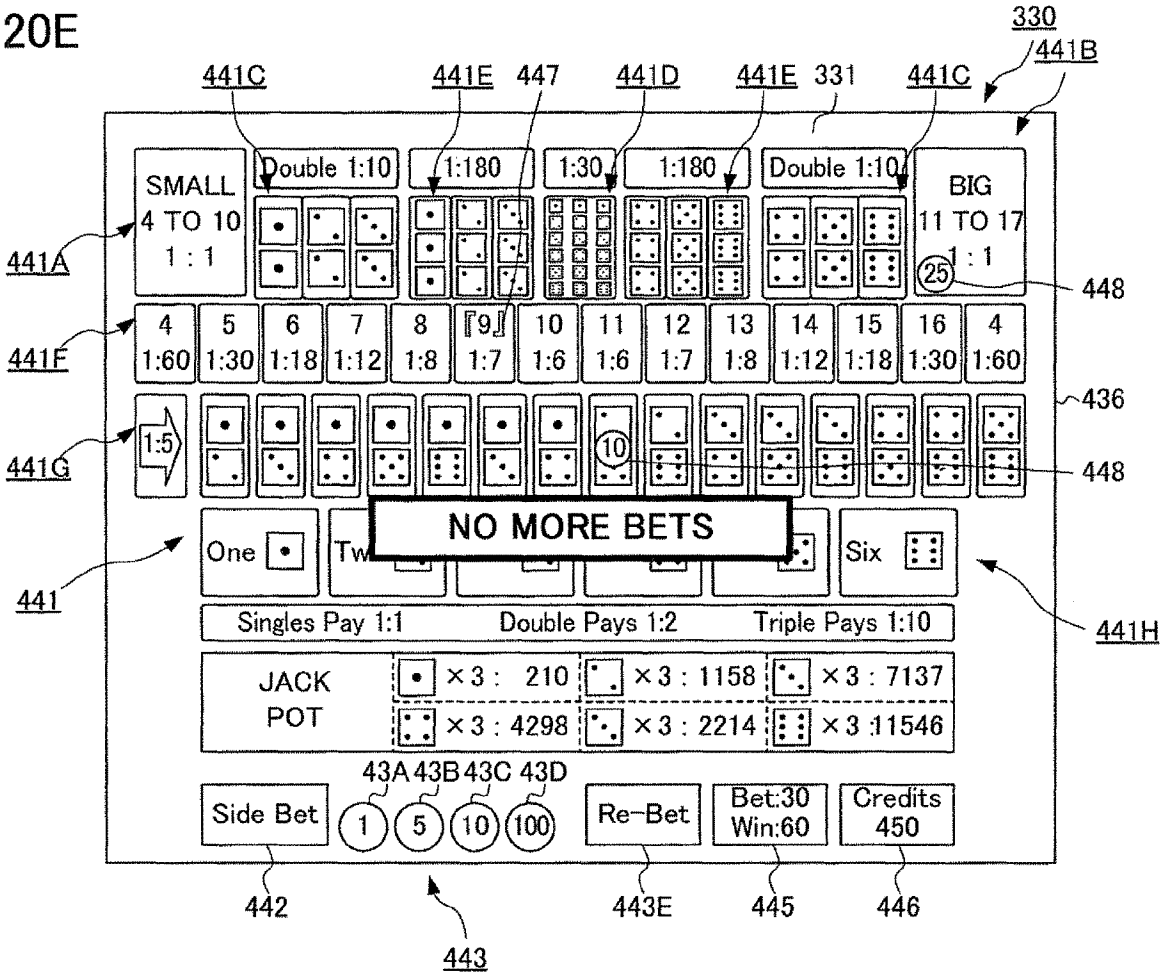
FIG. 20A is a diagram showing a rendered effect table according to the embodiment of the present invention.
FIG. 20B is a diagram showing a rendered effect table according to the embodiment of the present invention.
FIG. 20C is a diagram showing a rendered effect table according to the embodiment of the present invention.
FIG. 20D is a diagram showing a rendered effect table according to the embodiment of the present invention.
Figure 21E:
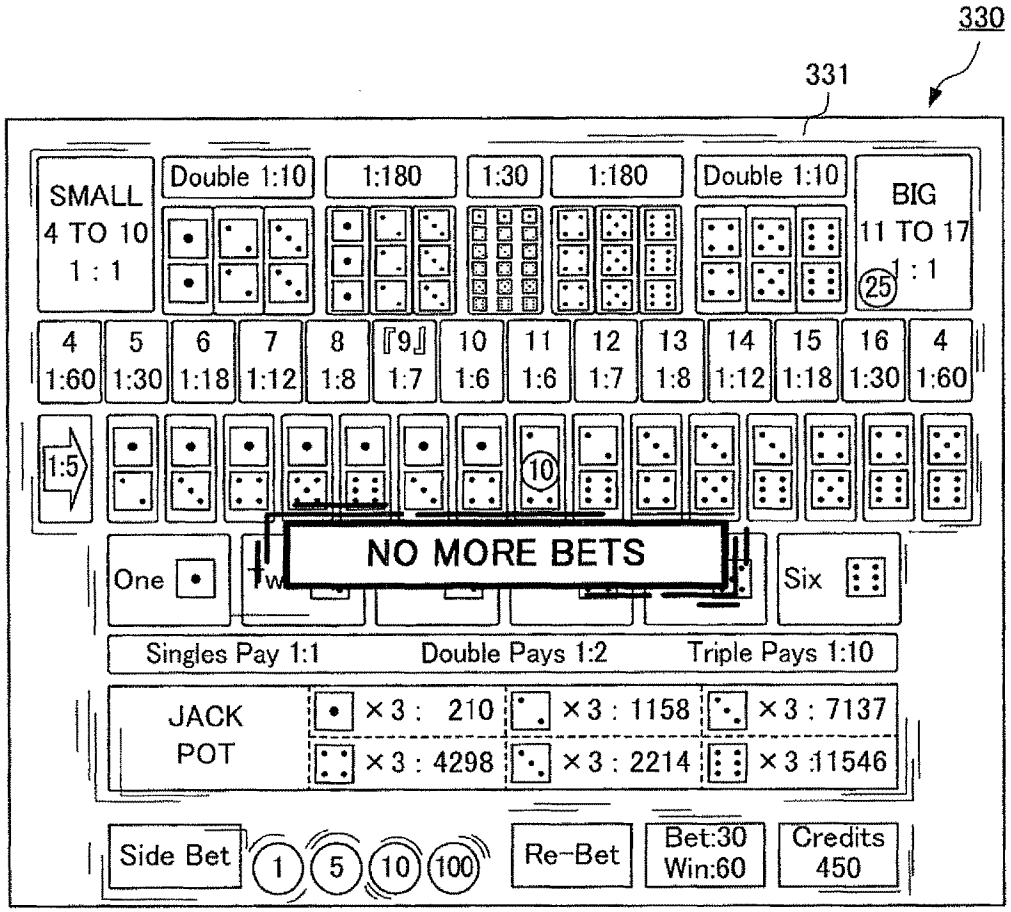
FIG. 21A is a diagram showing an IC tag data table according to the embodiment of the present invention.
FIG. 21B is a diagram showing an IC tag data table according to the embodiment of the present invention.
FIG. 21C is a diagram showing an IC tag data table according to the embodiment of the present invention.
FIG. 21D is a diagram showing an IC tag data table according to the embodiment of the present invention.
Figure 22E:
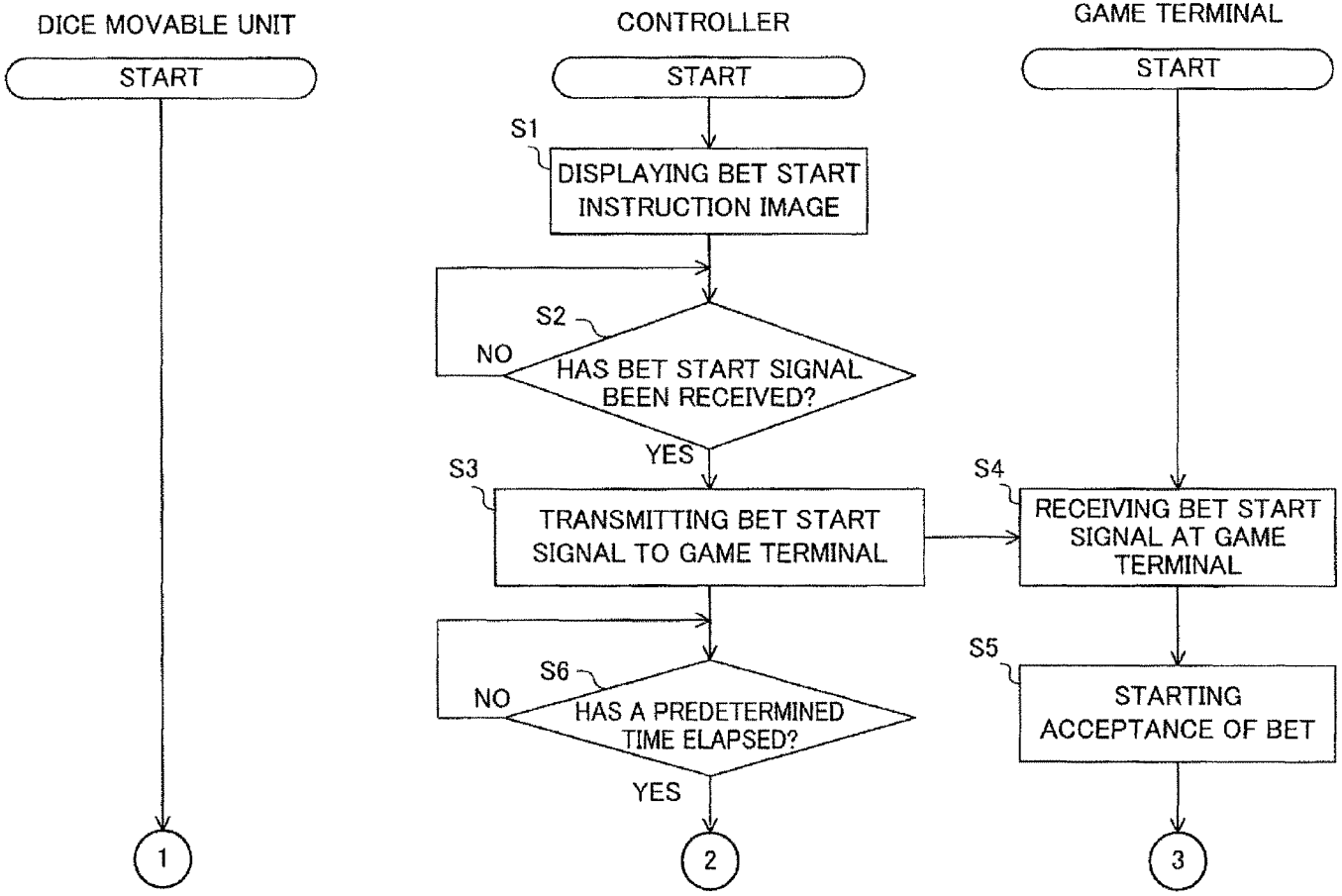
FIG. 22A is an infrared camera imaging data table according to the embodiment of the present invention.
FIG. 22B is an infrared camera imaging data table according to the embodiment of the present invention.
FIG. 22C is an infrared camera capturing data table according to the embodiment of the present invention.
FIG. 22 is an infrared camera capturing data table according to the embodiment of the present invention.
Figure 23E:
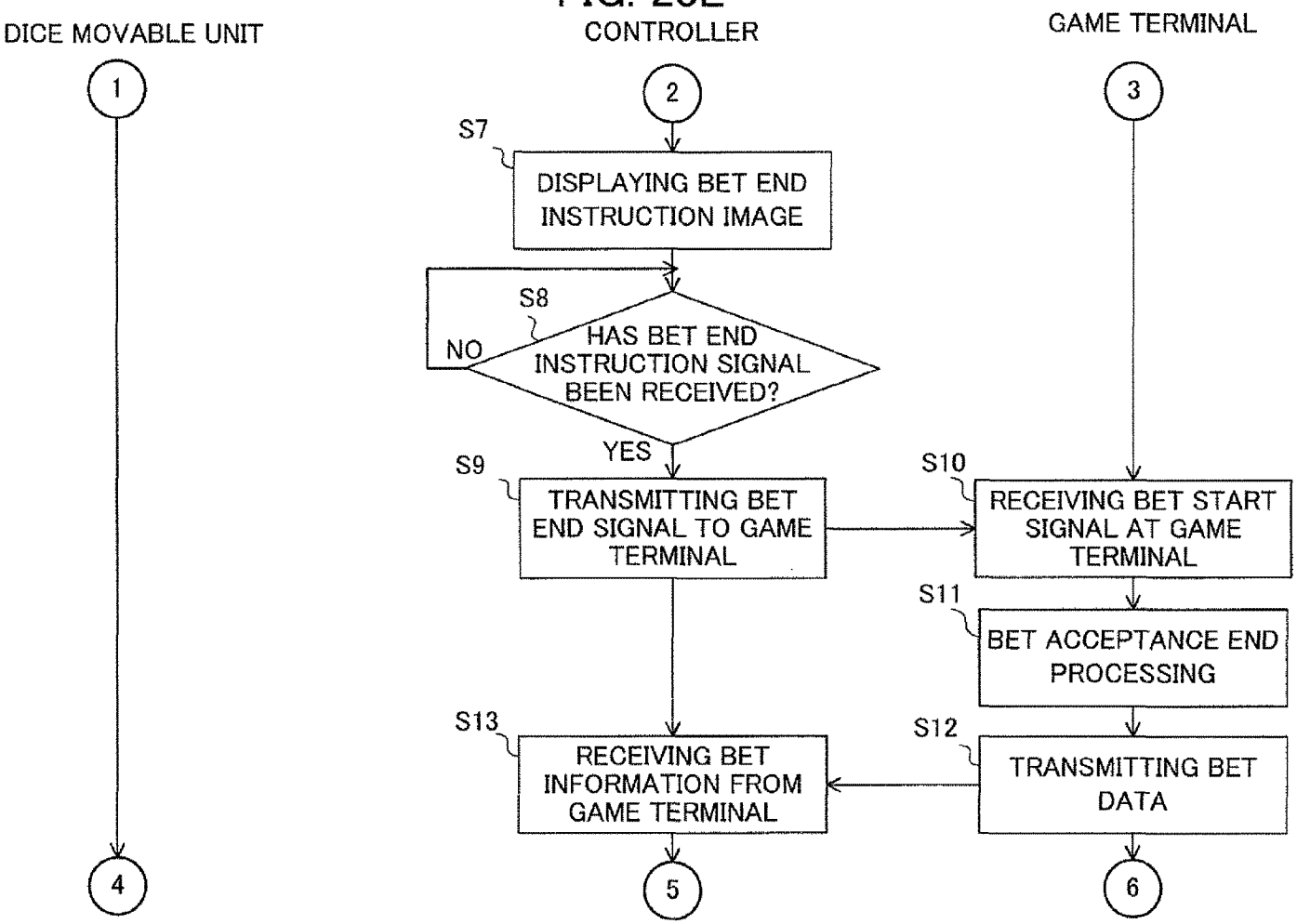
FIG. 23A is a dot pattern data classification table according to the embodiment of the present invention.
FIG. 23B is a dot pattern data classification table according to the embodiment of the present invention.
FIG. 23C is a dot pattern data classification table according to the embodiment of the present invention.
FIG. 23D is a dot pattern data classification table according to the embodiment of the present invention.
Figure 24E:
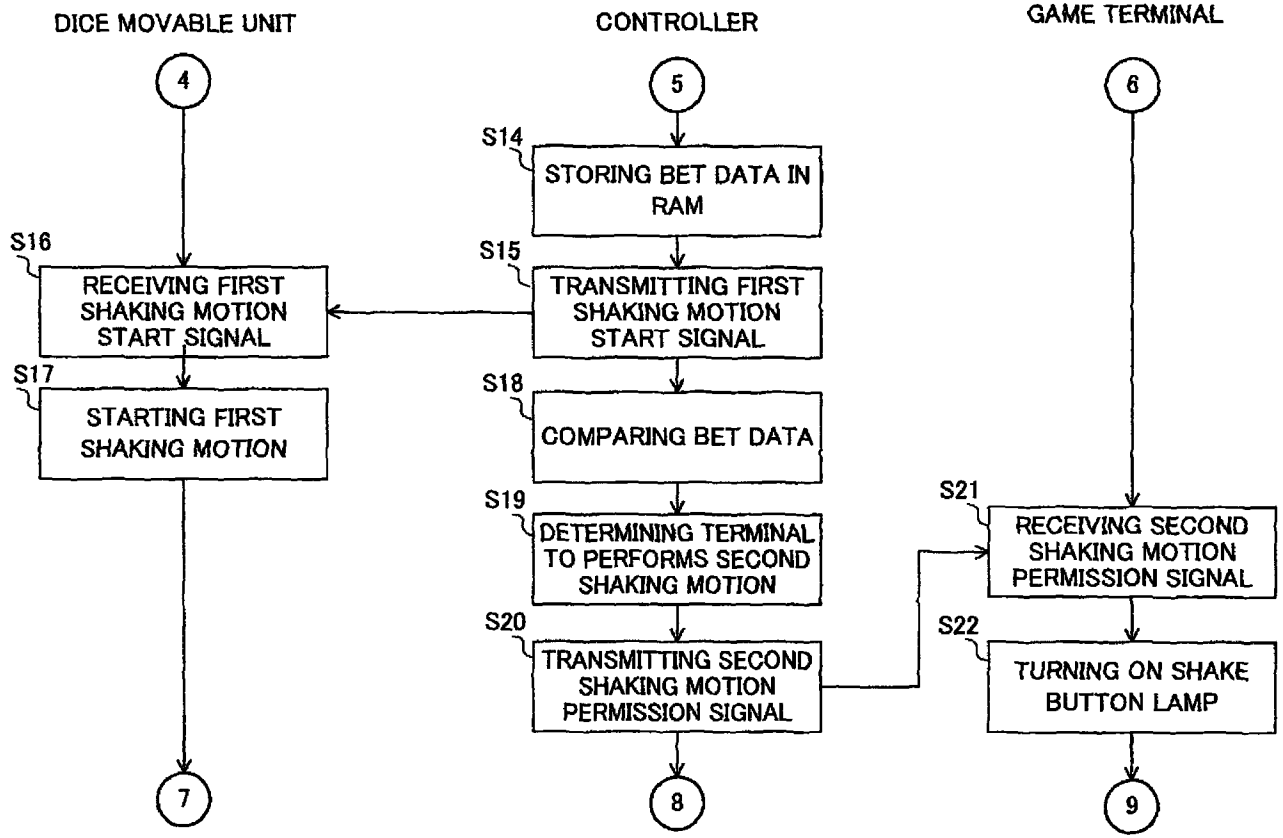
FIG. 24A is a number of dots-dot pattern data table according to the embodiment of the present invention.
FIG. 24B is a number of dots-dot pattern data table according to the embodiment of the present invention.
FIG. 24C is a number of dots-dot pattern data table according to the embodiment of the present invention.
Figure 25B:
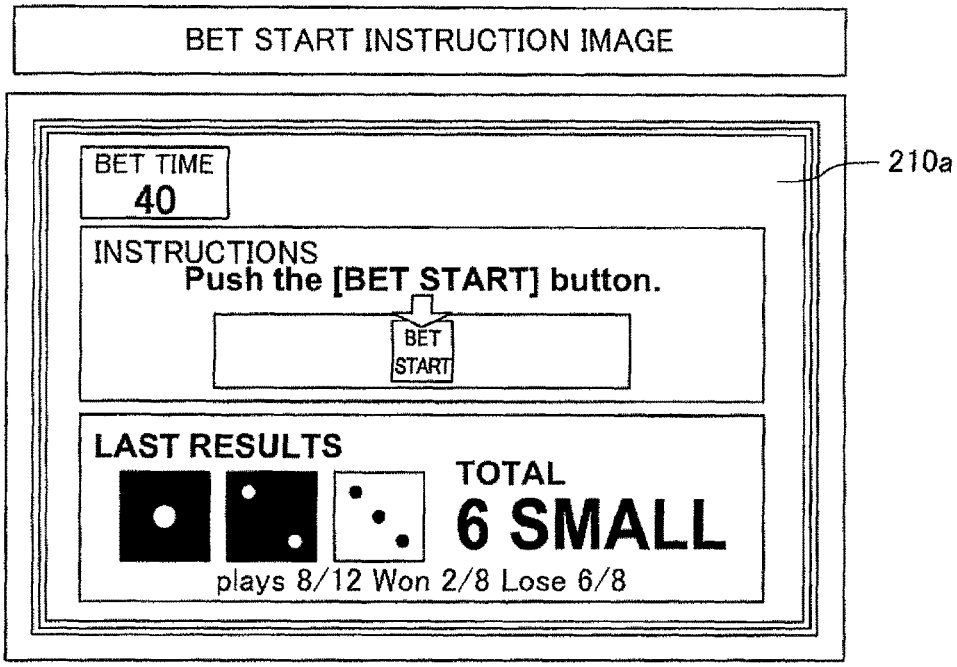
Figure 26B:
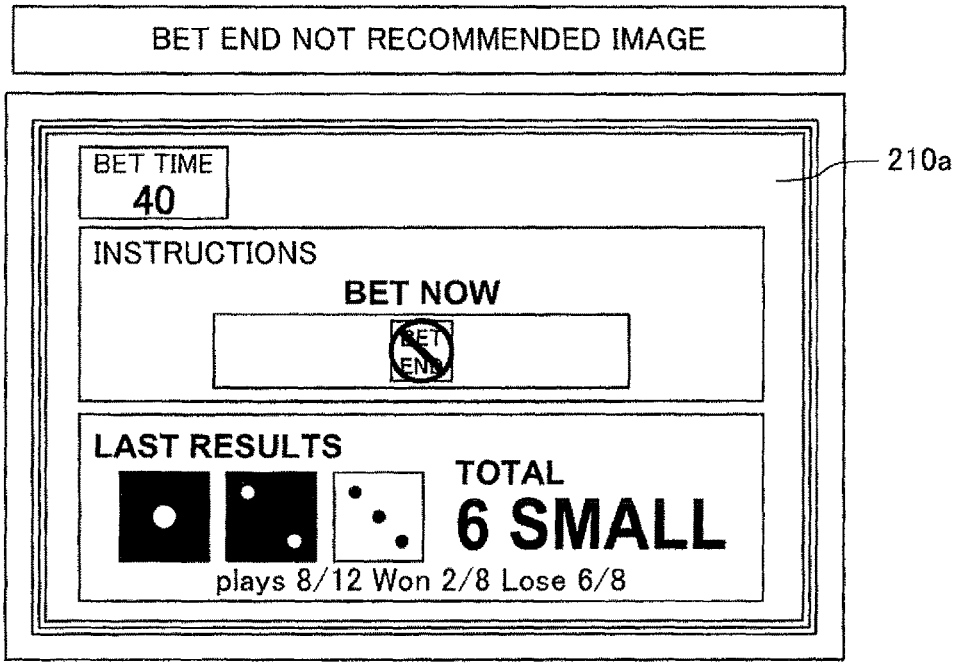
Figure 25C:
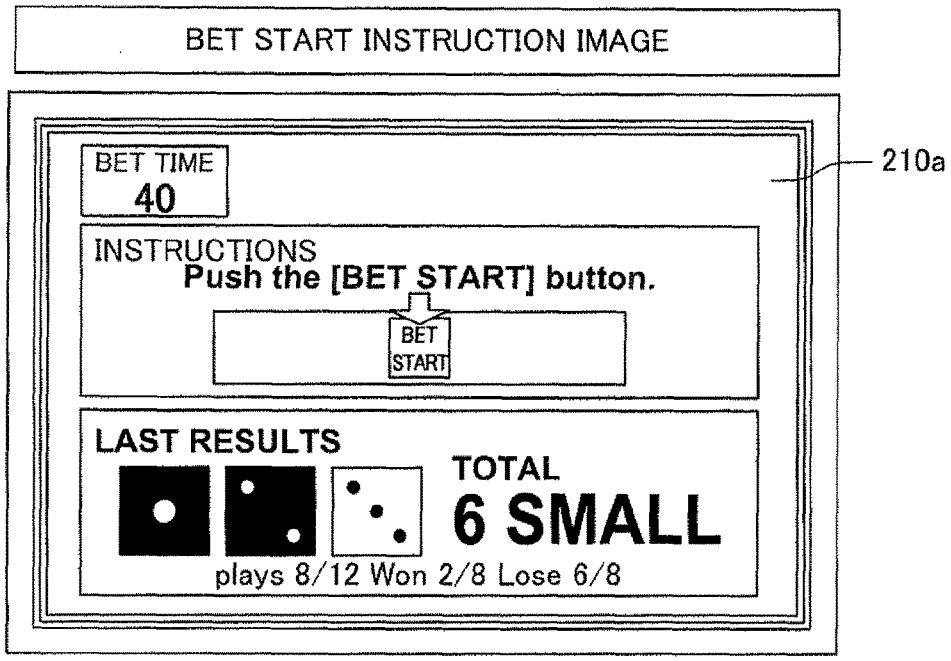
Figure 26C:
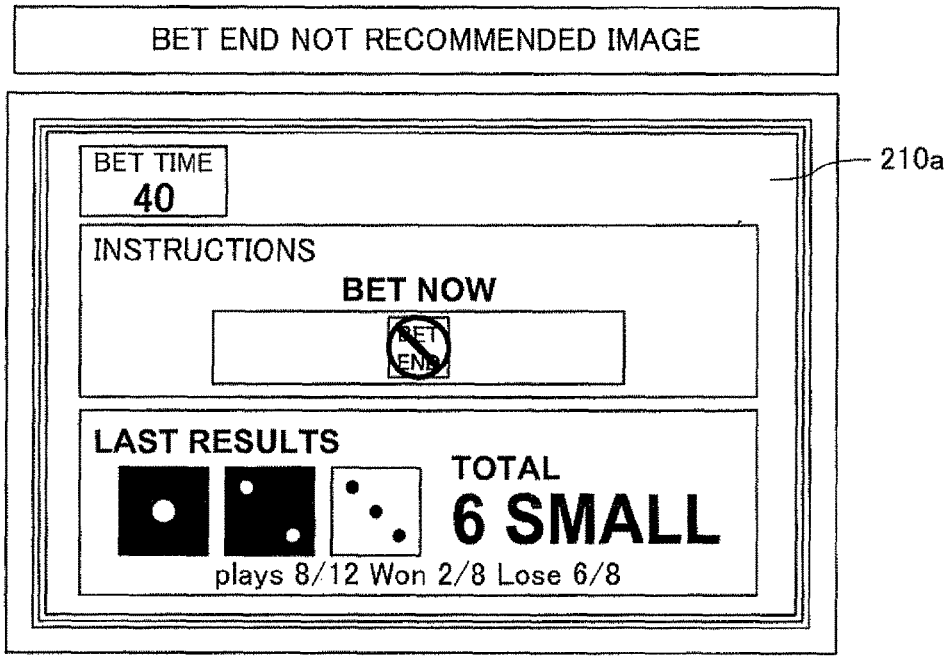
Figure 25D:
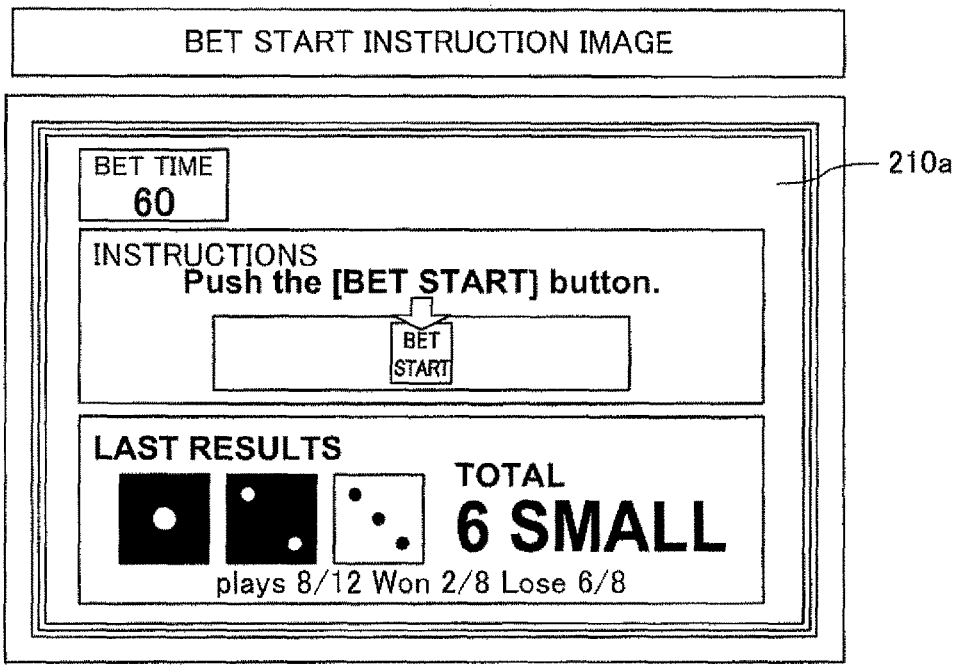
Figure 26D:
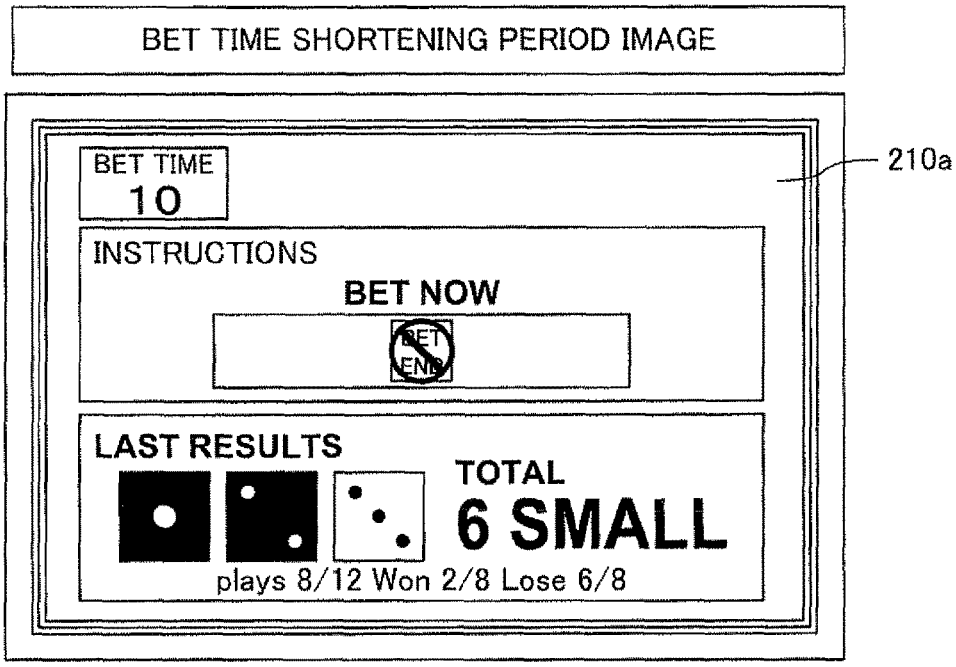
Figure 25E:
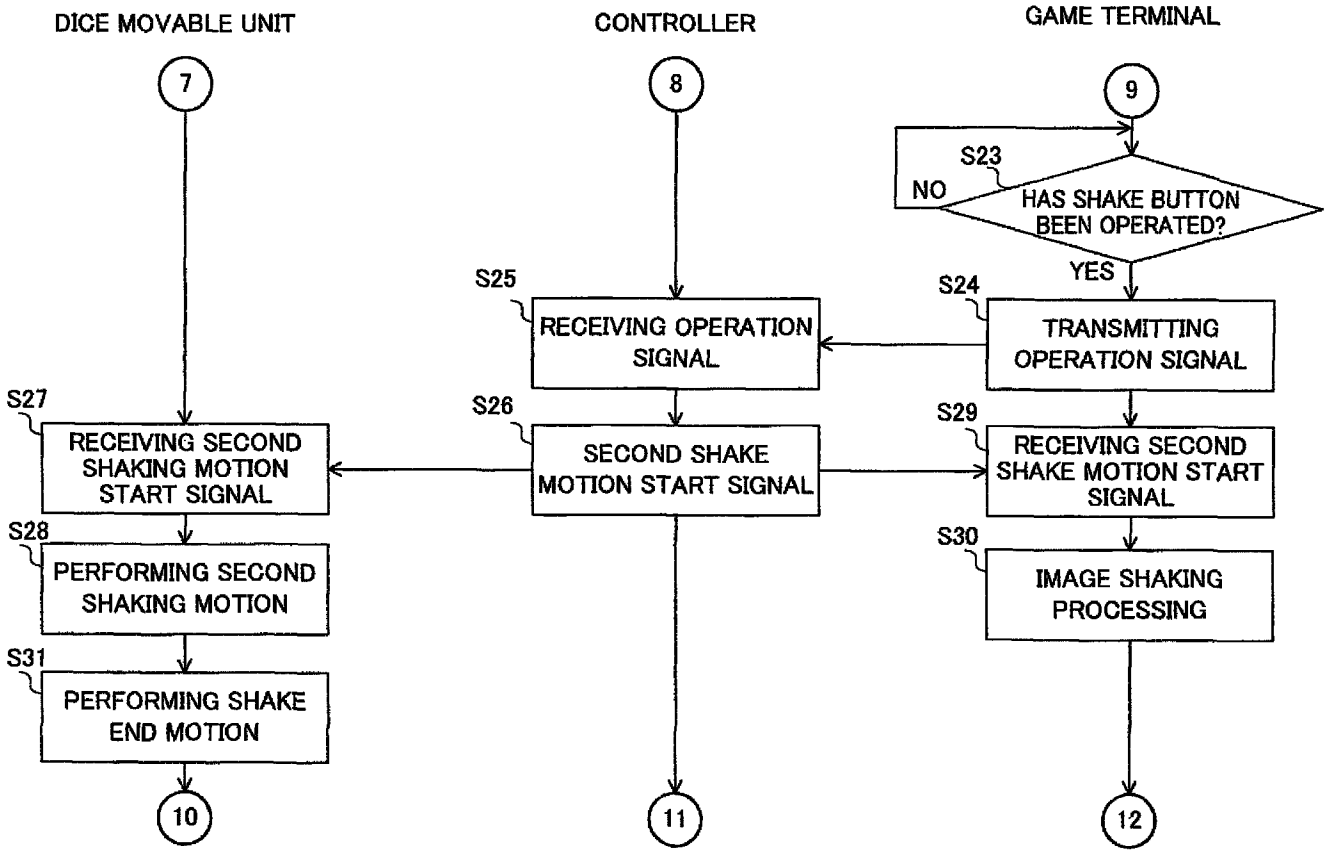
Figures 26A, 27A:
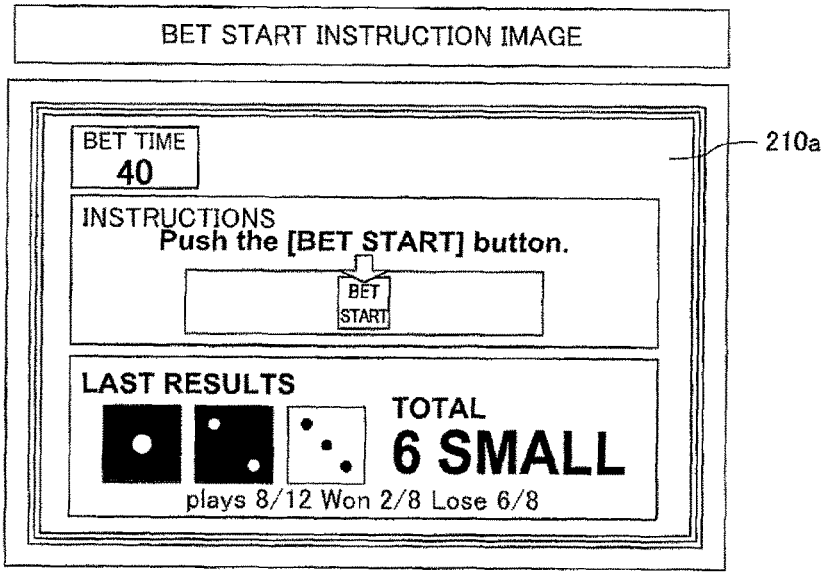
Figure 26E:
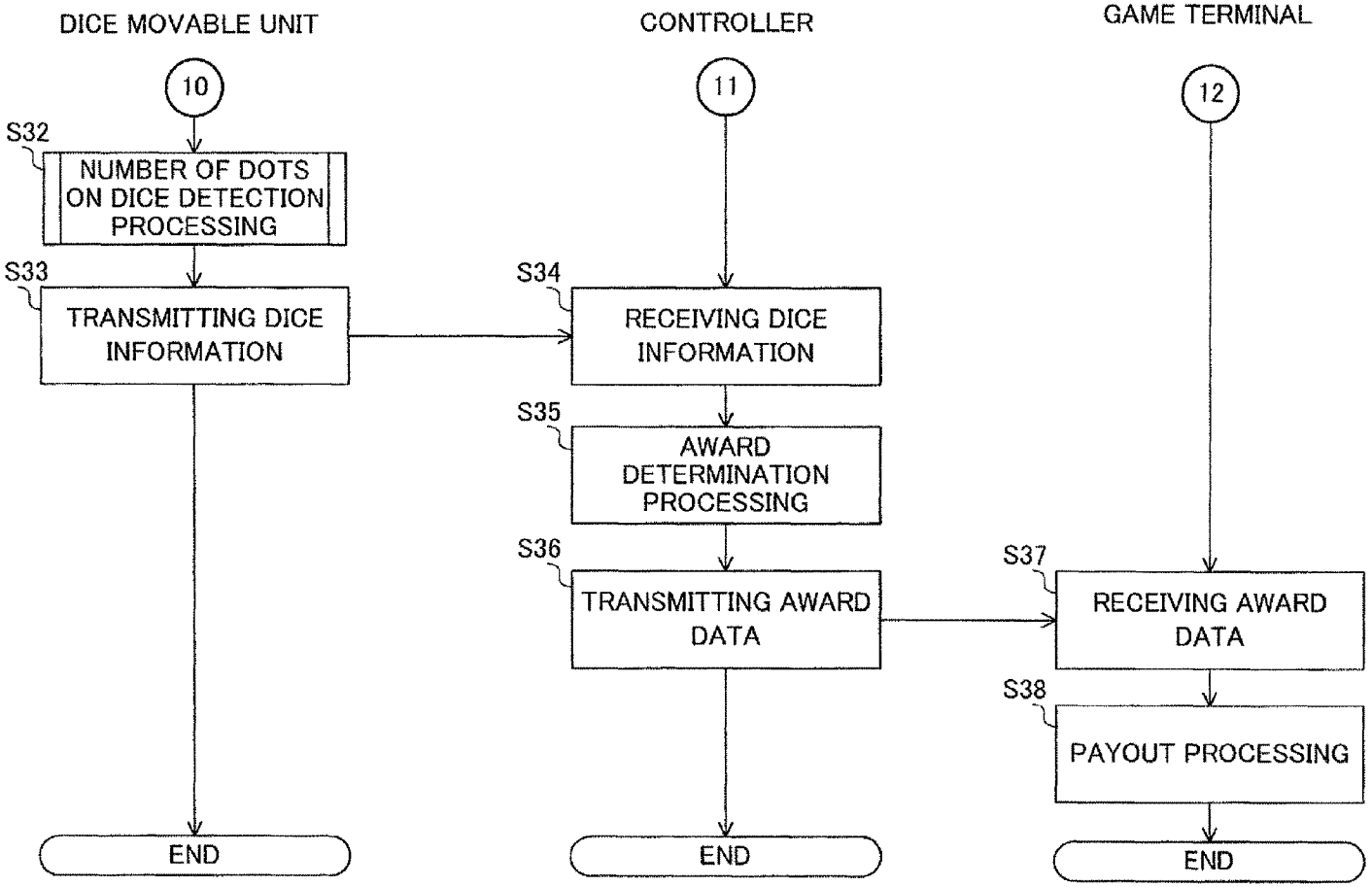
Figure 27B:
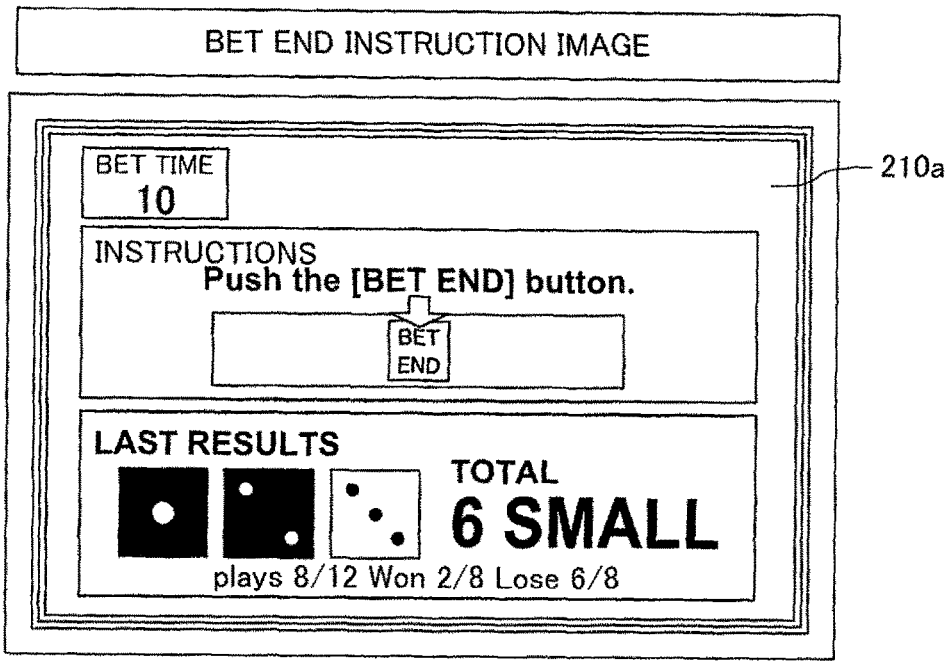
Figure 27C:
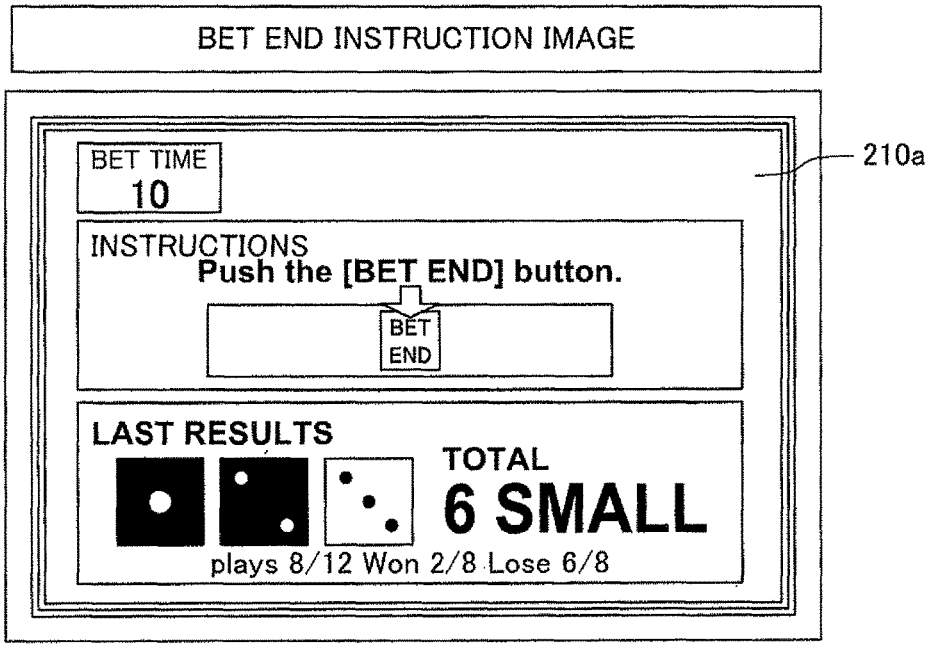
Figure 27D:
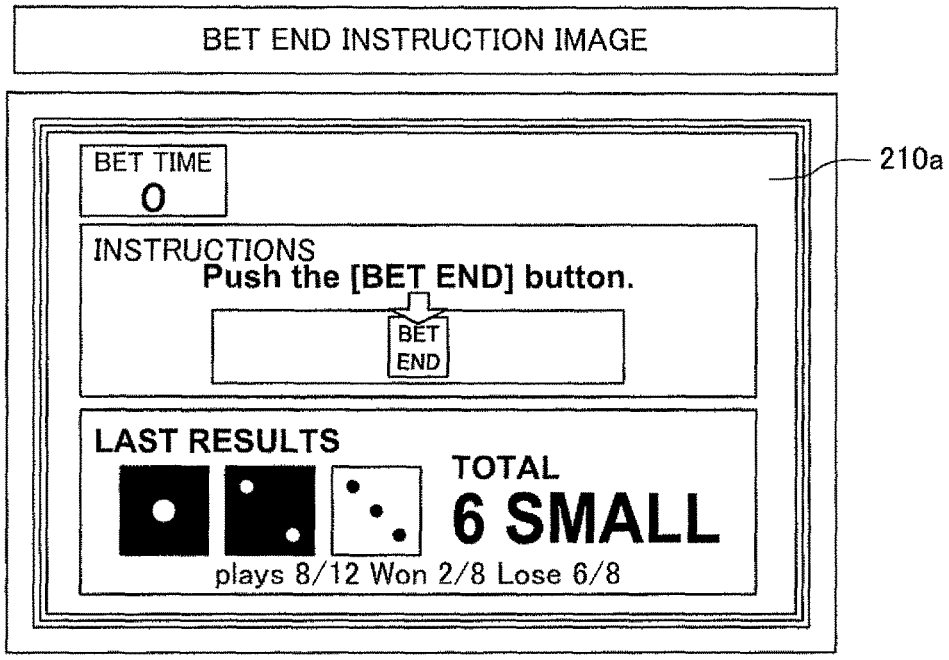
Figure 27E:
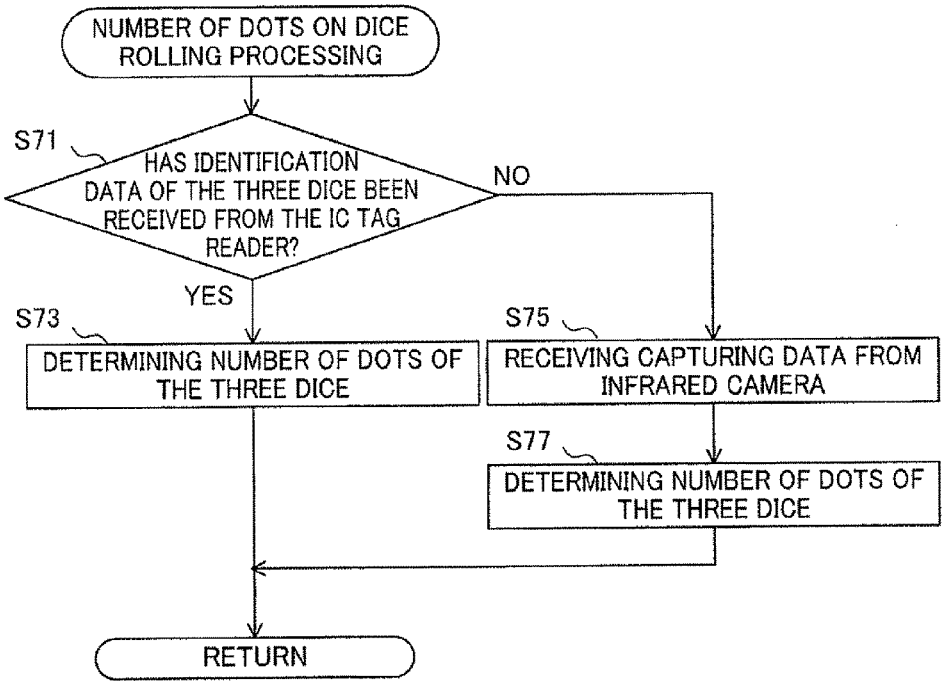
Figure 28A:
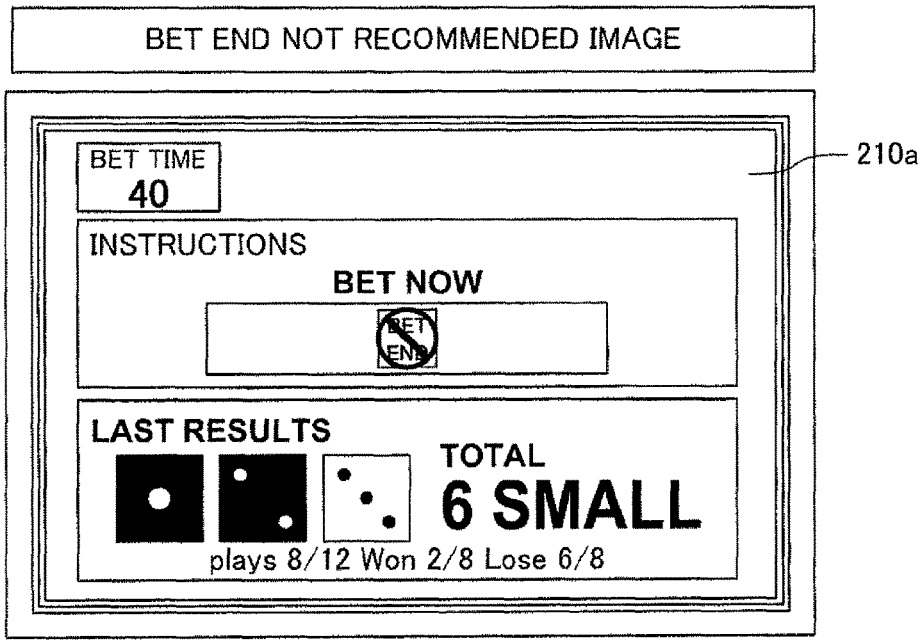
Figure 29A:
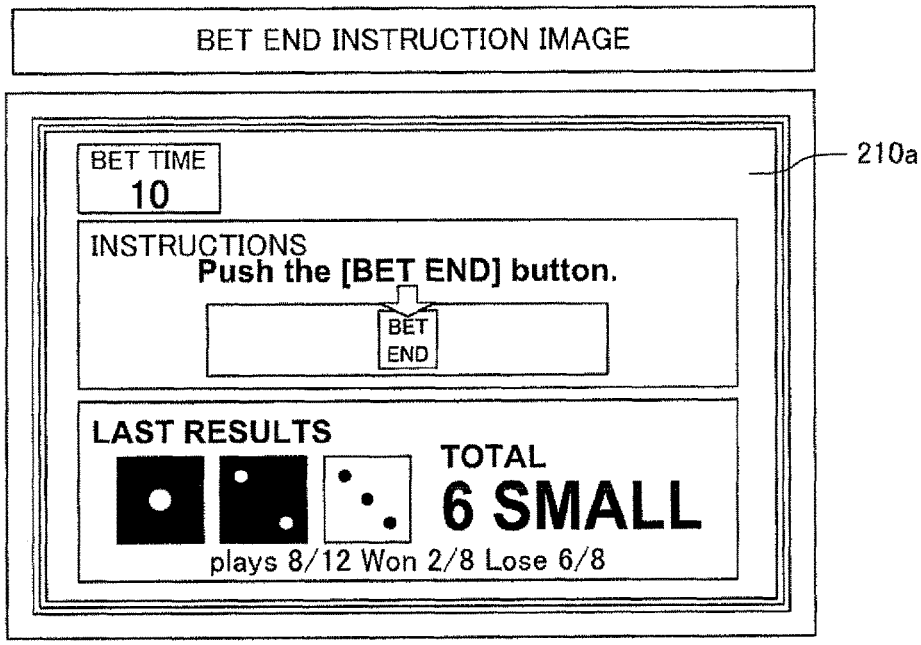
Figure 28B:
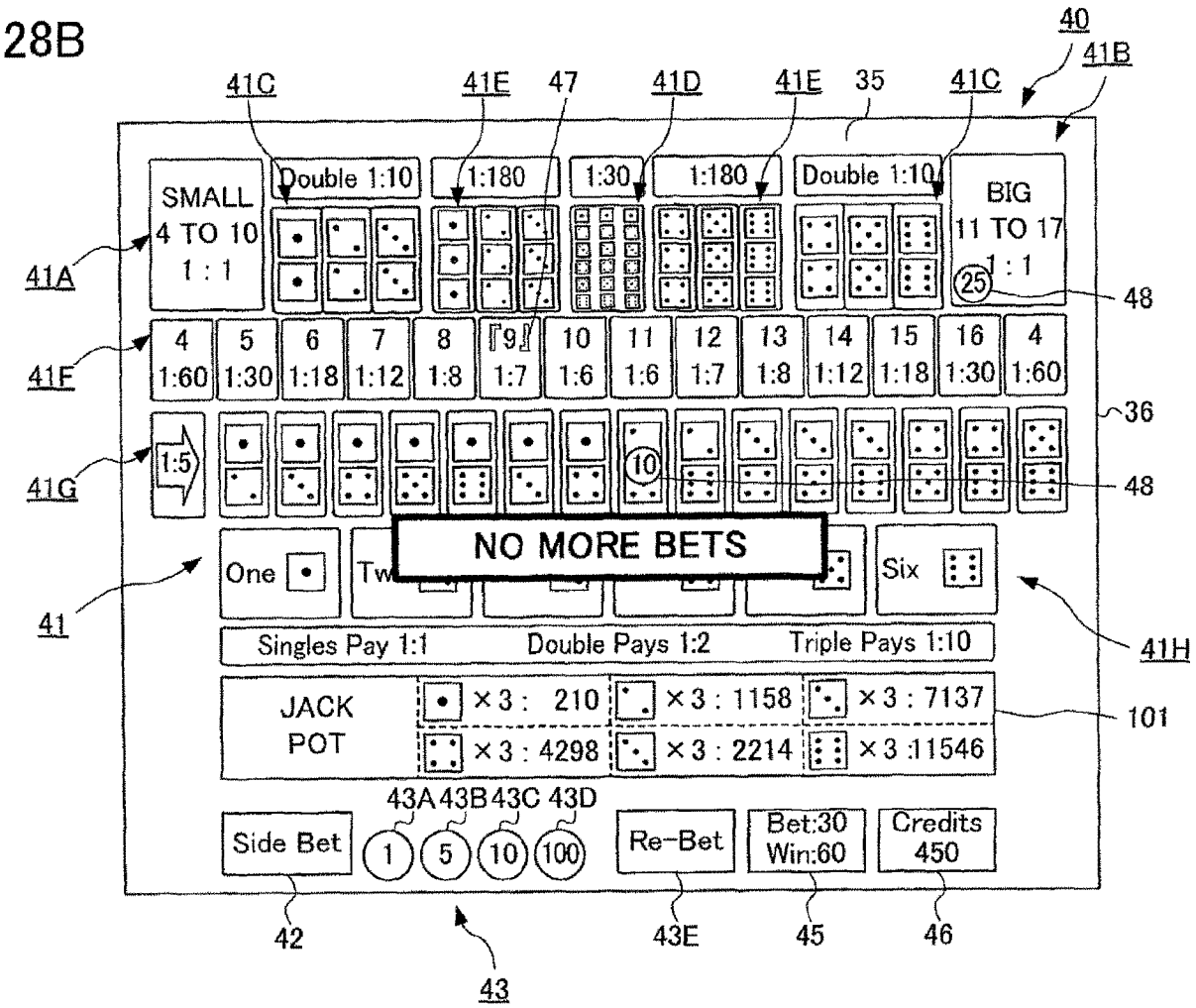
Figure 28C:
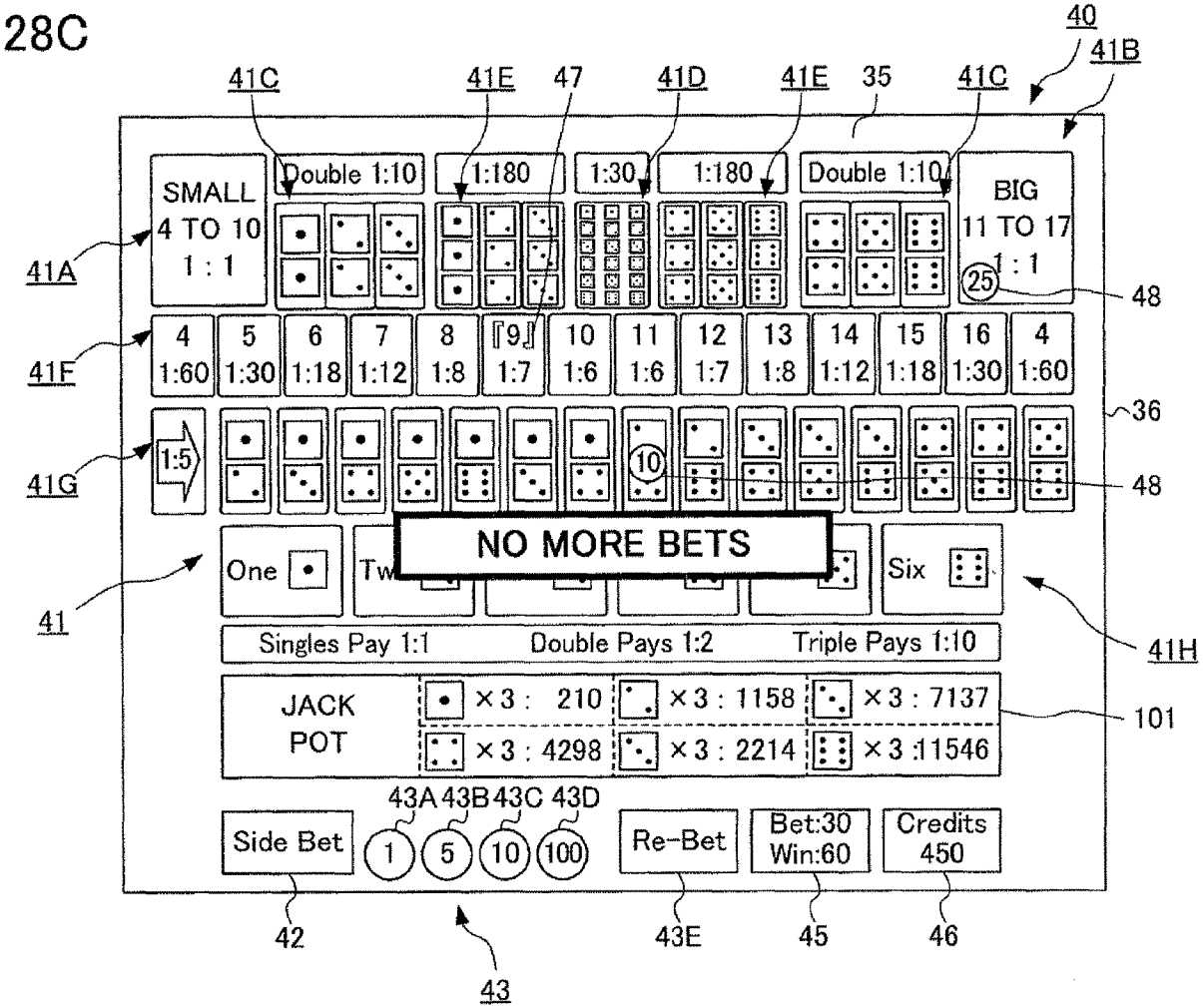
Figure 28D:
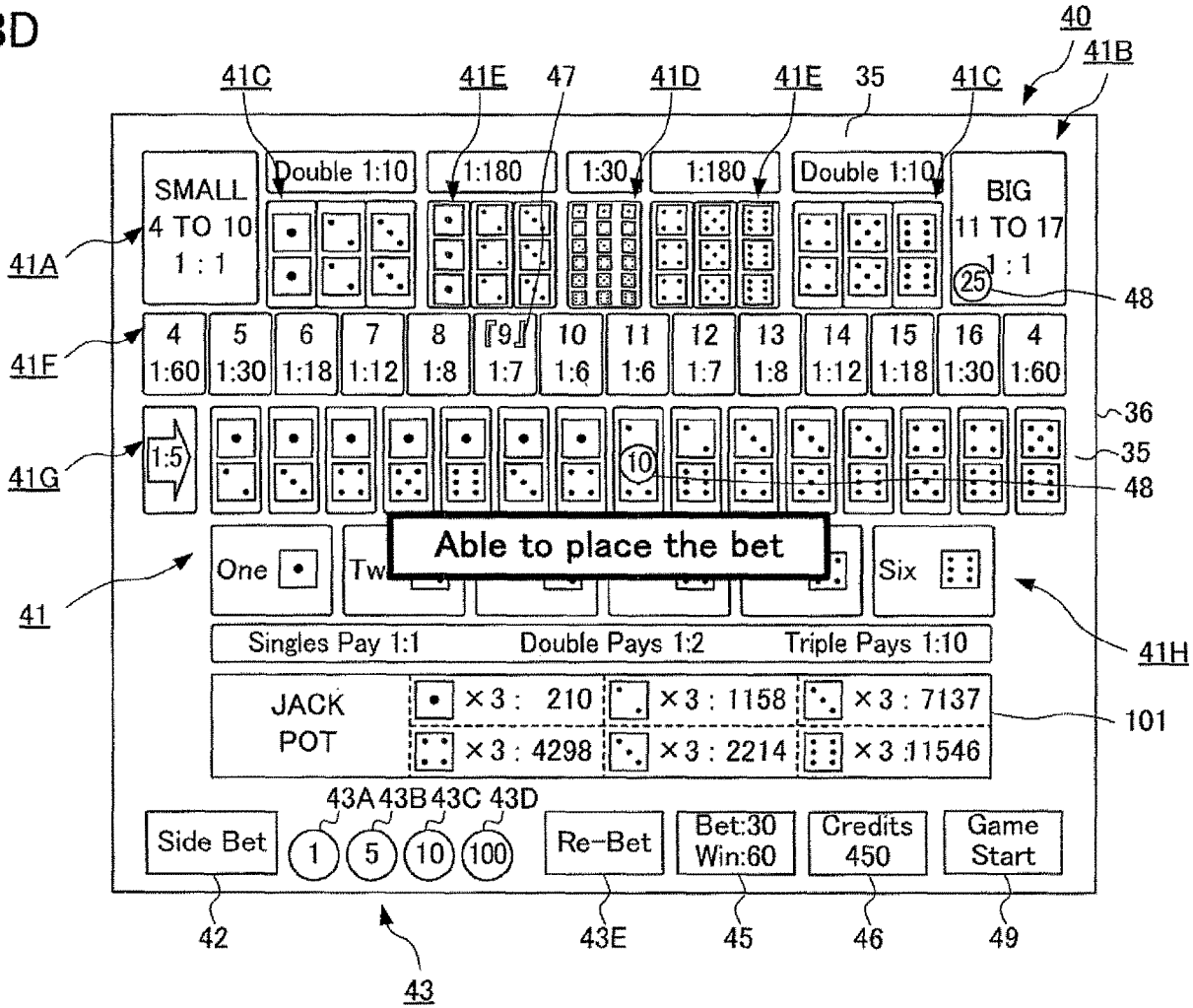
Figure 28E:
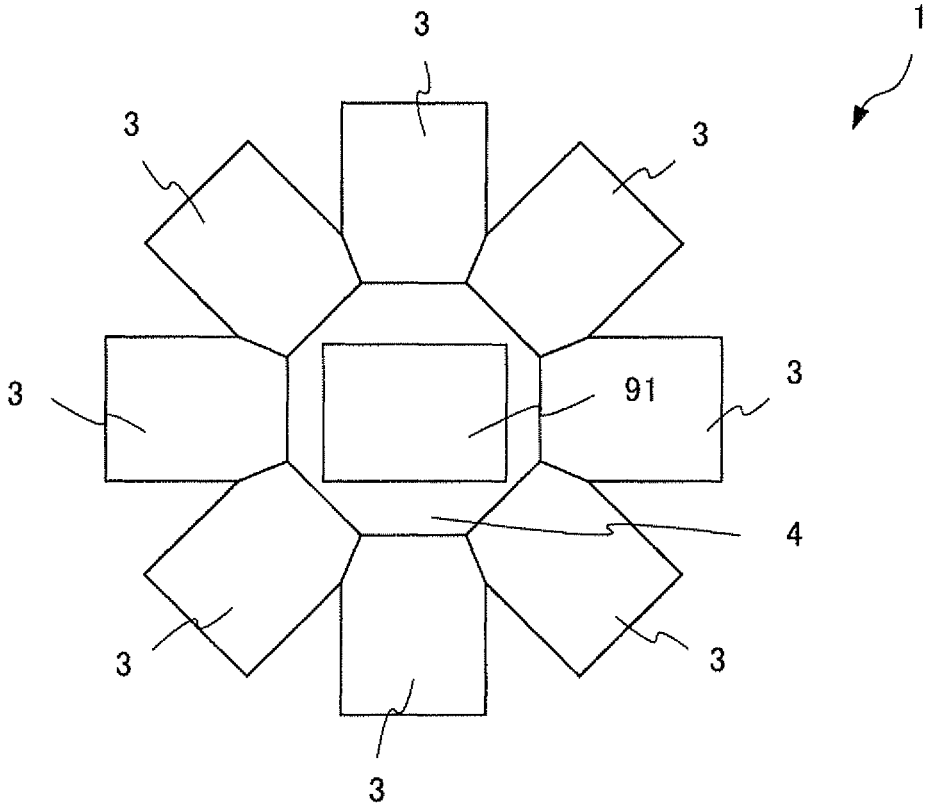
Figure 29B:
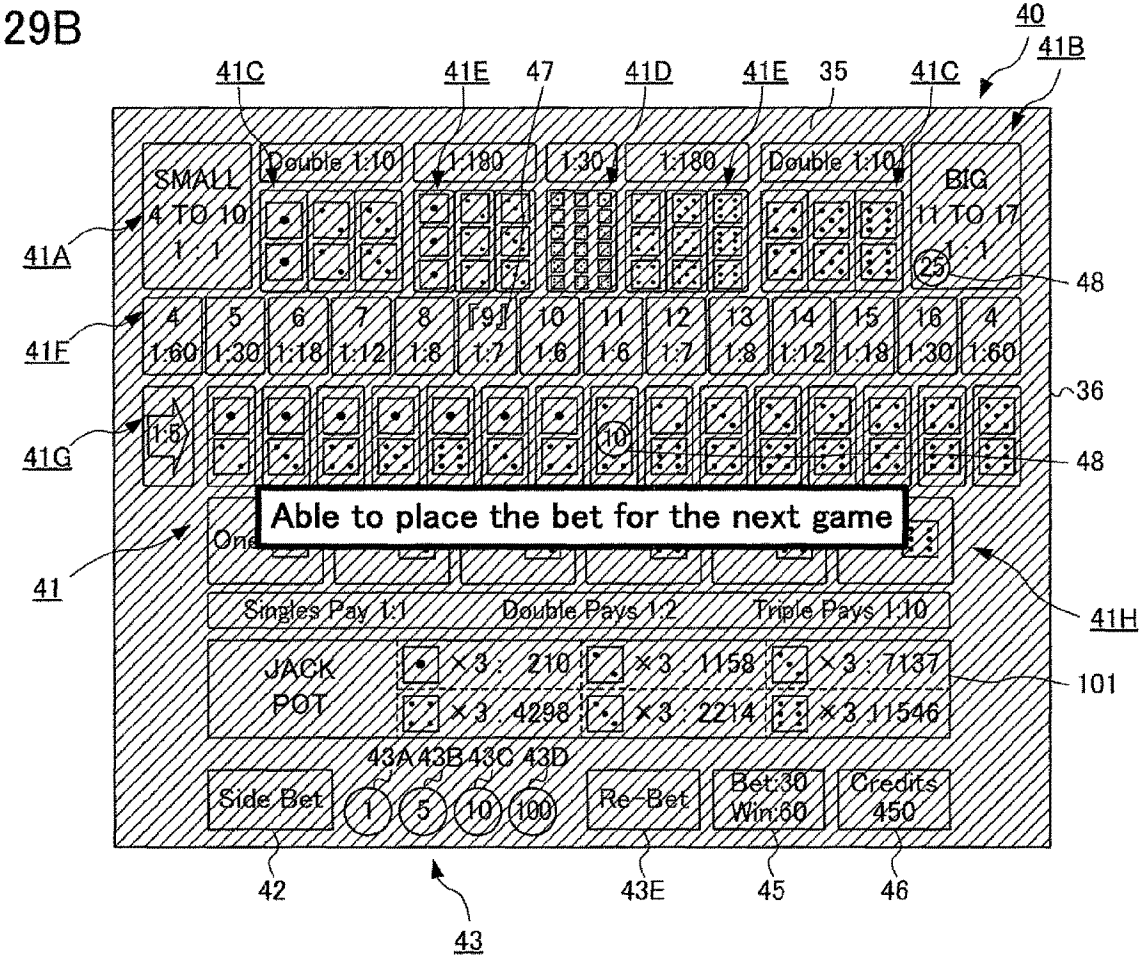
Figure 29C:
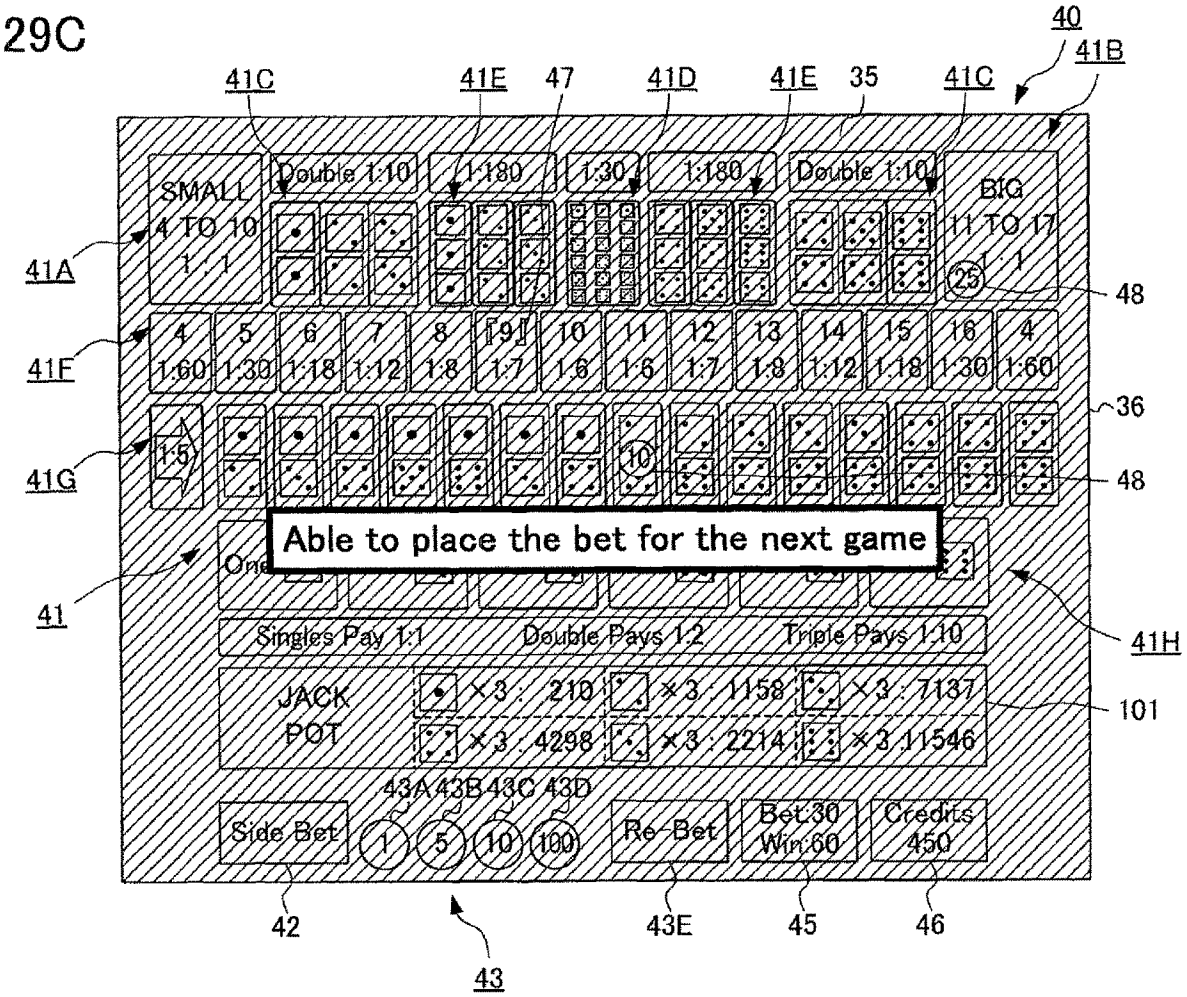
Figure 29D:
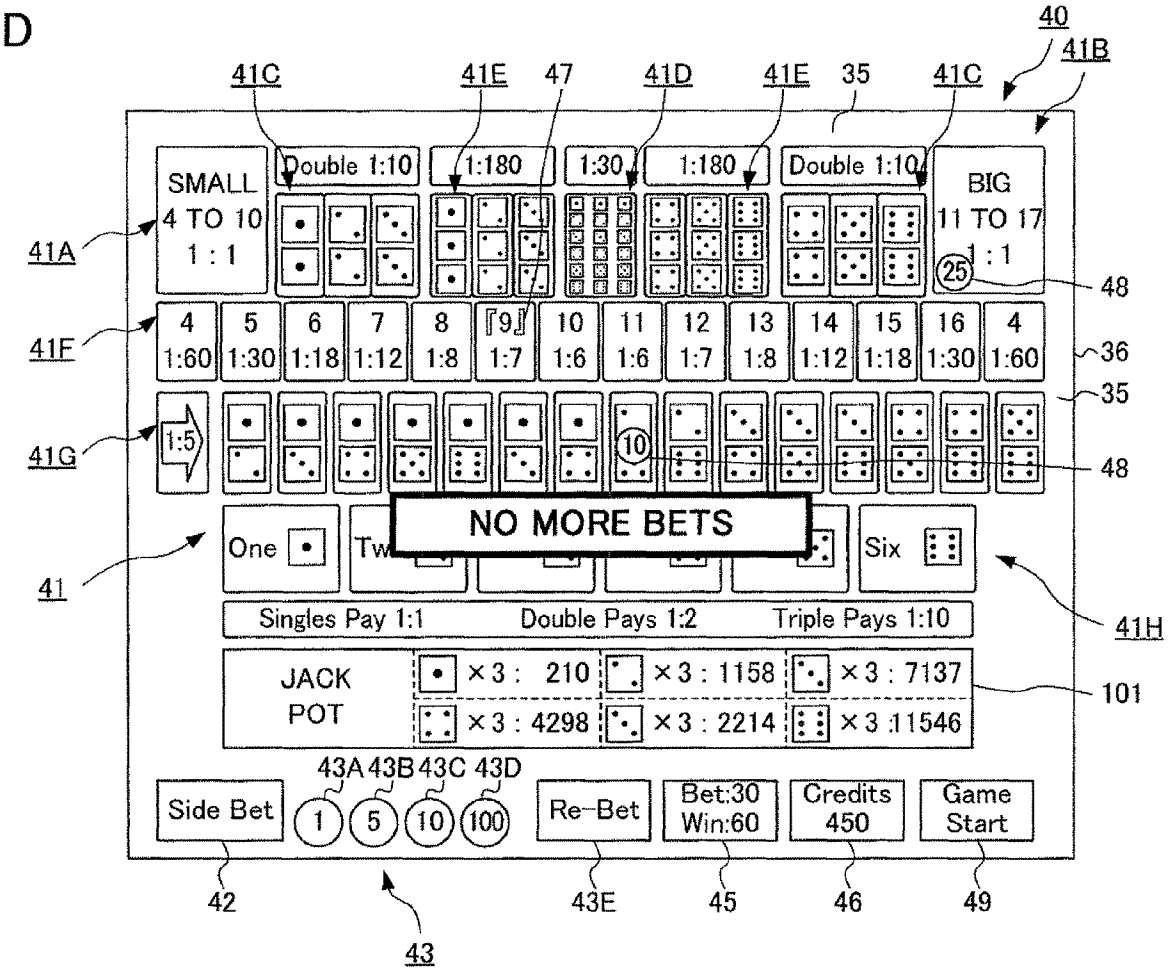
Figure 29E:
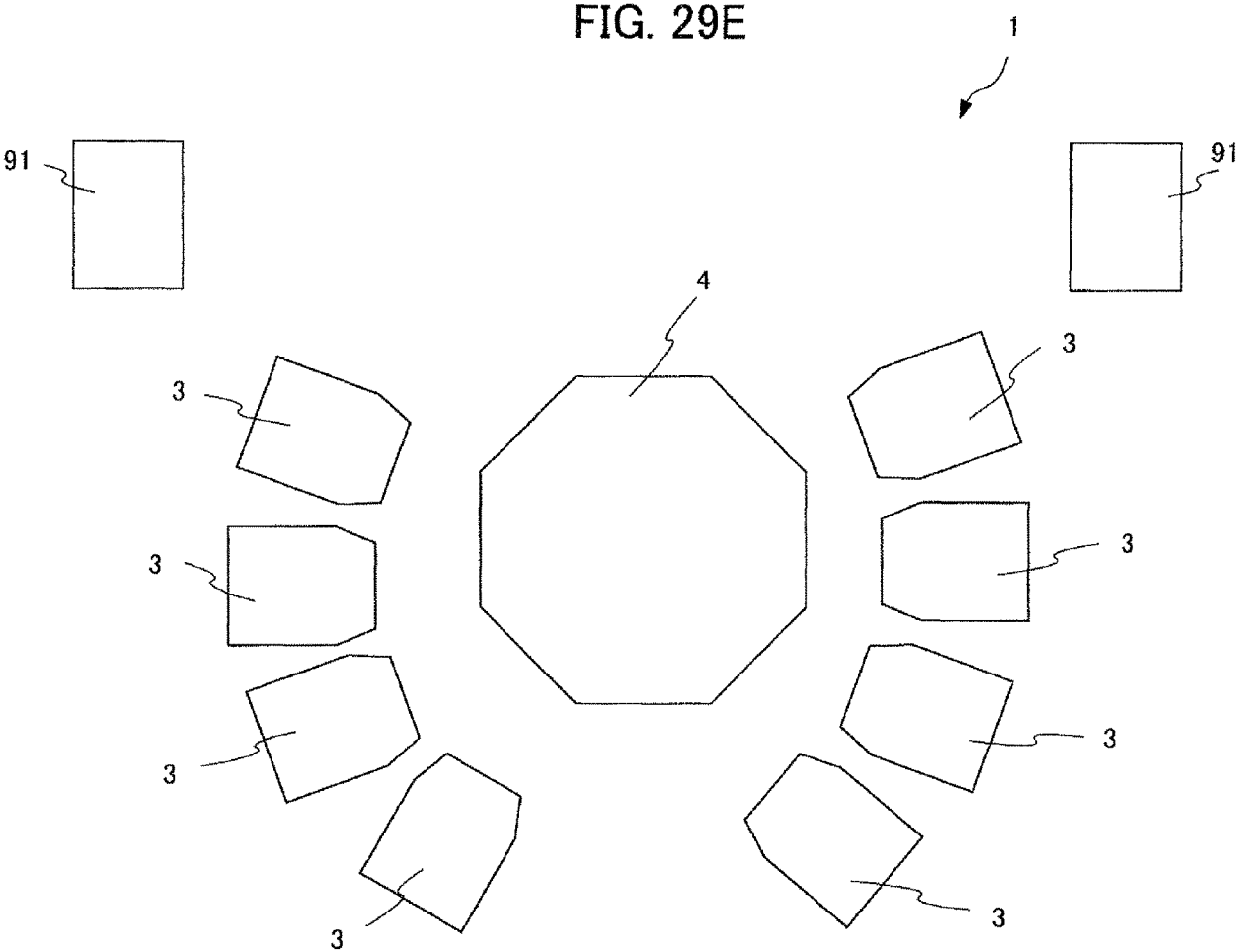

FIG. 10E is a block diagram showing an internal configuration of a game terminal according to an embodiment of the present embodiment;

FIG. 11E shows an instruction image display determination table according to an embodiment of the present invention;

FIG. 12E shows a bet existence determination table according to an embodiment of the present invention;

FIG. 13E shows an IC tag data table according to an embodiment of the present invention;

FIG. 14E shows an infrared camera capturing data table according to an embodiment of the present invention;

FIG. 15E shows a dot pattern data classification table according to an embodiment of the present invention;

FIG. 16E shows a number of dots-dot pattern data table according to an embodiment of the present invention;

FIG. 17E shows a bet start instruction image according to an embodiment of the present invention;

FIG. 18E shows a bet not recommended image according to an embodiment of the present invention;

FIG. 19E shows a bet end instruction image according to an embodiment of the present invention;

FIG. 20E is an image that notifies to each game terminals according to an embodiment of the present invention that bet acceptance has ended;

FIG. 21E illustrates a display example of a display of each of game terminal according to an embodiment of the present invention;

FIG. 22E is a flowchart showing processing of a gaming system according to an embodiment of the present invention;

FIG. 23E is a flowchart showing processing of a gaming system according to an embodiment of the present invention;

FIG. 24E is a flowchart showing processing of a gaming system according to an embodiment of the present invention;

FIG. 25E is a flowchart showing processing of a gaming system according to an embodiment of the present invention;

FIG. 26E is a flowchart showing processing of a gaming system according to an embodiment of the present invention;

FIG. 27E is a flowchart showing number of dots on dice detection processing of FIG. 26E;

FIG. 28E is a block diagram showing a modified example relating to arrangement; and FIG. 29E is a block diagram showing a modified example relating to arrangement.

Figure 1:
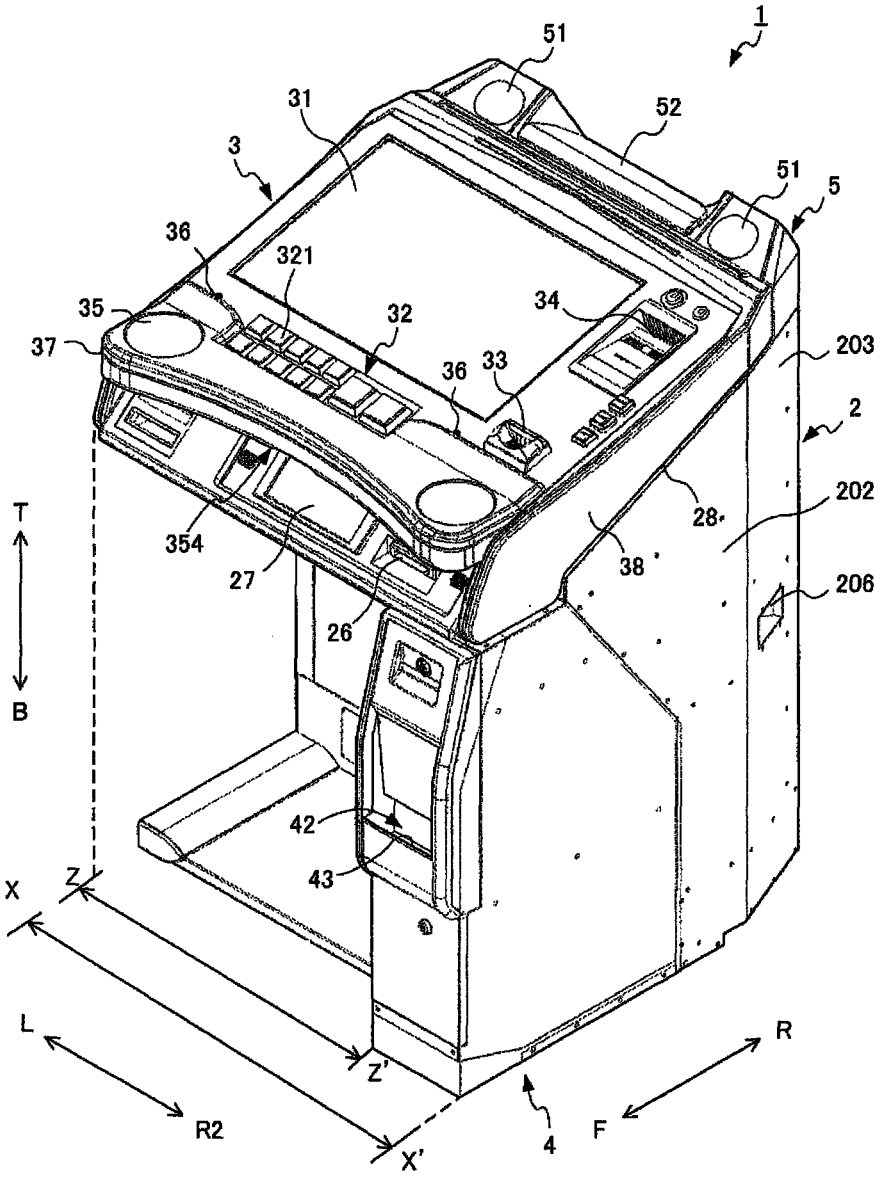
FIG. 1 is a perspective view showing the gaming machine 1 according to an embodiment of the present invention.
Figure 1A:
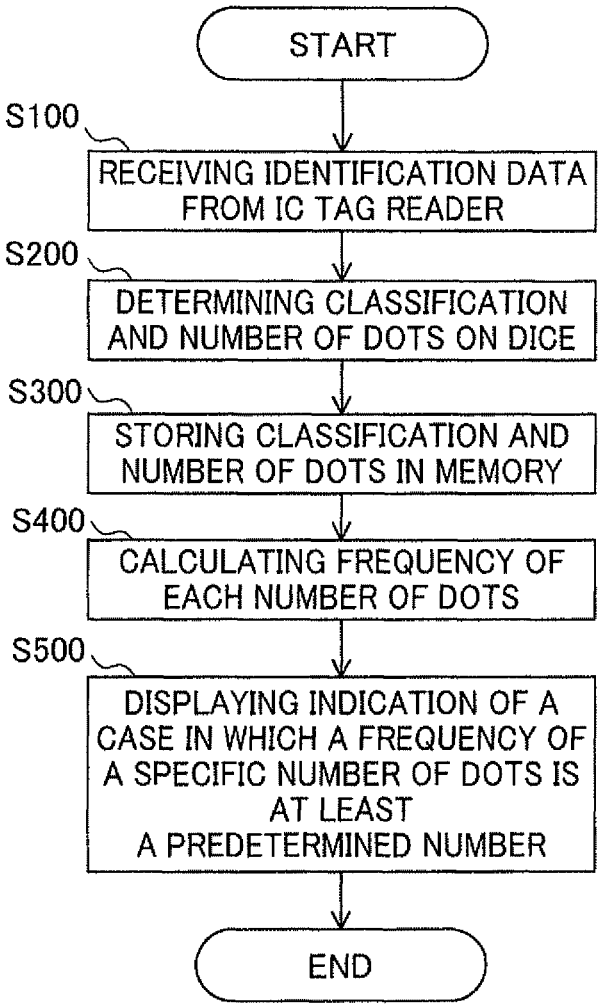
FIG. 1A is a flowchart schematically showing a processing sequence of a gaming machine according to an embodiment of the present invention.
Figure 1B:
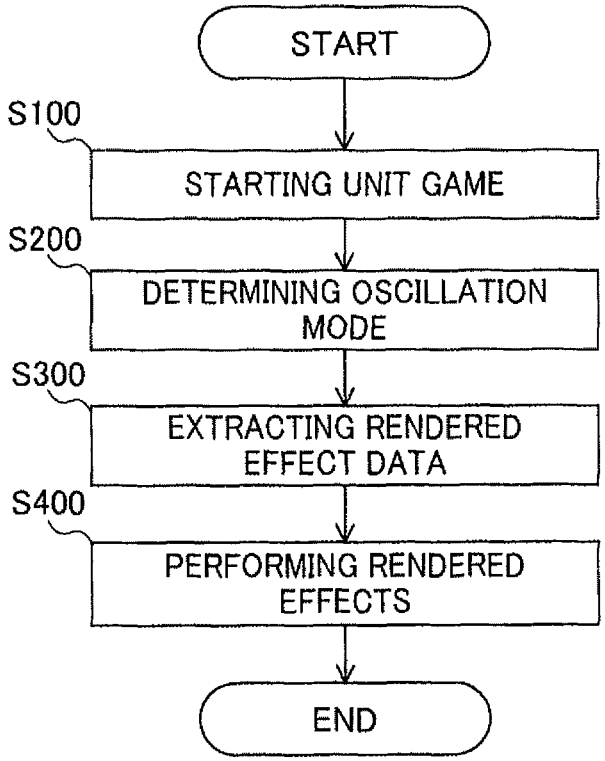
FIG. 1B is a flowchart schematically showing a processing sequence of a gaming machine according to an embodiment of the present invention.
Figure 1C:
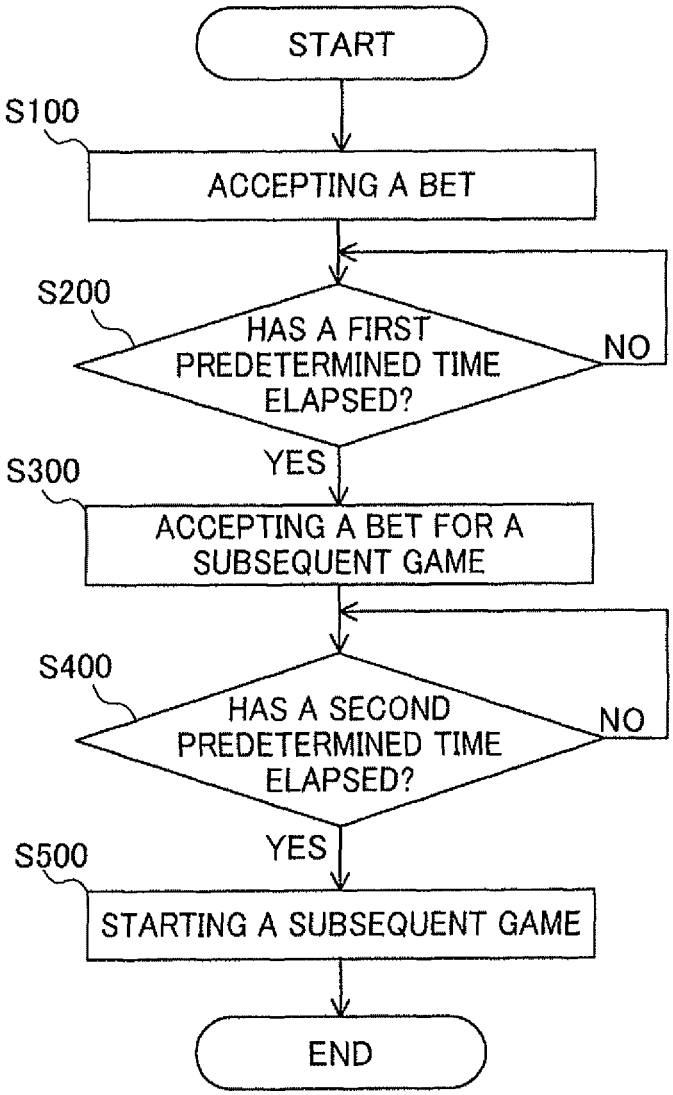
FIG. 1C is a flowchart schematically showing a processing sequence of a gaming machine according to an embodiment of the present invention.
Figure 1D:
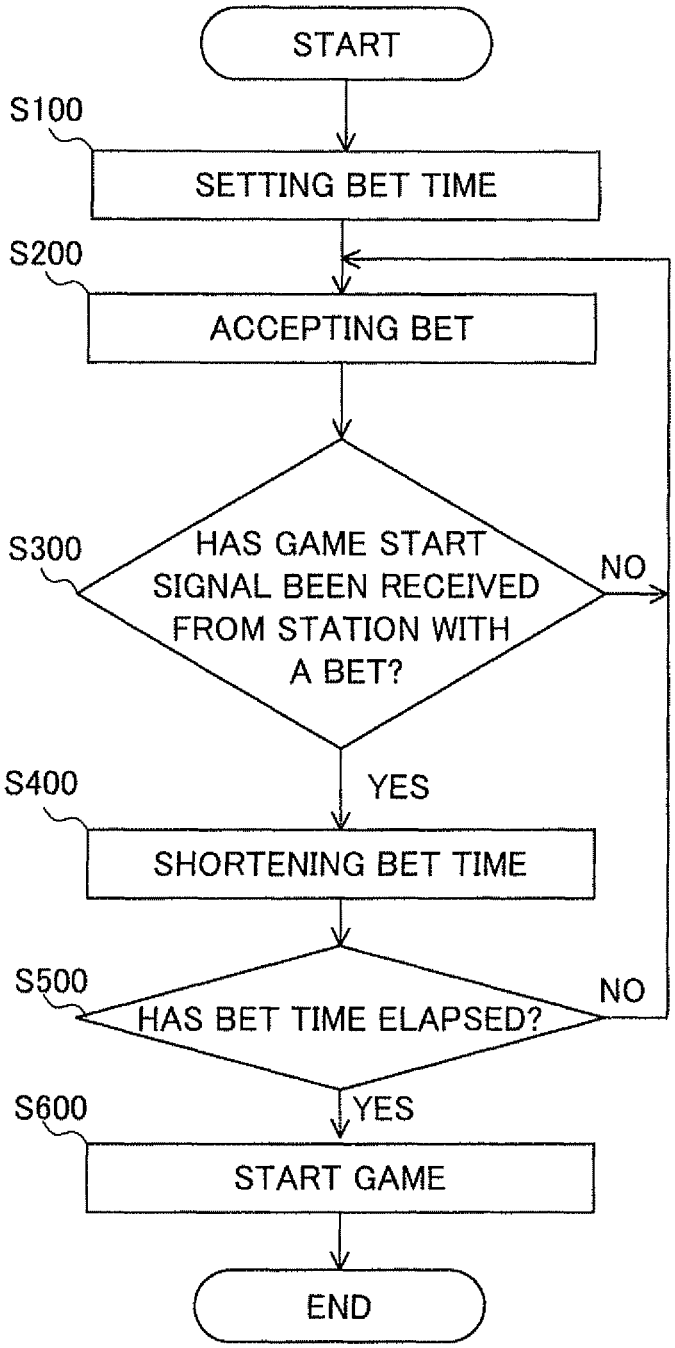
FIG. 1D is a flowchart schematically showing a processing sequence of a gaming machine according to an embodiment of the present invention.
Figure 1E:
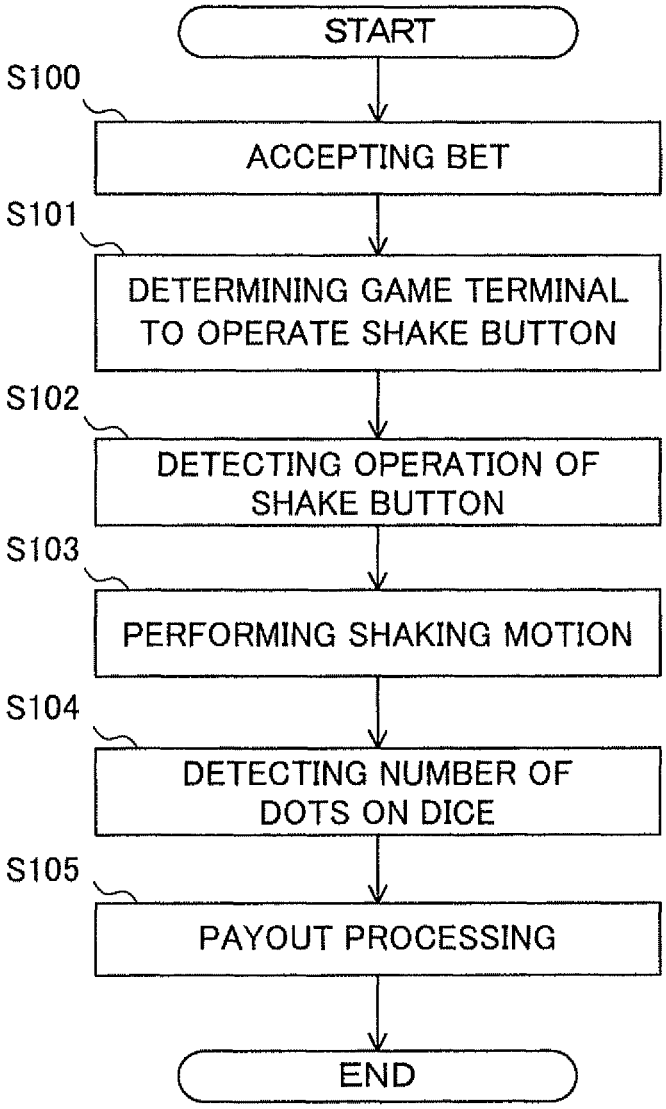
Figure 1F:
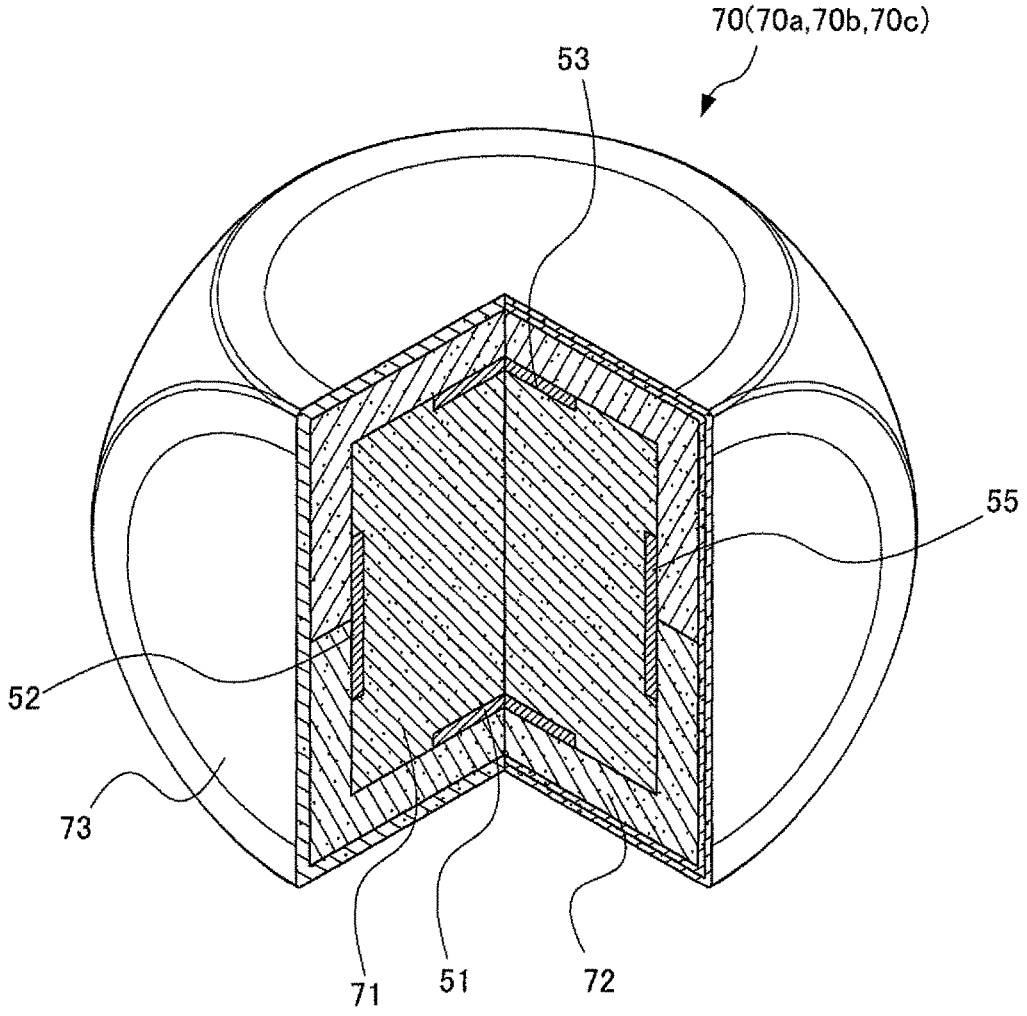
Figure 2:
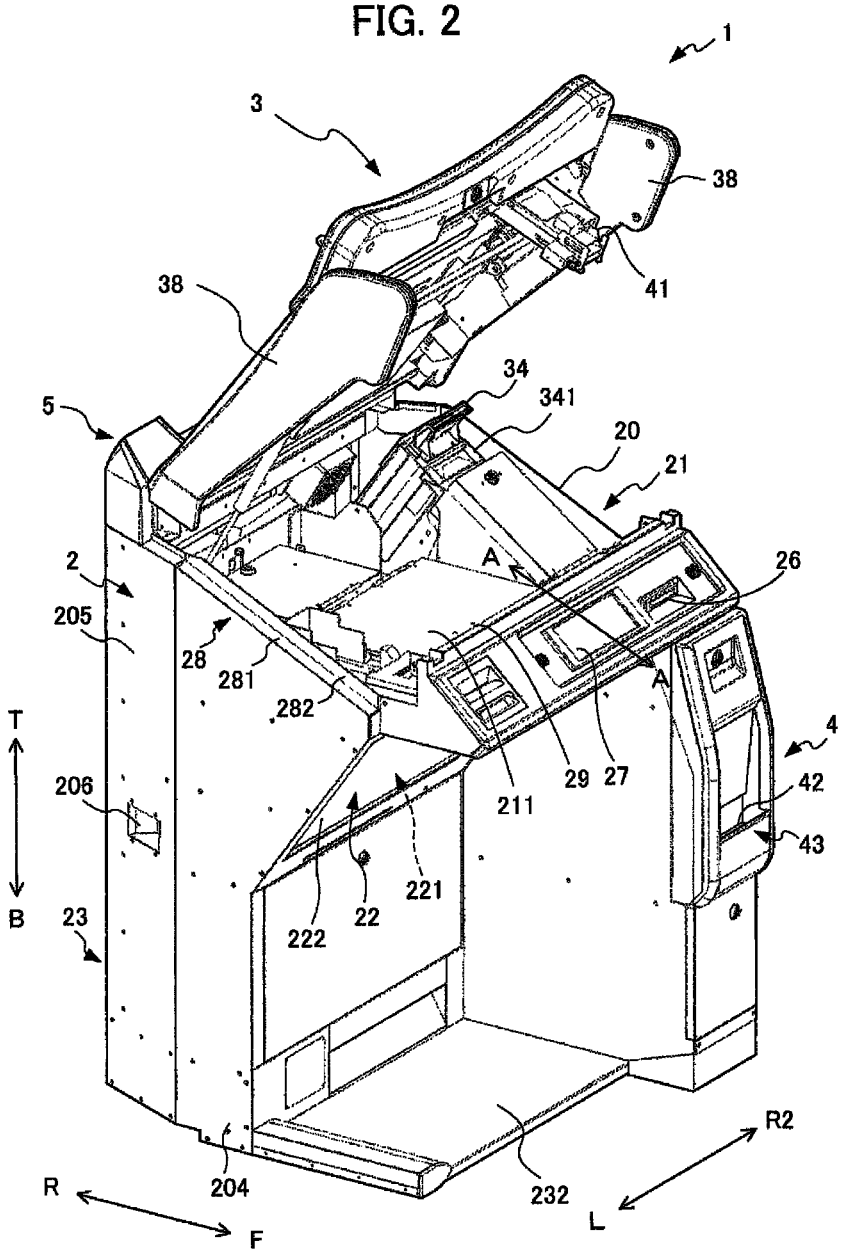
FIG. 2 is a perspective view showing the gaming machine 1 according to the embodiment of the present invention with a top door 3 being open.
Figure 2A:
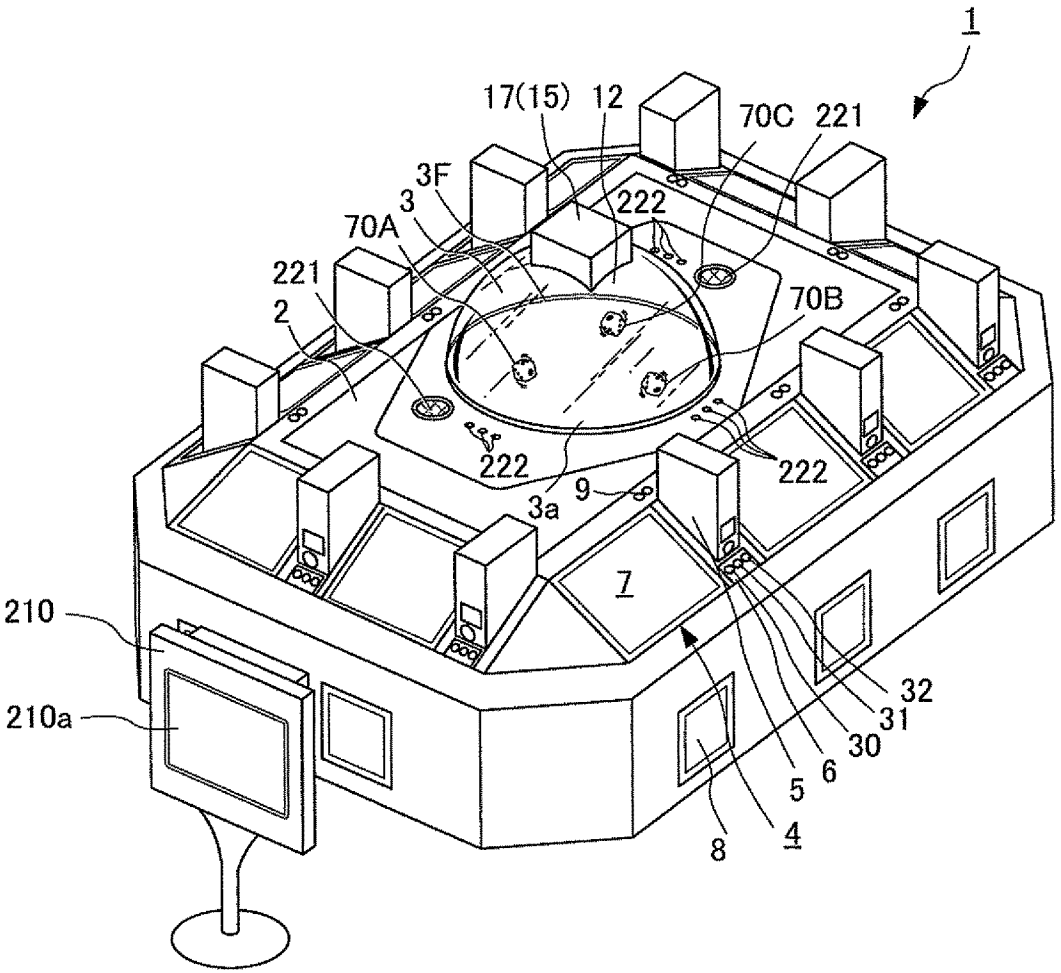
FIG. 2A is a perspective view of a gaming machine according to the embodiment of the present invention.
Figure 2B:
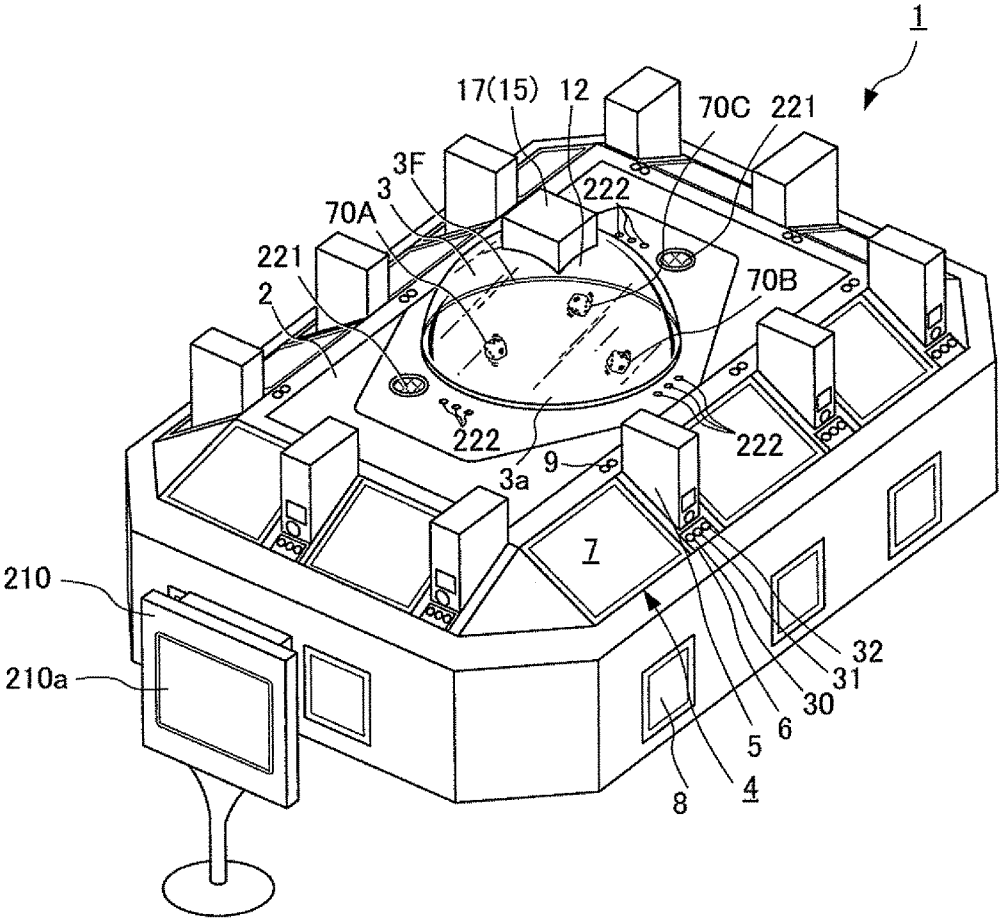
FIG. 2B is a perspective view of a gaming machine according to the embodiment of the present invention.
Figure 2C:
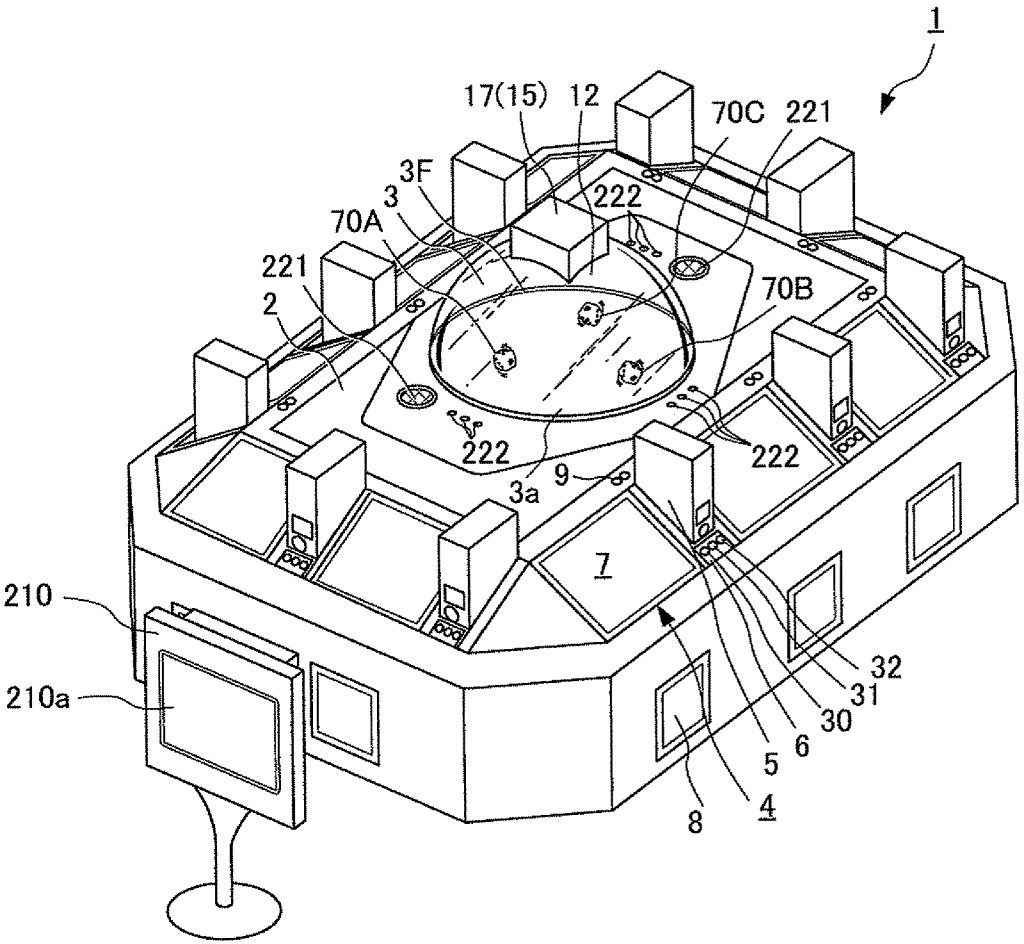
FIG. 2C is a perspective view of a gaming machine according to the embodiment of the present invention.
Figure 2D:
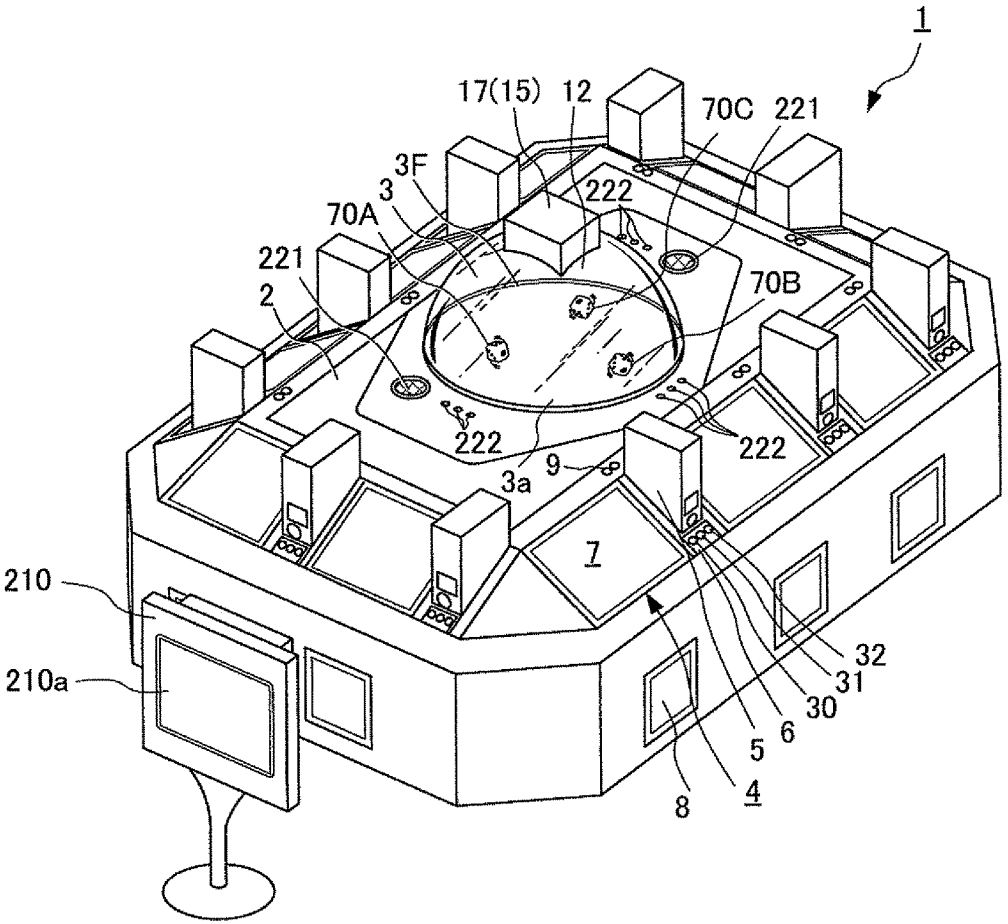
FIG. 2D is a perspective view of a gaming machine according to the embodiment of the present invention.
Figure 2E:
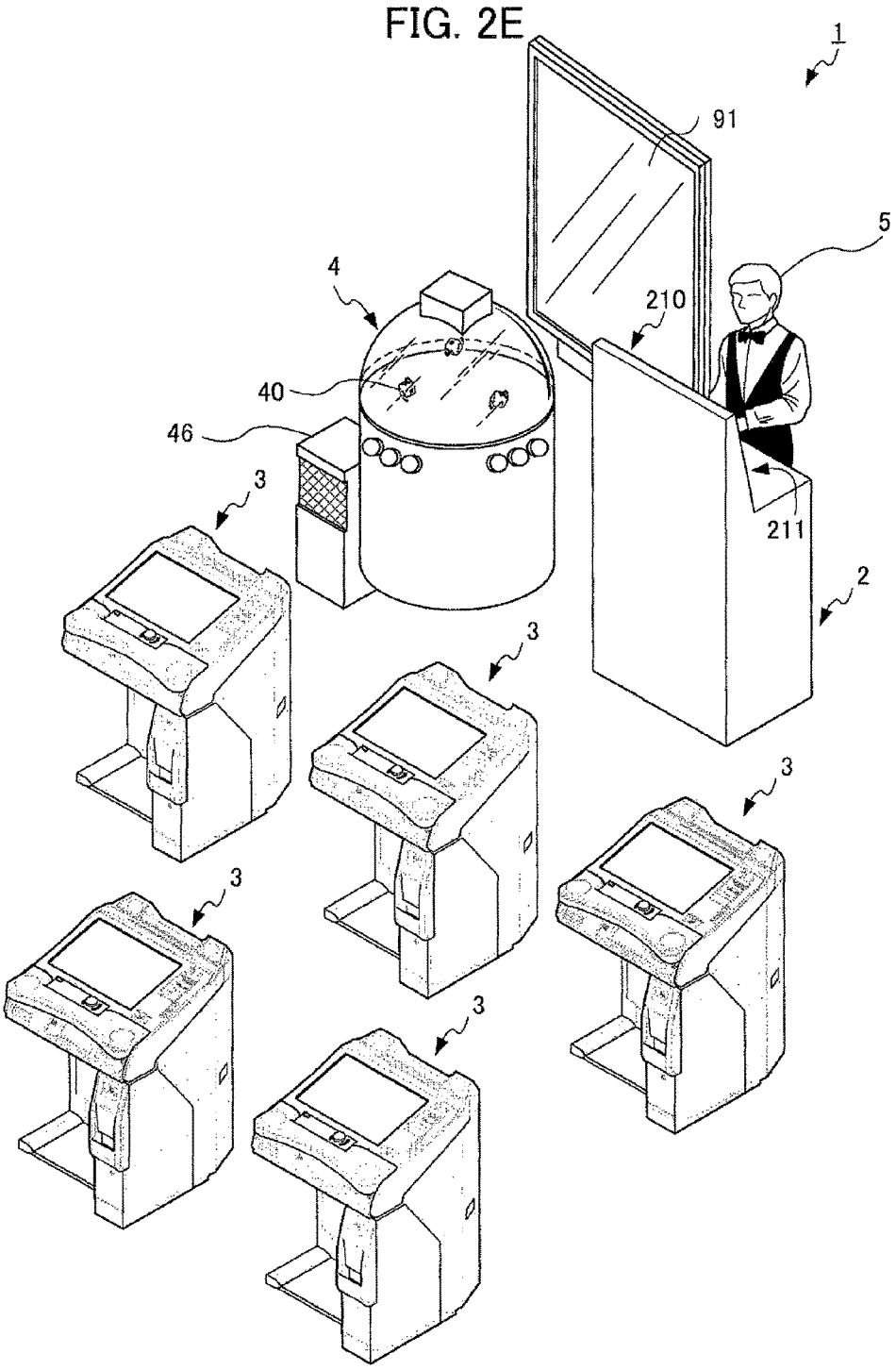
Figure 2F:
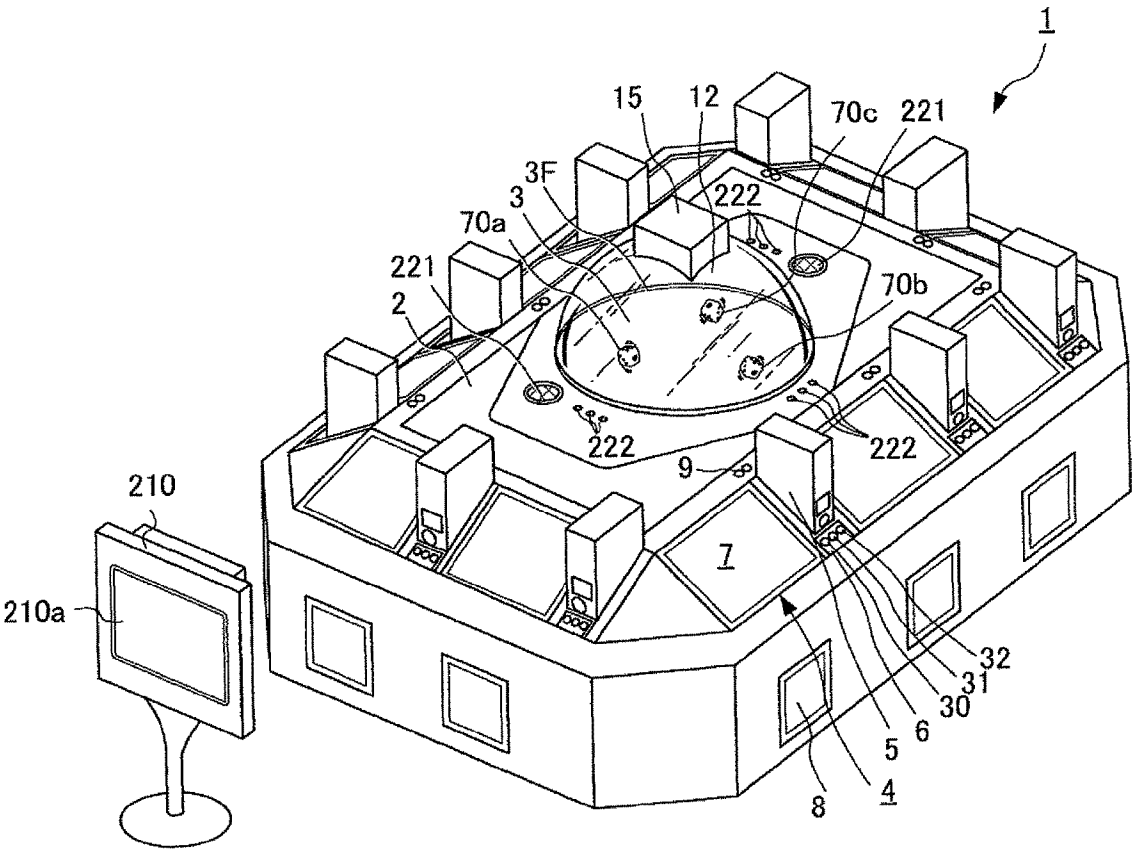
Figure 3:
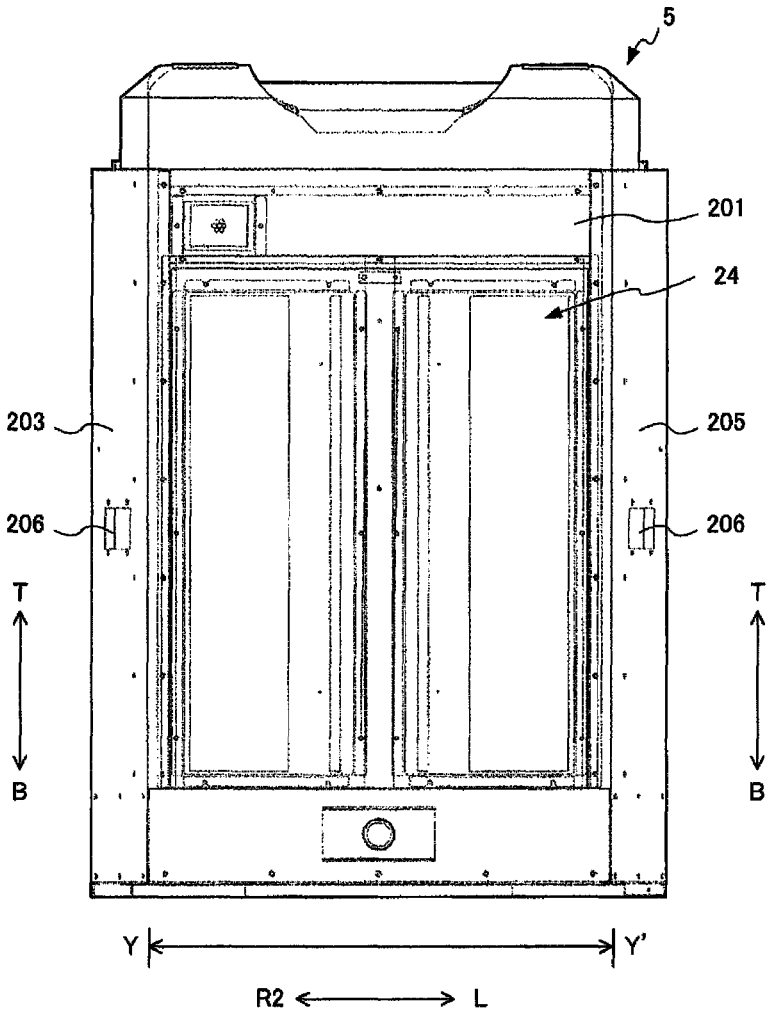
FIG. 3 is a back view showing the gaming machine 1 according to the embodiment of the present invention.
Figure 3A:
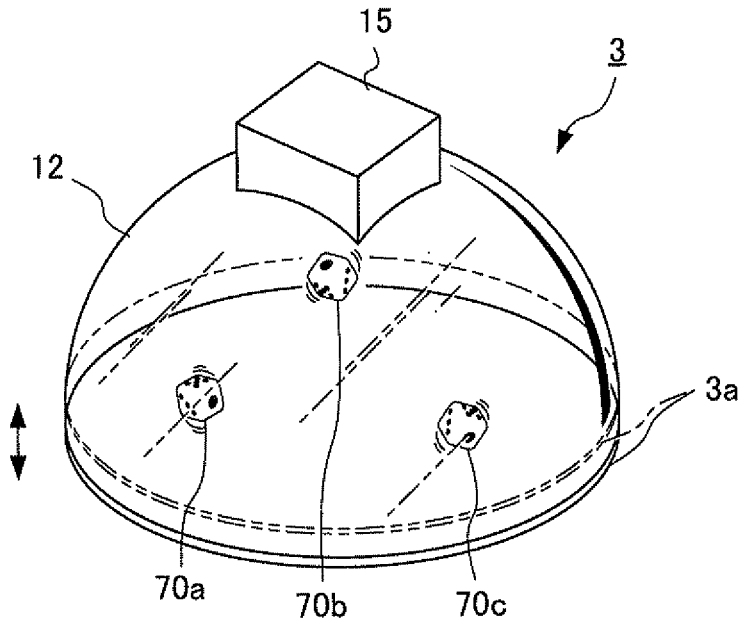
FIG. 3A is an enlarged view of a playing unit of the gaming machine shown in FIG. 2A.
Figure 4A:
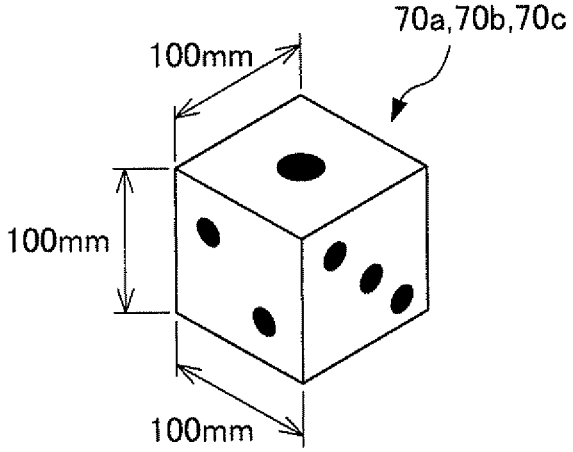
FIG. 4A is an external perspective view of a die according to the embodiment of the present invention.
Figure 3B:
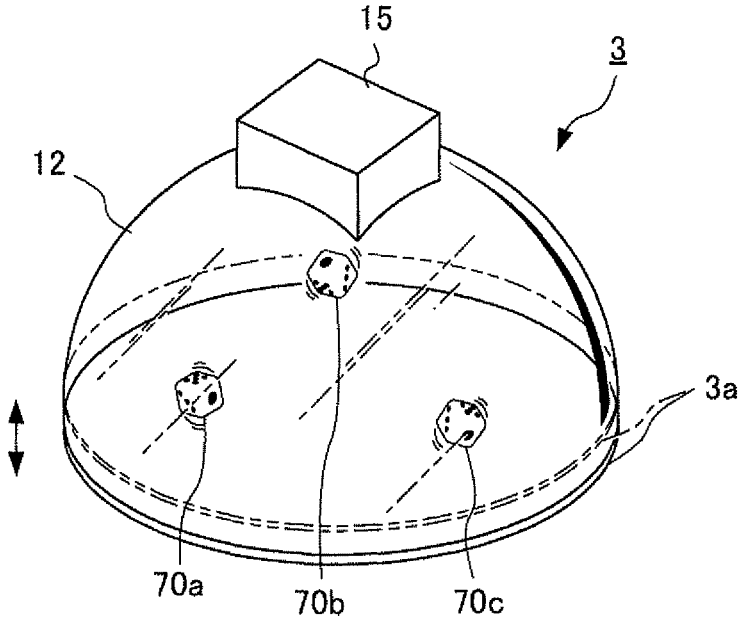
FIG. 3B is an enlarged view of a playing unit of the gaming machine shown in FIG. 2B.
Figure 4B:
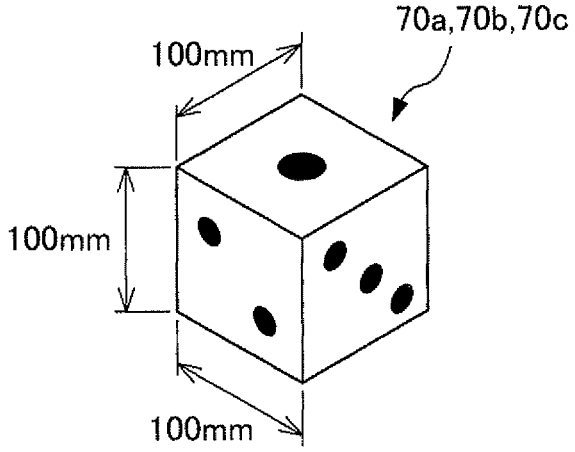
FIG. 4B is an external perspective view of a die according to the embodiment of the present invention.
Figure 3C:
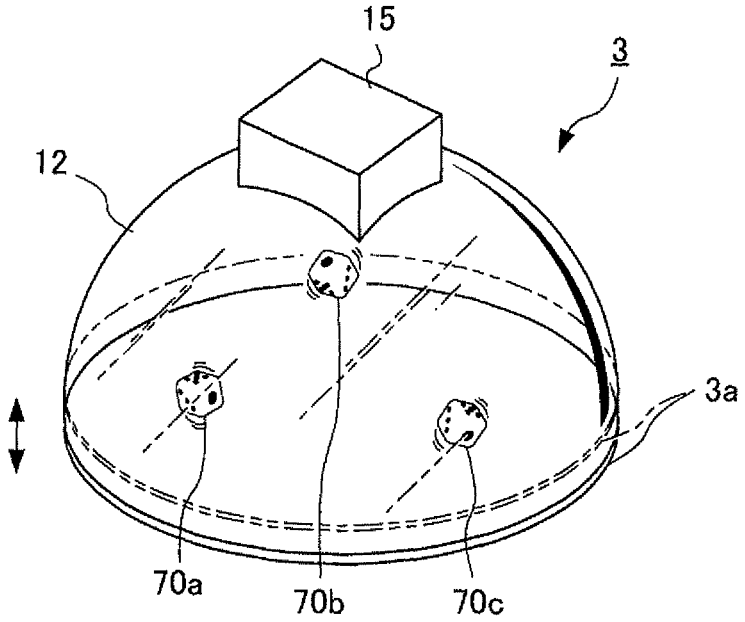
FIG. 3C is an enlarged view of a playing unit of the gaming machine shown in FIG. 2C.
Figure 4C:
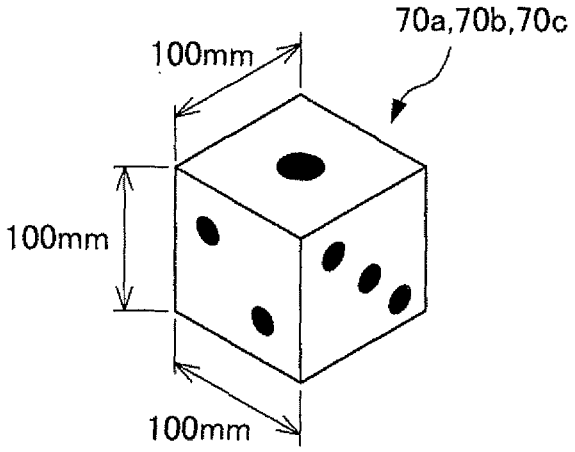
FIG. 4C is an external perspective view of a die according to the embodiment of the present invention.
Figure 3D:
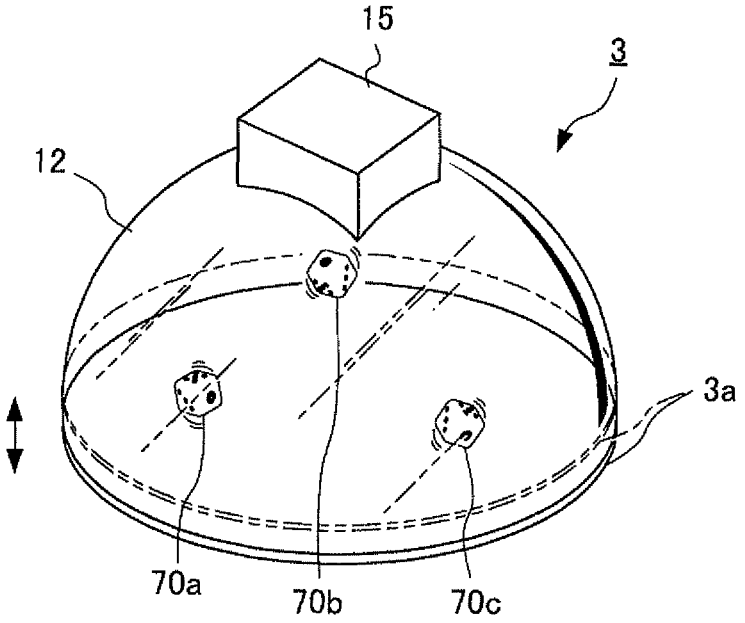
FIG. 3D is an enlarged view of a playing unit of the gaming machine shown in FIG. 2D.
Figure 4D:
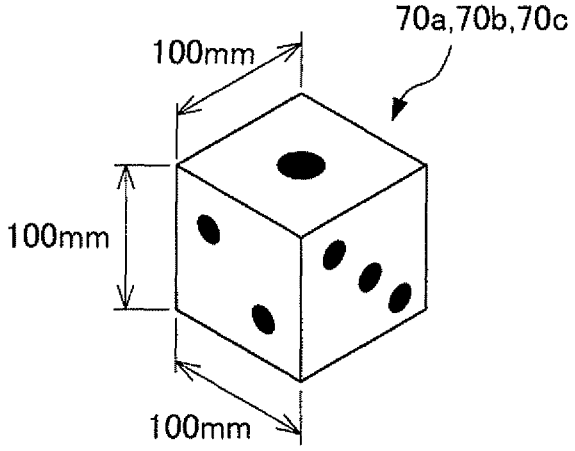
FIG. 4D is an external perspective view of a die according to the embodiment of the present invention.
Figure 3E:
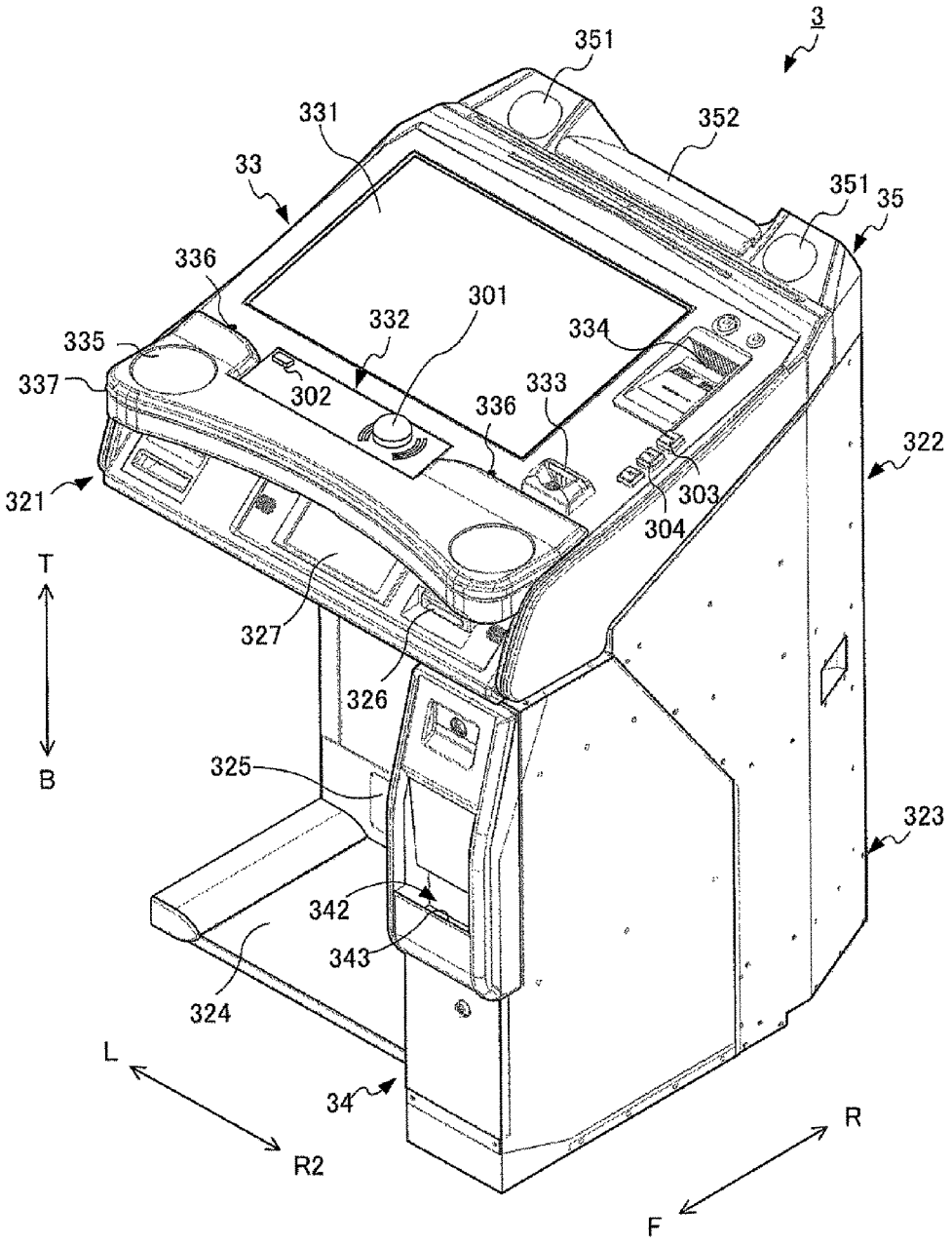
Figure 3F:
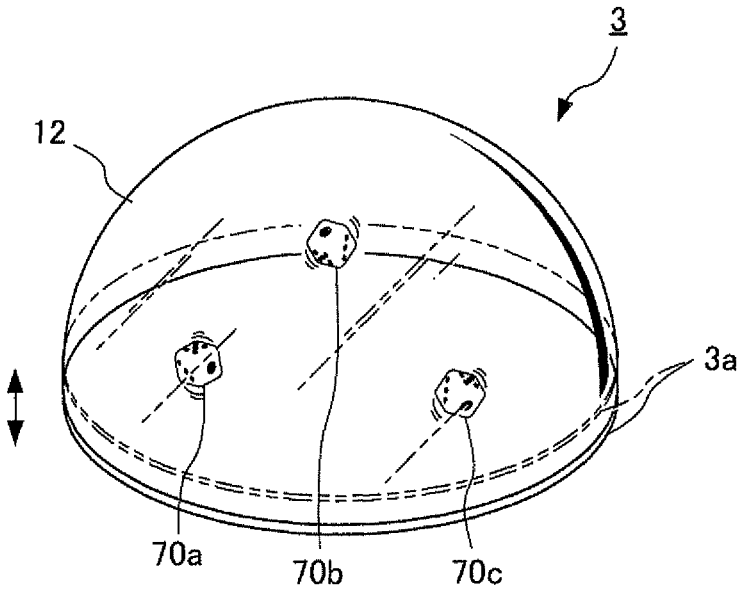
Figure 4:
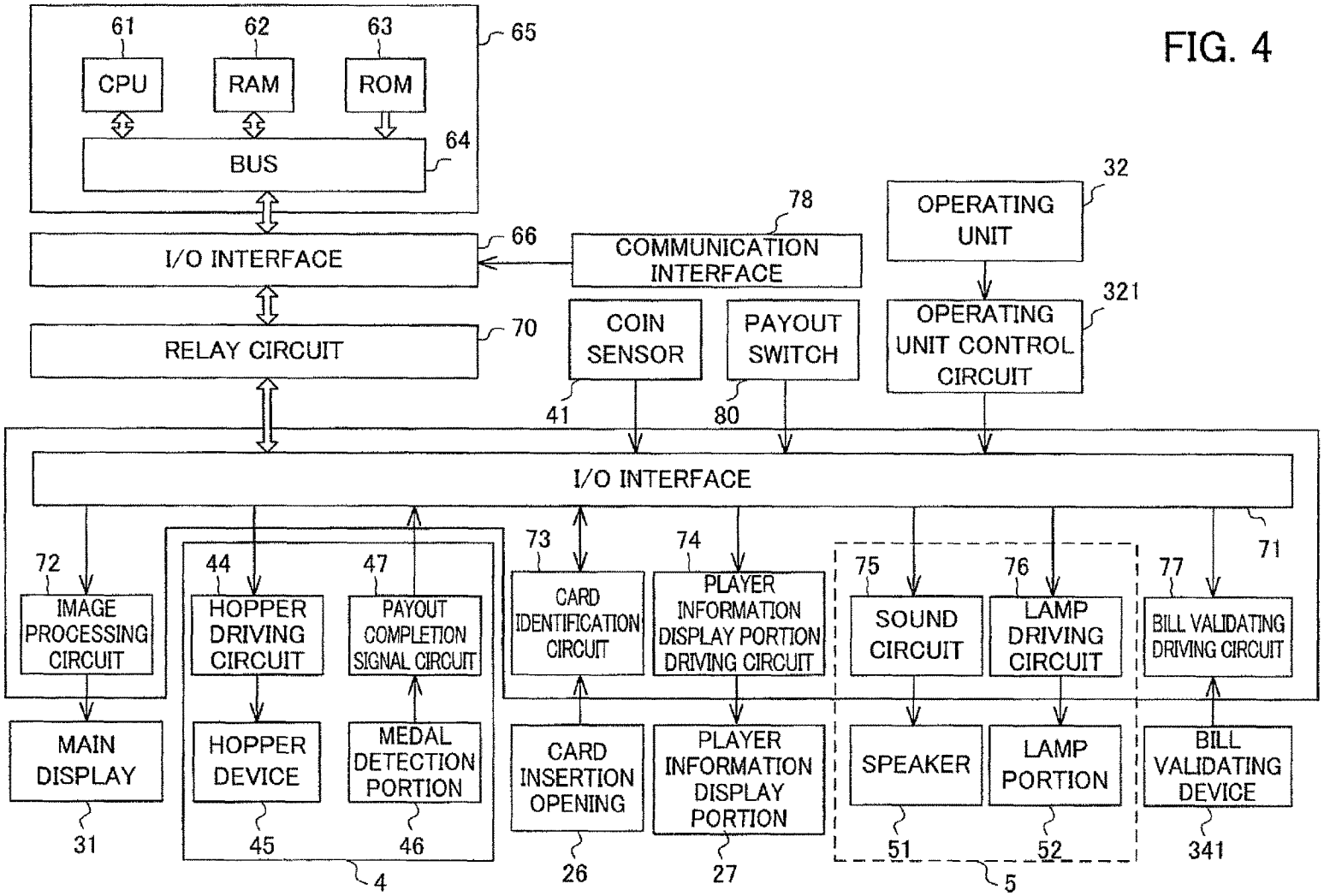
FIG. 4 is a functional block diagram of the gaming machine 1 according to the embodiment of the present invention.
Figure 4E:
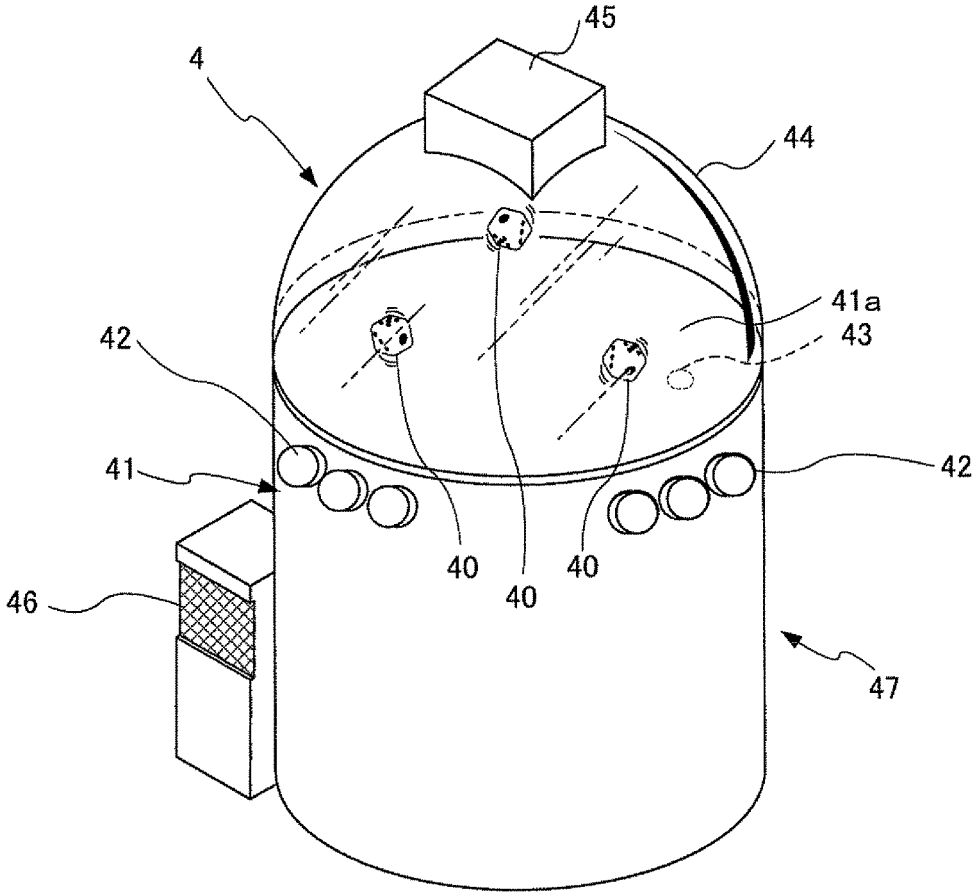
Figure 4F:
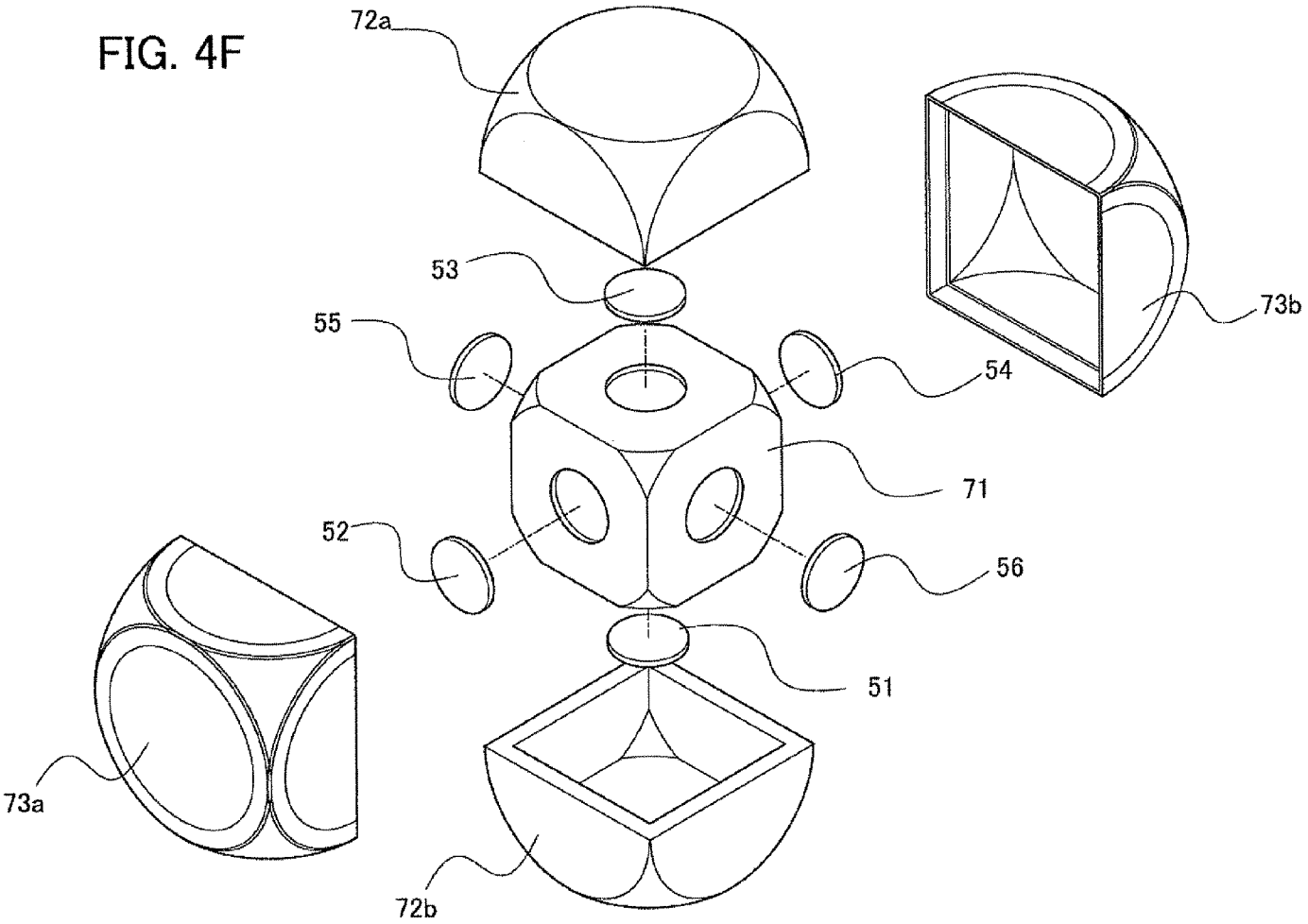
Figure 5:
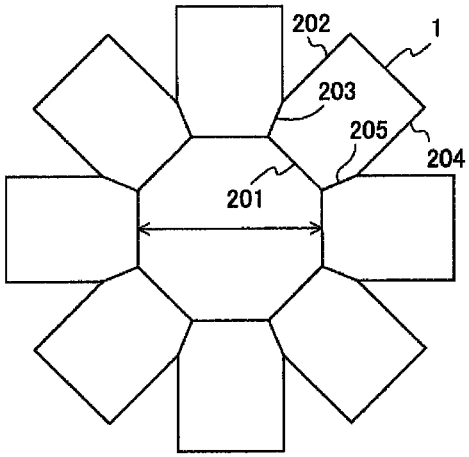
FIG. 5 is a diagram showing a circular arrangement of the gaming machines 1 according to the embodiment of the present invention.
Figure 6:
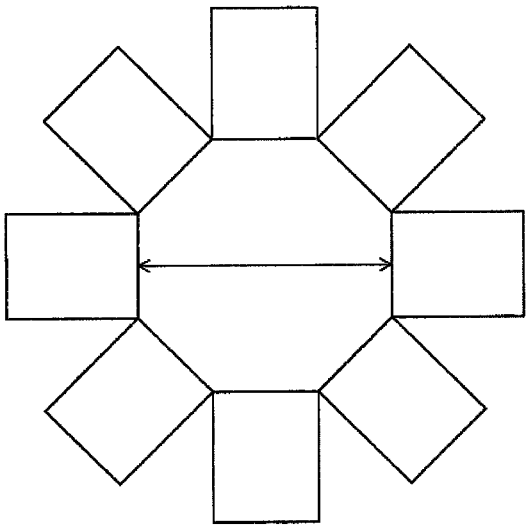
FIG. 6 is a diagram showing a comparative example of FIG. 5.
Figure 5A:
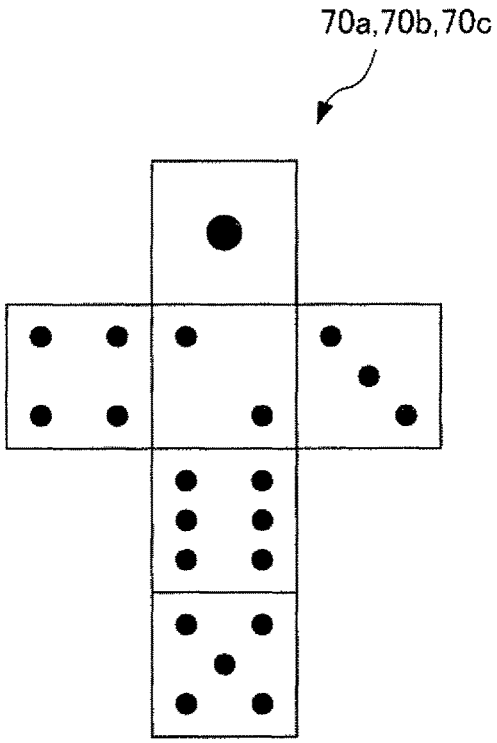
FIG. 5A is a development view of a die according to the embodiment of the present invention.
Figure 6A:
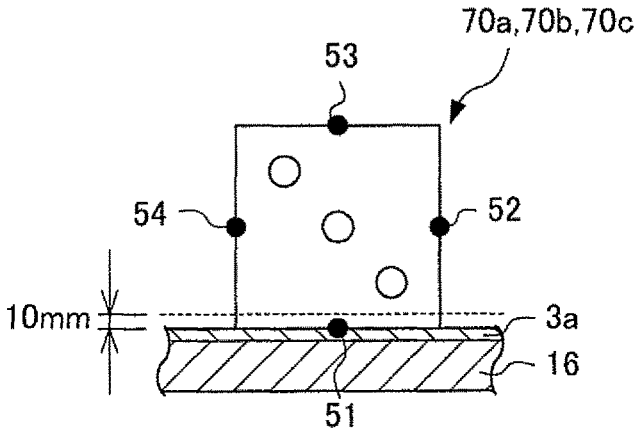
Figure 5B:
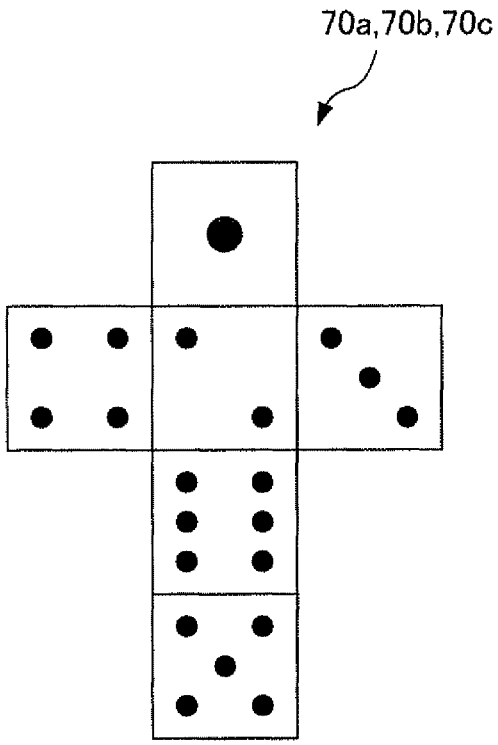
FIG. 5B is a development view of a die according to the embodiment of the present invention.
Figure 6B:
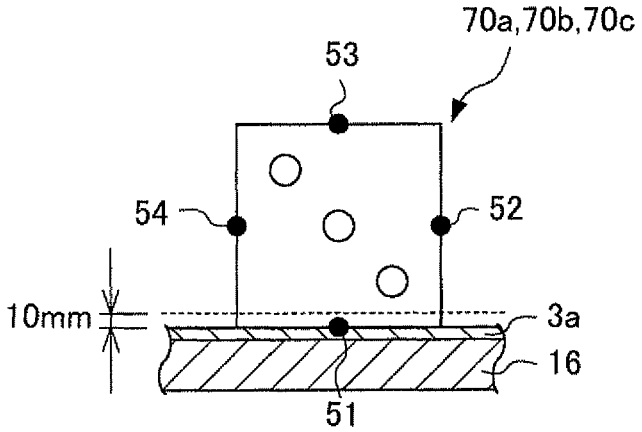
Figure 5C:
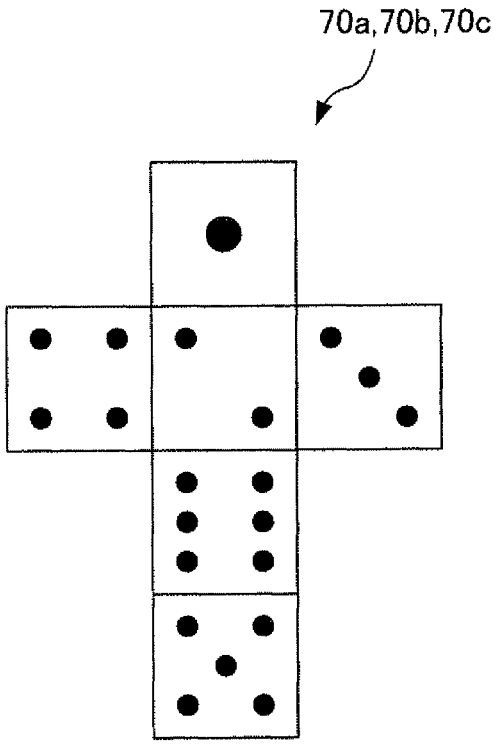
FIG. 5C is a development view of a die according to the embodiment of the present invention.
Figure 6C:
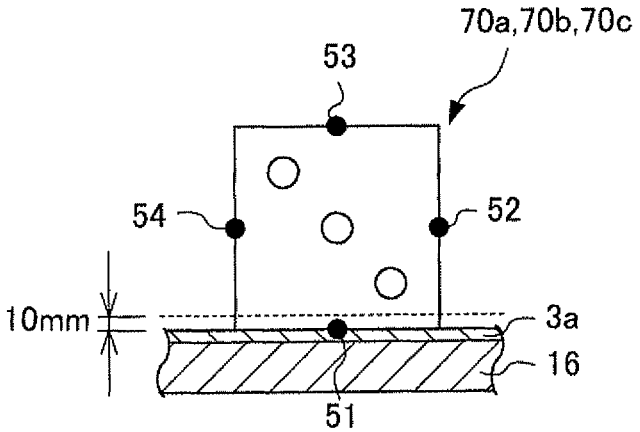
Figure 5D:
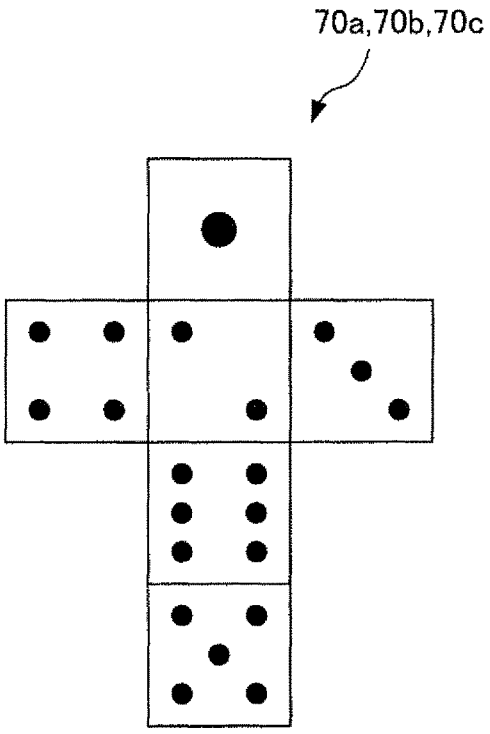
FIG. 5D is a development view of a die according to the embodiment of the present invention.
Figure 6D:
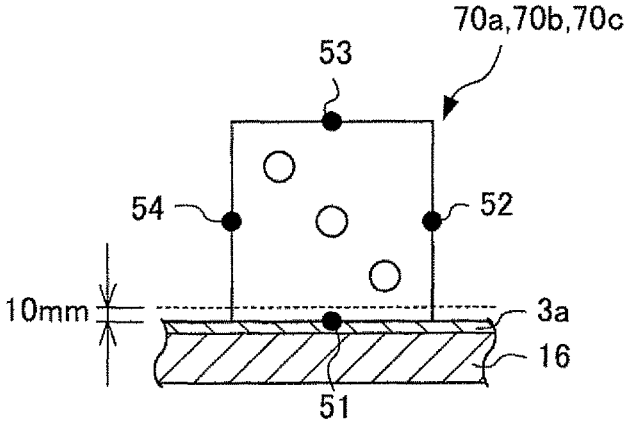
Figure 5E:
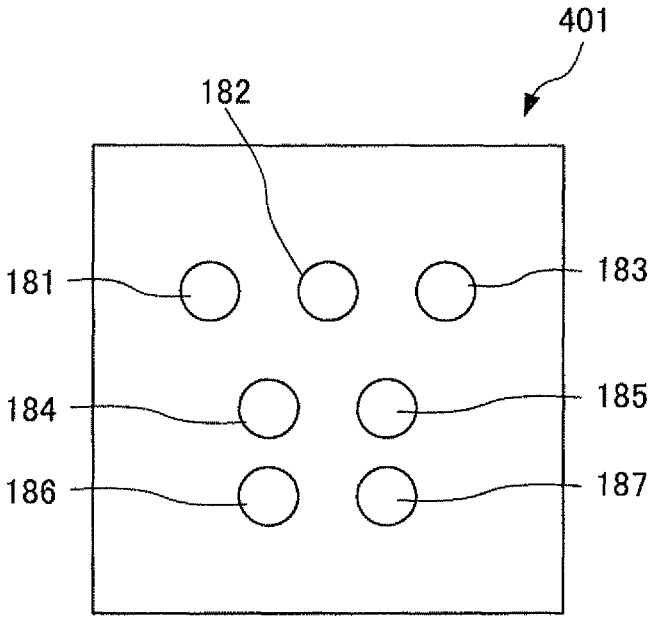
Figure 5F:
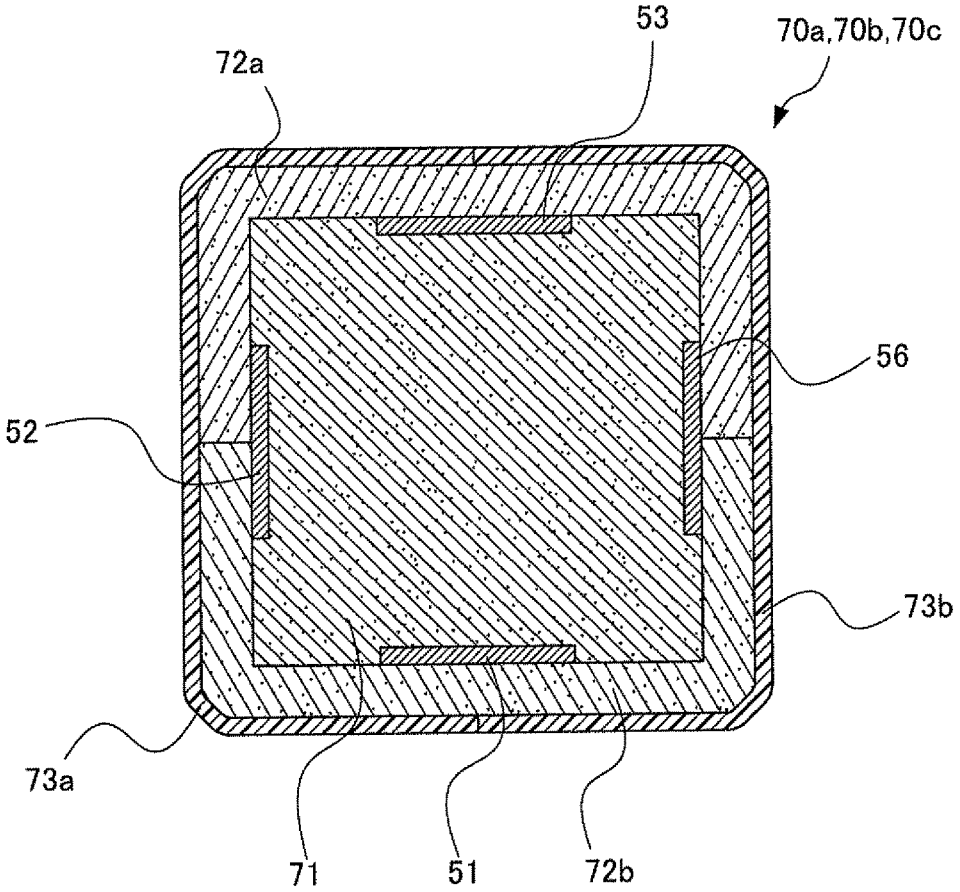
Figure 6G:
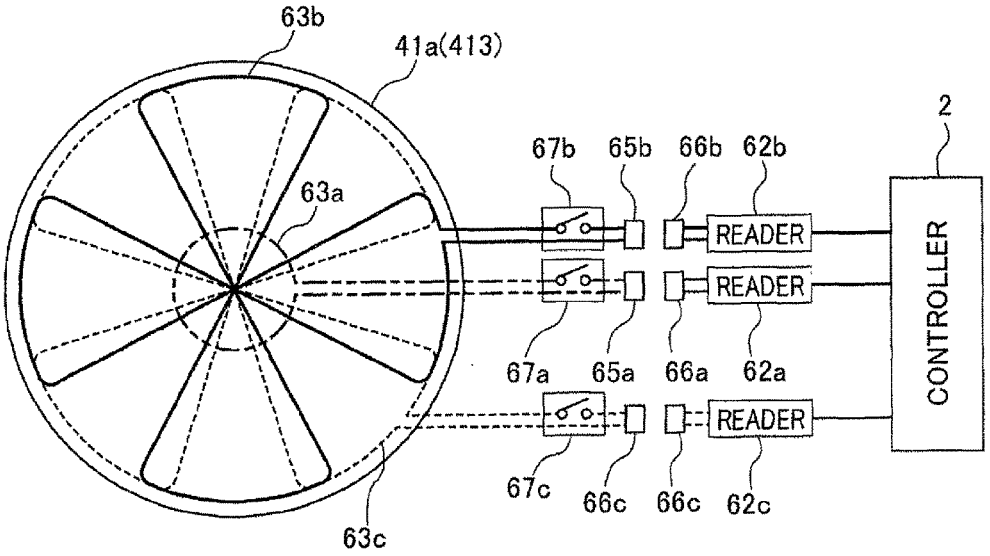
Figure 6E:
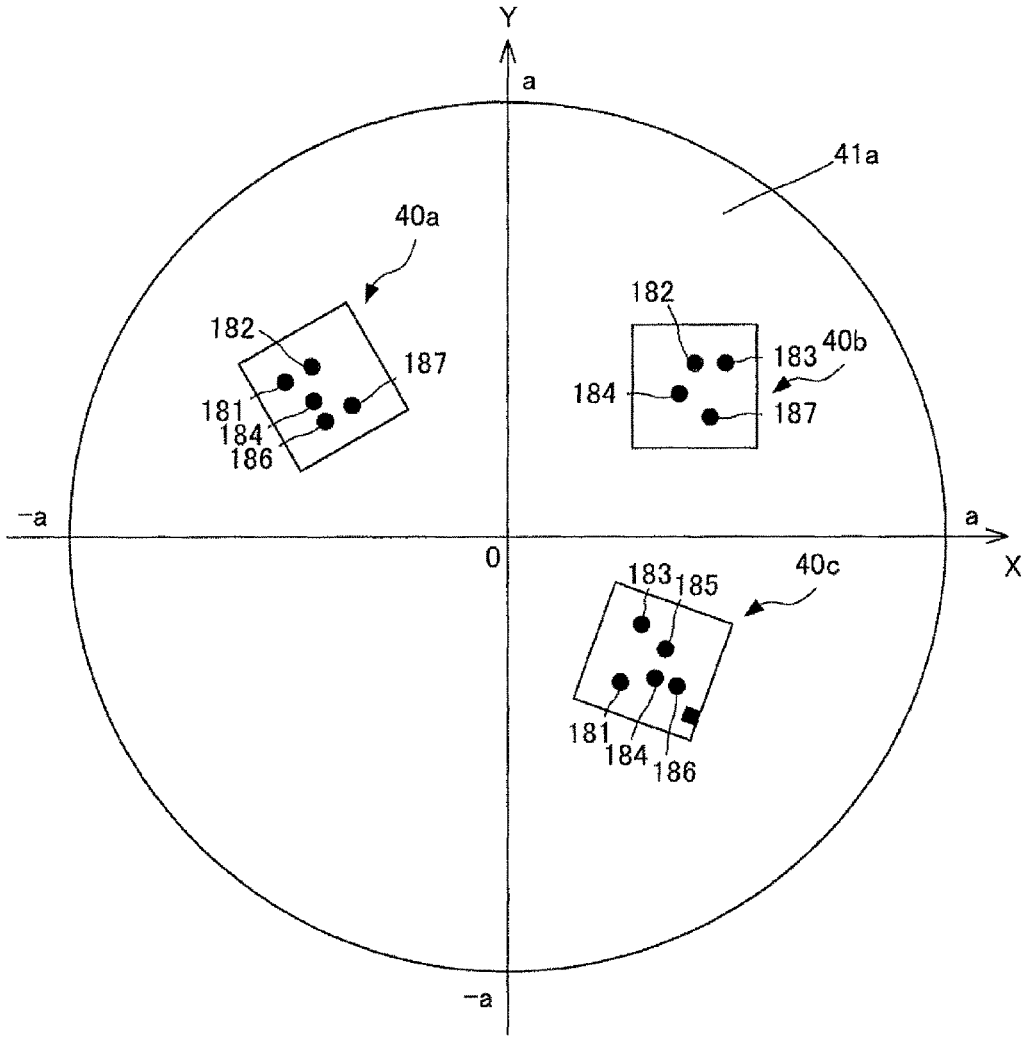
Figure 6F:
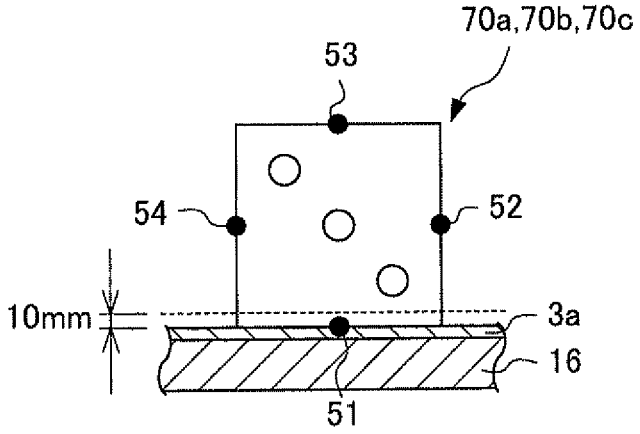
Figure 7:
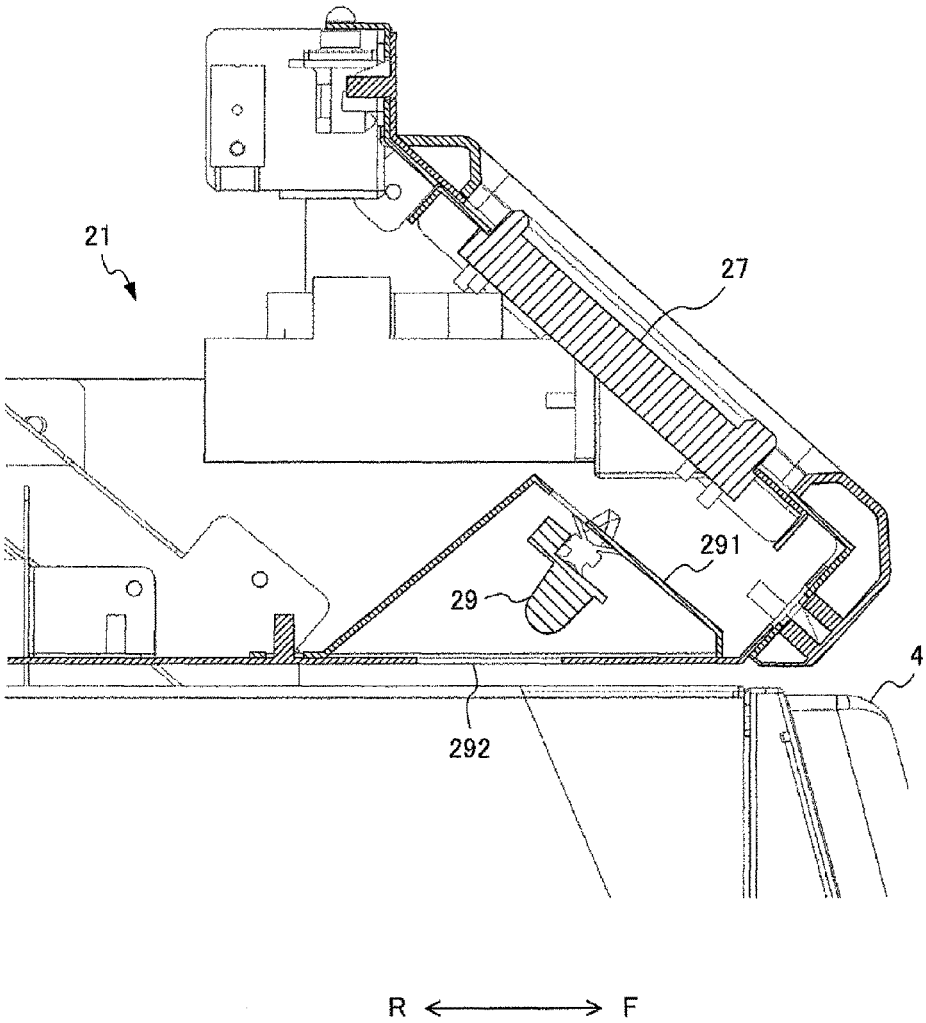
FIG. 7 is a cross-sectional view taken along line A-A in FIG. 2.
Figure 7A:
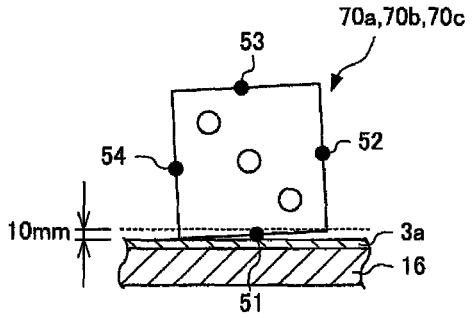
Figure 8A:
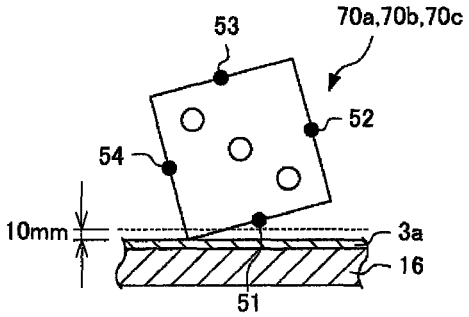
FIG. 8 is an exploded view of the vicinity of a foot lamp 25 according to the embodiment of the present invention.
Figure 7B:
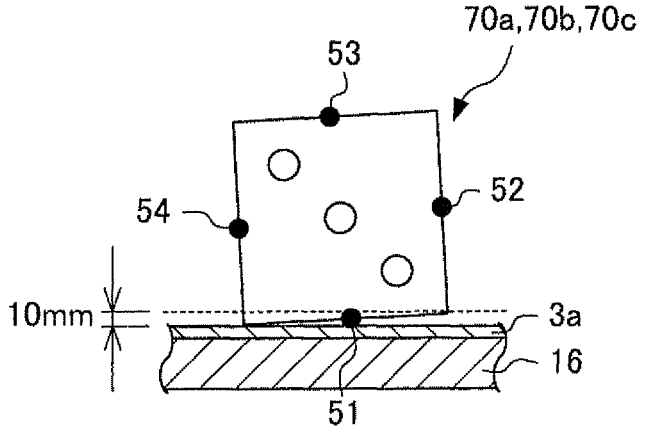
Figure 8B:
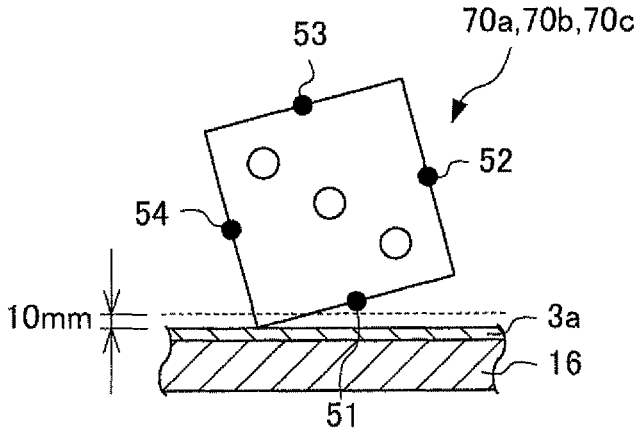
Figure 7C:
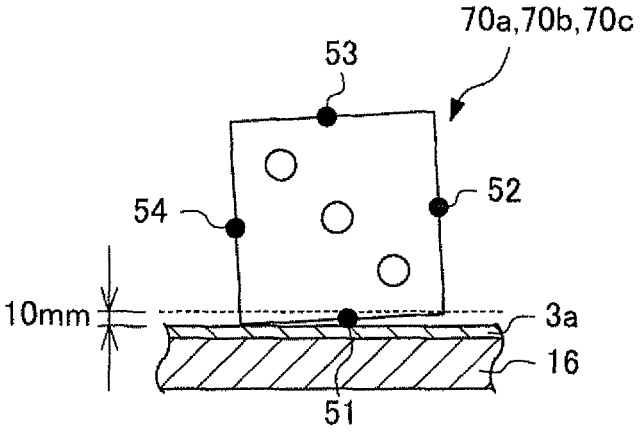
Figure 8C:
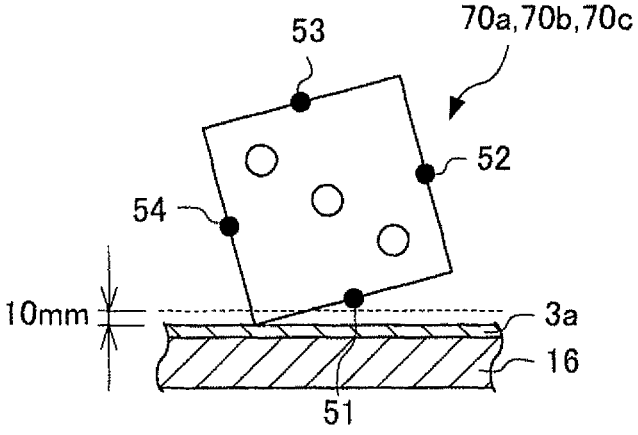
Figure 7D:
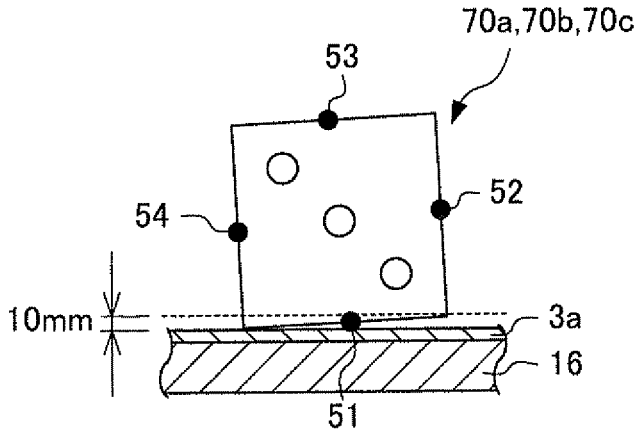
Figure 8D:
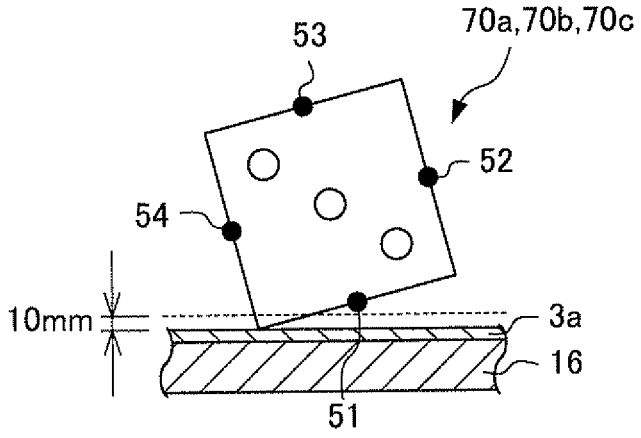
Figure 7E:
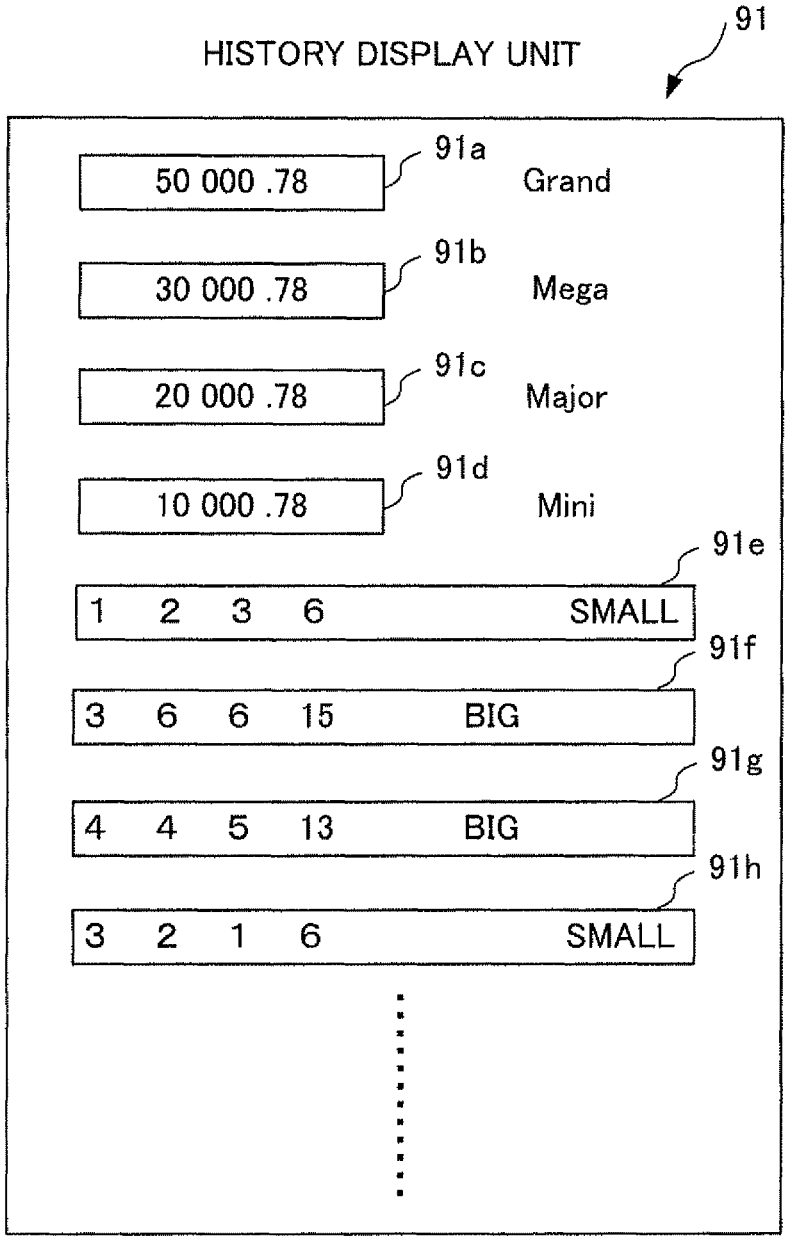
Figure 7F:
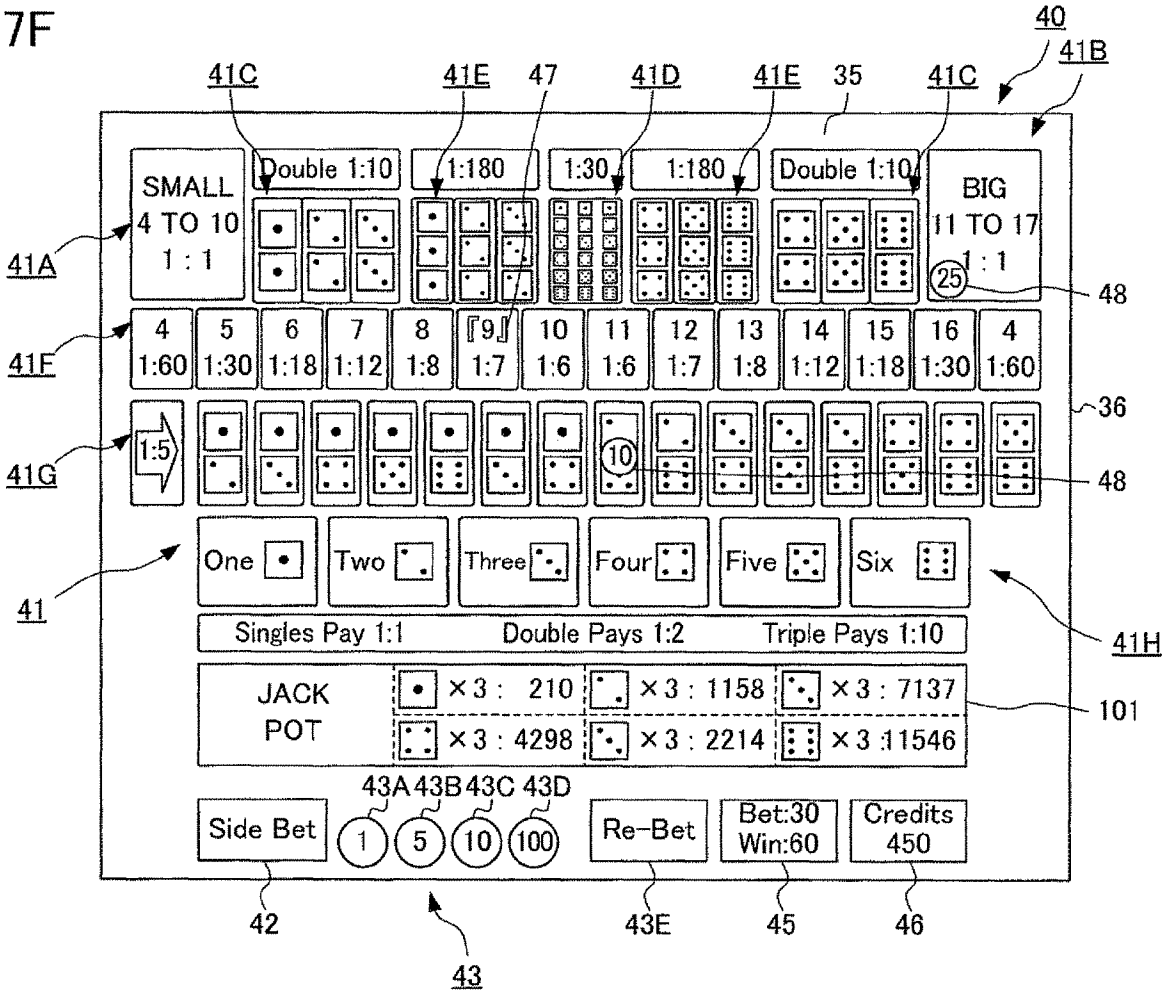
Figure 8:
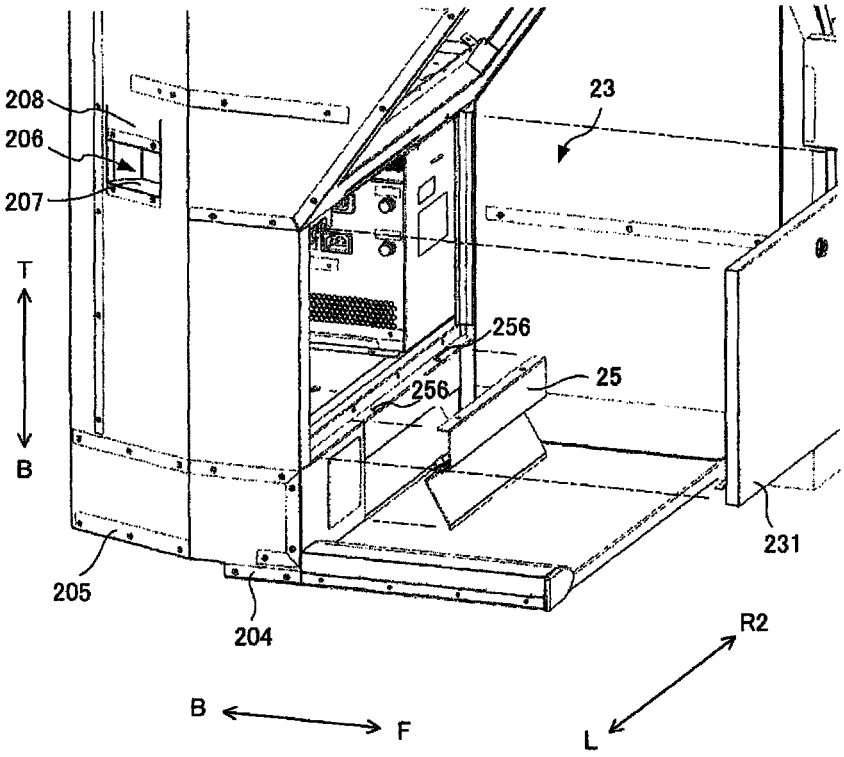
Figure 8E:
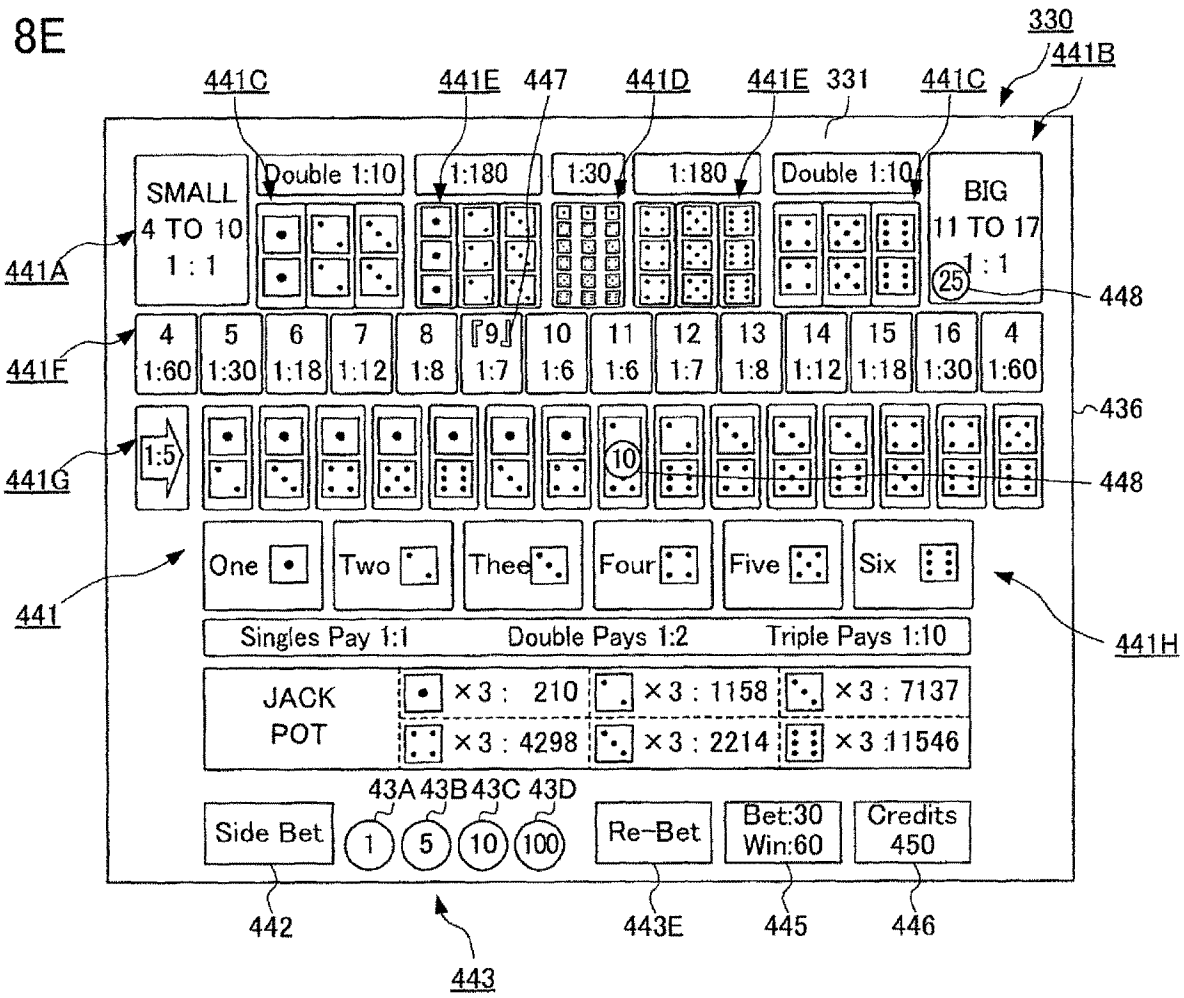
Figure 8F:
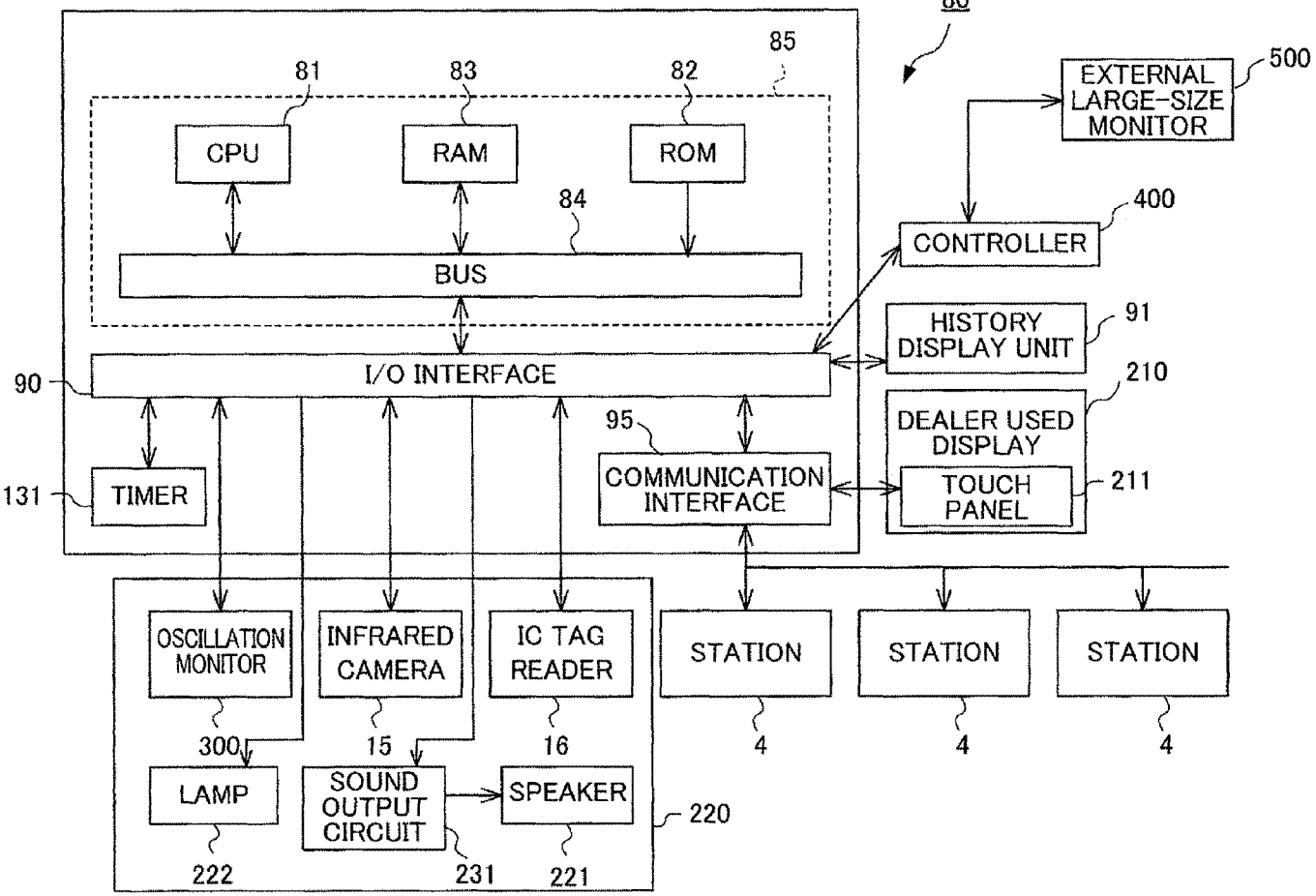
Figure 9:
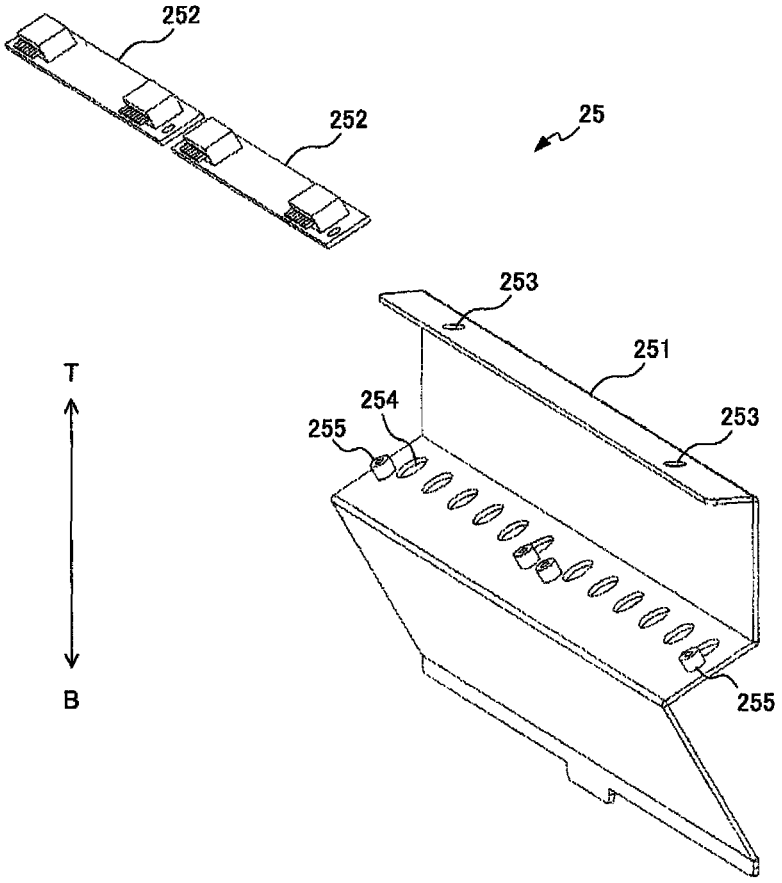
FIG. 9 is an exploded view of the foot lamp 25 according to the embodiment of the present invention.
Figure 9A:
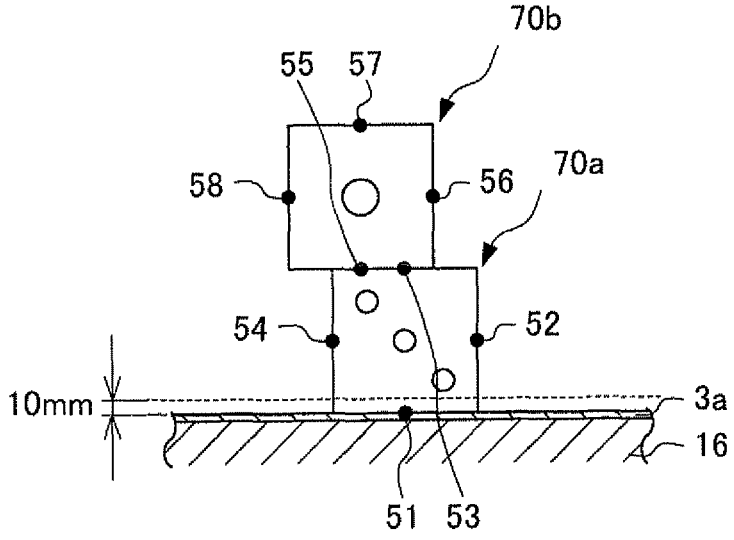
Figure 9B:
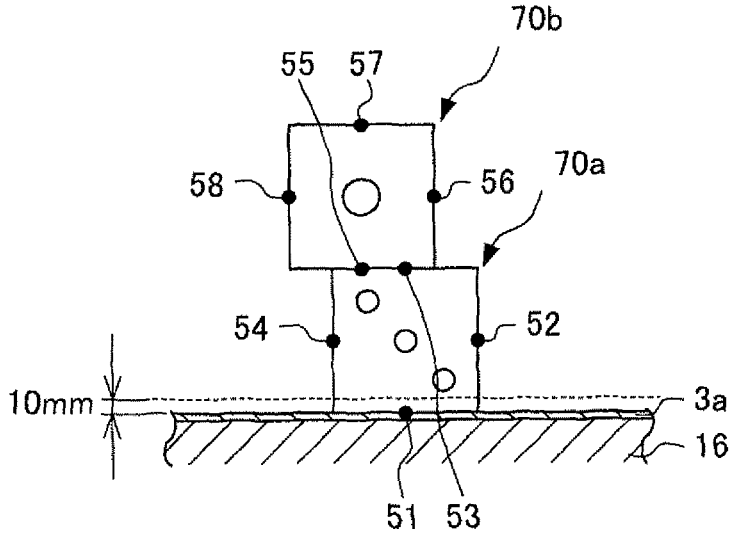
Figure 9C:
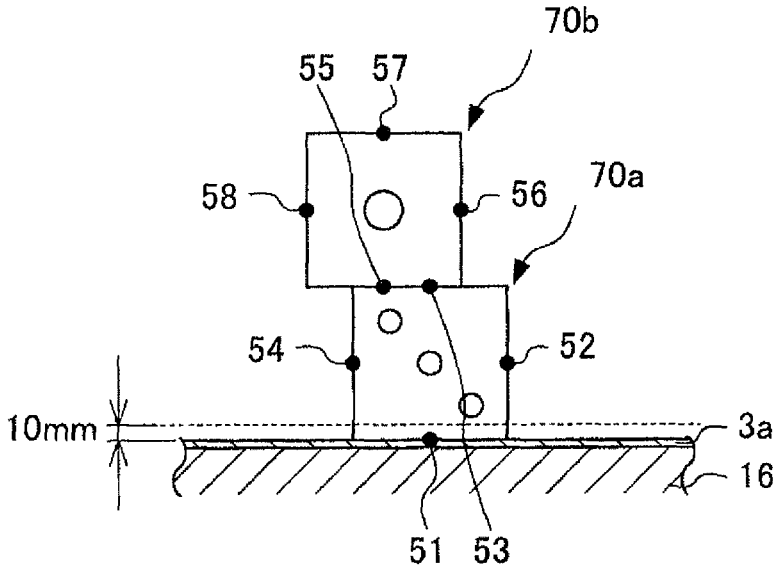
Figure 9D:
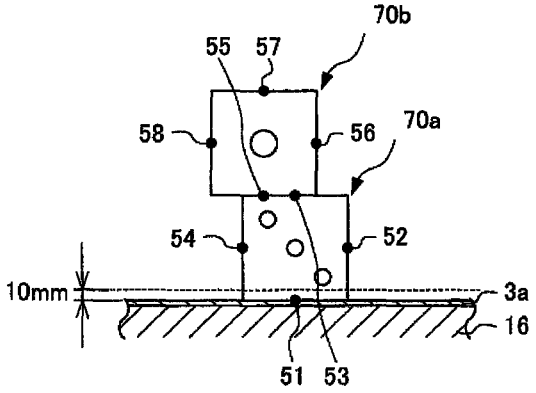
Figure 9E:
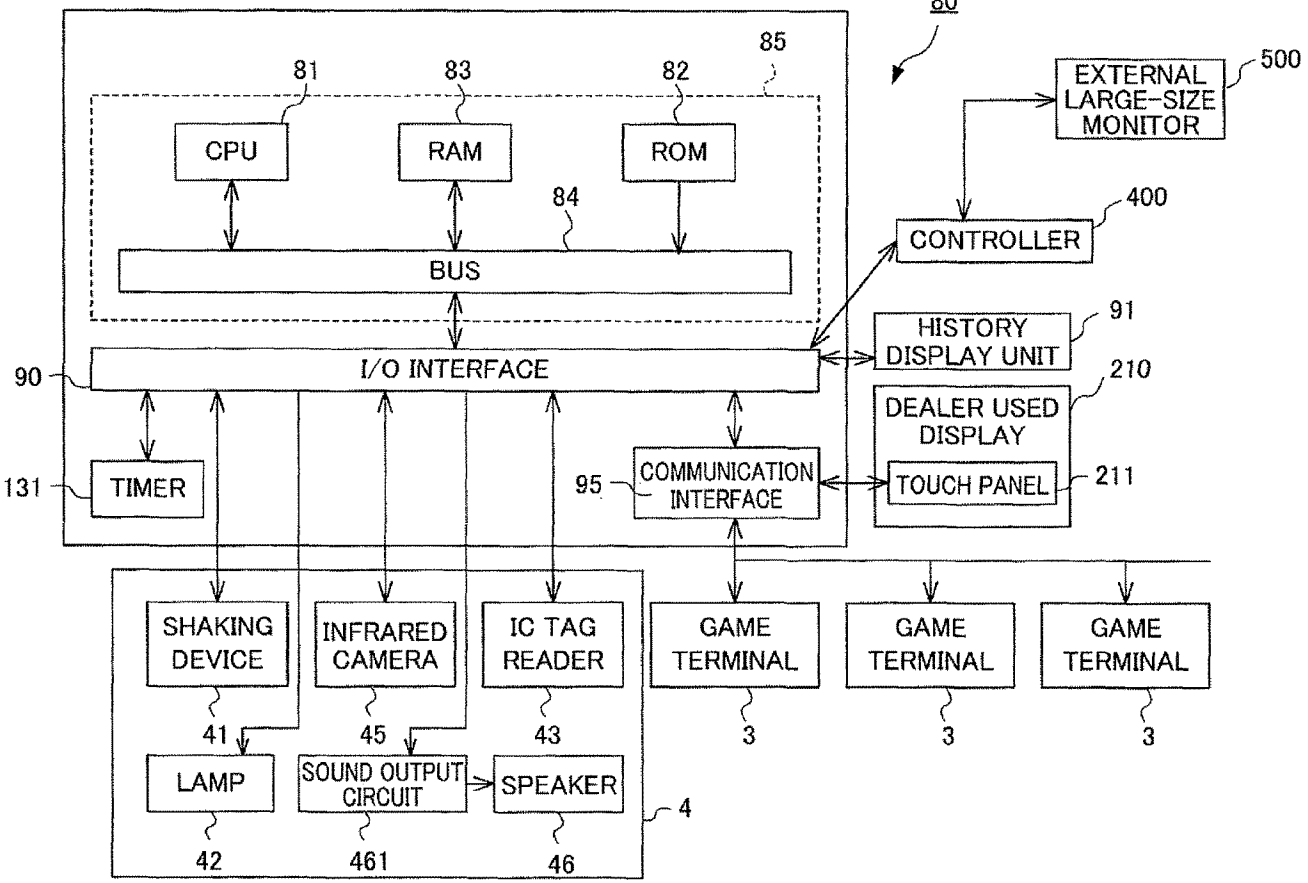
Figure 9F:
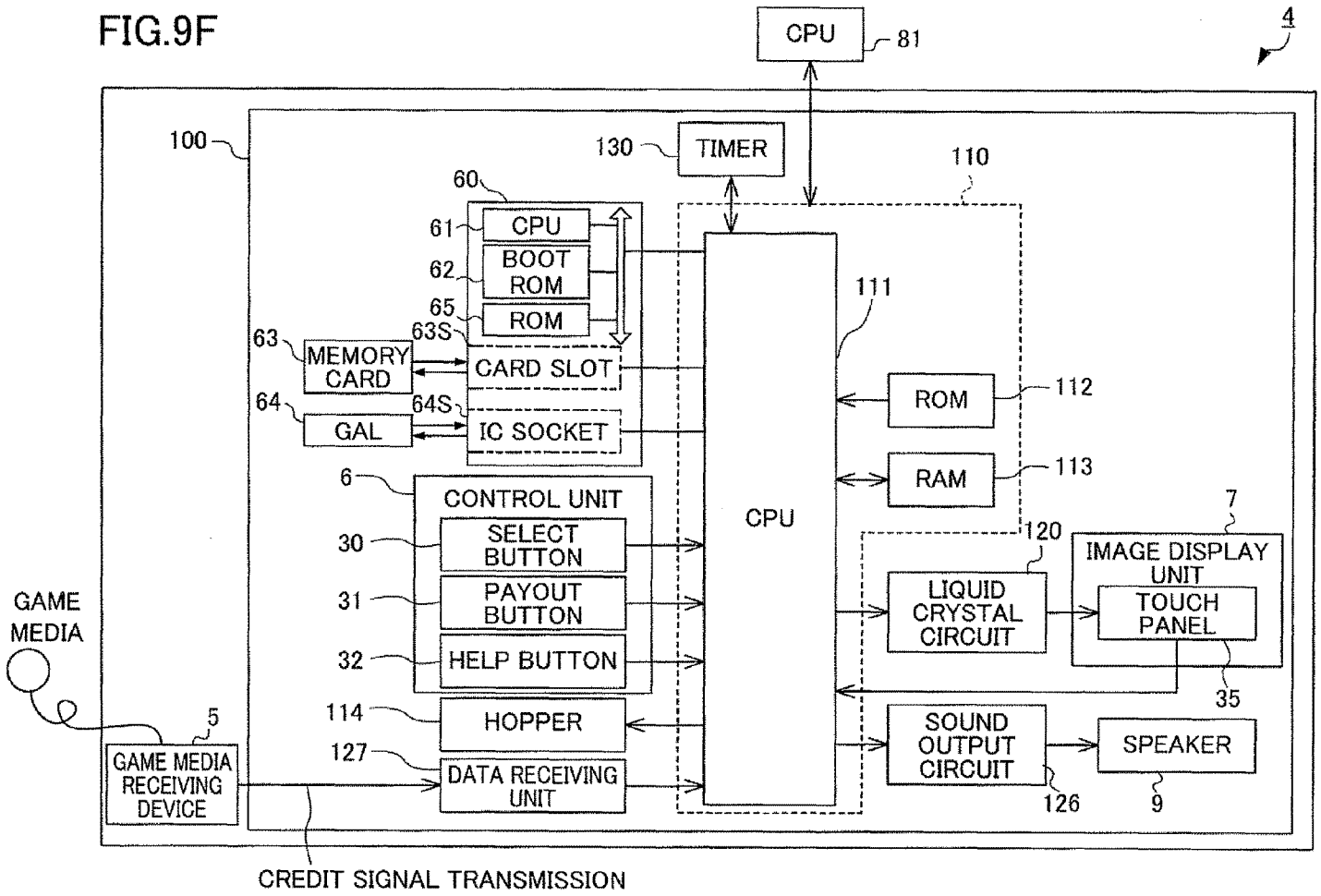
Figure 10F:
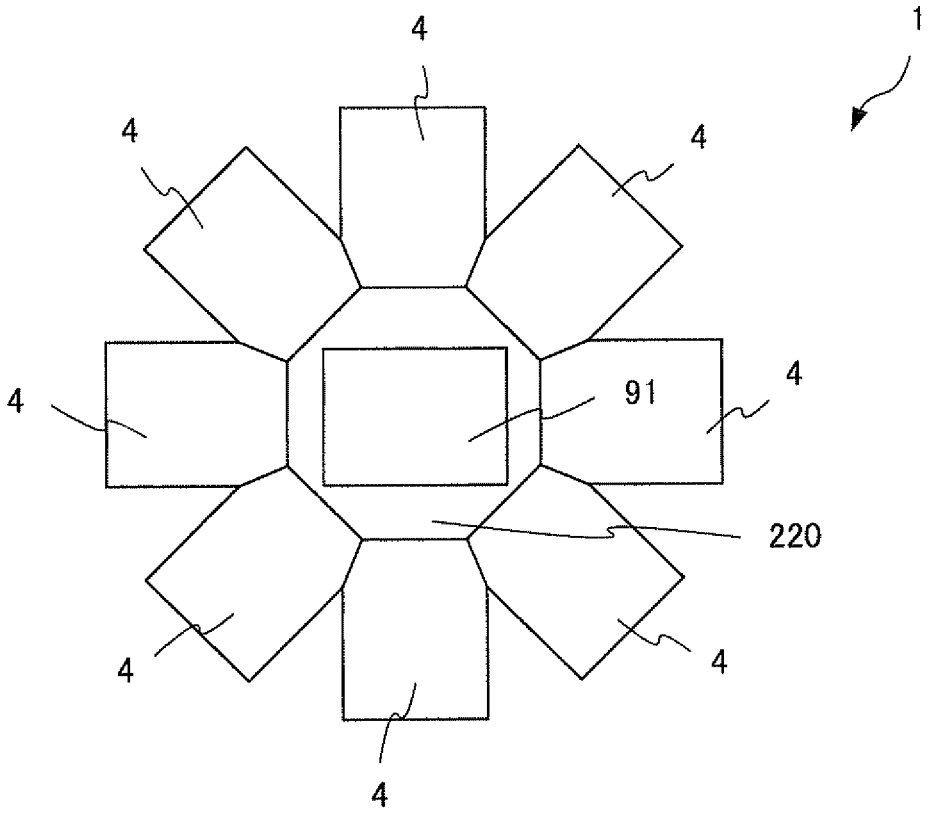
Figure 11:
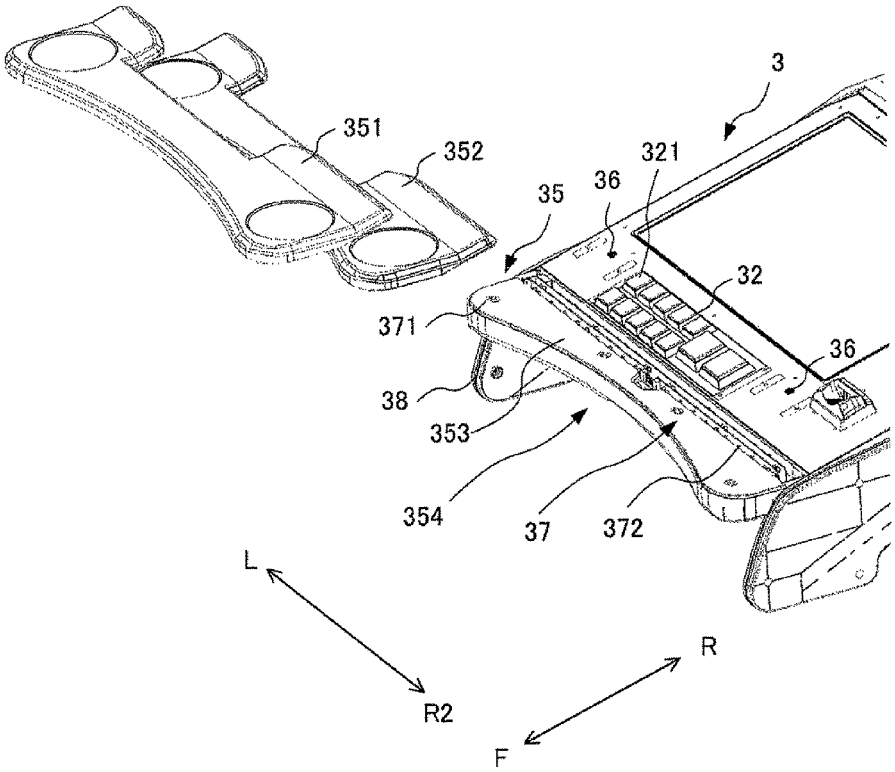
FIG. 11 is an enlarged exploded view of the top door 3, in the vicinity of an arm rest 35, according to the embodiment of the present invention.
Figure 11A:
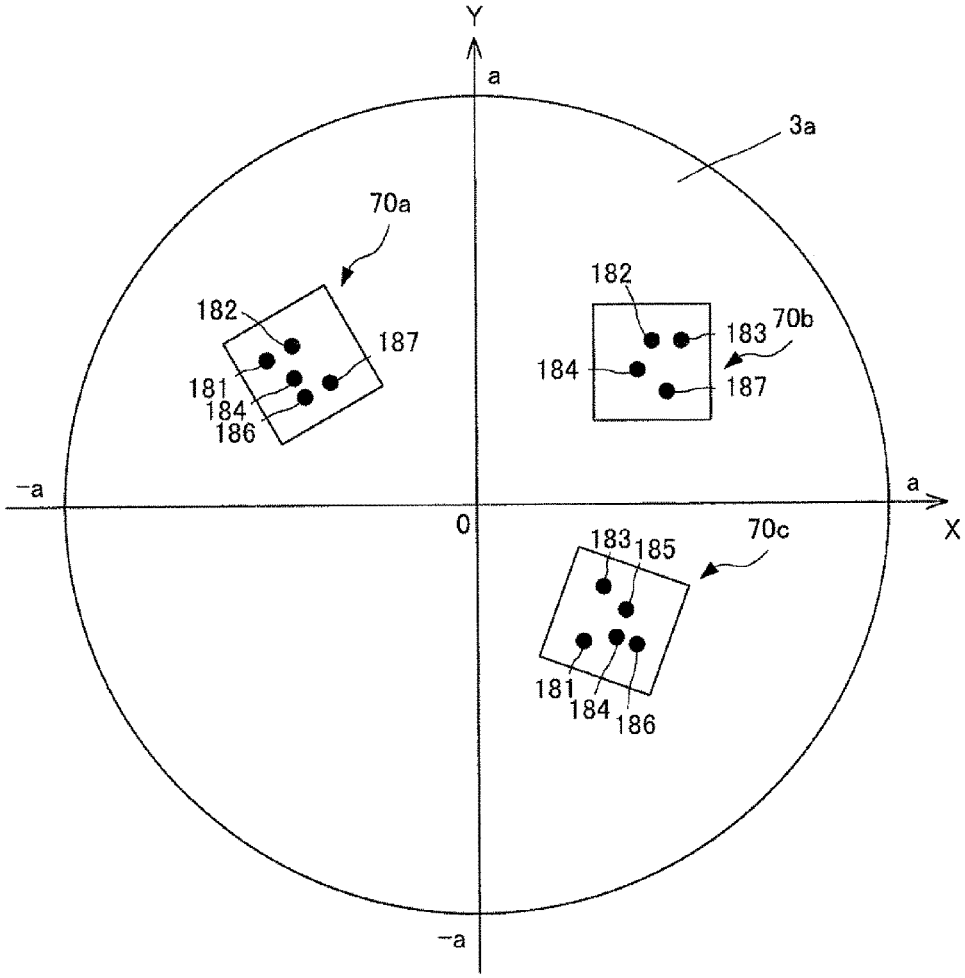
FIG. 11A is an image showing a state in which a die according to the embodiment of the present invention is imaged substantially in the vertically upward direction by an infrared camera.
Figure 11B:
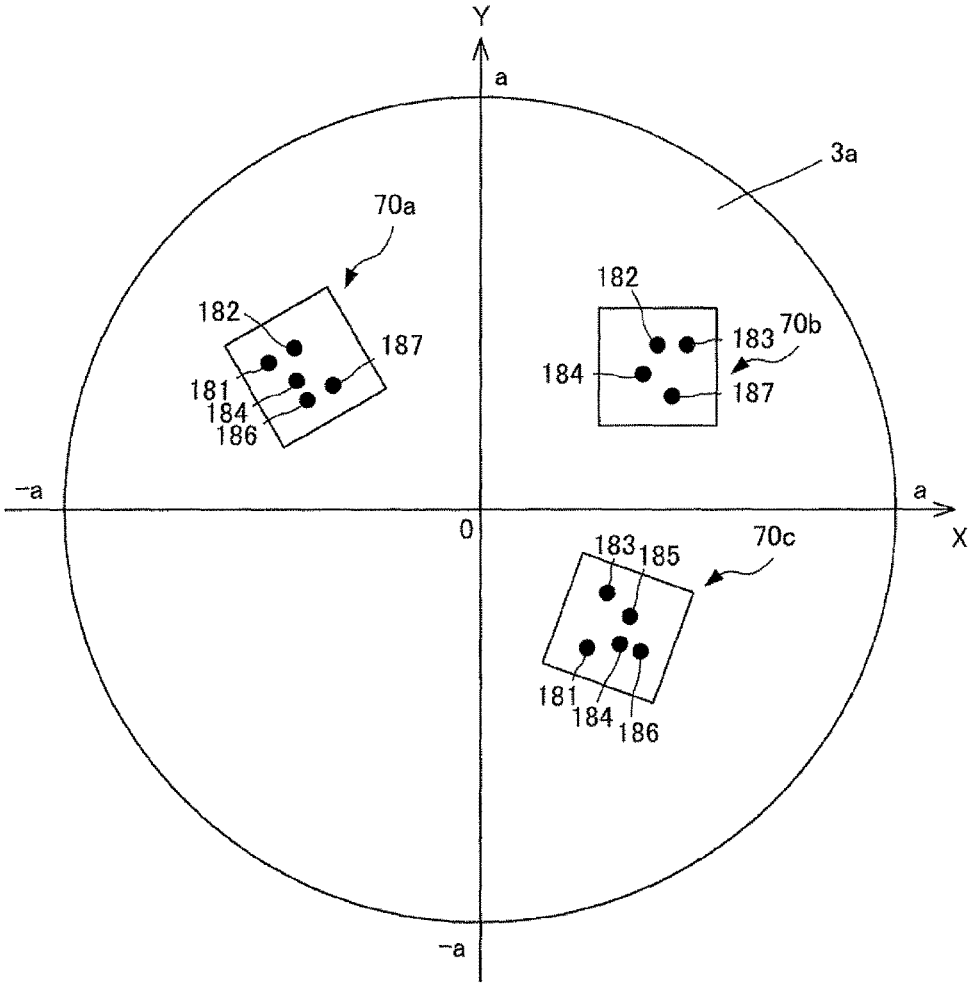
FIG. 11B is an image showing a state in which a die according to the embodiment of the present invention is imaged substantially in the vertically upward direction by an infrared camera.
Figure 11C:
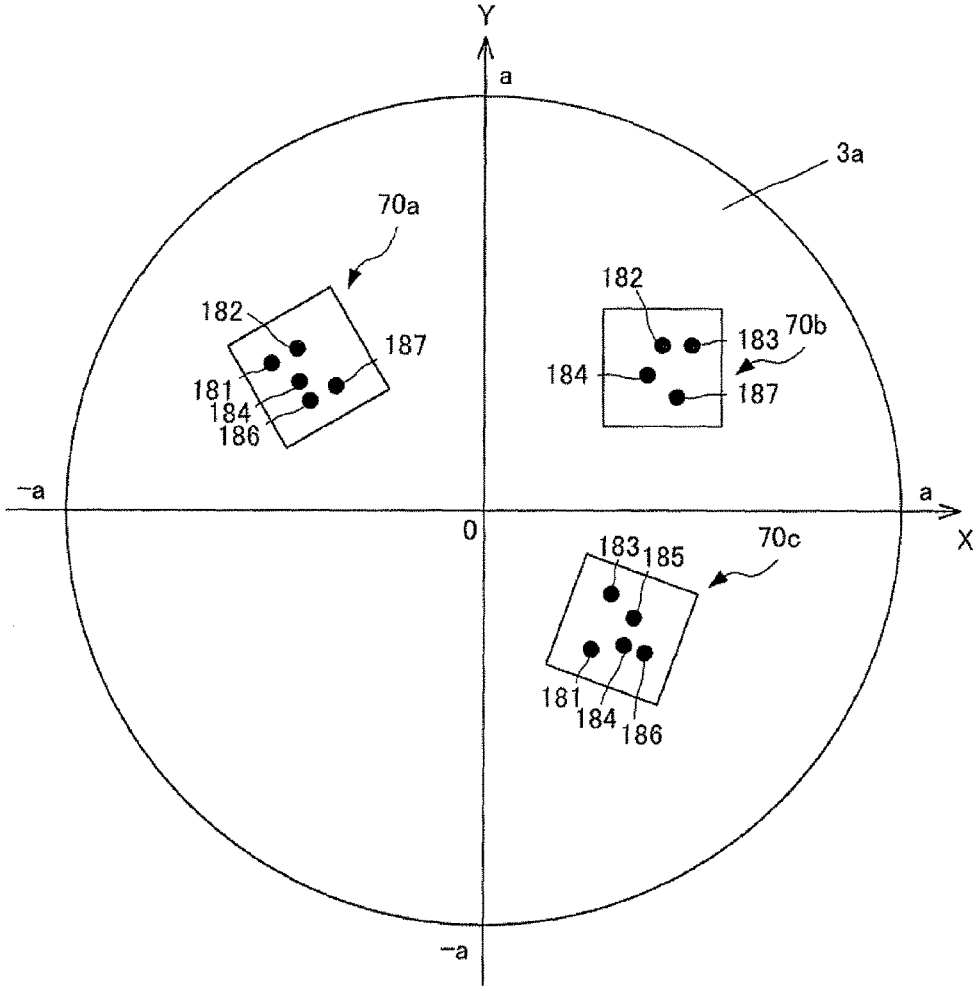
FIG. 11C is an image showing a state in which a die according to the embodiment of the present invention is captured substantially in the vertically upward direction by an infrared camera.
Figure 11D:
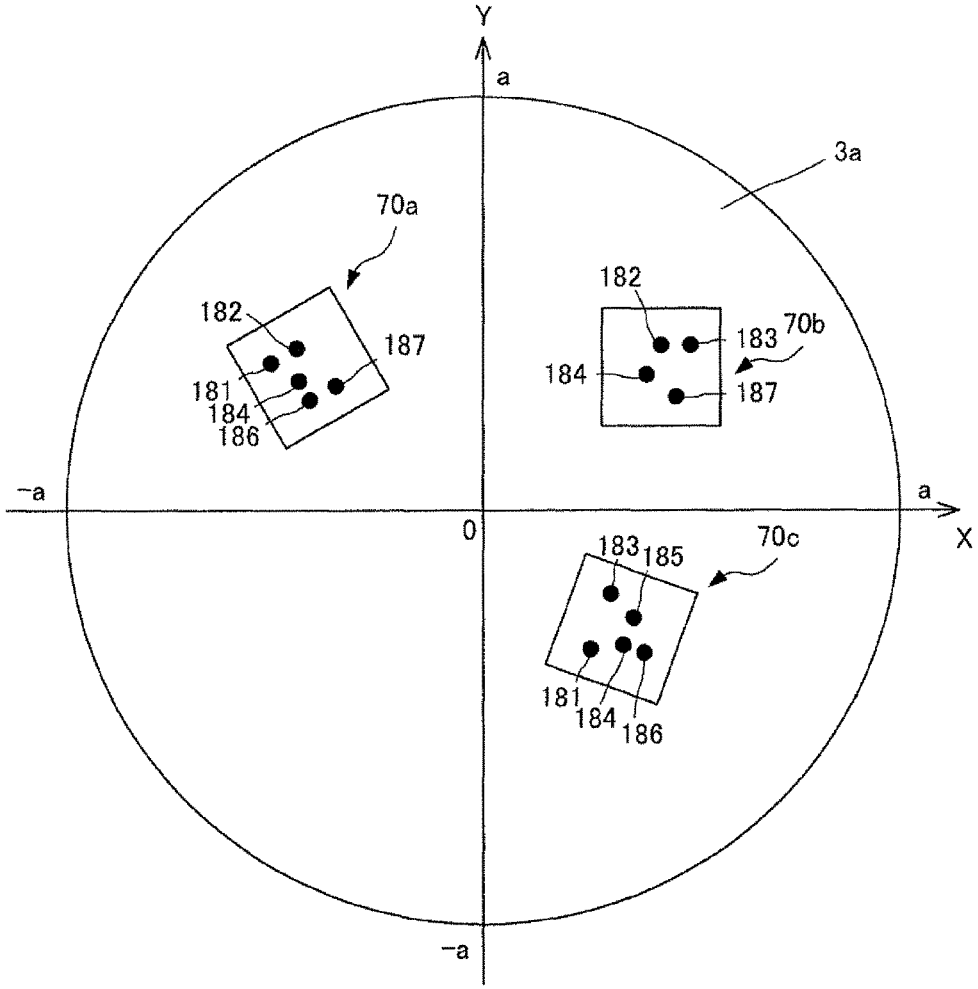
FIG. 11D is an image showing a state in which a die according to the embodiment of the present invention is captured substantially in the vertically upward direction by an infrared camera.
Figure 11F:
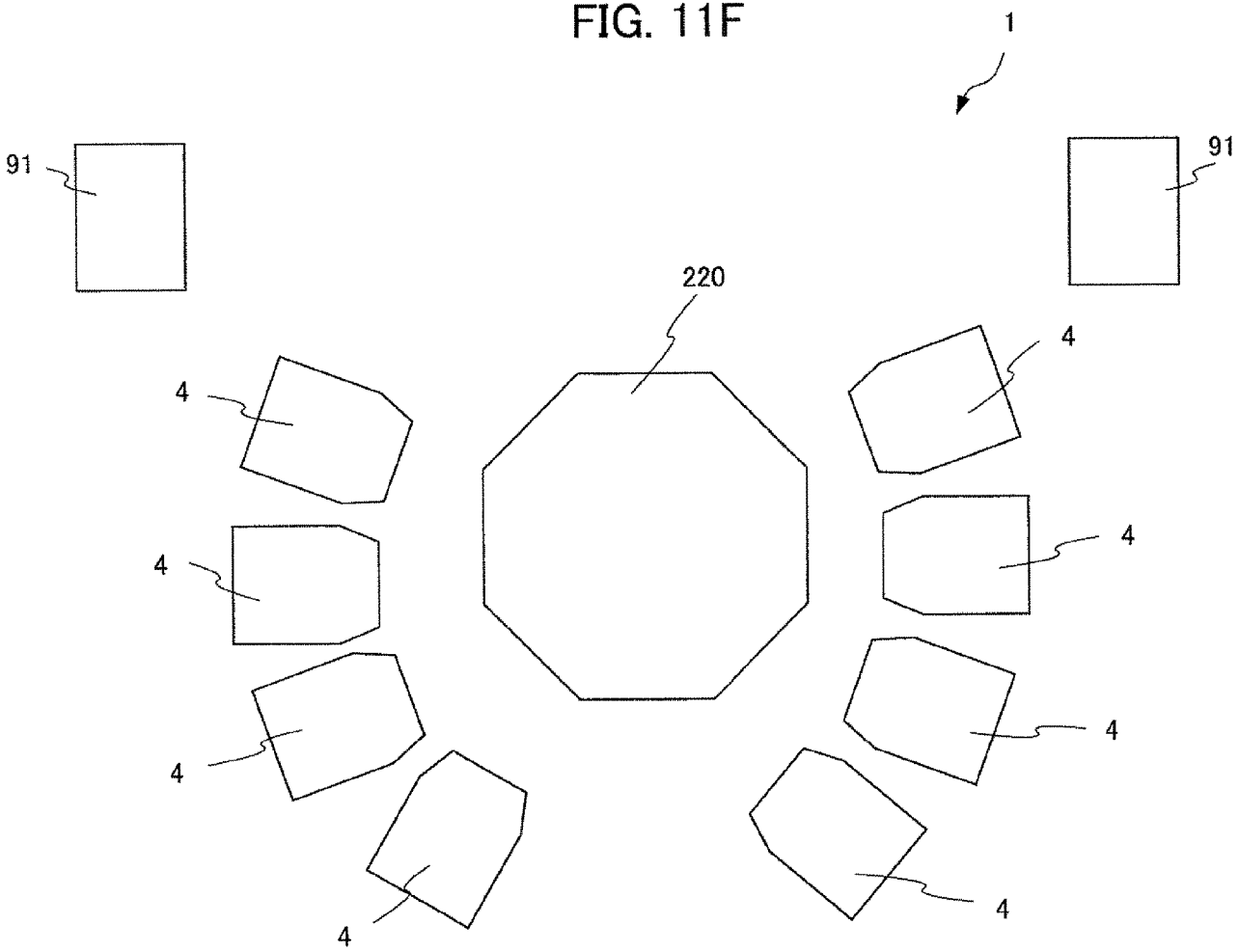
Figure 12:
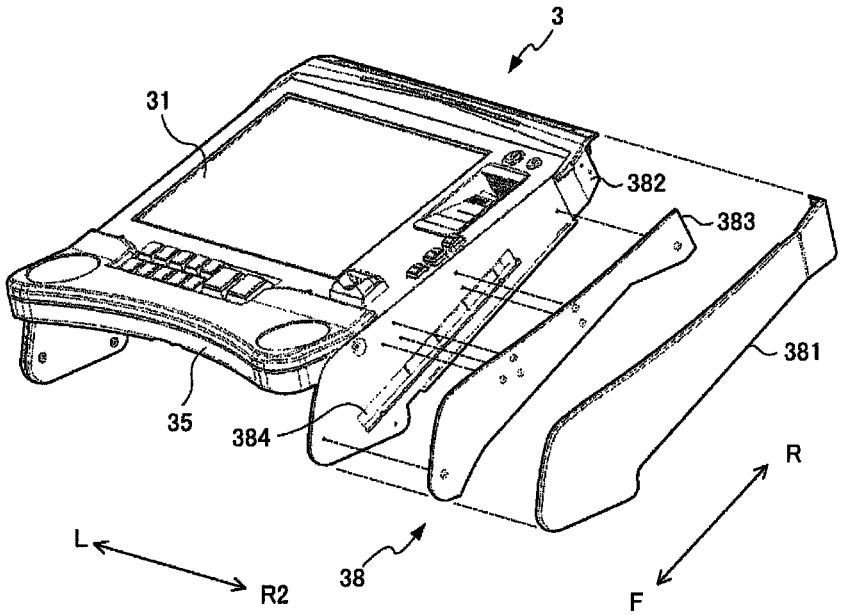
FIG. 12 is an enlarged exploded view of the top door 3, in the vicinity of a cover member 38, according to the embodiment of the present invention.
Figure 12A:
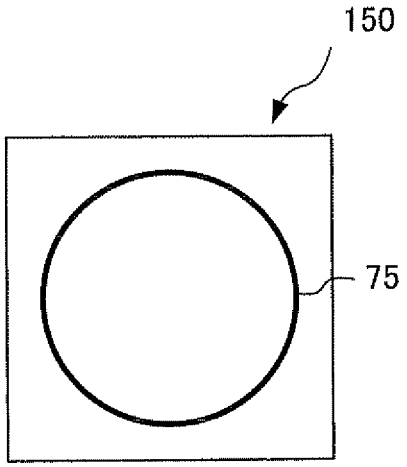
FIG. 12A shows a sheet attached to each face of a die according the embodiment of the present invention.
Figure 12B:
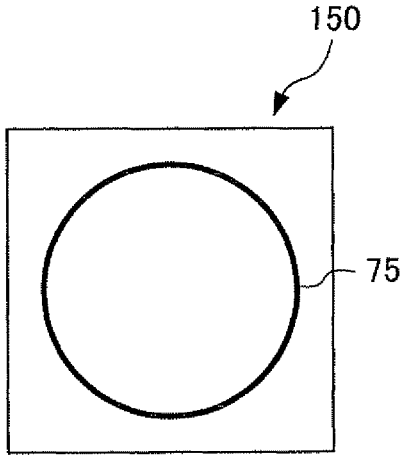
FIG. 12B shows a sheet attached to each face of a die according the embodiment of the present invention.
Figure 12C:
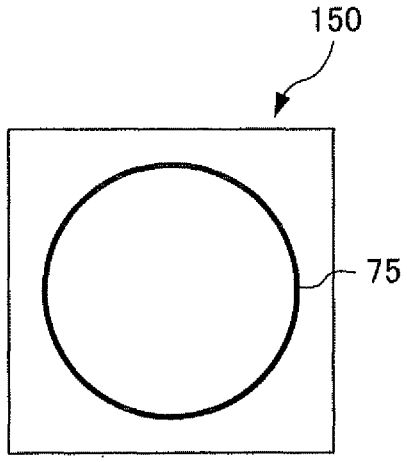
FIG. 12C shows a sheet attached to each face of a die according the embodiment of the present invention.
Figure 12D:
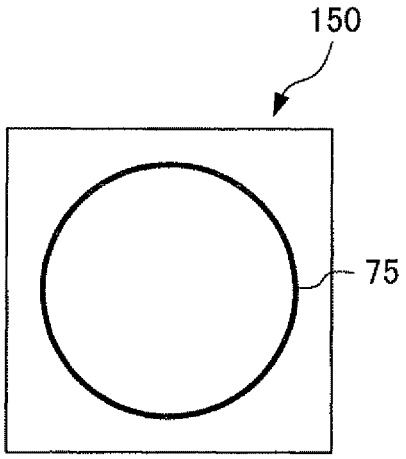
FIG. 12D shows a sheet attached to each face of a die according the embodiment of the present invention.
Figure 12F:
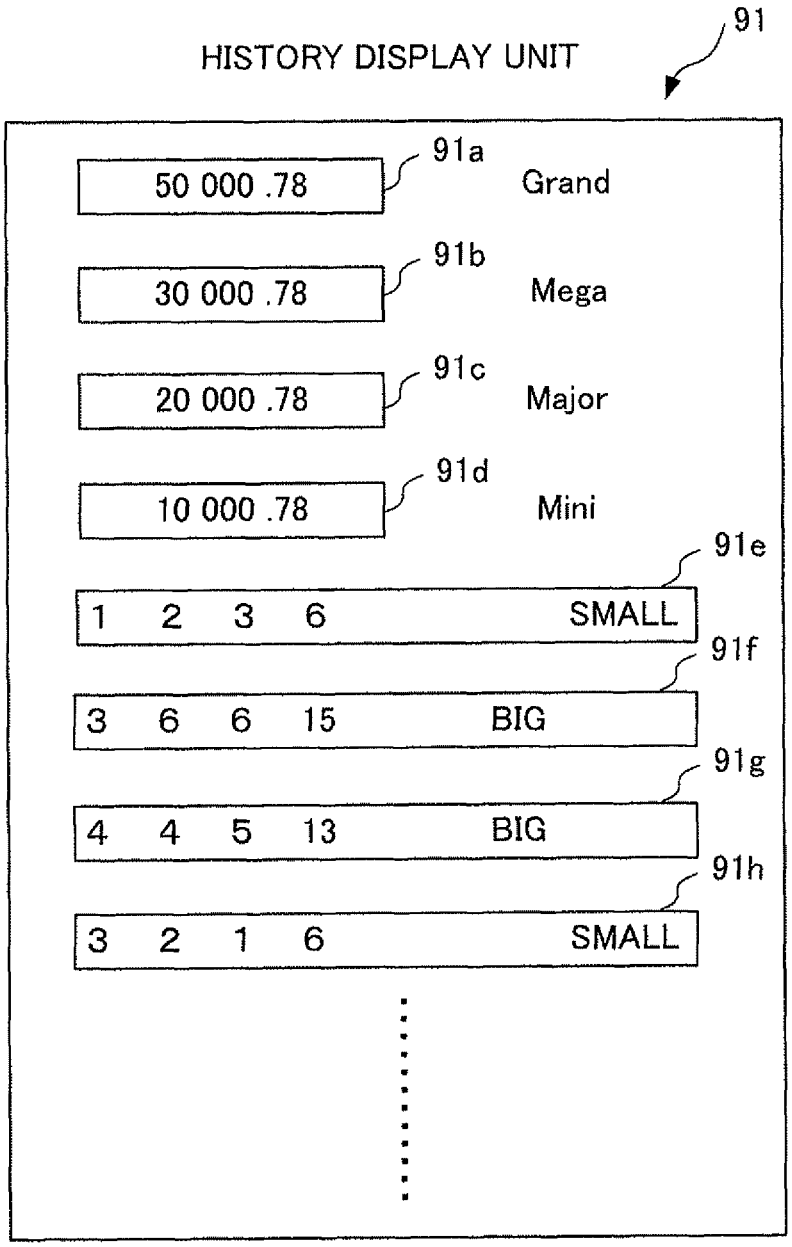

FIG. 1F is a perspective view that includes a partial cross section showing an internal configuration of a die according to an embodiment of the present invention;

FIG. 2F is a perspective view of a gaming machine according to the embodiment of the present invention;

FIG. 3F is an enlarged view of a playing unit of the gaming machine shown in FIG. 2F;

FIG. 4F is an exploded perspective view of a die according to the embodiment of the present invention;

FIG. 5F is a cross sectional view of a die according to the embodiment of the present invention;

FIG. 6F is a diagram showing a readable area of an RFID tag using an RFID tag reader according to the embodiment of the present invention;

FIG. 7F shows an example of a display screen according to the embodiment of the present invention;

FIG. 8F is a block diagram showing an internal configuration of the gaming machine shown in FIG. 2F;

FIG. 9F is a block diagram showing an internal configuration of a station shown in FIG. 2F;

FIG. 10F is a block diagram showing an example of a different configuration of the game device according to the embodiment of the present invention;

FIG. 11F is a block diagram showing another example of a different configuration of the game device according to the second embodiment of the present invention; and FIG. 12F is a diagram showing an example of an image displayed on a display screen of a history display unit.

Figure 1G:
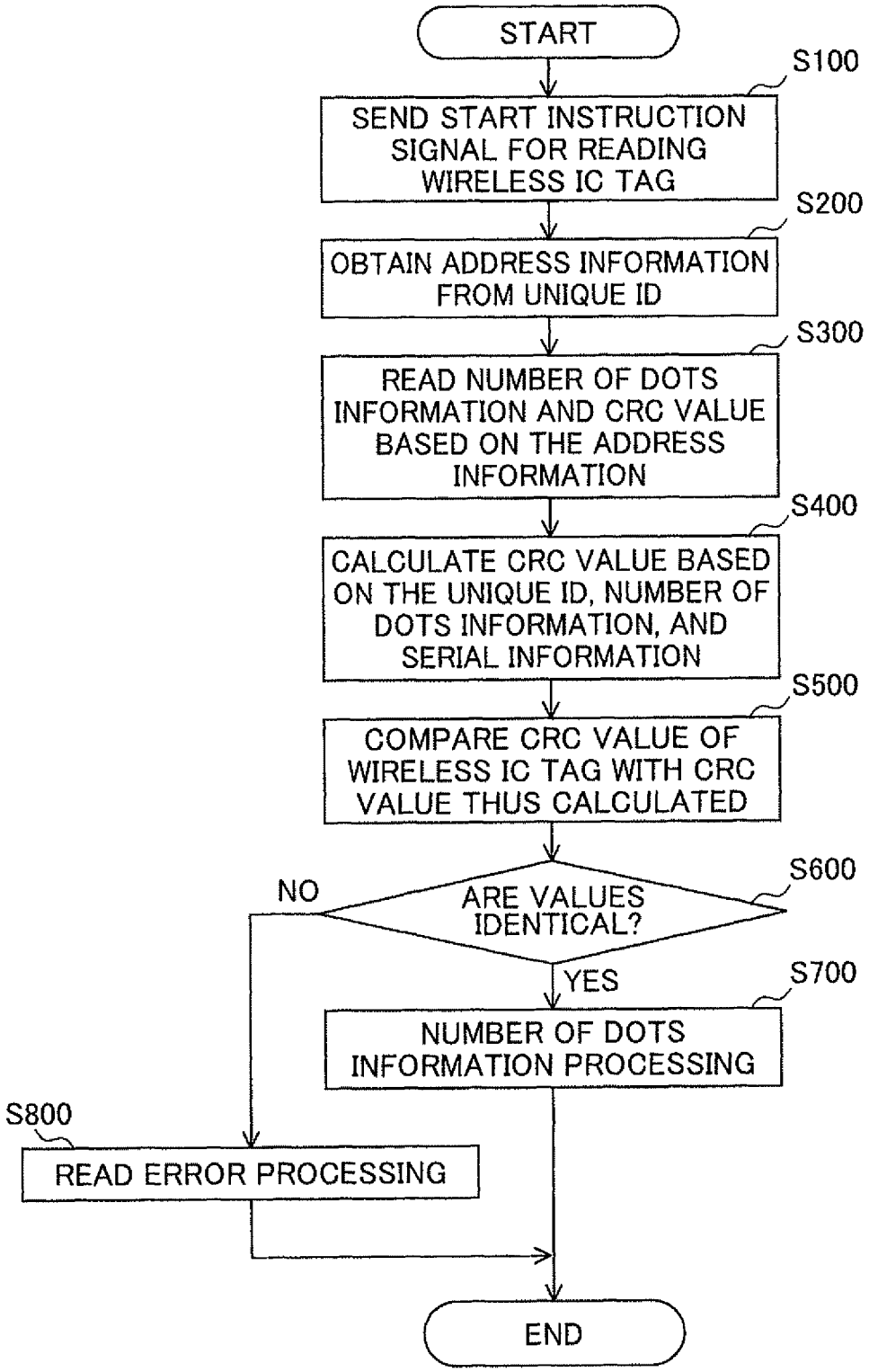
Figure 2G:
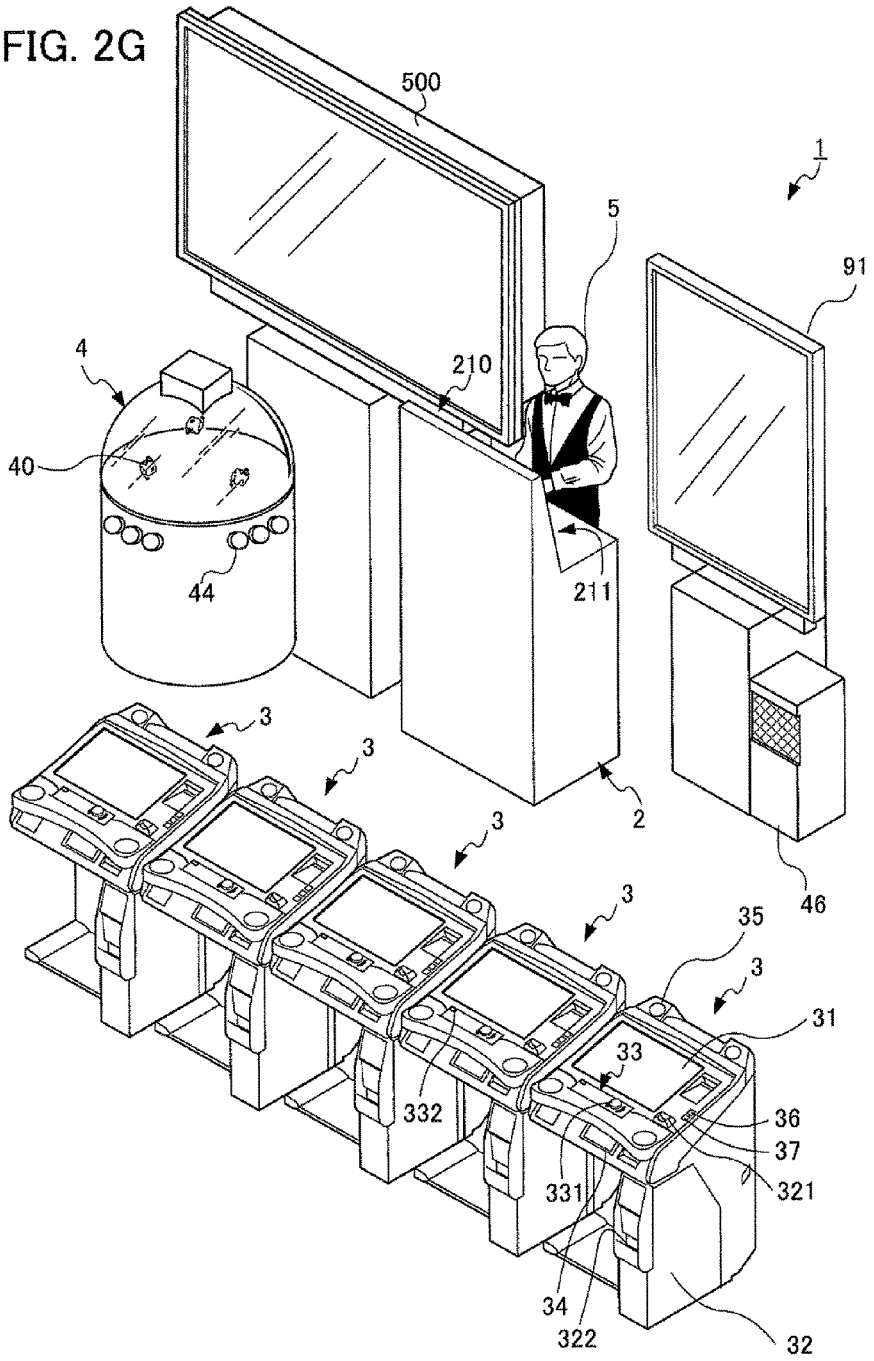
Figure 3G:
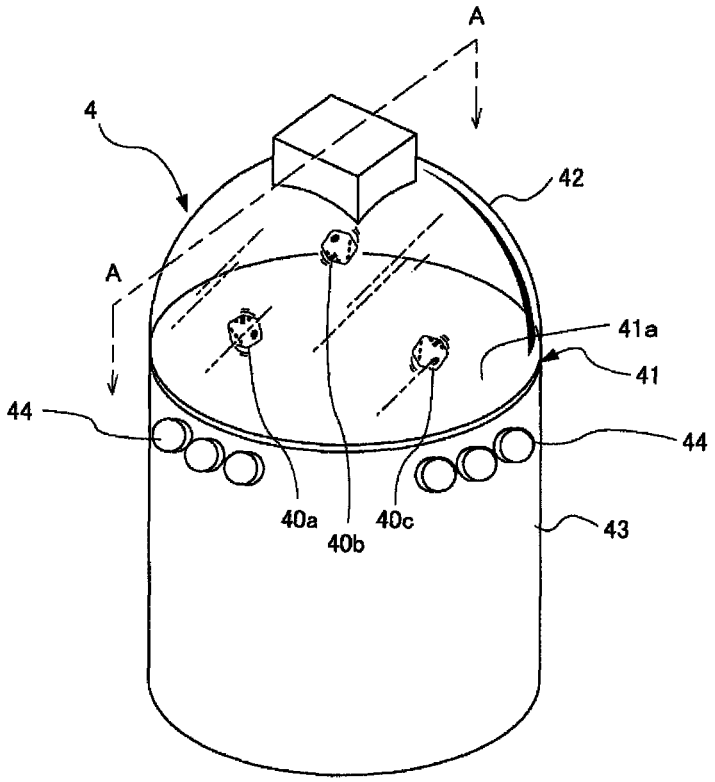
Figure 4G:
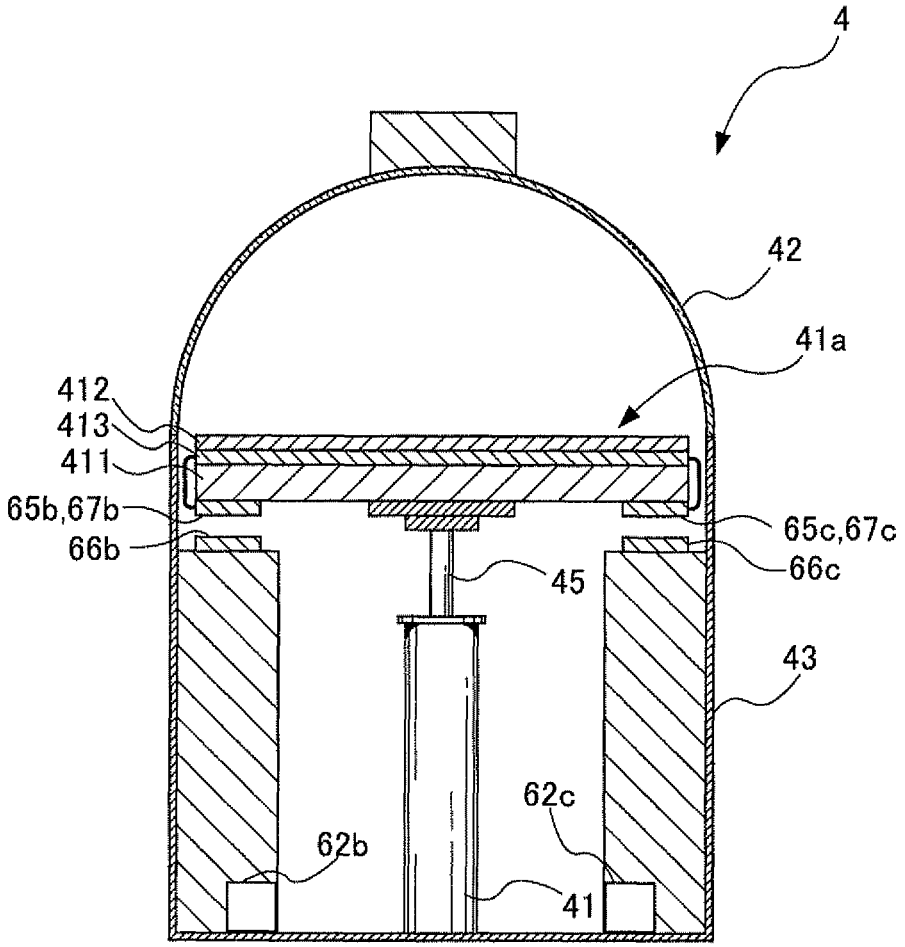
Figure 5G:
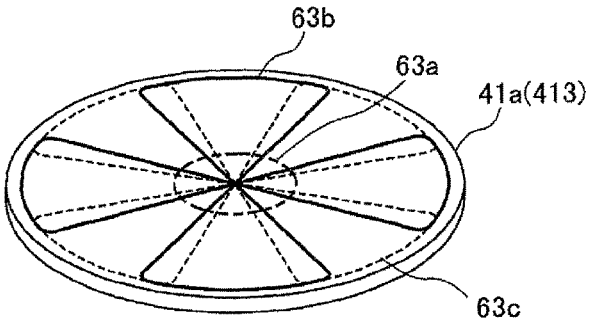
Figure 7G:
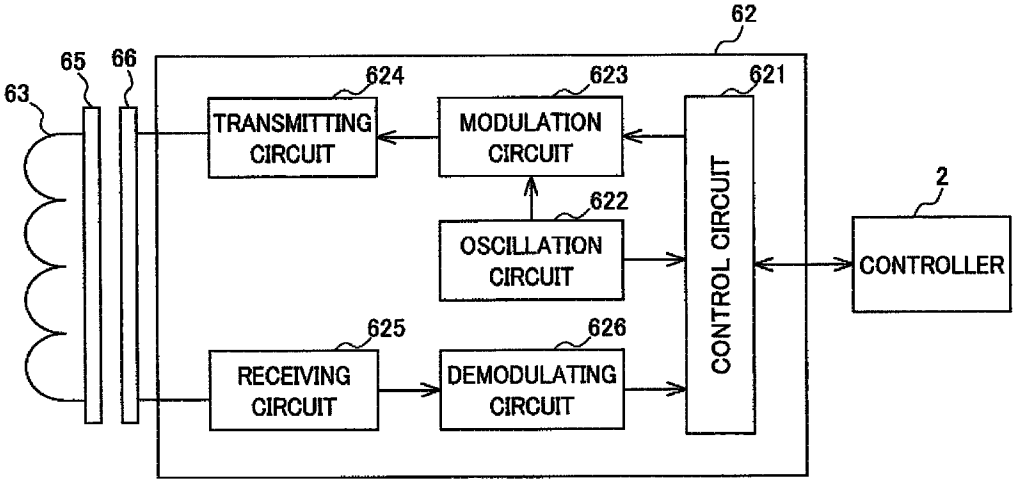
Figure 8G:
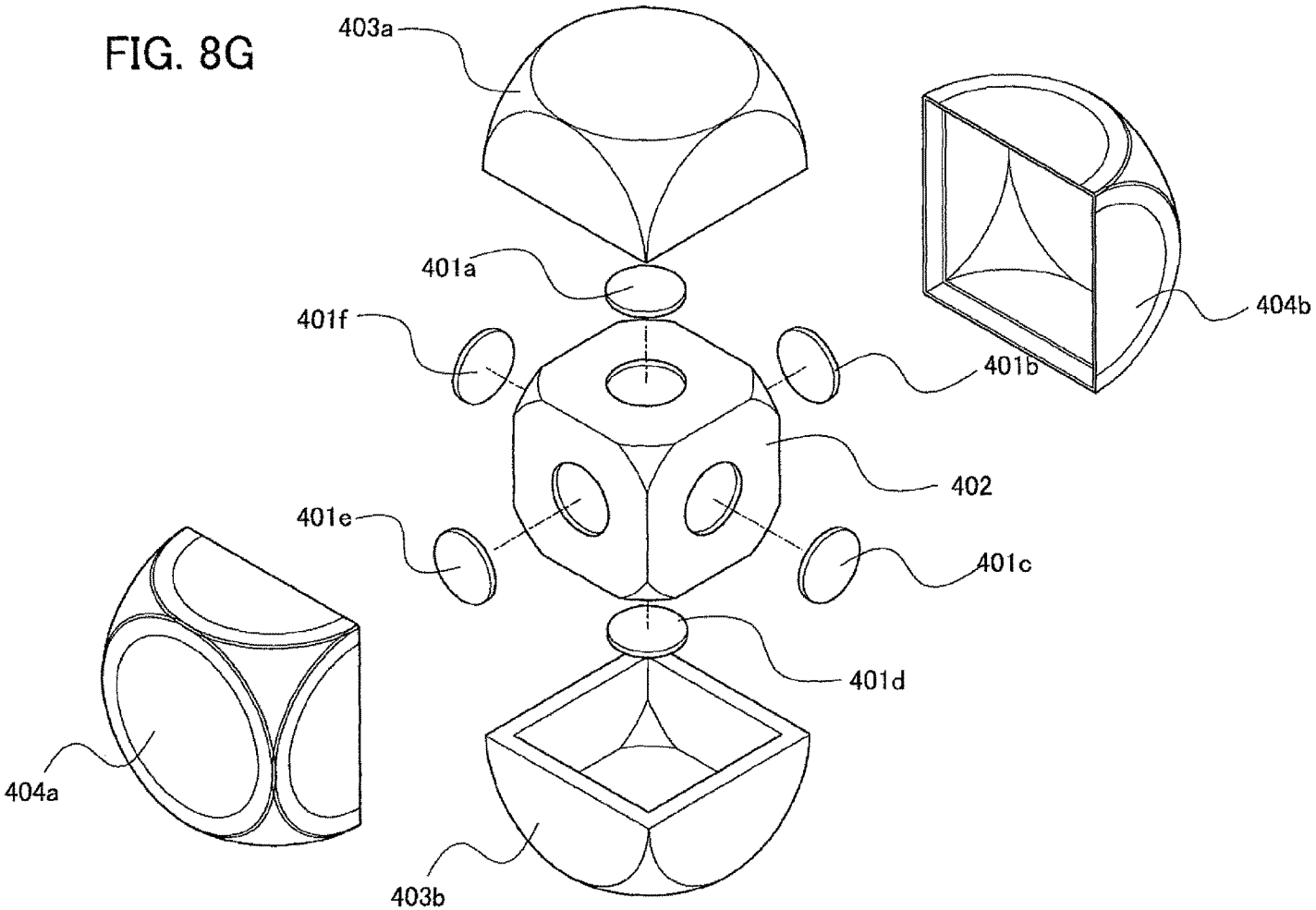
Figure 9G:
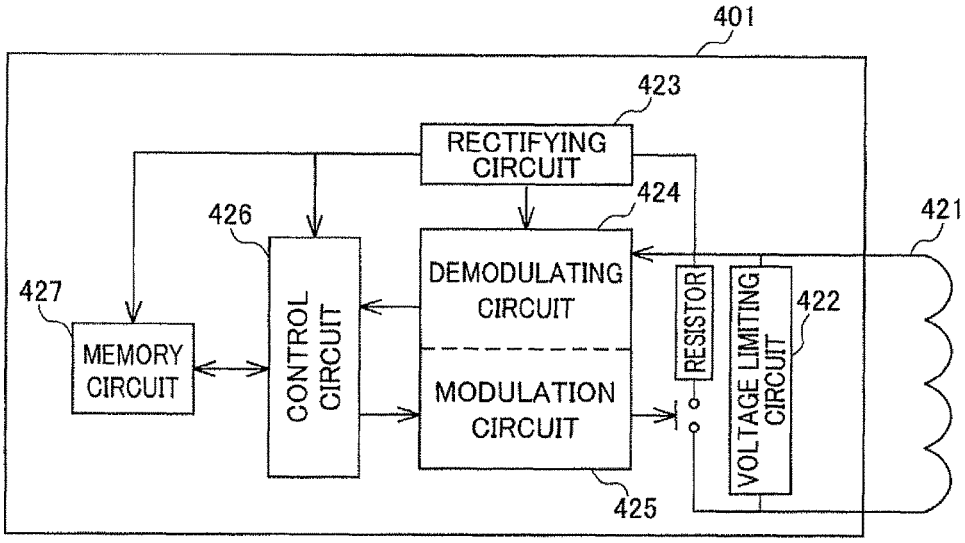
Figure 11G:
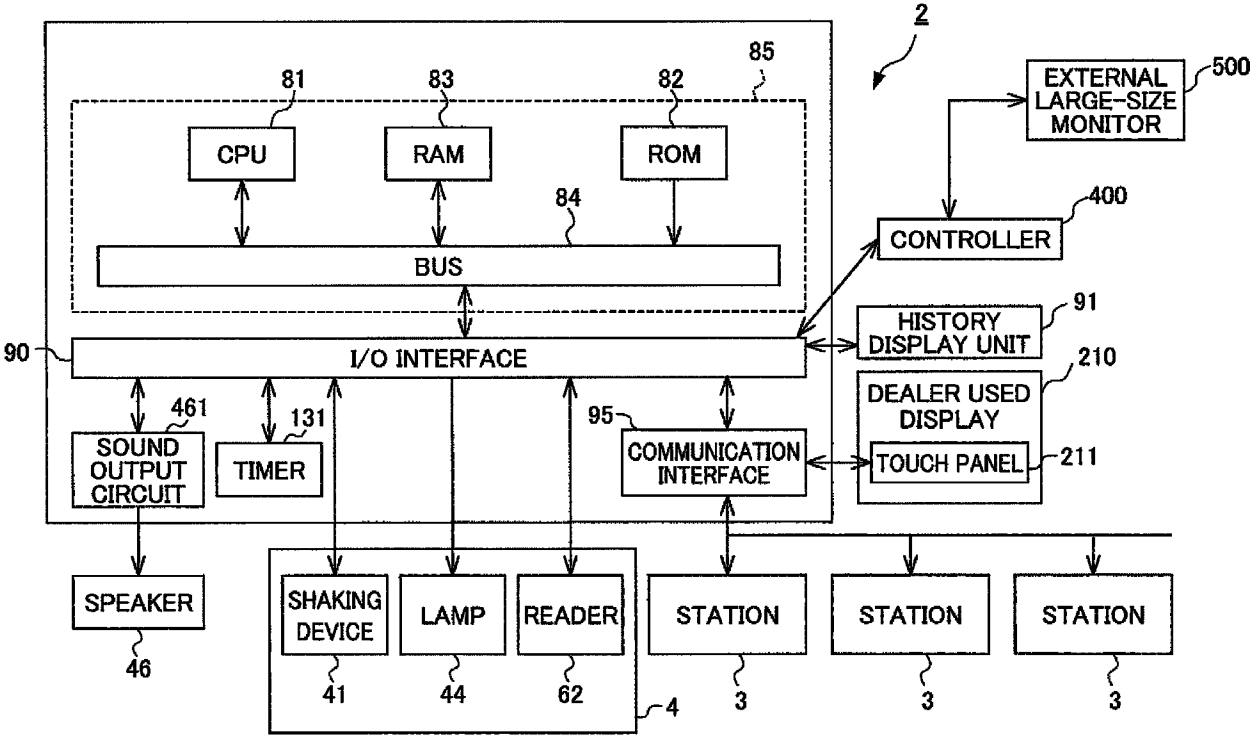
Figure 12G:
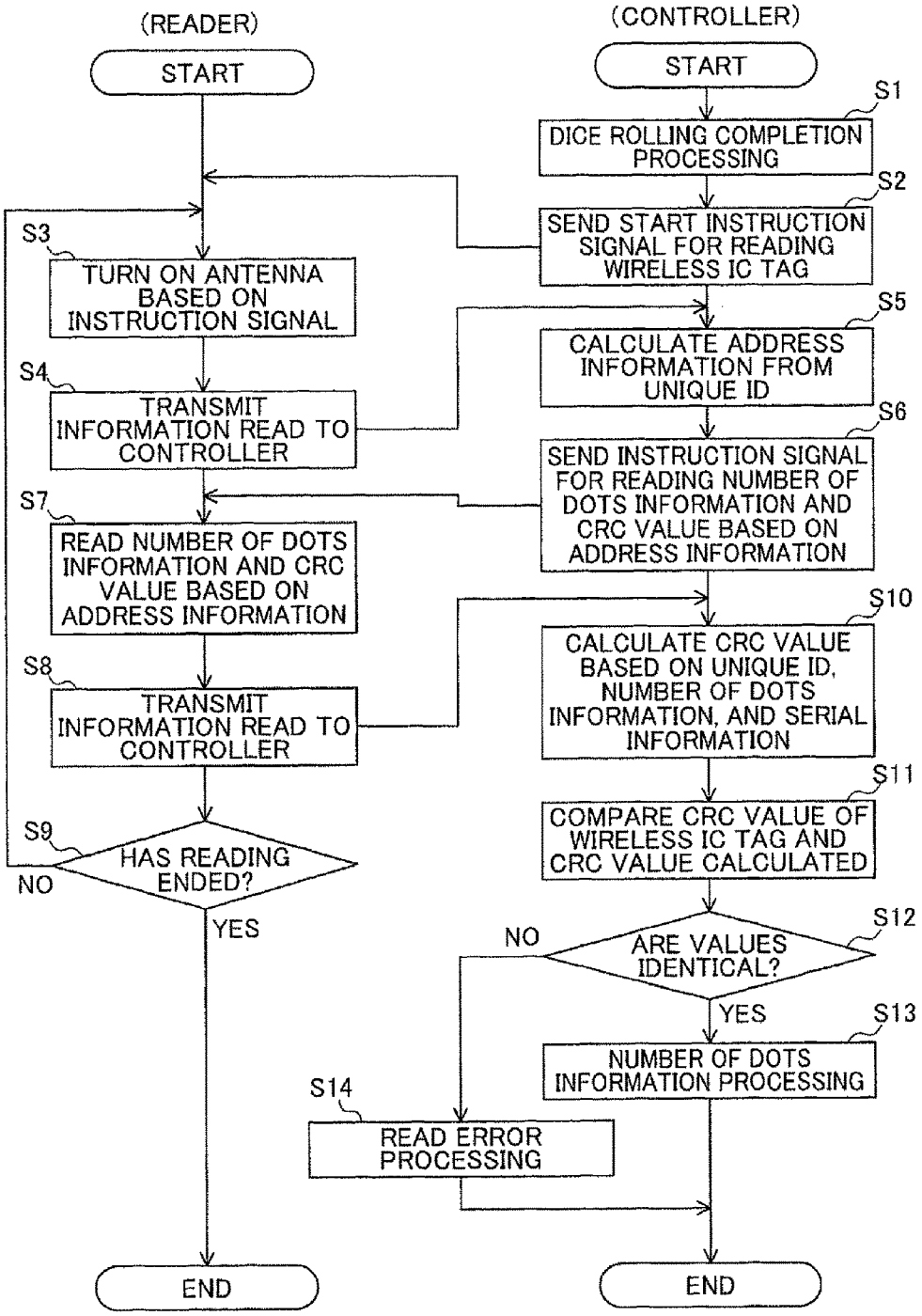

FIG. 1G is a diagram showing an outline of the flow executed in a gaming machine according to an embodiment of the present invention;

FIG. 2G is an overall view of the gaming machine according to an embodiment of the present invention;

FIG. 3G is a perspective view of a dice movable unit according to an embodiment of the present invention;

FIG. 4G is a diagram illustrating a cross-section along the line A-A in FIG. 3G;

FIG. 5G is a schematic representation of an antenna of a playing board according to an embodiment of the present invention;

FIG. 6G is a configurational diagram of a detection device according to an embodiment of the present invention;

FIG. 7G is a block diagram showing an internal configuration of a reader according to an embodiment of the present invention;

FIG. 8G is an exploded perspective view of a die according to an embodiment of the present invention;

FIG. 9G is a block diagram showing an internal configuration of a wireless IC tag according to an embodiment of the present invention;

FIG. 10G is a diagram showing a storage table that is stored in a wireless IC tag according an embodiment of the present invention;

FIG. 11G is a block diagram showing an internal configuration of a controller according to an embodiment of the present invention; and FIG. 12G is a flowchart showing processing of error detection according to an embodiment of the present invention.

EXPLANATION OF REFERENCE NUMERALS

1 gaming machine
2 cabinet
3 top door
4 hopper unit
5 application unit

32 operating unit
61 CPU
62 RAM
63 ROM

PREFERRED MODE FOR CARRYING OUT THE INVENTION

An embodiment of the present invention is described hereinafter with reference to the accompanying drawings.

Overall Summary

An embodiment of the gaming machine according to the present invention is described hereinafter with reference to the accompanying drawings. First, an overall configuration of a gaming machine 1 according to the present embodiment is described with reference to FIGS. 1 to 3. FIG. 1 is a perspective view of the gaming machine 1. FIG. 2 is a perspective view showing the gaming machine 1 with a top door 3 being open. FIG. 3 is a back view of the gaming machine 1.

The gaming machine 1 is composed of: a cabinet 2 as a cabinet for housing a circuit substrate and the like; a top door 3 in which a main display 31, an operating unit 32 and the like are disposed; a hopper unit 4 being a retaining device for medals and coins, which discharges the medals and coins; and an application unit 5 that can be attached and removed, to which a speaker 51, a lamp portion 52, and the like are disposed.

The cabinet 2 houses a circuit substrate and the like, and constitutes a main body of the gaming machine 1. The cabinet 2 includes a sub housing portion 21 formed on a lower side (a lower side in the drawings is hereinafter referred to as a lower side B) of the top door 3, a main housing portion 22 formed on the lower side B of the sub housing portion 21, and a supporting portion 23 formed on a further lower side of the main housing portion 22. The sub housing portion 21 houses a relay board unit 211 (described later) and a human body detection sensor 29, which is the first sensor. In addition, the main housing portion 22 houses a main control unit 221 (described later).

An opening portion 20 is formed on an upper side T (an upper side in the drawings is hereinafter referred to as an upper side T) of the sub housing portion 21. In the present embodiment, the opening portion 20 constitutes an entirety of the upper side T of the cabinet 2; in other words, the entirety of the upper side T of the sub housing portion 21 is open.

A card insertion opening 26 into which a player card, which is an information storage medium for a PTS (player tracking system), is inserted, and a player information display portion 27 for displaying information stored on the player card inserted are provided on a front side F (a front side in the drawings is hereinafter referred to as a front side F) of the sub housing portion 21, which is a front side F of the cabinet 2. The player card stores information related to a player such as a player ID, and the player information displaying portion 27 displays history information of the player, who owns the player card inserted into the card insertion opening 26. In the present embodiment, the player card also stores a play history.

In addition, in the cabinet 2, a foot lamp 25 is provided on the front side F of the cabinet 2 and on the lower side B of the main housing portion 22. The foot lamp 25 is disposed on the front side F of the supporting portion 23. The foot lamp 25 emits light toward the lower side B and irradiates a region corresponding to feet of a player in a case where the player is seated in front of the gaming machine 1.

A supporting plate 232 is provided on the lower side B of the cabinet 2. The supporting plate 232 is disposed on the lowermost side B of the cabinet 2 so as to project from an end portion on the lower side B of the supporting portion 23 toward the front side F.

In addition, as shown in FIG. 3, a cabinet illuminating portion 24 is provided on a back side (a back side in the drawings is hereinafter referred to as a back side F) of the cabinet 2. The cabinet illuminating portion 24 emits light or switches between modes of illumination in accordance with a control signal from the main control unit 221.

The top door 3 is disposed on the upper side T of the cabinet 2 so as to cover an entirety of the opening portion 20 formed on the sub housing portion 21 of the cabinet 2. The top door 3 is disposed so as to cover the upper side T of the cabinet 2 like a lid and opens and closes rotationally on an end thereof on the back side R (see FIG. 2).

In addition, the top door 3 includes: a main display 31 for displaying mainly images related to the game; an operating portion 32 on which a player performs operations related to the game; a coin slot 33 into which coins are inserted; and a bill slot 34 into which bills are inserted (see FIG. 1).

A hopper unit 4 is disposed on the lower side B of the top door 3 and the sub housing portion 21, to a right side of the cabinet 2 (a right side of the cabinet is hereinafter referred to as a right side R2). The hopper unit 4 constitutes a face on the right side R2 of the cabinet 2, namely a face on the right side R2 of the gaming machine 1. The hopper unit 4 is provided as an independent body from the cabinet 2 and connected to the cabinet 2 via an opening portion for a hopper (not shown) provided on a face on the lower side B of the sub housing portion 21.

The hopper unit 4 is formed in a vertically long shape, which is elongated in a thickness direction (F-R direction). In addition, a coin payout opening 42 is formed on the front side F of the hopper unit 4, and coins discharged from the coin payout opening 42 are collected in the coin tray 43.

An application unit 5 is disposed on the upper side T, in an end on the back face side R, of the cabinet 2. An application unit 5 is disposed on the upper side T, in an end on the back face side R, of the cabinet 2.

In the present embodiment, the application unit 5 includes a speaker 51 and a lamp portion 52 (see FIG. 1). In other words, in the gaming machine 1, the speaker 51 and the lamp portion 52, as a unit, are formed to be detachable (details are described later). Functional Configuration A circuit configuration of the gaming machine 1 is described hereinafter with reference to FIG. 4.

FIG. 4 is a functional block diagram of the gaming machine 1.

The gaming machine 1 according to the present embodiment is basically configured around a microcomputer 65, which is composed of a CPU 61, RAM 62, ROM 63, and a bus 64 for transferring data therebetween. The RAM 62 and the ROM 63 are connected to the CPU 61 via the bus 64. The RAM 52 is memory for temporarily storing various data computed by the CPU 61. The ROM 63 stores various programs, data tables and the like for performing processing required for controlling the gaming machine 1.

The main control unit 221 including the microcomputer 65 is housed by the main housing portion 22 in the cabinet 2.

A communication interface 78 and a relay circuit 70 are connected to the microcomputer 65 via an I/O interface 66. The communication interface 78 is a module for connecting an external network. For example, in a case where a plurality of gaming machines 1 is administered by a server, the gaming machines 1 can communicate with each other and with the server in a bidirectional manner, via the communication interface 78. This allows the gaming machine 1 to execute games in cooperation with the server and other gaming machines 1.

The relay circuit 70 is a circuit for connecting driving circuits and devices (described later) with the microcomputer 65. The relay board unit 211 including the relay circuit 70 is housed by the sub housing portion 21 of the cabinet 2.

The sub housing portion 21 is disposed on an uppermost side T of the cabinet 2, and in a position readily accessible by opening the top door 3. In the present embodiment, only the relay board unit 211 including the relay circuit 70, not the main control unit 221 including the microcomputer 65, is disposed in the sub housing portion 21. In other words, the relay circuit 70, which only relays control signals, is disposed in the most accessible position inside the cabinet 2, and modules (described later) are connected to the microcomputer 65 via the relay circuit 70.

The relay circuit 70 and each of the other modules (described later) are further connected by the I/O interface 71. The modules connected to the microcomputer 65 via the relay circuit 70 are described hereinafter.

An image processing circuit 72 is connected to the relay circuit 70 via the I/O interface 71. The image processing circuit 72 is connected to the main display 31 and controls operation of the main display 31.

The image processing circuit 72 includes program ROM, image ROM, an image control CPU, work RAM, a video display processor (VDP), video RAM, and the like (not shown). The program ROM stores an image control program with respect to the display functions of the main display 31, and various kinds of selection tables. The image ROM stores pixel data for creating an image, for example, pixel data for creating an image on the main display 31. In addition, the image control CPU determines an image to be displayed on the main display 31 from among the pixel data sets stored beforehand in the image ROM according to the image control program stored beforehand in the program ROM based upon the parameters set by the microcomputer 65. The work RAM is configured as a temporary storage means in a case where the image control program is executed by the image control CPU. The VDP is a component for creating an image data that accords with the display contents determined by the image control CPU, and for outputting the image thus created to the main display 31. It should be noted that the video RAM is configured as a temporary storage device used by the VDP for creating an image.

In addition, a hopper unit 4 is connected to the relay circuit 70 via the I/O interface 71. More specifically, connected to the relay circuit 70 are a hopper driving circuit 44 and a payout complete signal circuit 47 in the hopper unit 4. The hopper driving circuit 44 controls operation of a hopper device 45. The payout complete signal circuit 47 manages detection of medals performed by a medal detection portion 46 provided to the hopper device 45, and checks whether medals discharged externally from the hopper device 45 has reached a payout number or not.

A card identification circuit 73 and a player information display portion driving circuit 74 are connected to the relay circuit 70 via the I/O interface 71. The card identification circuit 73 is a reader portion that identifies a player card inserted from the PTS card slot 26 and reads information regarding a player stored on the player card. In addition, a player information display portion 27 is connected to the player information display portion driving circuit 74. Play history information is displayed on the player information display portion 27, from the information regarding a player read by the card identification circuit 73.

A sound circuit 75 is connected to the relay circuit 70 via the I/O interface 71. A speaker 51 is connected to the sound circuit 75. The speaker 51 generates various sound effects, background music and the like when various effects are made, by an output control by the sound circuit 75 based on a driving signal from the CPU 61.

A lamp driving circuit 76 is connected to the relay circuit 70 via the I/O interface 71. Furthermore, a lamp portion (for example, LED) 52 is connected to the lamp driving circuit 76. The lamp portion 52 emits light in a blinking pattern in accordance with an effect, based on a control signal from the microcomputer 65.

It should be noted that, in the present embodiment, the sound circuit 75, the speaker 51, the lamp driving circuit 76, and the lamp portion 52 are configured to be the application unit 5.

A bill validating driving circuit 77 is connected to the relay circuit 70 via the I/O interface 71. A bill validating device 341 is connected to the bill validating driving circuit 77. The bill validating device 341 checks whether or not a bill and a bar coded ticket is genuine. Upon reception of a genuine bill, the bill validating device 341 inputs a value of the bill thus received to the CPU 61, based on an identification signal from the bill validating driving circuit 77. Furthermore, upon reception of a genuine bar coded ticket, the bill validating device 341 inputs a credit amount and the like recorded on the bar coded ticket thus received to the CPU 61, based on an identification signal from the bill validating driving circuit 77.

An operating unit control circuit 320 is connected to the relay circuit 70 via the I/O interface 71. In addition, the control unit 32 is connected to the operating unit control circuit 320. In the present embodiment, the control unit 32 is configured to be an exchangeable module. The control unit 32 can be exchanged accordingly with a module prepared in accordance with a type of a game provided by the gaming machine 1, along with the operating unit control circuit 320.

A coin sensor 41 is connected to the relay circuit 70 via the I/O interface 71. The coin sensor 41 detects a coin, which is inserted via the coin slot 33, passing by. Cabinet The cabinet 2 is described in detail hereinafter with reference to FIGS. 1 to 3 and FIGS. 5 to 9. FIG. 5 is a diagram showing a circular arrangement of the gaming machines 1. FIG. 6 is a diagram showing a comparative example of FIG. 5. FIG. 7 is a cross-sectional view taken along line A-A in FIG. 2. FIG. 8 is an enlarged perspective view of the supporting portion 23 and the vicinity of the foot lamp 25. FIG. 9 is an exploded view of the foot lamp 25.

Referring to FIGS. 1, 2 and 5, hereinafter, a lateral face of the cabinet 2 on the right side R2 is referred to as a right lateral face 202, and a lateral face of the cabinet 2 on the left side L is referred to as a left lateral face 204, seen from the front side F of the gaming machine 1. In addition, a face on a rear side (the back side R) of the gaming machine 1 is referred to as a back face 201. A right end face 203 is formed on the right lateral face 202, between an end on the back side R and the back face 201. Similarly, a left end face 205 is formed on the left lateral face 204, between an end on the back side R and the back face 201.

Thus, seen from the upper side T, the gaming machine 1 with the right end face 203 and the left end face 205 has a six-cornered shape, in which a length in the width direction (L-R2 direction) of the front side F (distance between X and X' in FIG. 1) is longer than a length in the width direction (L-R2 direction) of the back face 201 (distance between Y and Y' in FIG. 3).

As used herein, the distance between X and X' is a distance between the right lateral face 202 to the left lateral face 204. In addition, the distance between Y and Y' is a distance from a contact point between the back face 201 and the right end face 203, to a contact point between the back face 201 and the left end face 205.

First, the right end face 203 is a planar surface, which looks like a face made by chamfering a corner horizontally in a direction of gravitational force, connecting two points that are a predetermined distance away from a point of intersection of extended lines of the right lateral face 202 and the back face 201. Similarly, the left end face 205 is a planar surface, which looks like a face made by chamfering a corner horizontally in the direction of gravitational force, connecting two points that are the predetermined distance away from a point of intersection of extended lines of the left lateral face 204 and the back face 201.

In addition, the right end face 203 and the left end face 205 are surfaces between corners of which inner angles with respect to the adjacent lateral face and the back face are at least 90 degrees. More specifically, the right end face 203 is formed to have an inner angle with respect to the right lateral face 202 and an inner angle with respect to the back face 201, which are at least 90 degrees. Similarly, the left end face 205 is formed to have an inner angle with respect to the left lateral face 204 and an inner angle with respect to the back face 201, which are at least 90 degrees.

The present gaming machine 1 is installed in a game hall, for example, in a semicircular or circular arrangement, with the right end face 203 contacting the left end face 205 of an adjacent gaming machine 1, as shown in FIG. 5. This can arrange the gaming machines 1 in a smaller diameter than in a case where substantially rectangular gaming machines, in which the right end face 203 and the left end face 205 are not provided, are installed in a circle (see FIG. 6), thereby saving total installation space.

In addition, a handle portion 206 is provided in each of the right end face 203 and the left end face 205, as shown in FIGS. 1 and 2. The handle portion 206 is a concave portion 207 formed on the faces toward the inside of the cabinet 2. In the concave portion 207, a projecting portion 208 is formed, which is a part of the upper side T that projects so as to cover an opening of the concave portion.

In a case where an administrator moves the gaming machine 1, the administrator can carry the gaming machine by putting their fingers into the concave portion 207 of the handle portion 206 and holding the projecting portion 208 with the fingers bent toward the upper side T.

The handle portion 206 is formed on at least one of the right end face 203 and the left end face 205, preferably on both thereof.

Returning to FIGS. 1 and 2, the cabinet 2 includes the sub housing portion 21 and the main housing portion 22, as described above. The sub housing portion 21 constitutes an upper face of the cabinet 2 and has the opening portion 20 on the upper side T thereof. The top door 3 is disposed so as to cover the opening portion 20. The main housing portion 22 is disposed on the lower side B of the sub housing portion 21 and substantially in a center in a vertical direction (T-B direction) of the cabinet 2. In other words, the sub housing portion 21 is formed between the main housing portion 22 and the top door 3.

In addition, the relay board unit 211 including the relay circuit 70 is housed by the sub housing portion 21 and the main control unit 221 including the microcomputer 65 is housed by the main housing portion 22. Therefore, only the relay board unit 211 is accessible, even in a case where the top door 3 is illegally opened, and therefore fraud by directly accessing the main control unit 221 can be avoided. Furthermore, for example, in a case where a player puts a drink on an arm rest 35 (described later), even if the drink is spilled on the gaming machine 1, foreign articles such as the drink can only enter the sub housing portion 21, and the main control unit 221 will be free from an effect of such foreign articles.

The main housing portion 22 is formed so as to be gradually shorter in length in the thickness direction (hereinafter referred to as the F-R direction), decreasing from the upper side T to the lower side B. The lower side of the main housing portion 22 is the supporting portion 23 that supports the gaming machine 1.

The supporting portion 23 is formed continuously from the main housing portion 22 to have substantially the same length in the F-R direction as that of the lower side B of the main housing portion 22. In other words, starting from the top, the gaming machine 1 has the top door 3; the sub housing portion 21; the main housing portion 22; and the supporting portion 23. A portion on the front side F of the top door 3 and the sub housing portion 21 are formed to project from the main housing portion 22 toward the front side F. On the other hand, the main housing portion 22 is formed to be shorter in length in the F-R direction, descending from the upper side T to the lower side B. This creates a space on the lower side B of the display, i.e. on the lower side B of the sub housing portion 21. The space is used as a space for accommodating the legs of a player, in a case where a chair is provided in front of a gaming machine 1 and the player sits thereon. Since the player can sit closer to the gaming machine, the installation area for the gaming machine 1, including a space for accommodating the player, can be reduced.

The main control unit 221 including the microcomputer 65 is housed by the main housing portion 22. A main housing portion door 222 is provided on the front side F of the main housing portion 22, which can be open to take out the main control unit 221.

The sub housing portion 21 houses at least: the relay board unit 221 including the relay circuit 20; the bill validating device 341; and the human body detection sensor 29. In addition, the coin sensor 41 is connected to the top door 3 and housed by the sub housing portion 21. Furthermore, on an outer face in the front side F of the sub housing portion 21, the player information displaying portion 27 and the card slot 26, into which the player card is inserted, are provided.

Since the player information displaying portion 27 and the card slot 26 are provided on an outer face of the sub housing portion 21, an area of the top door 3 can be made smaller, thereby making the whole gaming machine 1 smaller. In addition, even in a case where a string is attached to the playing card for carrying thereof, the string will not fall on the main display, whereby it is possible to prevent impairment of visual recognition thereby.

As shown in FIG. 7, the human body detection sensor 29 is disposed on the front side F in the sub housing portion 21. Furthermore, the human body detection sensor 29 is disposed substantially in a center in the width direction (L-R2 direction) of the cabinet 2, i.e. substantially in a center between Z and Z' (distance between Z and Z' in FIG. 1).

As used herein, the distance between Z and Z' is a distance between the left side L of the cover member 38 and a lateral face on the left side L of the hopper unit 4.

The human body detection sensor 29 is disposed inside a sensor housing 291. The sensor housing 291 is formed to have a substantially triangular cross section, and the human body detection sensor 29 is disposed on a tilted surface facing the back side R. Therefore, the human body detection sensor 29 is disposed so that an apex thereof faces the back side R and the lower side B. This configuration allows the player's legs, which enter the space created on the lower side B of the sub housing portion 21, to be detected, whereas players passing in front of the gaming machine 1 will not to be mistakenly detected.

In the present embodiment, an infrared sensor can be used, for example, as the human body detection sensor 29. The infrared sensor is a so-called thermal infrared sensor, and captures a change in temperature of a sensor element due to infrared radiation radiated thereon by a human body and the like, as a change in resistance or a change in a physical phenomenon such as a thermo-electromotive force and a pyroelectric effect, and outputs thereof as an electric signal.

A sensor hole 292 is formed on an extended line from the apex of the human body detection sensor 29. The sensor hole 292 is formed on a surface on the lower side B of the sub housing portion 21. Furthermore, the sensor hole 292 is formed in a center in the width direction (L-R2 direction) of the cabinet 2, i.e. in a center between Z and Z' (distance between Z and Z' in FIG. 2). The human body detection sensor 29 detects infrared radiation generated by a human body through the sensor hole 292.

It should be noted that, in a case where the hopper unit 4 is not provided, the human body detection sensor 29 and the sensor hole 292 can be disposed or formed substantially in a center in the width direction (L-R2 direction) of the cabinet 2.

The foot lamp 25 is described hereinafter with reference to FIGS. 8 and 9.

As shown in FIG. 8, the cabinet 2 further includes the foot lamp 25 on the front side F of the supporting portion 23. Furthermore, the foot lamp 25 is disposed on the lower side B of the supporting portion 23, so that light is emitted toward the lower side B.

As shown in FIG. 9, the foot lamp 25 is composed of a foot lamp cover 251 and an LED substrate 252. Screw holes 253 and 253 are formed on the foot lamp cover 251, through which the foot lamp cover 251 is fixed to the cabinet 2 with screws. The screw holes 253 and 253 are formed in positions corresponding to positions of screw holes 256 and 256 formed in the front side F of the supporting portion 23. In a case where the foot lamp 25 is attached to the supporting portion 23 and a supporting portion door 231 is closed, the screw holes 253 and 253 are hidden behind the supporting portion door 231.

Light transmitting holes 254 are formed on the foot lamp cover 251, through which light from an LED provided on the LED substrate 252 transmits. The LED substrate 252 is disposed so as to align with the light transmitting holes 254, and mounted with screws to the foot lamp cover 251 by way of mounting bosses 255.

The foot lamp 25 lights the vicinity of the feet of a player sitting on a chair in front of the gaming machine 1. On the other hand, when a player is seated, the foot lamp 25 is hidden behind the player and the light thereof is not perceivable from other players passing by the gaming machine 1. Therefore, a player looking for a vacant gaming machine can find the gaming machine 1 with the light on the lower side B. Furthermore, in the present embodiment, the foot lamp 25 is controlled to be turned off when a player is seated at the front side F of the gaming machine 1. Details are described later.

In addition, as shown in FIG. 3, the cabinet illuminating portion 24 is provided on the back side R of the cabinet 2. The cabinet illuminating portion 24 emits light or switches between modes of illumination in accordance with operation on the operating unit 32 by a player. Change in the cabinet illuminating portion 24 is described later in detail.

Top Door

The top door 3 is described in detail hereinafter with reference to FIGS. 1, 2, 10, and 11. FIG. 10 is an enlarged view of an operating unit 32b. FIG. 11 is an enlarged exploded view of the top door 3, in the vicinity of an arm rest 35. FIG. 12 is an enlarged exploded view of the top door 3, in the vicinity of a cover member 38.

As shown in FIG. 1, the top door 3 is disposed so as to cover the upper face of the cabinet 2, in a state of being tilted toward the front side F that is a front face of the gaming machine 1. In addition, the operating unit 32, the coin slot 33, the bill slot 34, and the arm rest 35 are disposed on the top door 3. On a reverse side of the top door 3, the coin sensor 41 is disposed in a position corresponding to the coin slot 33. In other words, the top door is provided with various devices such as devices that operate based on a signal from the control unit and devices that transmit a signal to the control unit. The devices are all connected to the main control unit 221 including the microcomputer 65, via the relay board unit 221 (the relay circuit 70) that is a relay portion.

The main display 31 is disposed on the upper side T of the top door 3 and occupies a majority of a surface thereof. In addition, since the top door 3 is disposed in the state of being tilted toward the front side F of the cabinet 2, the main display 31, which is disposed on the upper side T of the top door 3, is also disposed in the state of being tilted toward the front side F that is the front face of the gaming machine 1. The main display 31 displays images associated with the games. The main display 31 is preferably formed to have an aspect ratio at which a length in the horizontal direction (the L-R2 direction in the present embodiment) is greater than a length in the vertical direction (the F-R direction in the present embodiment). In other words, a so-called wide display that is long in the longitudinal direction thereof, which is a width direction (L-R2 direction) of the gaming machine 1, is preferable.

The operating unit 32 is disposed to be adjacent to the main display 31. In the present embodiment, the operating unit 32 is disposed on the front side F of the main display 31. A player performs operations necessary for the games executed by the gaming machine 1 via the operating unit 32. The operating unit 32 shown in FIGS. 1 and 2 has a plurality of keys 321, to which functions for the games executed by the gaming machine 1 are assigned.

Furthermore, the operating unit 32 is configured as a single module, which is exchangeable in accordance with the games executed by the gaming machine 1. An example of the operating unit 32 is an operating unit 32b shown in FIG. 10.

The operating unit 32b is an operating unit for the gaming machine 1 executing a dice game called Sic Bo. The operating unit 32b for Sic Bo is provided with a roll button 323 for rolling dice, a notification lamp disposed so as to enclose the roll button 323, and a bet button 325 for making a bet, on the right side R2 of an operating unit main body 322. In addition, the operating unit 32b is connected to the relay board unit 211 of the gaming machine 1 by means of a connector 326.

The roll button 323 is operated in a Sic Bo game for shuffling dice after making a bet on the number of spots and a combination of spots on the rolled dice as a random number generator (in other words, after generating random numbers). Shuffle of the dice can be performed using virtual dice displayed on the main display 31 or using real dice by means of a dice unit (not shown) provided besides the gaming machine 1. As used herein, the dice unit includes a plurality of dice and a device for rolling dice.

The notification lamp 324 notifies that a player can roll the dice by operating the roll button 323. More specifically, the notification lamp 324 lights when a player can start rolling the dice after making a bet. In addition, in a case where a game is executed in coordination with the dice unit and a plurality of gaming machines 1, after that bets are made by the plurality of gaming machines 1, a player having a right to roll the dice is selected by a dealer or a server managing the game. Thereafter, when the player can start rolling the dice, only the notification lamp 324 on the gaming machine 1 operated by the selected player lights. A flow of the processing is described later.

Returning to FIG. 1, a sound sensor 36 is provided on both sides of the operating unit 32. The sound sensor 36 recognizes the voice of a player. The sound sensor 36 is connected to the microcomputer 65 via the relay circuit 70 in the relay board unit 211. The sound sensor 36 is disposed below a plurality of small holes formed on a surface of the top door 3.

In addition, an arm rest 35 is provided on the front side F of the operating unit 32. The arm rest 35 is a projecting portion provided so as to project toward the front side F of the cabinet 2 with the top door 3 being closed, and an end portion thereof on the front side F is an end portion on the front side F of the top door 3. The end portion thereof has a concave portion 354 that is slightly hollow toward the main display 31 and centered substantially at a center in the width direction (L-R2 direction).

The player information display portion 27, which is provided on the lower side B of the concave portion 354 formed on the arm rest 35, allows a player to visually recognize a display content of the player information display portion 27 by inhibiting the arm rest 35 from blocking the player's view.

The arm rest 35 includes an arm rest illuminating portion 37. Light from the arm rest illuminating portion 37 can be visually recognized from a side of an end on the front side F of the arm rest 35.

Referring to FIG. 11, the arm rest 35 is composed of arm rest covers 351 and 352 constituting a surface of the arm rest 35 and an arm rest base 353 constituting a face on the lower side B of the arm rest 35. In addition, the arm rest illuminating portion 37 is disposed between the arm rest covers 351 and 352 and the arm rest base 353.

The arm rest illuminating portion 37 is composed of a light guiding plate 371 and an LED 372. The LED 372 is disposed along a face of the arm rest base 353 to the side of the operating unit 32, so that light therefrom is directed toward the front face F.

The light guiding plate 371 is formed in a plate-like shape and disposed so as to cover an entire face of the arm rest base 353 on the upper side T. In addition, the light guiding plate 371 is disposed on the front side F of the LED 372 so that an end face thereof faces the LED 372. Then, the light guiding plate 371 surface-emits light, by dispersing point-like light of the LED 372, introduced from the end face thereof, to the entire light guiding plate 371.

The arm rest covers 351 and 352 are disposed on the upper side T of the light guiding plate 371. The light guiding plate is disposed between the arm rest covers 351 and 352 and the arm rest base 353, and only an end face thereof is visually recognizable. When viewed from the front side F of the gaming machine 1, light from the arm rest illuminating portion 37 can be visually recognized in a linear shape on a side to the front side F of the arm rest 35.

Referring to FIGS. 1, 2 and 12, a cover member 38 is provided on each side in the width direction (L-R2 direction) of the top door 3. In the present embodiment, the cover member 38 is provided so as to cover an entirety of each side in the width direction (L-R2 direction) of the top door 3 (see FIGS. 1 and 2). The cover member 38 is formed so that a shape of a lower end thereof follows a shape of the opening portion 20 of the cabinet 2 when the top door 3 is closed. In addition, the cover member 38 is formed so as to become gradually longer in the vertical direction (T-B direction) from the back side R to the front side F. The front side F of the cover member 38 is formed so as to cover a side of a portion in the sub housing portion 21 of the cabinet 2, in which the player information display portion 27 and the card slot 26 are disposed.

As shown in FIG. 12, the cover member 38 has a three-layered structure including an outer cover 381 disposed on an outermost side, an inner cover 382 disposed on an inner side, and an intermediate cover 383 disposed between the outer cover 381 and the inner cover 382. The intermediate cover 383 is disposed so as to mainly cover an upper side T half of the inner cover 382. An LED portion 384 is disposed on the lower side B of the intermediate cover 383, between the outer cover 381 and the inner cover 382.

The outer cover 381 and the inner cover 382 are members having sufficient stiffness to reinforce the top door 3, and can be formed of the same member or different members. The intermediate cover 383 is disposed on the upper side T of the LED portion 384, around the LED portion. The outer cover 381, disposed to cover the LED portion 384, is preferably made of a member through which light from the LED portion 384 can be visually recognized, such as a translucent member and a transparent member.

The LED portion is connected to the relay circuit 70 of the relay board unit 211. In addition, the LED portion 384 is connected to the microcomputer of the main control unit via the relay board unit 221. The LED portion 384 has various illuminating modes such as lighting-up, blinking, switching off, and the like, in accordance with a control signal from the CPU 61, as one rendered effect for games executed by the gaming machine 1.

It should be noted that, although FIG. 12 shows an exploded view of the cover member 38 on the right side R2, the cover member 38 on the left L is similarly configured.

Returning to FIGS. 1 and 2, an uneven portion 28 is formed on an end on the upper side T of the right lateral face 202, the right end face 203, the left lateral face 204, and the left end face 205 of the cabinet 2. The uneven portion 28 includes: a bottom portion 281 that is formed to be substantially horizontal to the bottom face of the cover member 38 in a case where the top door 3 is closed, and a wall portion 282 formed in the vertical direction from the bottom portion 281 toward the upper side T on an end, toward the inside of the cabinet 2, of the bottom portion 281 (see FIG. 2).

The length in the width direction (L-R2 direction) of the bottom portion 281 is at least a length of thickness of the cover member 38. In addition, the length preferably has substantially the same length as that of the length of thickness of the cover member 38.

When the top door 3 is in a state of being closed, the cover member 38 is in contact with the bottom portion 281 of the uneven portion 28 (see FIG. 1). Furthermore, the right lateral face 202, the right end face 203, the left lateral face 204 and the left end face 205 are each connected with the cover member 38, thereby forming the lateral face of the cabinet 2.

By disposing the cover member 38, the top door 3 can be reinforced. In addition, in a case where the top door 3 is closed, since the cover member 38 contacts the bottom portion 281 of the uneven portion 28 formed on a side to the cabinet 2 and the right lateral face 202, the right end face 203, the left lateral face 204 and the left end face 205 are each connected with the cover member 38 and form the lateral face of the cabinet 2, and although a player having malicious intent may try to force the top door 3 open, a handhold can be eliminated, thereby preventing tampering.

Furthermore, since the uneven portion 28 has a wall portion 282 that is formed in a vertical direction from the bottom portion 281, in a case where the top door 3 is closed and the cover member 38 and the bottom portion 281 are contacting each other, even if a crowbar or the like is inserted therebetween, the wall portion 282 can block the crowbar. Particularly in the present embodiment, since the width of the bottom portion 281 is substantially the same as the thickness of the cover portion 38, even if a crowbar or the like is inserted between the cover member 38 and the bottom portion 281, the crowbar would immediately abut into the wall portion 282 and would not be able to get a supporting point, thereby preventing the top door 3 from being forced open.

Figure 13:
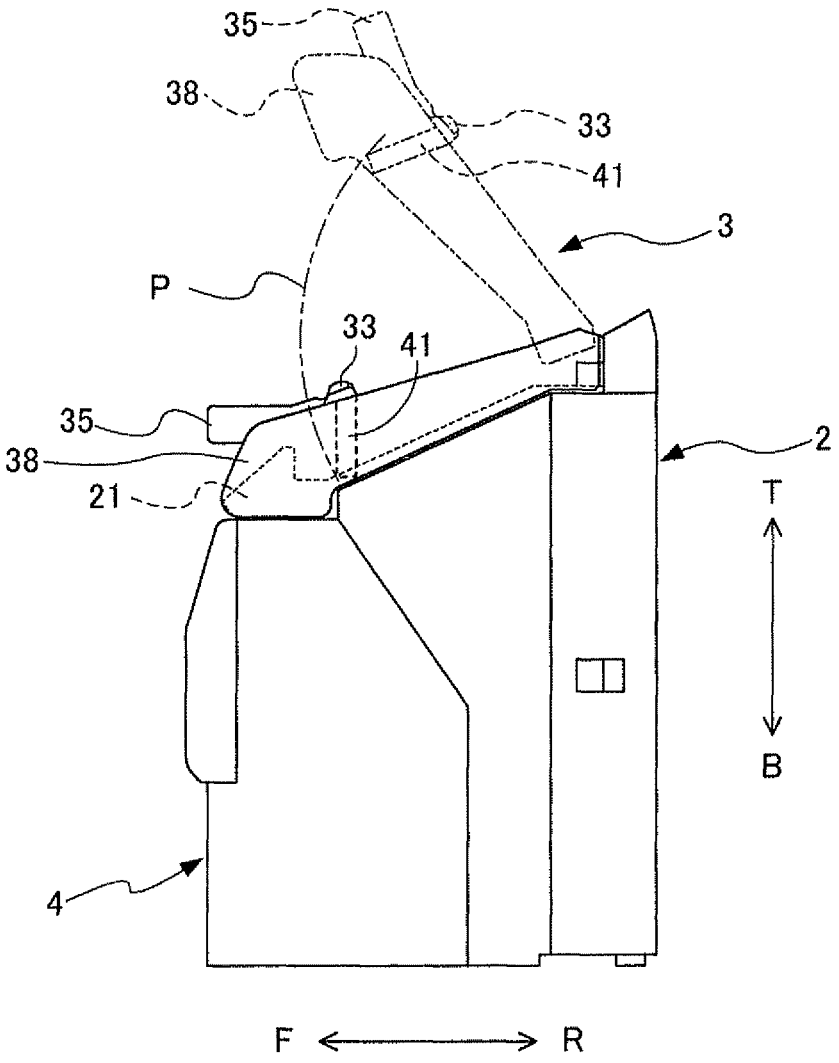
FIG. 13 is a diagram showing a relationship between a coin sensor 41 and a sub housing portion 21 of the cabinet 2 in a case where the top door 3 is opened and closed, according to the embodiment of the present invention.
Figure 14:
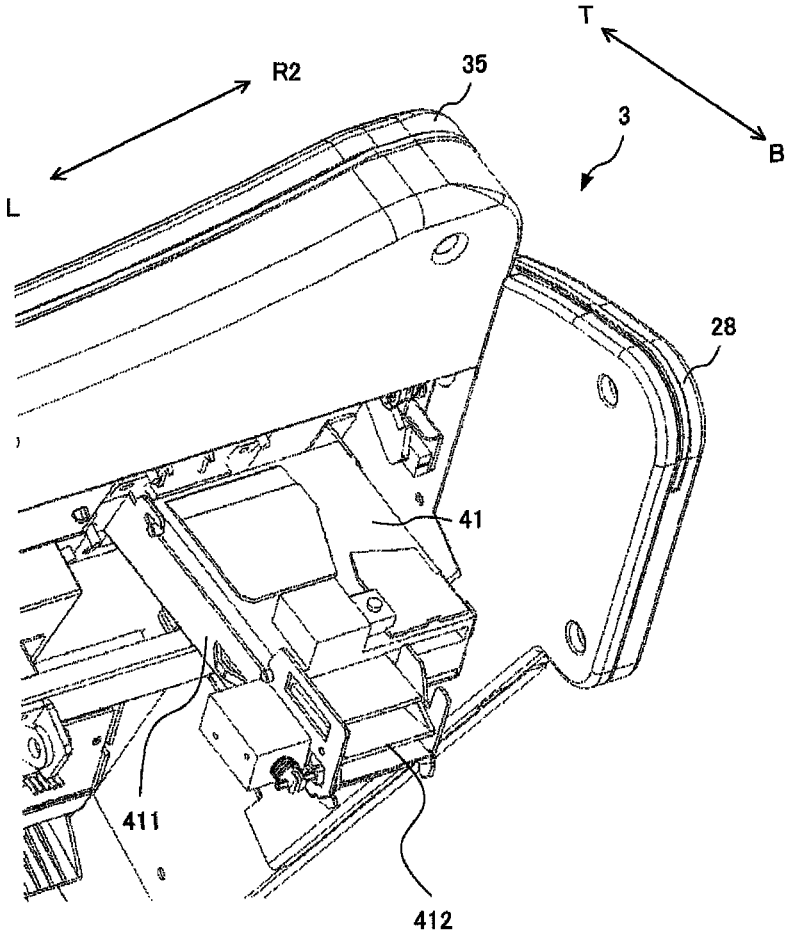
FIG. 14 is a partial enlarged view of the vicinity of a coin sensor 41 according to an embodiment of the present invention.
Figure 15:
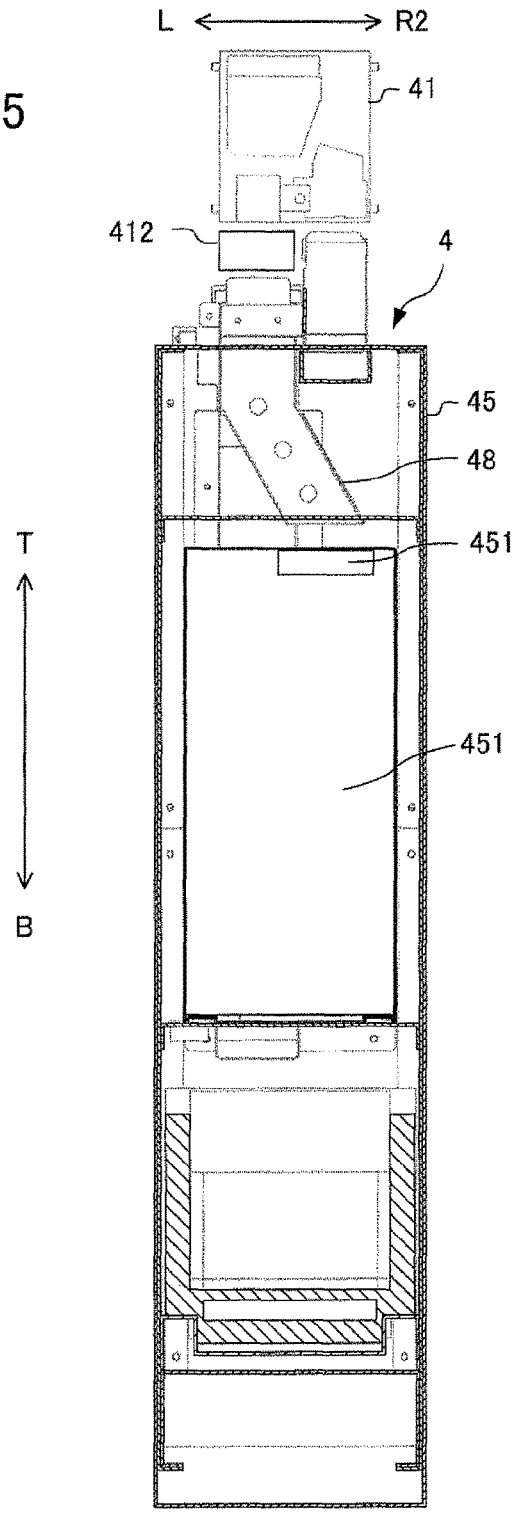
FIG. 15 is a cross-sectional view of a hopper unit 4 according to the embodiment of the present invention.

The hopper unit 4 and the coin sensor 41 are described hereinafter with reference to FIGS. 13 to 15. FIG. 13 is a diagram showing a relationship between a coin sensor 41 and a sub housing portion 21 of the cabinet 2 in a case where the top door 3 is opened and closed. FIG. 14 is a partial enlarged view of the vicinity of a coin sensor 41. FIG. 15 is a cross-sectional view of a hopper unit 4.

According to FIG. 1, the coin slot 33 is formed on the upper side T of the top door 3. In addition, the coin slot 33 is disposed more to the front side F than a center in the thickness direction (F-R direction) of the top door 3, and more to the back side R than an end on the front side F of the top door 3. More particularly, the coin slot 33 is disposed on a face of the cabinet 2 where the player information display portion 27 is disposed, more to the back side R than an end on the upper side T.

As shown in FIG. 13, the coin sensor 41 is disposed on a lower side B (reverse side) of the top door 3. In addition, the coin sensor 41 is disposed directly below (on the lower side B of) the coin slot 33. More particularly, as shown in FIG. 14, the coin slot 33 is disposed so that the coin sensor 41, which is disposed directly below the coin slot 33, does not interfere with an upper end (an end on the upper side T) on the front side F of the cabinet 2 when the top door 3 is opened and closed.

More specifically, the coin slot 33 is disposed so that a trajectory P of an end on the lower side B of the coin sensor 41, which is disposed on the reverse side of the top door 3, does not interfere with the sub housing portion 21 of the cabinet 2, when the top door 3 is opened by lifting an end thereof on the front side F and swinging the top door 3 open with an end thereof on the back side R as a rotational axis. In other words, the end on the lower side B of the coin sensor 41 follows a circular path around the end on the back side R of the top door 3, and the coin sensor 41 is disposed so that the end on the upper side T of the cabinet 2 is positioned outside the circular path. In the present embodiment, the end on the upper side T of the cabinet 2 is the front side F of the opening portion 20 of the sub housing portion 21.

As a result, in a case where the coin slot 33 is disposed on an end on the front side F of the top door 3, the coin sensor 41 may interfere with the cabinet 2; however, as described above, the coin slot is disposed more to the back side R than the end on the upper side T, thereby preventing interference.

As shown in FIG. 14, the coin sensor 41 is fixed on the top door 3 by a sensor case 411, at a position corresponding to the coin slot 33 on a lower side B (reverse side) of the top door 3. In other words, the coin sensor 41 is provided so as to connect with the coin slot 33. In addition, on an end on the lower side B of the coin sensor 41, a connection opening 412 is provided for connecting with a guidepath 48 that guides coins having passed through the coin sensor 41 into the hopper unit 4.

Since the coin sensor 41 is provided in the vicinity of the coin slot 33, on the reverse side of the top door 3, there is no need to provide a guidepath between the coin slot 33 and the coin sensor 41. As a result, the jamming of coins between the coin slot 33 and the coin sensor 41 is eliminated.

FIG. 15 is a cross-sectional view of a hopper unit 4, showing a positional relationship thereof with respect to the coin sensor 41. The hopper unit 4 is disposed on a straight line that extends from the coin sensor 41 in a direction of gravitational force. In addition, the guidepath 48 to the hopper unit 4 is disposed directly below the connection opening 412, which is the lower end side of the coin sensor 41.

The guidepath 48 is disposed directly below the connection opening 412 of the coin sensor 41, i.e. on a straight line that extends from the coin slot 33 in the direction of gravitational force. Furthermore, the guidepath 48 is formed in a shape of a straight line or a polygonal line and connected with a coin tank 451 in the hopper device 45. The coin tank 451 retains coins inserted from the coin slot 33 and having passed through the coin sensor 41 and the guidepath 48.

As described above, the guide path 48 being formed in a form of a straight line can prevent the coins from being jammed in the guide path 48.

A length in the width direction (L-R2 direction) of the hopper unit 4 preferably corresponds to a size of the main display 31. In other words, the main display 31 is formed to have an aspect ratio greater than 4 to 3. Accordingly, the length in the width direction (L-R2 direction) of the hopper unit 4 is preferably formed in accordance with an increase in size of the main display 31, from a case of an aspect ratio of 4 to 3. In the present embodiment, the main display 31 has an aspect ratio of 16:9, and is longer in the width direction (L-R2 direction) than in a case of an aspect ratio of 4 to 3. In addition, the length in the width direction (L-R2 direction) of the hopper unit 4 is determined in accordance with a growth in length in the width direction (L-R2 direction) of the main display 31. It should be noted that, although the hopper unit 4 is thinner than a conventional hopper unit, a size thereof in the thickness direction (F-R direction) reaches the front side F of the cabinet 2 as shown in FIGS. 1 and 2, and thus an amount of retained coins therein is the same as a conventional hopper unit.

Figure 16:
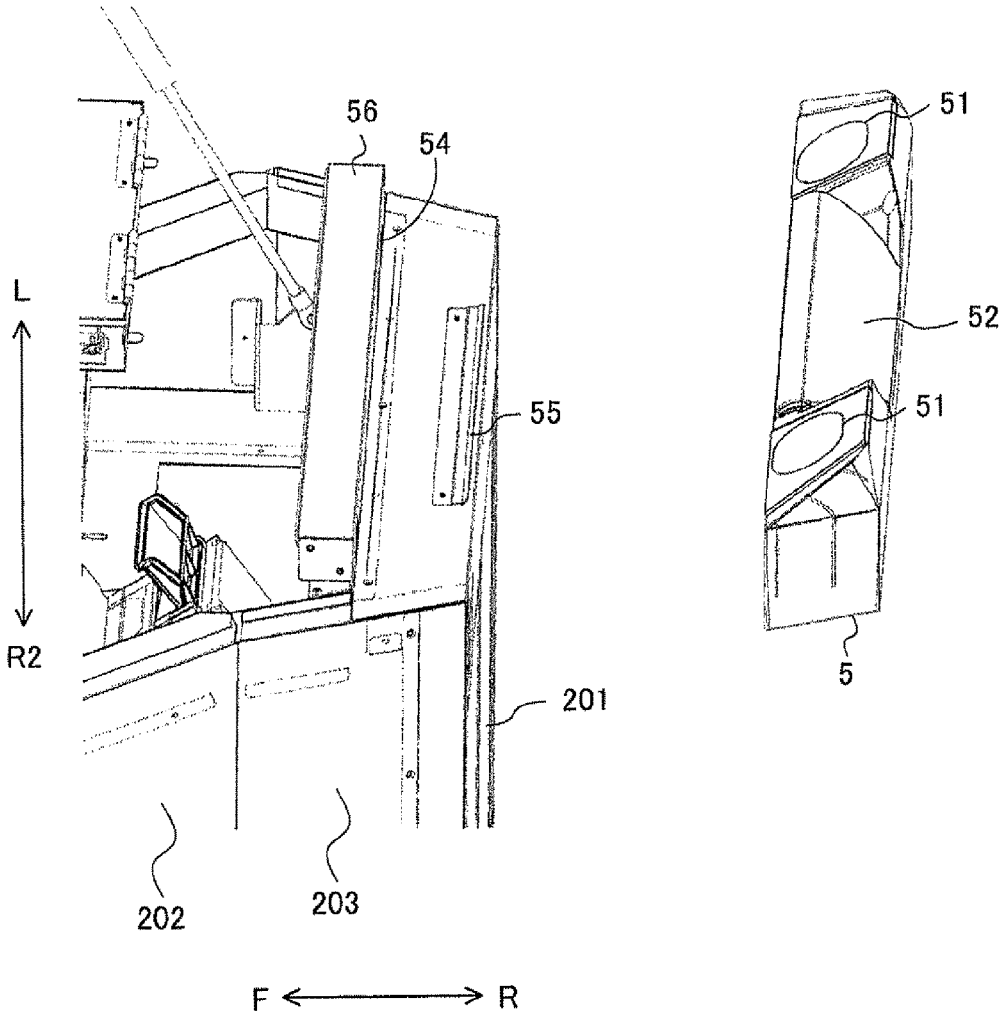
FIG. 16 is an enlarged exploded view of the vicinity of an application unit 5 disposed on a back face side R of the cabinet 2 according to the embodiment of the present invention.

The application unit 5 is described hereinafter with reference to FIG. 16. FIG. 16 is an enlarged exploded view of the vicinity of an application unit 5 disposed on a back face side R of the cabinet 2.

In the present embodiment, the application unit 5 is disposed on the back side R of the cabinet 2. The application unit 5 is formed to be attachable/detachable with respect to the cabinet 2 by means of a screw or the like (not shown), in consideration of maintainability, and connected to the relay board unit 211 of the cabinet 2 by means of a connector (not shown) extended from the application unit 5, via a connection hole 54 formed on the cabinet 2.

In addition, the application unit 5 is disposed on the upper side T of the cabinet 2. Furthermore, the application unit 5 is disposed in an end portion on the back side R on the upper face of the cabinet 2, along the width direction (L-R2 direction). The application unit 5 is set between a supportive plate 55 provided in the end portion on the back side R of the cabinet 2 and a supportive projection 56 provided so as to face the supportive plate 55. It should be noted that the supportive plate 55 and the supportive projection 56 are both formed to be horizontally long along the width direction (L-R2 direction) of the cabinet 2, and a length of a gap between the supportive plate 55 and the supportive projection 56 preferably corresponds to a length of the application unit 5 in the thickness direction (F-R direction).

The connector, as a connection portion for connecting a cable extending from the application unit 5, is preferably provided to the connection hole 54. This facilitates replacement of the application unit 5.

The application unit 5 is formed to be horizontally long along the width direction (L-R2 direction) of the cabinet 2, and includes the speaker 51 and the lamp portion 52 in the present embodiment. The speaker 51 is provided on both ends of the application unit 5, and the lamp portion 52 is provided between the two speakers 51. The speaker 51 and the lamp portion 52 emit sound or light in response to a control signal from the microcomputer 65. It should be noted that, in addition to the speaker 51 and the lamp portion 52, various devices can be installed on the application unit 5. For example, a sub display that is different from the main display 31 can be installed thereon in order to execute a game on two windows or to display information regarding a game on the sub display on the application unit 5. In addition, coloring of the application unit 5 can be changed in accordance with the design of a casino hall and the like.

Control Flow

Figure 18:
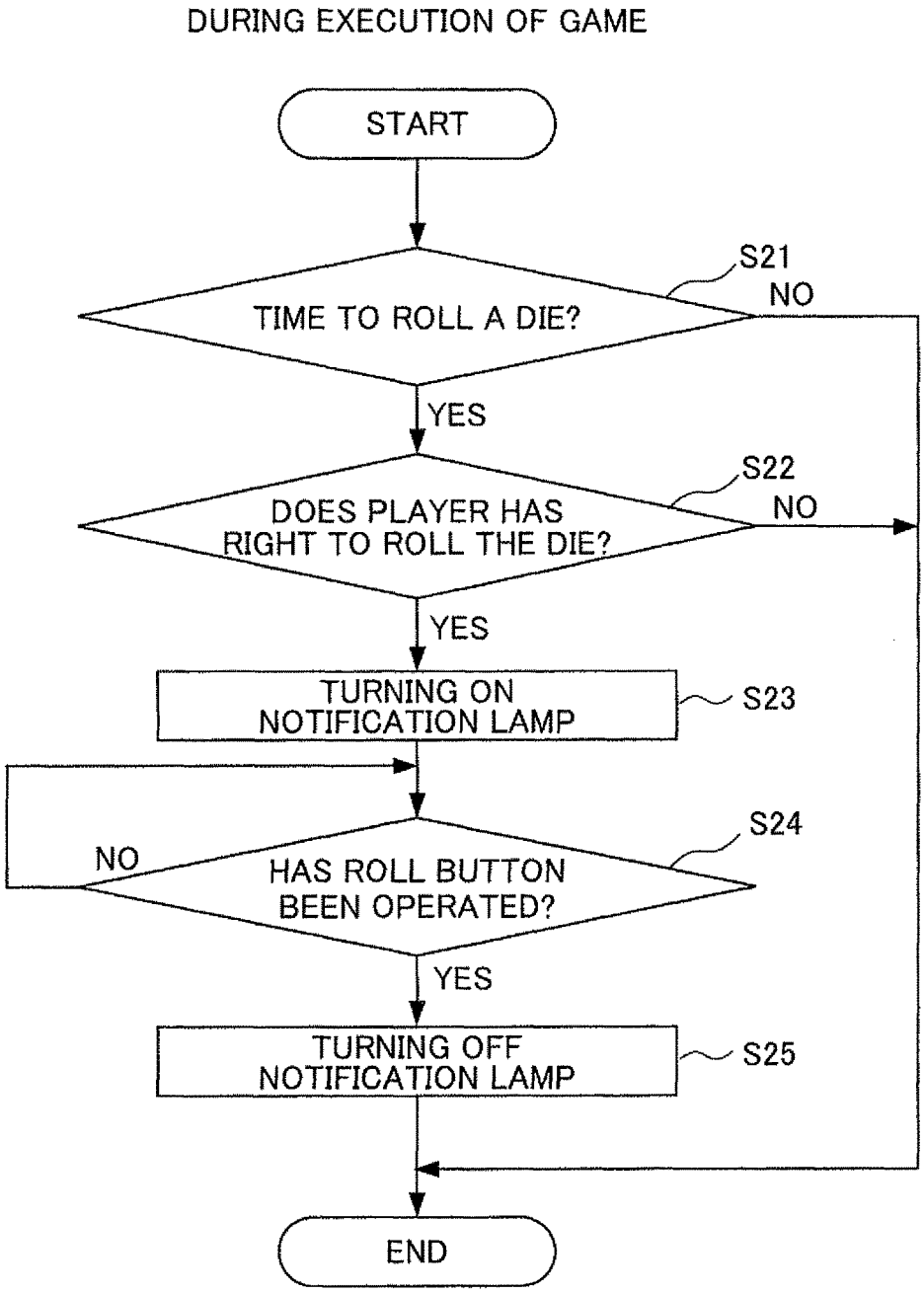

A flow of processing by the gaming machine 1 is described hereinafter with reference to FIGS. 17 and 18. FIG. 17 is a diagram showing a main flow. FIG. 18 is a diagram showing a flow of the operating unit during game execution when performing Sic Bo.

Control of the main flow is described with reference to FIG. 17.

First, a CPU 61 of the gaming machine 1 illuminates the foot lamp 25 and the arm rest illuminating portion 37 (Step S1), and advances the processing to Step S2.

In Step S2, the CPU 61 determines whether the human body detection sensor 29 has detected a human body. In a case where the human body detection sensor 29 has detected a human body (in a case ofYES determination), the processing is advanced to Step S3. In a case where the human body detection sensor 29 has not detected a human body (in a case of NO determination), the CPU 61 stands by.

In Step S3, the CPU 61 turns off the foot lamp 25 and the arm rest illuminating portion 37, and advances the processing to Step S4. As described above, the foot lamp 25 and the arm rest illuminating portion 37 are turned off when the human body detection sensor 29 responds (detects a human body) and are turned on when the human body detection sensor 29 does not respond (does not detect a human body).

In Step S4, the CPU 61 outputs a predetermined question from the speaker 51. The question is for confirming the use of the gaming machine 1, for example, "Would you like to play a game?" More specifically, the CPU 61 reads audio data stored in the ROM 63 and outputs the audio data from the speakers 51 of the application unit 5. When the processing is terminated, the CPU 61 advances the processing to Step S5.

In Step SS, the CPU 61 determines whether a player has responded or not. More specifically, the sound sensor 36 provided on the top door 3 detects sound, and the CPU 61 analyzes the sound to determine whether the sound is a predetermined response or not. In a case where the sound is the predetermined response (in a case ofYES determination), the processing is advanced to Step S6. In a case where the sound sensor does not detect sound or the sound is not the predetermined response (in a case of NO determination), the processing is advanced to Step S2.

In Step S6, the CPU 61 displays a game window on the main display 31. Here, the game window is, for example, an image for accepting a bet and the like. In addition, in Step S7, the CPU 61 determines whether a bet is accepted or not. In a case where a bet is accepted (in a case ofYES determination), the processing is advanced to Step S8. In a case where a bet is not accepted (in a case of NO determination), the CPU 61 stands by.

In Step S8, the CPU 61 switches between modes of illumination of the cabinet illuminating portion 24. The mode of illumination is required to be changed from the mode before the bet is made. For example, a change in modes is a change of light color, blinking, turning off or on of the light, and the like. In a case where the gaming machine 1 is installed in a semicircular arrangement or the like around a dealer, the dealer can recognize bets being made by the change in modes of illumination.

In Step S9, the CPU 61 starts executing a game. In Step S10, the CPU 61 determines whether the game is terminated or not. The LED portion 384 provided on both sides 2 of the top door 3 switches between the modes of illumination in accordance with a control signal from the CPU 61. In other words, a mode of light emitted by the LED portion 384 is changed (change in colors, turning on and off, blinking and the like). As used herein, the game is a unit in which a bet can be made. In a case where the game is terminated (in a case of YES determination), the CPU 61 advances the processing to Step S11, and in a case where the game is not terminated (in a case of NO determination), the CPU 61 continues executing the game until termination.

In Step S11, the CPU 61 performs payout of coins as necessary, and advances the processing to Step S12. In Step S12, the CPU 61 returns the mode of light of the cabinet illuminating portion 24.

In Step S13, the CPU 61 determines whether the human body detection sensor 29 is responding or not. In a case where the human body detection sensor 29 is responding and detecting a human body (in a case of YES determination), the processing is advanced to Step S6. On the other hand, in a case where the human body detection sensor 29 is not responding and not detecting a human body (in a case of NO determination), the processing is advanced to Step S14. In a case where the human body detection sensor 29 is detecting a human body even after the termination of the game, the player using the gaming machine 1 is considered to be willing to continue the game. Therefore, the CPU 61 can continue the game without returning to Step S4 for outputting the question from the speakers 51.

In Step S14, the CPU 61 terminates execution of the game and displays a demonstration screen on the main display 31. Since the human body detection sensor 29 does not detect a human body, a player is assumed to be away from the gaming machine 1. Therefore, the CPU 61 terminates the game and displays the demonstration screen. Upon finishing the processing, the CPU 61 terminates the flow.

Operation during execution of a Sic Bo game is described hereinafter with reference to FIG. 18. It should be noted that a flow shown in FIG. 18 is for a case where an operating unit 32b for a Sic Bo game is installed in the cabinet 2 as the operating unit 32. In addition, a die and a unit for rolling the die (hereinafter referred to as a dice unit) are assumed to be provided separately from the gaming machine 1.

In Step S21, the CPU 61 determines whether it is time to roll the die or not. More specifically, the CPU 61 determines whether a bet operation is terminated or not. In addition, in a case where a plurality of gaming machines 1 executes a game simultaneously, the CPU 61 determines whether the bet operation by all the players participating in the game is terminated or not. In addition, in a case where a plurality of gaming machines 1 executes a game simultaneously, the CPU 61 determines whether all the players participating in the game have terminated the bet operation.

In Step S22, the CPU 61 determines whether the player has the right to roll the die. Whether the player has the right to roll the die is determined by whether a predetermined condition is satisfied. In a case where the player has the right to roll the die (in a case of a YES determination), the processing is advanced to Step S23, and in a case where the player does not have the right to roll the die (in a case of a NO determination), the flow is terminated.

Here, the predetermined condition can be, for example, a player randomly selected from among players having bet at least a predetermined amount, a player having bet a maximum amount, a player having bet a maximum accumulated bet amount, a player completely randomly determined, a player having lost or won a large amount, and the like.

In Step S23, the CPU 61 illuminates the notification lamp 324 on the operating unit 32b. This notifies a player that the roll button 323 can be operated to start rolling the die. In addition, in a case where a plurality of gaming machines 1 executes a game simultaneously, the notification lamp 324 is turned on only for the gaming machine 1 used by a player having the right to roll the die in Step S22. By granting a right to roll the die to a player, the player can decide when to start rolling the die.

In Step S24, the CPU 61 determines whether the roll button 323 is operated or not. In a case where the roll button 323 is not operated (in a case of a YES determination), the CPU 61 advances the processing to Step S25, and in a case where the roll button 323 is not operated (in a case of a NO determination), the CPU 61 stands by.

In Step S25, the CPU 61 submits a signal to start rolling the die to the dice unit and turns off the notification lamp 324. Upon finishing the processing, the CPU 61 terminates the flow.

According to the present embodiment, for the case of detecting a player intending to operate the gaming machine 1, the human body detection sensor 29 provided on the lower side B of the sub housing portion 21 detects a human body, the speakers 51 output a question in response to a detection by the human body detection sensor 29, and then the sound sensor 36 detects a voice of the player, determines whether the voice is a predetermined sentence corresponding to an answer to the question by analyzing the voice, and recognizes the sentence. In this way, even if the human body detection sensor 29 responds to an object other than a human body (a player), game will not start without the predetermined sentence being recognized by the sound sensor 36. This can prevent the gaming machine 1 from executing a game when a player is not operating the gaming machine 1.

While an embodiment of the gaming machine according to the present invention has been described, it is to be understood that the above description is intended to be illustrative, and not restrictive, and any changes in design may be made to specific configurations such as various means. Moreover, it should be understood that the advantages described in association with the embodiments are merely a listing of most preferred advantages, and that the advantages of the present invention are by no means restricted to those described in connection with the embodiments.

In the present embodiment, the card identification circuit 73 as the reader portion reads information stored in the player card inserted into the card slot 26, and a play history of the player is displayed on the player information display portion 27; however, the present invention is not limited thereto. For example, various gaming machines 1 in a game hall can be connected by a network and, in a case where a player card is inserted into the card slot 26, a play history corresponding to the player card can be read from a server and displayed on the player information display portion 27.

In the present embodiment, the foot lamp 25 and the arm rest illuminating portion 37 are turned on when the human body detection sensor 29 is not responding, and the foot lamp 25 and the arm rest illuminating portion 37 are turned off when the human body detection sensor 29 is responding; however, the present invention is not limited thereto. For example, the foot lamp 25 and the arm rest illuminating portion 37 can be turned on even when the human body detection sensor 29 is responding. In addition, the LED portion 384 on the cover member 38 can be similarly turned on and off. In a case where a player is seated at the front side F of the gaming machine 1, the light emitted from the foot lamp 25 and the arm rest illuminating portion 37 are hidden behind the player, thus providing the same effect as the abovementioned embodiment without a particular operation.

Embodiments of the present invention will be described below with reference to the accompanying drawings.

As described later in detail, as shown in FIG. 1A, the CPU 81 receives identification data from an IC tag reader 16 (Step S100), determines a classification and number of dots on dice based on the identification data thus received (Step S200), stores the classification and the number of dots on the dice thus determined for each game in RAM 83 (Step S300), calculates a frequency at which each of the dots appears over a predetermined number of games (for example, 100 games) for each classification of the dice (Step S400), and displays, in a case in which the frequency of a specific number of dots on a specific die is at least a predetermined number (Step S500), an indication thereof on the dealer used display 210.

FIG. 2A is a perspective view schematically showing an example of a gaming machine according to the embodiment of this invention. FIG. 3A is an enlarged view of a playing unit of the gaming machine shown in FIG. 2A. As shown in FIG. 2A, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70a, 70b, and 70c) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3a, which is formed to be a circular shape, to roll and then stop the dice 70. An IC tag reader 16, which is described later in FIGS. 6A to 9A, are provided below the playing board 3a.

Since the playing board 3a is formed to be substantially planar, as shown in FIG. 3A, the dice 70 are rolled by oscillating the playing board 3a substantially in the vertical direction with respect to the horizontal direction of the playing board 3a. Then, the dice 70 are stopped after the oscillation of the playing board 3a ceases. The playing board 3a is oscillated by a CPU 81 (described later) driving an oscillating motor 300.

Furthermore, as shown in FIG. 3A, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3a, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

FIG. 4A is an external perspective view of a die 70. As shown in FIG. 4A, the die 70 is a cube of which the length of a side is 100 mm.

FIG. 5A is a development view of the die 70. As shown in FIG. 5A, the combinations of two faces opposing each other are "1 and 6", "2 and 5", and "3 and 4".

FIGS. 6A to 9A show IC tag readable areas by an IC tag reader 16 disposed below the playing board 3a.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3a.

With reference to FIG. 6A, a face of the die 70 (for example, a face of which the number of dots is six) is in contact with the playing board 3a. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

With reference to FIG. 7A, a die 70 is inclined. However, since the IC tag 51 still exists in the readable area of the IC tag reader 16, the number of dots of the die 70 is determined as "one".

With respect to FIG. 8A, the die 70 is inclined at a greater angle than the case shown in FIG. 7A. Then, since there is no IC tag which exists in the readable area of the IC tag reader 16, the IC tag reader 16 cannot detect the number of dots of the die 70.

With reference to FIG. 9A, the die 70b is superimposed on the die 70a. In this case, neither of the IC tags 55, 56, 57, and 58, which are embedded in the die 70b, exists in the readable area of the IC tag reader 16. Therefore, in this case, the IC tag reader 16 cannot detect the number of dots of the die 70b.

FIG. 10A shows a sheet 140 attached to each face of the die 70.

As shown in FIG. 10A, on each face of the die 70, the sheet 140, to which infrared absorption ink is applied to identify the number of dots and the type of the die 70, is provided so as to be covered by a sheet on which the number of dots is printed. According to FIG. 10A, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

FIG. 11A shows an image in which the dice 70, which comes to rest on the playing board 3a, are imaged substantially in the vertically upward direction using an infrared camera 15.

With reference to FIG. 11A, dots to which the infrared absorption ink is applied on each of the dice 70a, 70b, and 70c are imaged in black. The type and the number of dots for each of the dice 70a, 70b, and 70c are determined based on a combination of the dots to which the ink is applied. In addition, the playing board 3a is formed in a disc shape having a radius a, and each position of the dice 70a, 70b, and 70c is detected as an x component and y component on an x-y coordinate.

FIG. 12A shows a sheet 150 which is attached to each face of the dice 70.

As shown in FIG. 12A, a circular profile 75 having a certain area on each face of the dice 70 in common is depicted by way of applying the infrared absorption ink on each face of the dice 70. The sheet 150 on which the circular profile 75 is depicted is provided so as to be covered by the abovementioned sheet 140.

Figure 13A:
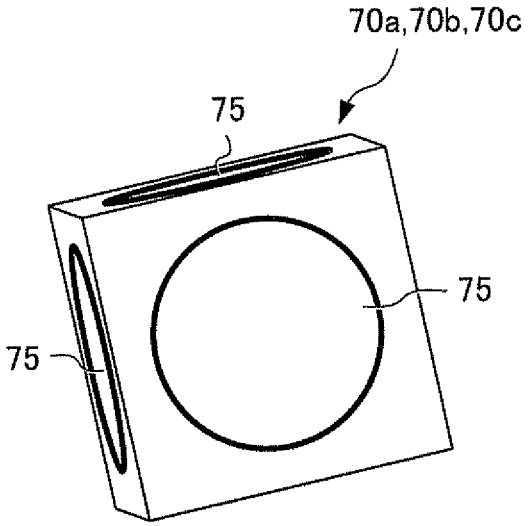
FIG. 13A shows an image in which a die according to the embodiment of the present invention that has come to rest at a tilt on a playing board, is imaged substantially in the vertically upward direction by an infrared camera.

FIG. 13A shows an image in which the die 70, which comes to rest at a tilt on a playing board 3a, is imaged substantially in the vertically upward direction using the infrared camera 15.

With reference to FIG. 13A, three faces of the die 70 are imaged. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus imaged, and distinguishes the number of dots of the face on which the circular profile 75 having the largest area among the areas thus calculated is printed as the correct number of dots.

Figure 14A:
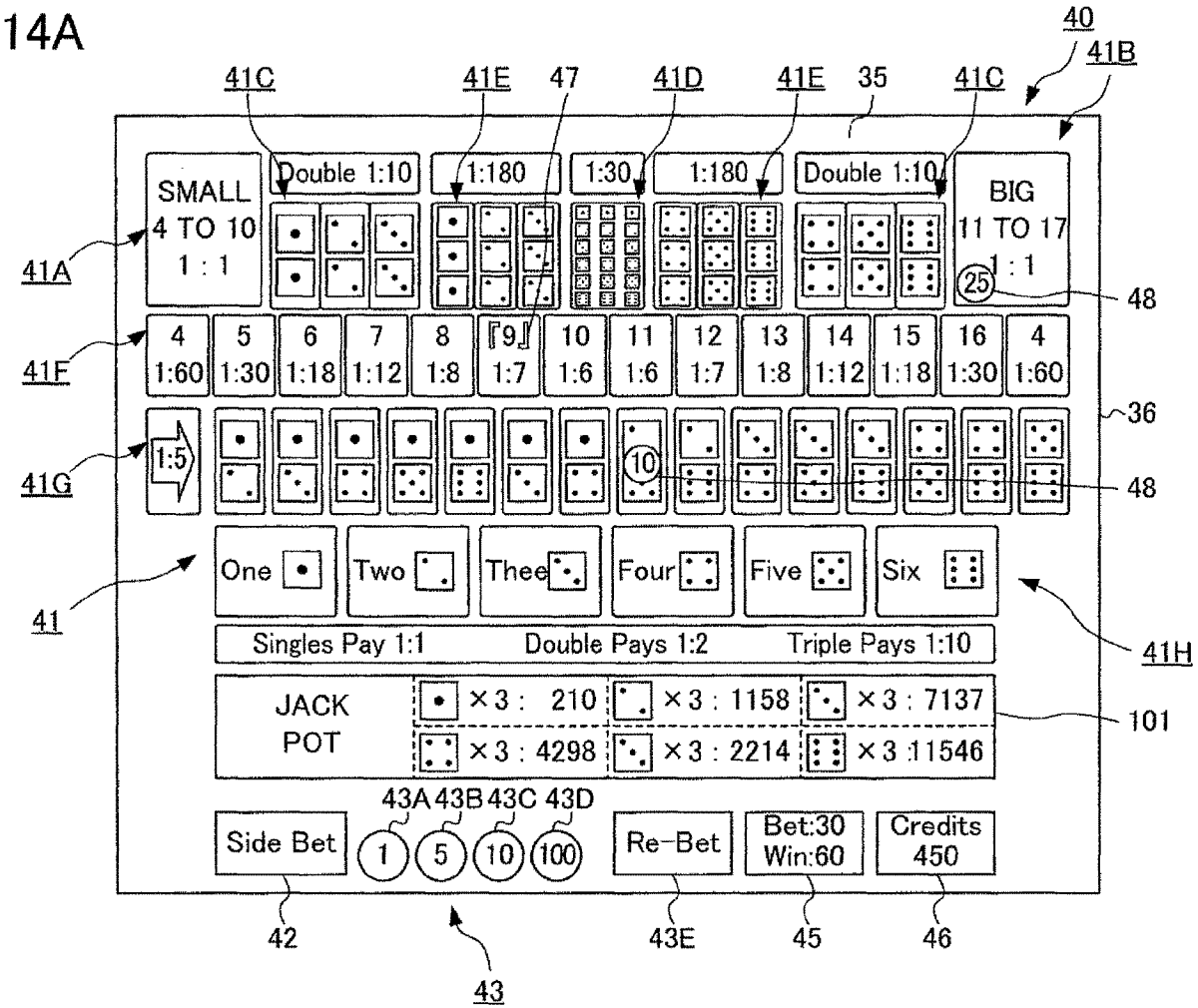
FIG. 14A shows an example of a display screen according to the embodiment of the present invention.

FIG. 14A shows an example of a display screen displayed on an image display unit. As shown in FIG. 14A, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15A:
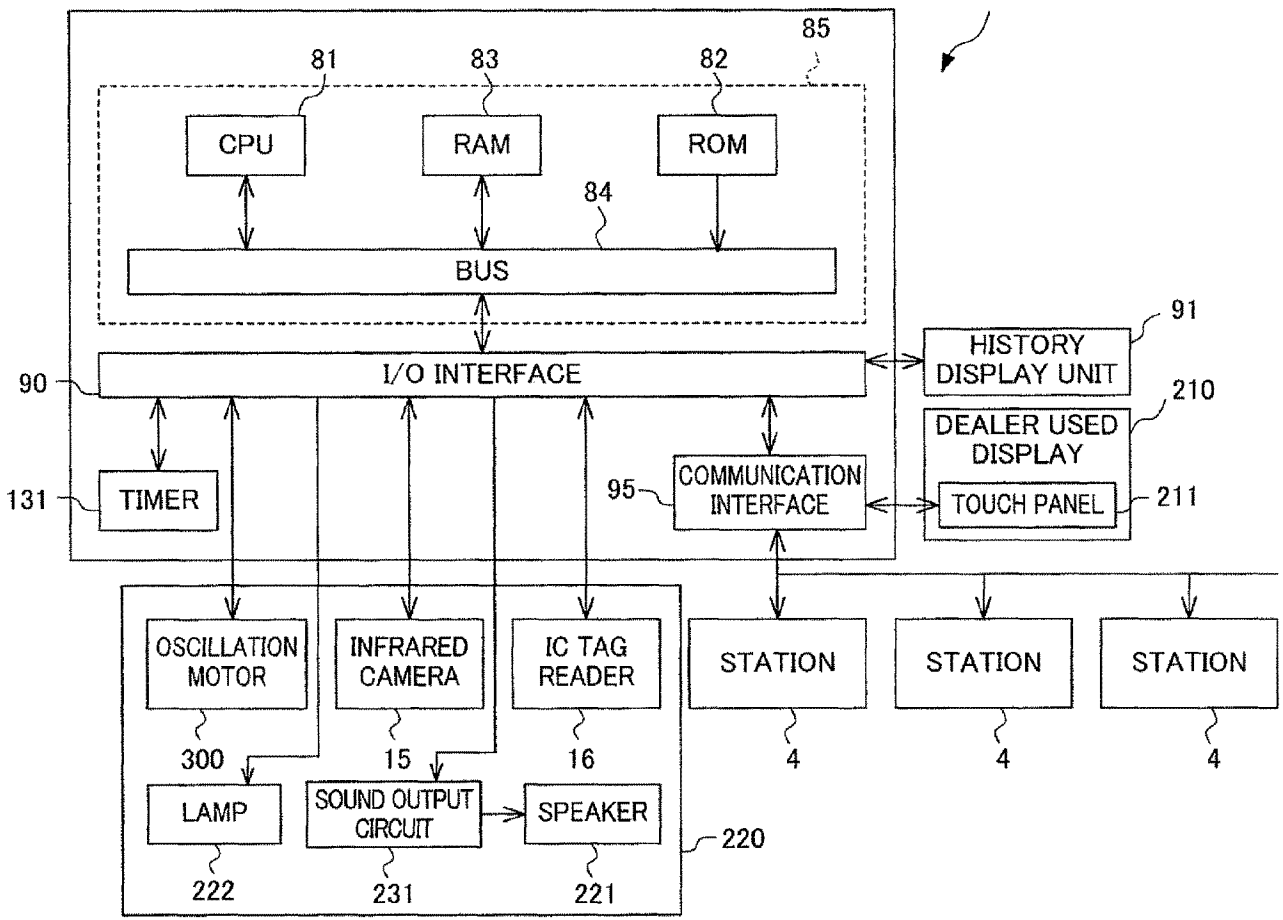
FIG. 15A is a block diagram showing the internal configuration of the gaming machine shown in FIG. 2A.

FIG. 15A is a block diagram showing the internal configuration of the gaming machine shown in FIG. 2A. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3a, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed. The CPU 81 controls the oscillating motor 300, which oscillates the playing unit 3, based on data and a program stored in the ROM 82 and the RAM 83, and oscillates the playing board 3a of the playing unit 3. Furthermore, after oscillation of the playing board 3a ceases, a control processing associated with game progression, such as confirmation processing for confirming the number of dots on each of the dice 70 resting on the playing board 3a.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16A:
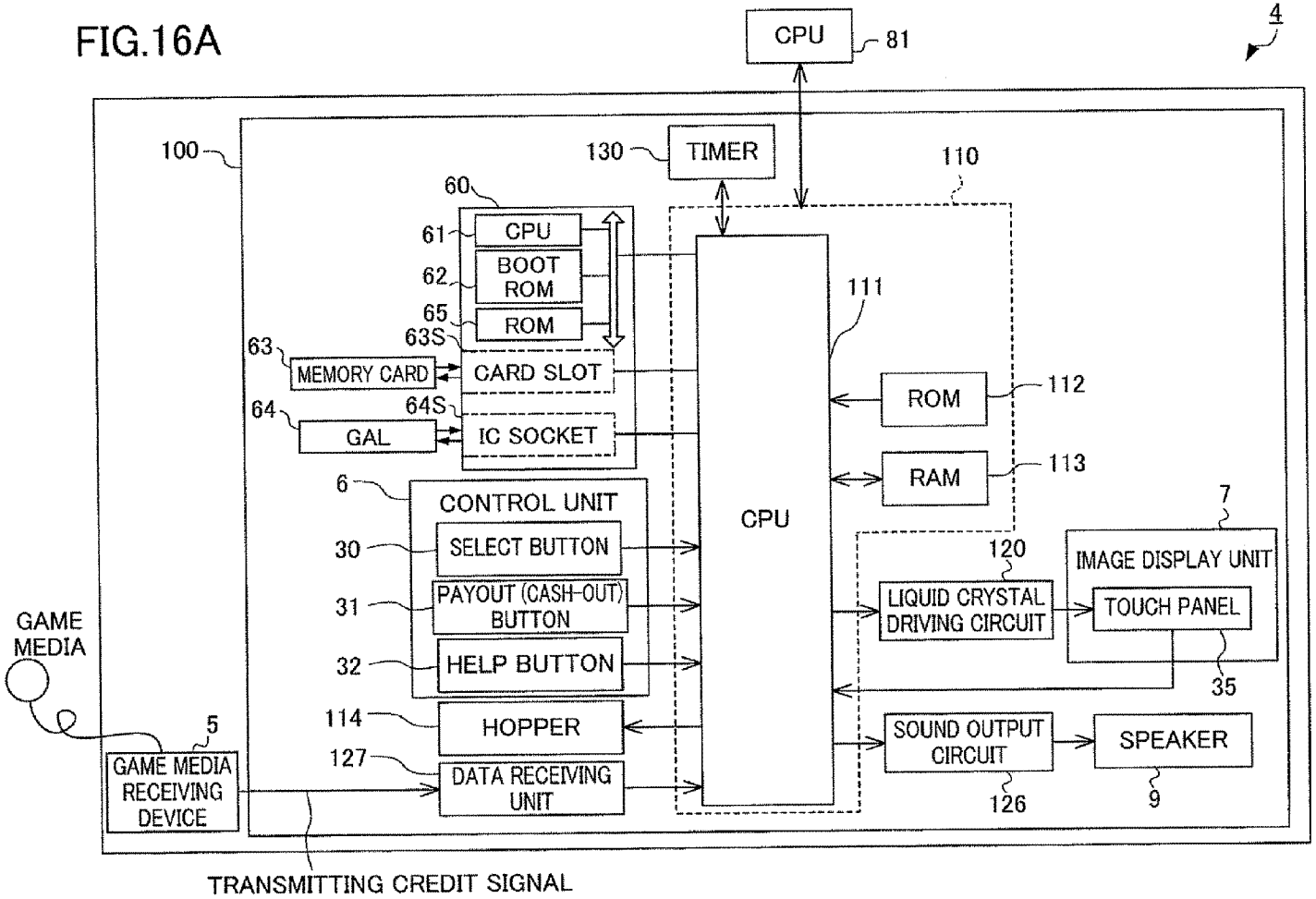
FIG. 16A is a block diagram showing the internal configuration of the station shown in FIG. 2A.

FIG. 16A is a block diagram showing the internal configuration of the station shown in FIG. 2A. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like more specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17A.

Figure 34A:
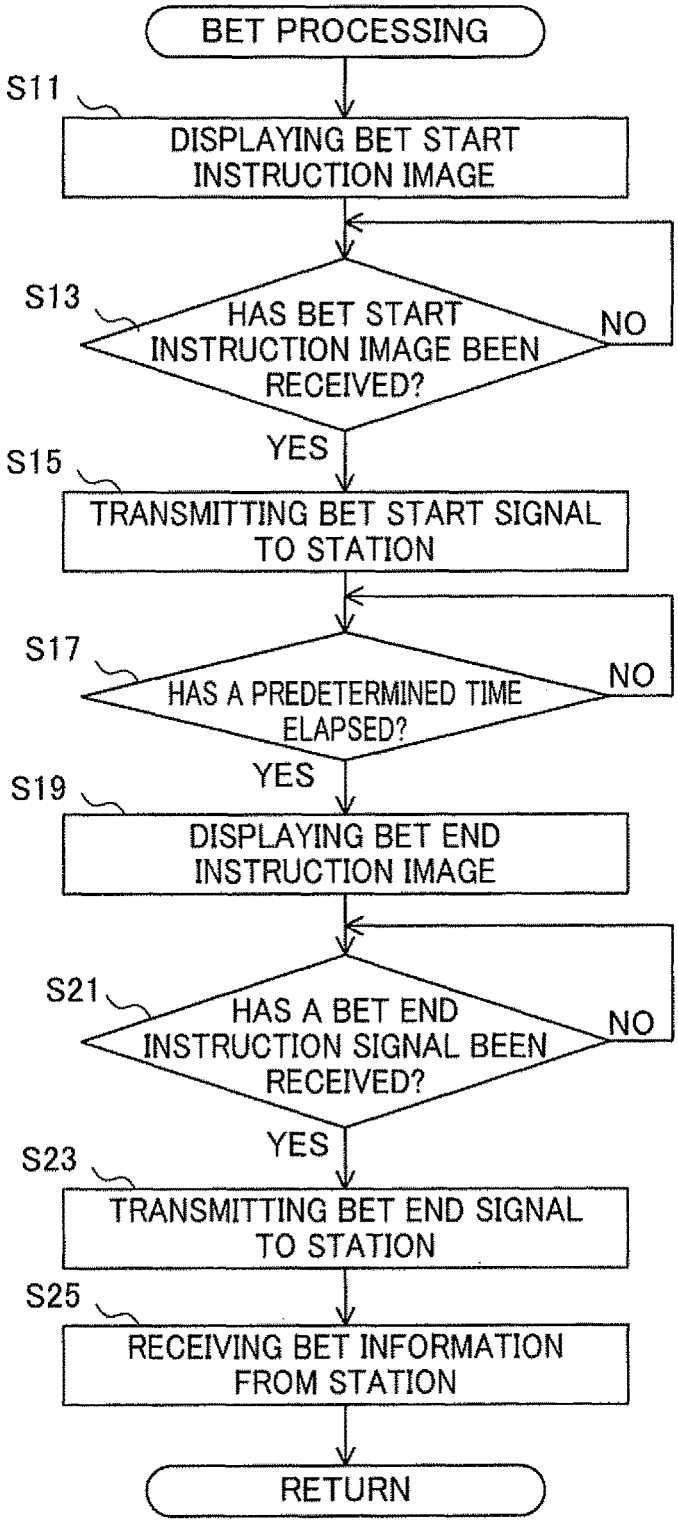
FIG. 34A is a flowchart showing bet processing executed in a gaming machine according to the embodiment of the present invention.

In Steps S11 and S19 of FIG. 34A, the instruction image display determination table is referred to by the CPU 81 upon determining whether a bet start instruction image or a bet end instruction image is displayed on the display screen 210a of the dealer used display 210.

According to this table, "X" is data for indicating that the bet start instruction image and the like is not displayed on the display screen 210a, and "O" is data for indicating that the bet start instruction image and the like is displayed on the display screen 210a. For example, in a case in which a dealer belongs to an intermediate level, the bet start instruction image is not displayed on the display screen 210a, but the bet end instruction image is displayed on the display screen 210a. In addition, this table is stored in the ROM 82.

The bet existence determination table is described with reference to FIG. 18A.

Figure 35A:
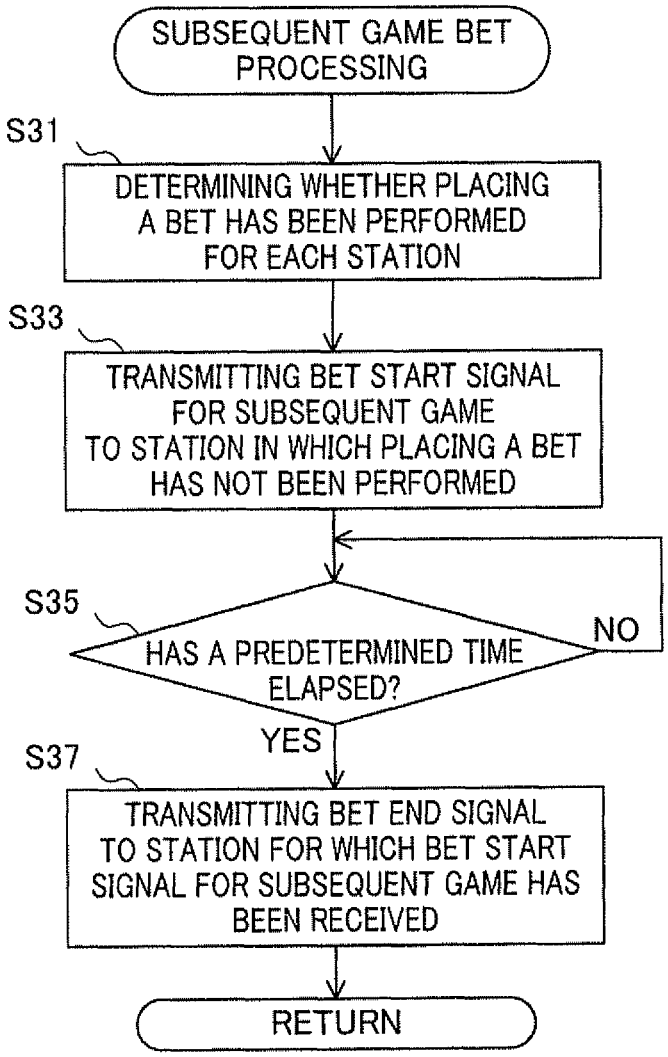
FIG. 35A is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 35A.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19A.

Figure 36A:
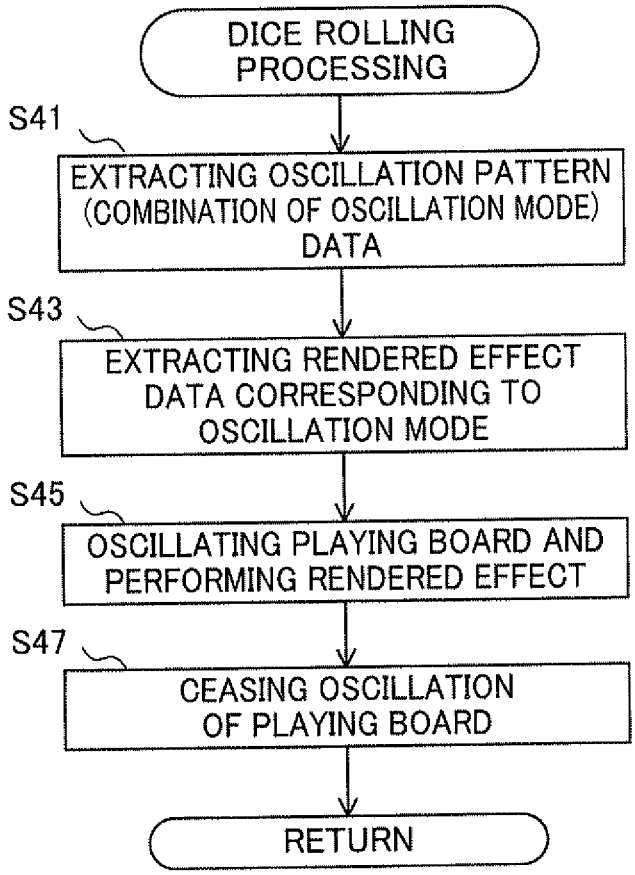
FIG. 36A is a flowchart showing dice rolling processing executed in a gaming machine according to the embodiment of the present invention.

The CPU 81 refers to this oscillation mode data table upon determining combination patterns of the oscillation modes of the playing board 3a in Step S41 of FIG. 36A. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3a is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20A.

The CPU 81 refers to this rendered effect table upon determining rendered effect data in response to an oscillation pattern of the playing board 3a in Step S43 of FIG. 36A. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21A.

The IC tag data table is a table showing data as identification data 1 to 3 which is created by the CPU 81 based on the results of the type of dice and the number of dots on the dice, when information stored in IC tags embedded in the dice 70a, 70b, and 70c is detected by the IC tag reader 16.

According to this table, for example, when an IC tag embedded in each die is detected in the order of 70c, 70a, and 70b, by the IC tag reader 16, the die 70c is associated with identification data 1 of which the type is "red" and the number of dots is "six", the die 70a is associated with identification data 2 of which the type is "white" and the number of dots is "three", and the die 70b is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera imaging data table is described with reference to FIG. 22A.

The infrared camera imaging data table is a data table showing dot patterns of the infrared absorption inks applied to the dice 70 and location data of the dice 70 on the playing board 3a.

For example, regarding the die 70a shown in FIG. 11A, in the infrared camera imaging data table, the CPU (not shown) inside the infrared camera 15 stores −50 for X and 55 for Y as location data, stores "○" for 181, 182, 184, 186, and 187, to which the infrared absorption inks are being applied, and stores "X" for 183 and 185, which are not being applied. The same is true of the dice 70b and 70c.

On the other hand, as shown in FIG. 13A, in a case where a plurality of faces of the dice 70 is imaged, the number of dots cannot be specified uniquely. In this case, the CPU (not shown) inside the infrared camera 15 calculates the area of the profiles 75 on the plurality of faces thus imaged, and generates the infrared camera imaging data table based on the dot patterns on the face that has a maximum area.

Therefore, even if the dice 70 come to rest at a tilt and a plurality of faces of the dice 70 is imaged, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23A.

According to this table, colors as the classification for the dice 70 are set so as to correspond to dot combinations to which the infrared absorption ink is applied, among the abovementioned dots 181 to 183 in FIG. 10A. "○" indicates that the infrared absorption ink is applied to the dot, and "X" indicates that the infrared absorption ink is not applied to the dot.

For example, in a case where the infrared camera imaging data table described in FIG. 22A is transmitted to the CPU 81, the CPU 81 determines the classification of the dice 70 as "red" by comparing the infrared camera imaging data table with the dot pattern data classification table.

A number of dots-dot pattern data table is described with reference to FIG. 24A.

According to this table, numbers as the number of dots on the dice 70 are set so as to correspond to dot combinations to which the infrared absorption ink is applied, among the abovementioned dots 184 to 187 in FIG. 10A. "○" indicates that the infrared absorption ink is applied to the dot, and "X" indicates that the infrared absorption ink is not applied to the dot.

For example, in a case where the infrared camera imaging data table shown in FIG. 22A is transmitted from the infrared camera 15 to the CPU 81, the CPU 81 determines the number of dots on the dice 70 as "five" by comparing the infrared camera imaging data table thus received with the dot pattern data classification table.

A position, classification, and number of dots data table is described with reference to FIG. 25A.

This table stores a position on the playing board 3a of the dice 70 and the number of dots of the dice 70 for each classification of the dice, and further stores the position on the playing board 3a of the dice 70 and the number of dots of the dice 70 in each game. It should be noted that this table is stored in the RAM 83.

Furthermore, a position and number of dots of the dice 70 imaged by the infrared camera 15 in each game is stored by the CPU 81 in this table.

A classification and number of dots data table is described with reference to FIG. 26A.

This table stores the number of dots on the dice 70 for each classification of dice, and further stores the number of dots on the dice 70 in each game. It should be noted that this table is stored in the RAM 83.

Furthermore, a classification and number of dots of the dice 70 detected by the IC tag reader in each game is stored by the CPU 81 in this table based on identification data 1 to 3.

A bet start instruction image is described with reference to FIG. 27A.

The bet start instruction image is displayed by the CPU 81 on the display screen 210a of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

A bet end not recommended image is described with reference to FIG. 28A.

This bet end not recommended image is displayed by the CPU 81 on the display screen 210a of the dealer used display 210 while the CPU 81 accepts a bet from each station 4.

This bet end not recommended image instructs the dealer not to touch a "bet end" button.

A bet end instruction image is described with reference to FIG. 29A.

The bet end instruction image is displayed by the CPU 81 on the display screen 210a of the dealer used display 210 after elapse of a predetermined time from when the CPU 81 starts accepting a bet from each station 4.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 30A.

Figure 30A:
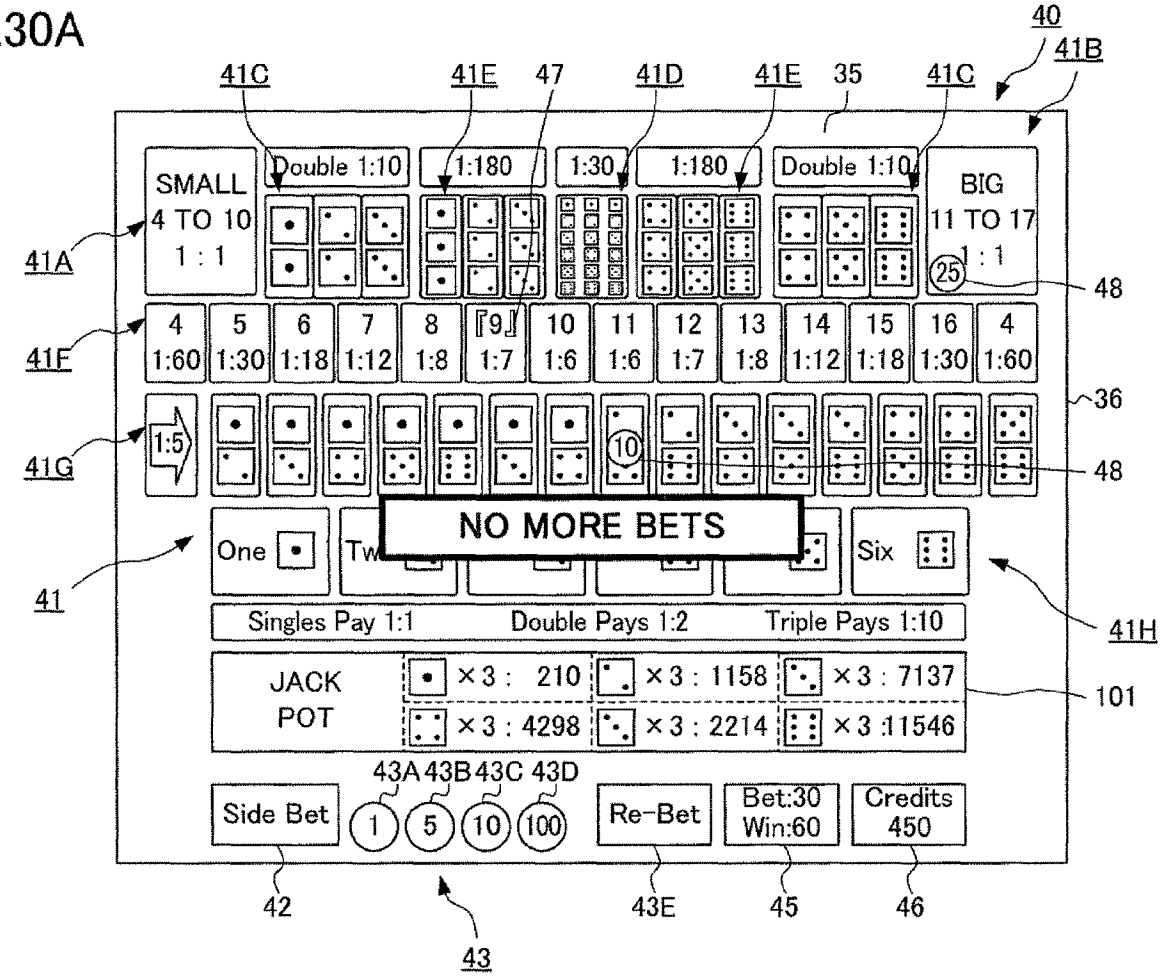

An image shown in FIG. 30A is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 31A.

Figure 31A:
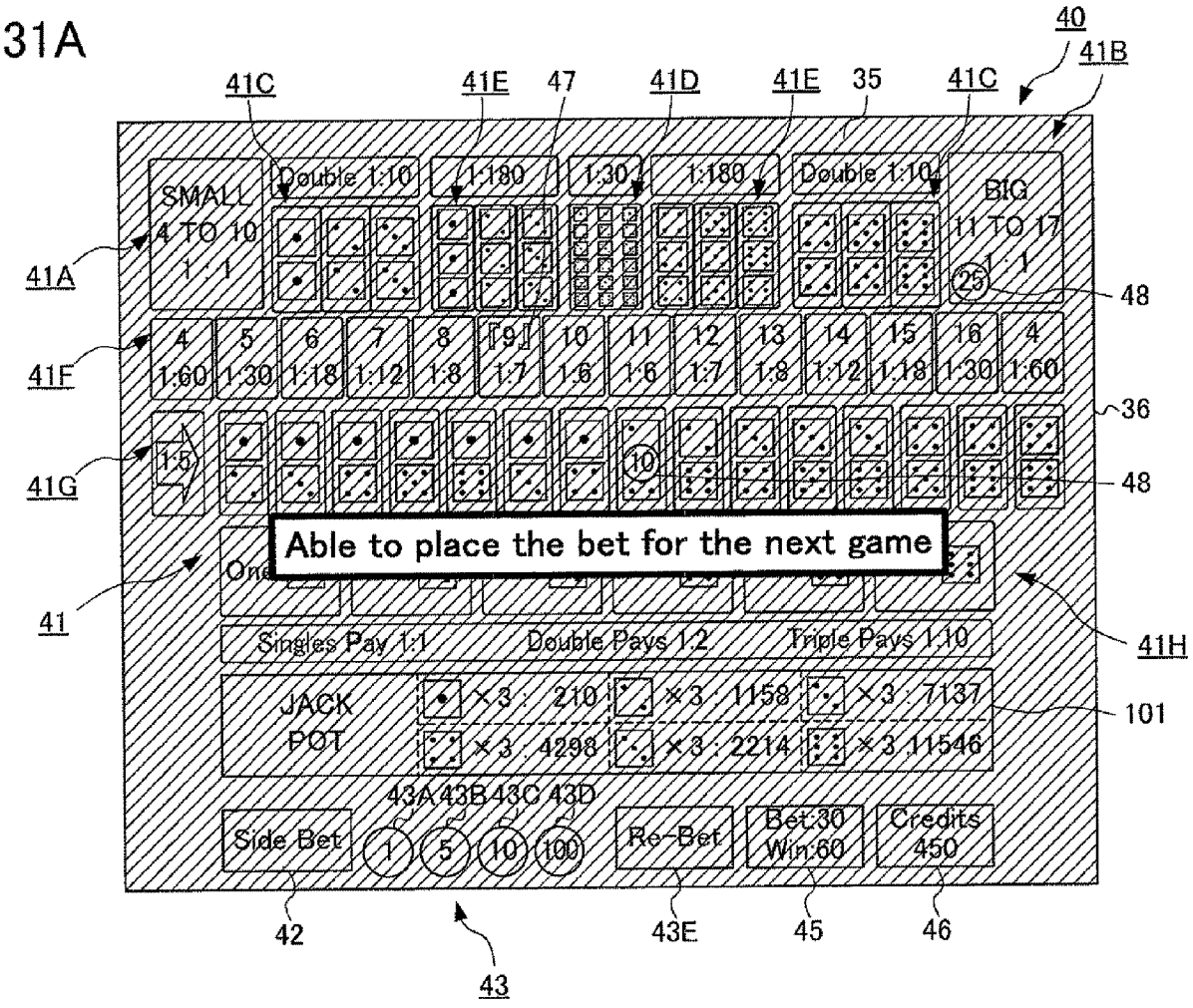

The image shown in FIG. 31A is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Figure 32A:
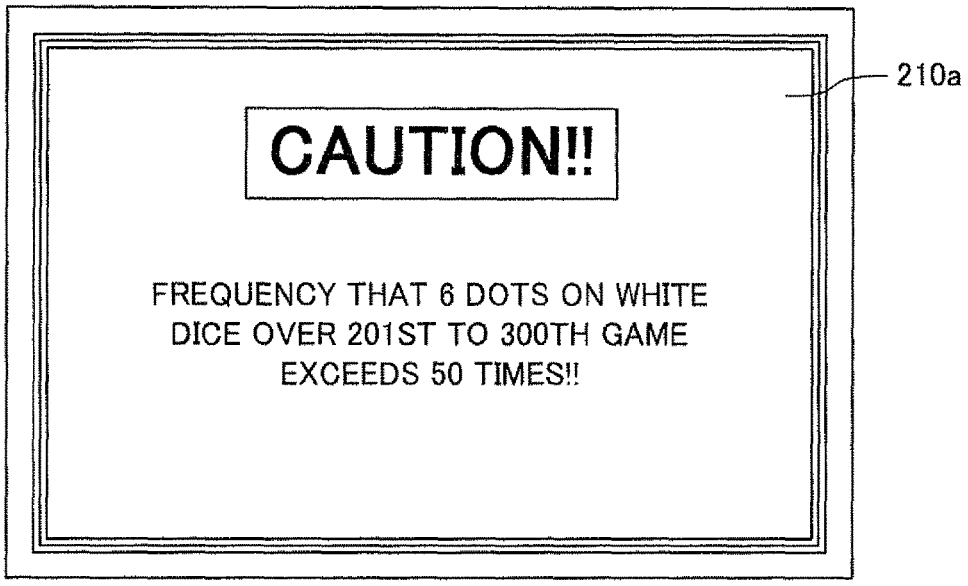
FIG. 32A shows an example of a display screen according to the embodiment of the present invention.

The image shown in FIG. 32A is displayed on a display screen 210a of the dealer used display 210 in a case in which a frequency at which a specific number of dots (for example, 6) of a specific die (for example, a white die) appearing over 100 games exceeds a predetermined number (for example, 50 times).

FIG. 32A shows a message "FREQUENCY THAT 6 DOTS APPEAR ON WHITE DIE OVER 201ST TO 300TH GAME EXCEEDS 50 TIMES!!".

Thus, in a case in which a specific number of dots of a specific classification of die appears frequently and the like, damage to a die or fraudulence related to a die can be detected.

Subsequently, with reference to FIGS. 33A to 37A, processing performed in the main control unit of a gaming machine according to the present embodiment is described.

Figure 33A:
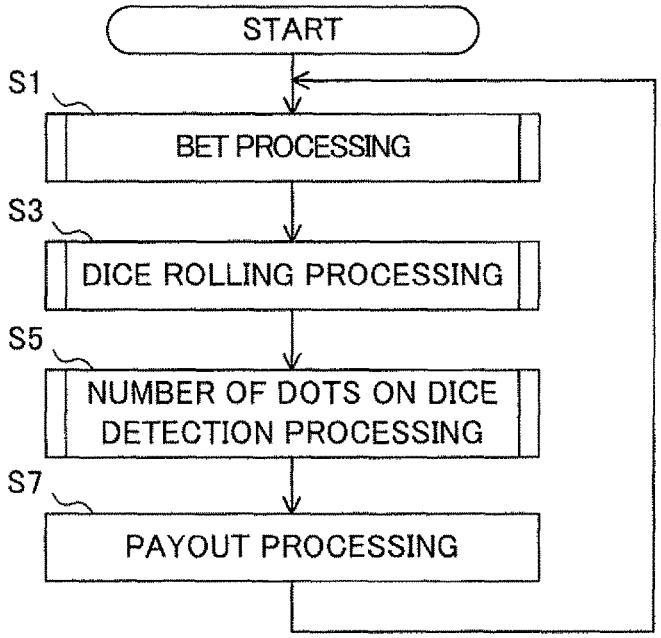
FIG. 33A is a flowchart showing dice game processing executed in a gaming machine according to the embodiment of the present invention.

FIG. 33A is a flowchart showing dice game execution processing. Initially, in Step S1, the CPU 81 executes bet processing, which is described later in FIG. 34A, and in Step S3, the CPU 81 executes dice rolling processing, which is described later in FIG. 36A. In Step S5, the CPU 81 executes number of dots on dice detection processing 1 (described later in FIG. 37A) or number of dots on dice detection processing 2 (described later in FIG. 38A) and, in Step 7, executes payout processing corresponding to the number of dots, and then the flow returns to Step 1.

FIG. 34A is a flowchart showing bet processing.

In Step S11, the CPU 81 displays the bet start instruction image (see FIG. 27A) on the display screen 210a of the dealer used display 210. It should be noted that, whether or not the bet start instruction image is displayed may be determined according to a dealer's level with reference to the instruction image display determination (see FIG. 17A).

Thus, according to the dealer's level, it becomes possible to determine whether the bet start instruction image is displayed on the display screen 210a of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 29A) on the display screen 210a of the dealer used display 210. It should be noted that, whether or not the bet end instruction image is displayed may be determined according to a dealer's level with reference to the instruction image display determination (see FIG. 17A).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 30A).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18A). Upon terminating the processing of Step S25, the CPU 81 terminates the bet processing.

With the bet processing of the present embodiment, even an inexperienced dealer can perform start operations for bet placement and end operations according to instructional images.

FIG. 35A is a flowchart showing subsequent game bet processing.

The subsequent game bet processing is started by the CPU 81 and executed parallel to the dice rolling processing in FIG. 33A when the bet processing described in FIG. 34A is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18A).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 31A) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 36A is a flowchart showing dice rolling processing. In Step S41, the CPU 81 extracts an oscillation pattern (combinations of oscillation modes) data from the ROM 82. More specifically, the CPU 81 refers to an oscillation mode data table (see FIG. 19A) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20A) and extracts rendered effect data corresponding to an oscillation mode based on an oscillation pattern data thus extracted in Step S41.

In Step S45, the CPU 81 oscillates the playing board 3a and performs a rendered effect. More specifically, the CPU 81 oscillates the playing board 3a by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3a is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3a. More specifically, the CPU 81 ceases the oscillation of the playing board 3a by stopping the oscillation motor 300. Upon terminating the processing in Step S47, the CPU 81 terminates the dice rolling processing.

Figure 37A:
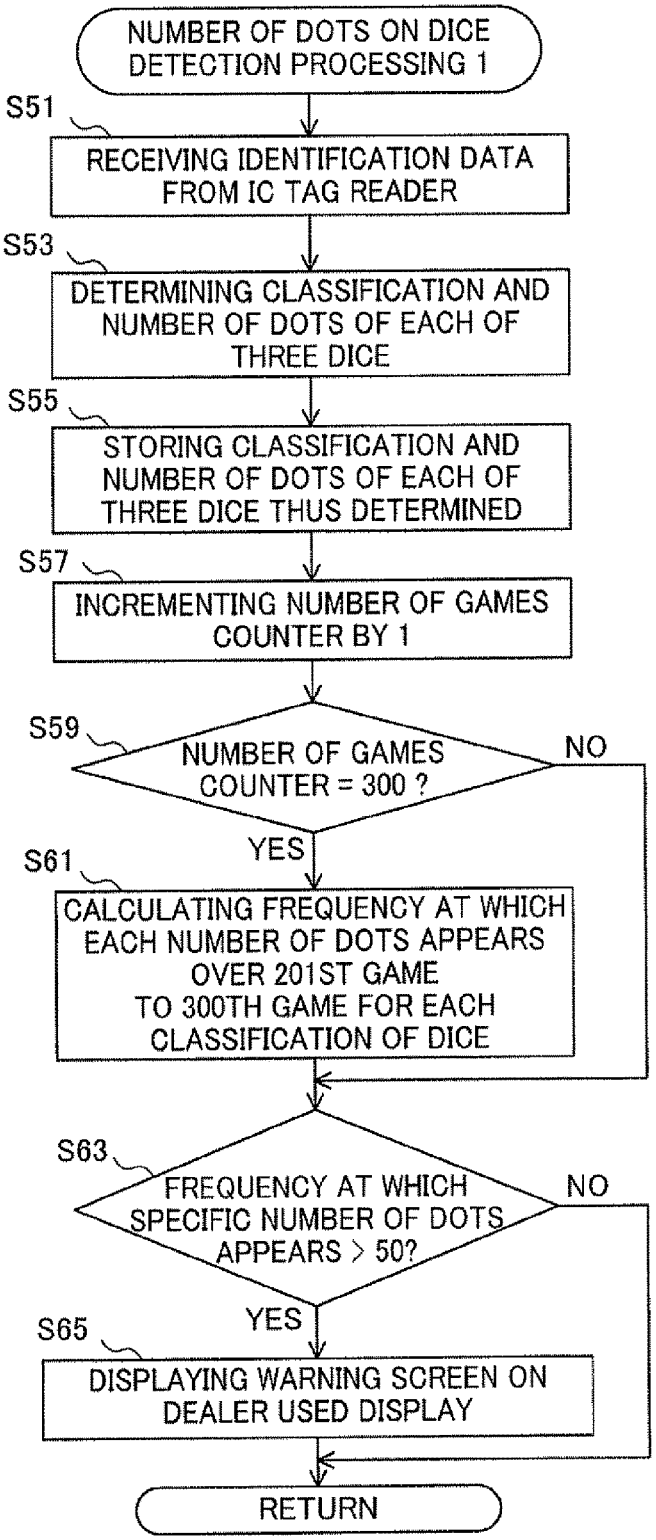
FIG. 37A is a flowchart showing dots on dice detection processing 1 executed in a gaming machine according to the embodiment of the present invention.

FIG. 37A is a flowchart showing number of dots on dice detection processing 1.

In Step S51, the CPU 81 receives identification data from the IC tag reader 16. More specifically, the CPU 81 receives identification data 1 to 3 (data in which a classification and number of dots of each of the dice 70a, 70b, and 70c are stored) that configures the IC tag data table (see FIG. 21A) from the IC tag reader 16. In Step S53, the CPU 81 determines a classification and number of dots of each of the three dice. More specifically, the CPU 81 determines a classification (color) and number of dots of each of the dice 70a, 70b, and 70c based on the identification data 1 to 3 that configures the IC tag data table (see FIG. 21A).

In Step S55, the CPU 81 stores the classification and number of dots of each of the three dice thus determined in memory. More specifically, the CPU 81 stores the classifications and numbers of dots thus determined in Step S53 in the classification and number of dots data table (see FIG. 26A) stored in the RAM 83.

In Step S57, the CPU 81 increments a number of games counter by 1. The number of games counter is provided in a predetermined area of the RAM 83.

In Step S59, the CPU 81 determines whether a value of the number of games counter is 300. In the case of a YES determination, the CPU 81 advances the processing to Step S61, and in the case of a NO determination, the CPU 81 advances the processing to Step S63.

In Step S61, the CPU 81 calculates a frequency at which each of a number of dots on dice appears during a 201st game to 300th game for each classification of dice. More specifically, with reference to the classification and number of dots data table (see FIG. 26A), the CPU 81 calculates a frequency at which each of a number of dots on dice appears during a 201st games to 300th games for each classification of dice.

In Step S63, the CPU 81 determines whether the frequency at which a specific number of dots appears is more than 50 times. In the case of a YES determination, the CPU 81 advances the processing to Step S65, and in the case of a NO determination, the CPU 81 terminates the number of dots on dice detection processing. In Step S65, the CPU 81 displays a caution screen on a dealer used display. More specifically, the CPU 81 displays the image shown in FIG. 32A on the display screen 210a. Upon terminating the processing in Step S65, the CPU 81 terminates the number of dots detection processing 1.

Thus, in a case in which a specific number of dots of a specific classification of die appears frequently and the like, damage to a die or fraudulence related to a die can be detected.

It should be noted that, in Step S63, although the CPU 81 determines whether the frequency at which a specific number of dots appears is more than 50 times, it is not limited thereto, and may determine for each classification of the dice whether a number of the dots on dice appears consecutively over a predetermined consecutive games (for example, 10 games). In a case of appearing consecutively over a predetermined number of games, an image including a message of "3 DOTS APPEARS ON BLACK DIE IN 10 CONSECUTIVE GAMES!!", for example, may be displayed as a warning image on the display screen 210a of the dealer used display 210.

Furthermore, it is not limited to display a warning screen in Step S65, and the CPU may interrupt a game.

Thus, it is possible to prevent a game from continuing in a case in which a specific number of dots of a specific classification of die appears frequently and the like due to damage to a die or fraudulence related to a die.

Figure 38A:
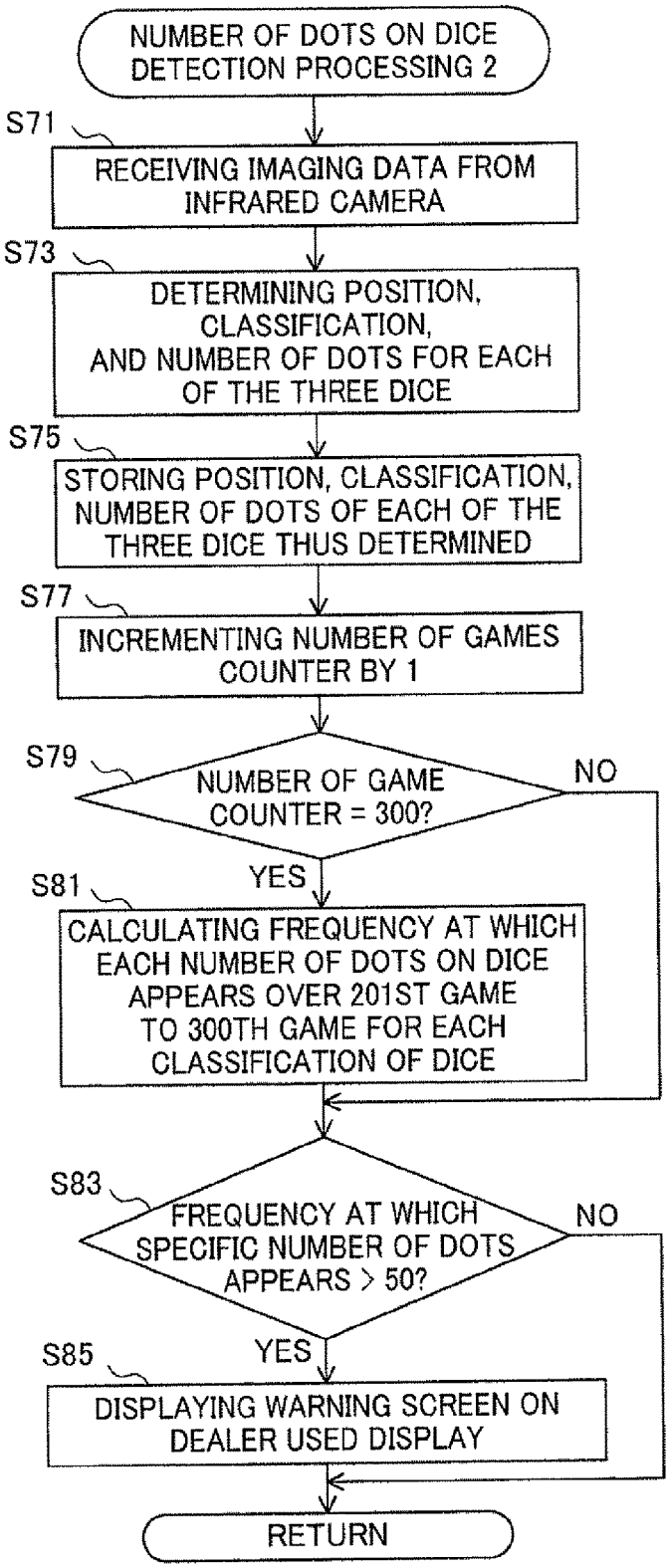
FIG. 38A is a flowchart showing dots on dice detection processing 2 executed in a gaming machine according to the embodiment of the present invention.

FIG. 38A is a flowchart showing number of dots on dice detection processing 2. The number of dots on dice detection processing 2 is a modified example of the number of dots on dice detection processing 1.

In Step S71, the CPU 81 receives imaging data from the infrared camera. More specifically, the CPU 81 receives the infrared camera imaging data table (see FIG. 22A) for each of the dice 70a, 70b, and 70c, from the infrared camera 15.

In Step S73, the CPU 81 determines a position, classification, and number of dots of each of the three dice. More specifically, the CPU 81 determines positions of the dice on the playing board 3a based on the infrared camera imaging data table (see FIG. 22A), determines types (colors) of the dice based on the infrared camera imaging data table (see FIG. 22A) and the dot pattern data classification table (see FIG. 23A), and determines numbers of the dice based on the infrared camera imaging data table (see FIG. 22A) and the number of dots-dot pattern data table (see FIG. 24A). This processing is executed for the three dice 70a, 70b, and 70c.

In Step S75, the CPU 81 stores a position, classification, and number of dots of each of the three dice thus determined in memory. More specifically, the CPU 81 stores the positions, classifications, and numbers of dots thus determined in Step S73 in the position, classification, and number of dots data table (see FIG. 25A) stored in the RAM 83.

In Step S77, the CPU 81 increments a number of games counter by 1. The number of games counter is provided in a predetermined area of the RAM 83.

In Step S79, the CPU 81 determines whether a value of the number of games counter is 300. In the case of a YES determination, the CPU 81 advances the processing to Step S81, and in the case of a NO determination, the CPU 81 advances the processing to Step S83.

In Step S81, the CPU 81 calculates a frequency at which each number of dots appears during a 201st game to 300th game for each classification of dice. More specifically, with reference to the position, classification and number of dots data table (see FIG. 25A), a frequency at which each number of dots appears during a 201st game to 300th game for each type of dice is calculated.

In Step S83, the CPU 81 determines whether the frequency at which a specific number of dots appears is more than 50 times. In the case of a YES determination, the CPU 81 advances the processing to Step S85, and in the case of NO, terminates the number of dots on dice detection processing 2.

In Step S85, the CPU 81 displays a warning screen on a dealer used display. More specifically, the CPU 81 displays the image shown in FIG. 32A on the display screen 210a. Upon terminating the processing of Step S85, the CPU 81 terminates the number of dots detection processing 2.

Thus, in a case in which a specific number of dots of a specific classification of die appears frequently and the like, damage to a die or fraudulence related to a die can be detected.

Furthermore, in Step S83, although the CPU 81 determines whether the frequency at which a specific number of dots appears is more than 50 times, it is not limited thereto, and may determine for each classification of dice whether a number of the dots on dice appears consecutively over a predetermined number of games (for example, 10 games) with reference to the position, classification and number of dots on dice data table (see FIG. 25A). In a case of appearing consecutively over a predetermined number of games, an image including a message of "3 DOTS APPEARS ON BLACK DIE IN 10 CONSECUTIVE GAMES!!", for example, is displayed as a warning image on the display screen 210a of the dealer used display 210.

Furthermore, it is not limited to display the warning screen in Step S85, and the CPU may interrupt a game.

Thus, it is possible to prevent a game from continuing in a case in which a specific number of dots of a specific classification of die appears frequently and the like due to damage to a die or fraudulence related to a die.

Descriptions regarding the present embodiment have been provided above. Although a case has been described in which the number of dice 70 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

Embodiments of the present invention will be described below with reference to the accompanying drawings.

Although described below in more detail, as shown in FIG. 1B, a CPU 81 starts a unit game (Step S100), determines an oscillation mode of a playing board 3a when the unit game starts (Step S200), extracts rendered effect data corresponding to the oscillation mode thus determined (Step S300) from ROM 82, and performs rendered effects based on the rendered effect data thus extracted (Step S400).

FIG. 2B is a perspective view schematically showing an example of a gaming machine according to the embodiment of this invention. FIG. 3B is an enlarged view of a playing unit of the gaming machine shown in FIG. 2B. As shown in FIG. 2B, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7. The playing unit 3 is configured so as to allow a plurality of dice to roll and stop. The present embodiment is configured to use three dice 70 (dice 70a, 70b, and 70c) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3a to, which is formed to be a circular shape, roll and then stop the dice 70. An IC tag reader 16, which is described later in FIGS. 6B to 9B, are provided below the playing board 3a.

Since the playing board 3a is formed to be substantially planar, as shown in FIG. 3B, the dice 70 are rolled by oscillating the playing board 3a substantially in the vertical direction with respect to the horizontal direction of the playing board 3a. Then, the dice 70 are stopped after the oscillation of the playing board 3a ceases. The playing board 3a is oscillated by a CPU 81 (described later) driving an oscillating motor 300.

Furthermore, as shown in FIG. 3B, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3a, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

FIG. 4B is an external perspective view of a die 70. As shown in FIG. 4B, the die 70 is a cube of which the length of a side is 100 mm.

FIG. 5B is a development view of the die 70. As shown in FIG. 5B, the combinations of two faces opposing each other are "1 and 6", "2 and 5", and "3 and 4".

FIGS. 6B to 9B show IC tag readable areas by an IC tag reader 16 disposed below the playing board 3a.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3a.

With reference to FIG. 6B, a face of the die 70 (for example, a face of which the number of dots is six) is in contact with the playing board 3a. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

With reference to FIG. 7B, a die 70 is inclined. However, since the IC tag 51 still exists in the readable area of the IC tag reader 16, the number of dots of the die 70 is determined as "one".

With respect to FIG. 8B, the die 70 is inclined at a greater angle than the case shown in FIG. 7B. Then, since there is no IC tag which exists in the readable area of the IC tag reader 16, the IC tag reader 16 cannot detect the number of dots of the die 70.

With reference to FIG. 9B, the die 70b is superimposed on the die 70a. In this case, neither of the IC tags 55, 56, 57, and 58, which are embedded in the die 70b, exists in the readable area of the IC tag reader 16. Therefore, in this case, the IC tag reader 16 cannot detect the number of dots of the die 70b.

FIG. 10B shows a sheet 140 attached to each face of the die 70.

As shown in FIG. 10B, on each face of the die 70, the sheet 140, to which infrared absorption ink is applied to identify the number of dots and the type of the die 70, is provided so as to be covered by a sheet on which the number of dots is printed. According to FIG. 10B, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

FIG. 11B shows an image in which the dice 70, which comes to rest on the playing board 3a, are imaged substantially in the vertically upward direction using an infrared camera 15.

With reference to FIG. 11B, dots to which the infrared absorption ink is applied on each of the dice 70a, 70b, and 70c are imaged in black. The type and the number of dots for each of the dice 70a, 70b, and 70c are determined based on a combination of the dots to which the ink is applied. In addition, the playing board 3a is formed in a disc shape having a radius a, and each position of the dice 70a, 70b, and 70c is detected as an x component and y component on an x-y coordinate.

FIG. 12B shows a sheet 150 which is attached to each face of the dice 70.

As shown in FIG. 12B, a circular profile 75 having a certain area on each face of the dice 70 in common is depicted by way of applying the infrared absorption ink on each face of the dice 70. The sheet 150 on which the circular profile 75 is depicted is provided so as to be covered by the abovementioned sheet 140.

Figure 13B:
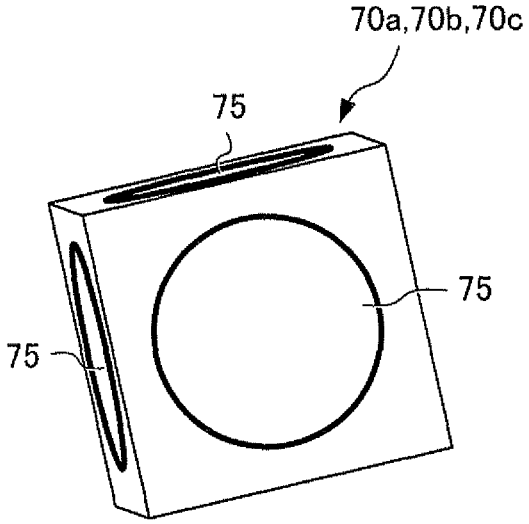
FIG. 13B shows an image in which a die according to the embodiment of the present invention that has come to rest at a tilt on a playing board, is imaged substantially in the vertically upward direction by an infrared camera.

FIG. 13B shows an image in which the die 70, which comes to rest at a tilt on a playing board 3a, is imaged substantially in the vertically upward direction using the infrared camera 15.

With reference to FIG. 13B, three faces of the die 70 are imaged. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus imaged, and distinguishes the number of dots of the face on which the circular profile 75 having the largest area among the areas thus calculated is printed as the correct number of dots.

Figure 14B:
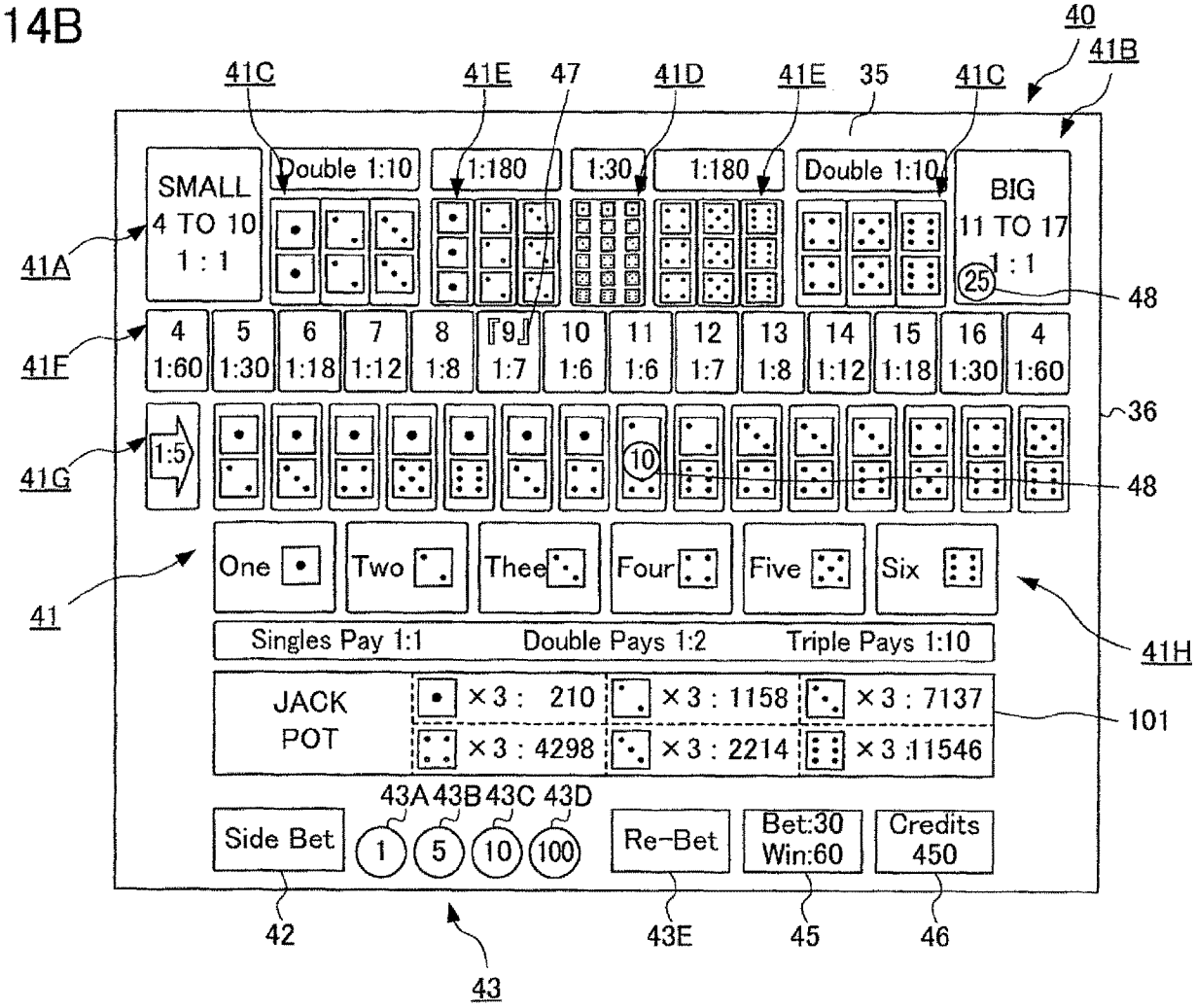
FIG. 14B shows an example of a display screen according to the embodiment of the present invention.

FIG. 14B shows an example of a display screen displayed on an image display unit. As shown in FIG. 14B, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying, chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15B:
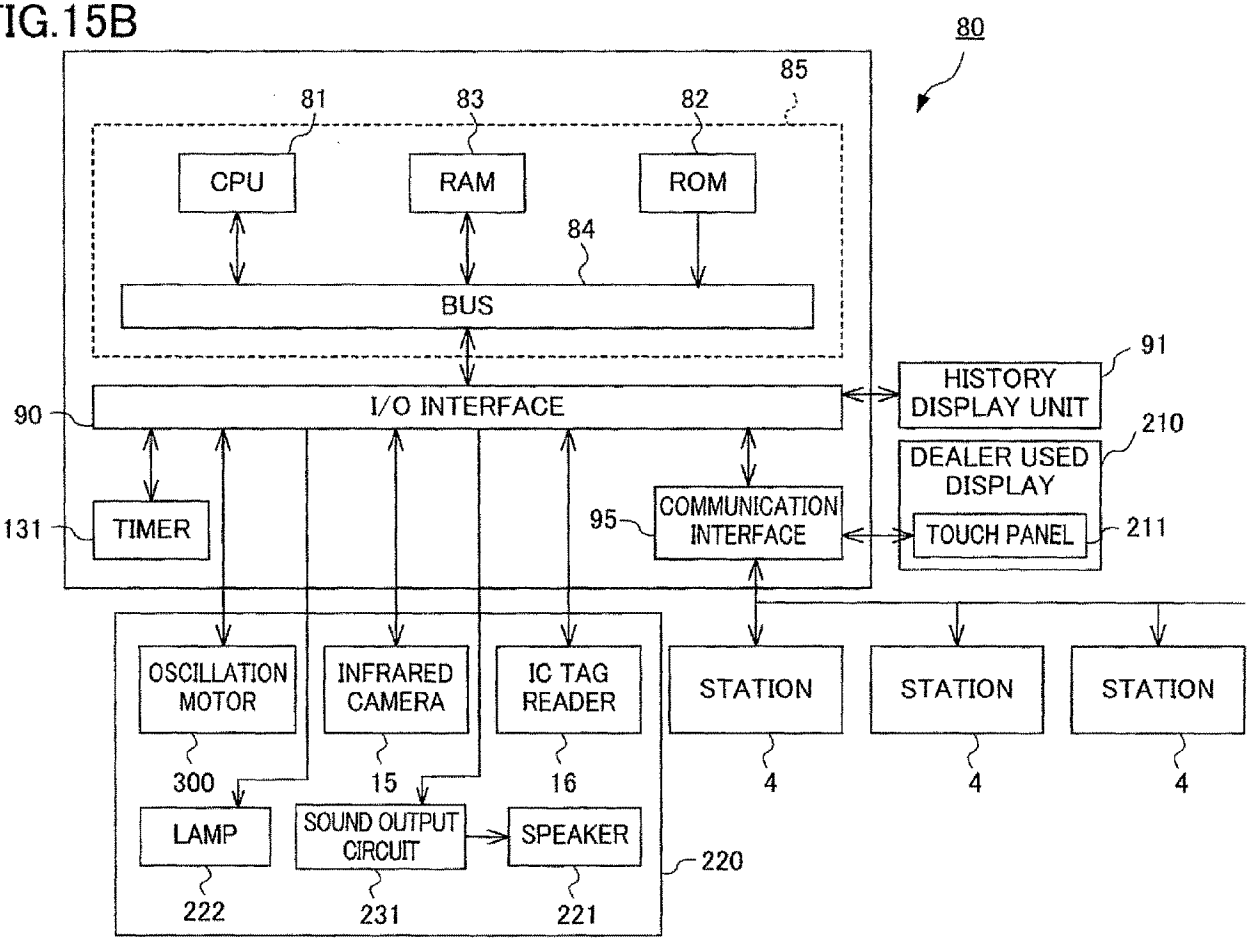
FIG. 15B is a block diagram showing the internal configuration of the gaming machine shown in FIG. 2B.

FIG. 15B is a block diagram showing the internal configuration of the gaming machine shown in FIG. 2B. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3a, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed. The CPU 81 controls the oscillating motor 300, which oscillates the playing unit 3, based on data and a program stored in the ROM 82 and the RAM 83, and oscillates the playing board 3a of the playing unit 3. Furthermore, after oscillation of the playing board 3a ceases, a control processing associated with game progression, such as confirmation processing for confirming the number of dots on each of the dice 70 resting on the playing board 3a.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16B:
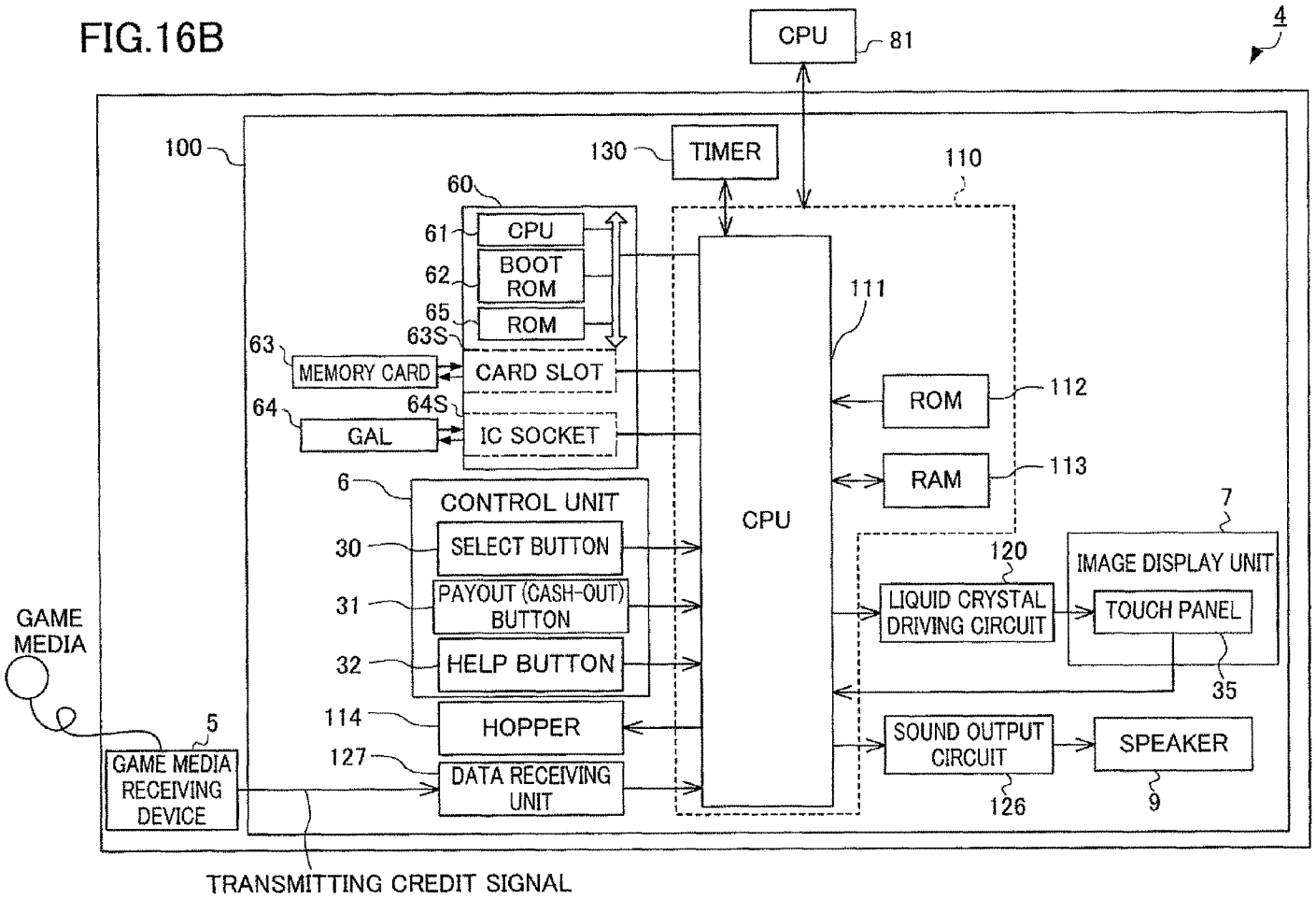
FIG. 16B is a block diagram showing the internal configuration of the station shown in FIG. 2B.

FIG. 16B is a block diagram showing the internal configuration of the station shown in FIG. 2B. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17B.

Figure 31B:
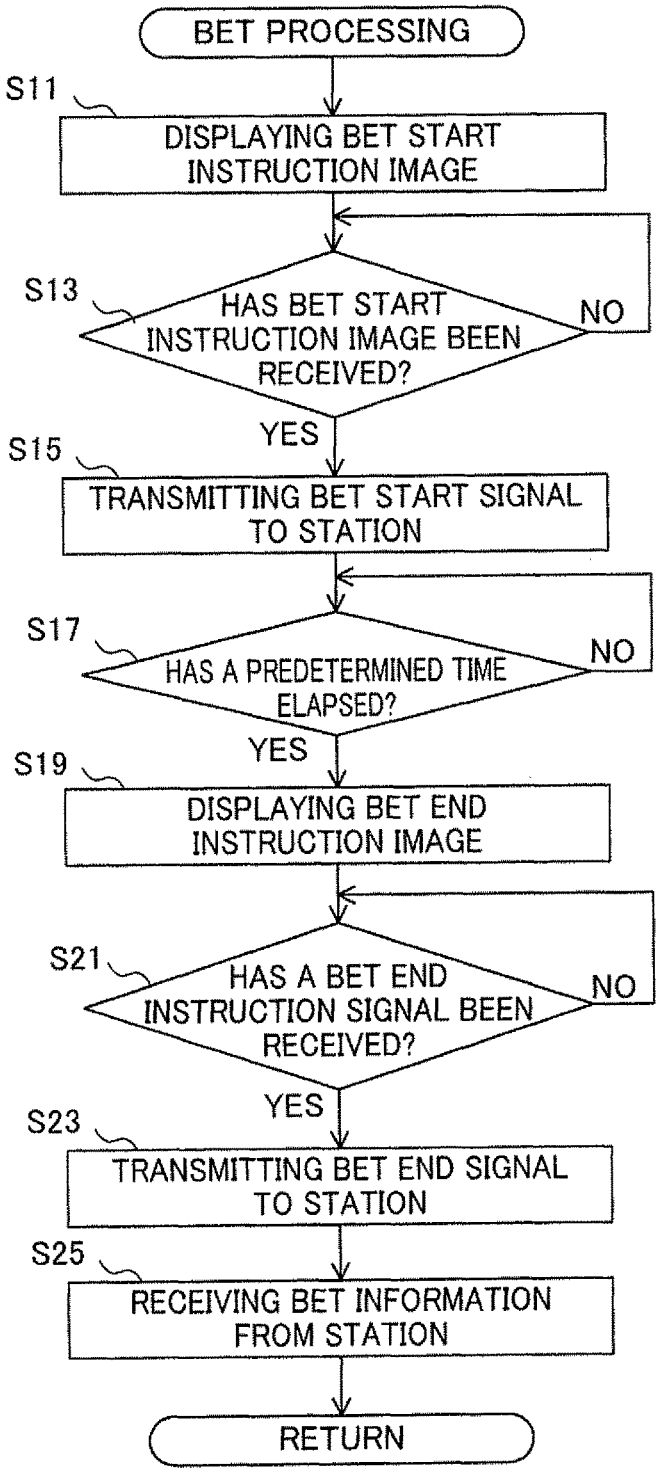
FIG. 31B is a flowchart showing bet processing executed in a gaming machine according to the embodiment of the present invention.

In Steps S11 and S19 of FIG. 31B, the instruction image display determination table is referred to by the CPU 81 upon determining whether a bet start instruction image or a bet end instruction image is displayed on the display screen 210a of the dealer used display 210.

According to this table, "X" is data for indicating that the bet start instruction image and the like is not displayed on the display screen 210a, and "○" is data for indicating that the bet start instruction image and the like is displayed on the display screen 210a. For example, in a case in which a dealer belongs to an intermediate level, the bet start instruction image is not displayed on the display screen 210a, but the bet end instruction image is displayed on the display screen 210a. In addition, this table is stored in the ROM 82.

The bet existence determination table is described with reference to FIG. 18B.

Figure 32B:
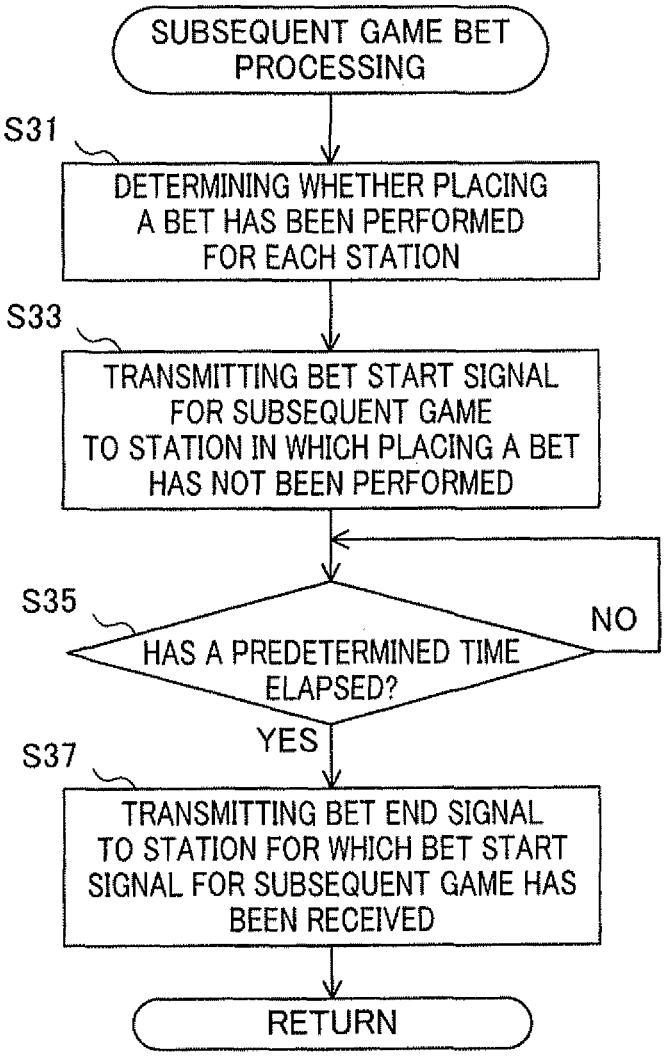
FIG. 32B is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 32B.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19B.

The CPU 81 refers to this oscillation mode data table upon determining combination patterns of the oscillation modes of the playing board 3a. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3a is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20B.

Figure 33B:
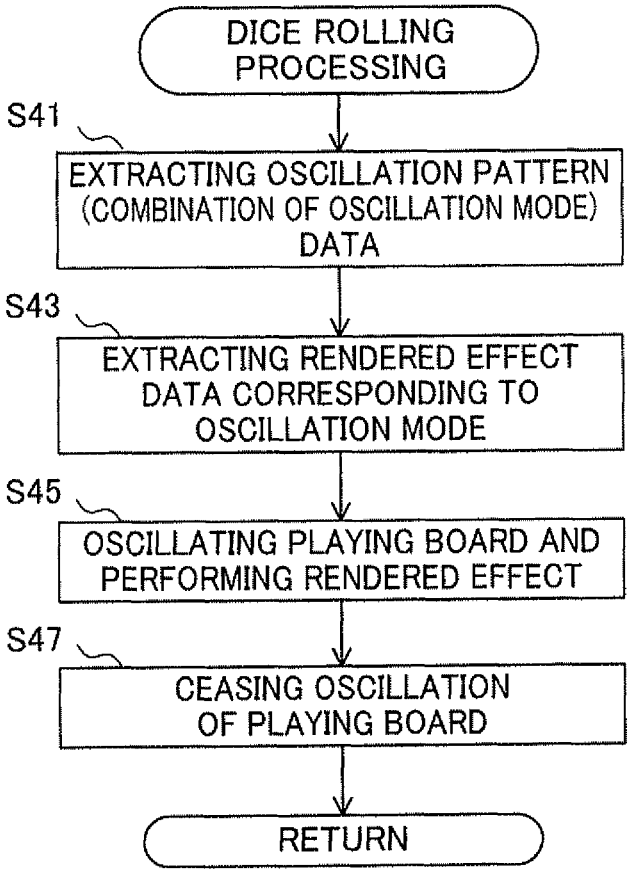
FIG. 33B is a flowchart showing dice rolling processing executed in a gaming machine according to the embodiment of the present invention.

The CPU 81 refers to this rendered effect table upon determining rendered effect data in response to an oscillation pattern of the playing board 3a in Step S43 of FIG. 33B. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21B.

The IC tag data table is a table showing data as identification data 1 to 3 which is created by the CPU 81 based on the results of the type of dice and the number of dots on the dice, when information stored in IC tags embedded in the dice 70a, 70b, and 70c is detected by the IC tag reader 16.

According to this table, for example, when an IC tag embedded in each die is detected in the order of 70c, 70a, and 70b, by the IC tag reader 16, the die 70c is associated with identification data 1 of which the type is "red" and the number of dots is "six", the die 70a is associated with identification data 2 of which the type is "white" and the number of dots is "three", and the die 70b is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera imaging data table is described with reference to FIG. 22B.

The infrared camera imaging data table is a data table showing dot patterns of the infrared absorption inks applied to the dice 70 and location data of the dice 70 on the playing board 3a.

For example, regarding the die 70a shown in FIG. 11B, in the infrared camera imaging data table, the CPU (not shown) inside the infrared camera 15 stores −50 for X and 55 for Y as location data, stores "○" for 181, 182, 184, 186, and 187, to which the infrared absorption inks are being applied, and stores "X" for 183 and 185, which are not being applied. The same is true of the dice 70b and 70c.

On the other hand, as shown in FIG. 13B, in a case where a plurality of faces of the dice 70 is imaged, the number of dots cannot be specified uniquely. In this case, the CPU (not shown) inside the infrared camera 15 calculates the area of the profiles 75 on the plurality of faces thus imaged, and generates the infrared camera imaging data table based on the dot patterns on the face that has a maximum area.

Therefore, even if the dice 70 come to rest at a tilt and a plurality of faces of the dice 70 is imaged, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23B.

According to this table, colors as the classification for the dice 70 are set so as to correspond to dot combinations to which the infrared absorption ink is applied, among the abovementioned dots 181 to 183 in FIG. 10B. "○" indicates that the infrared absorption ink is applied to the dot, and "X" indicates that the infrared absorption ink is not applied to the dot.

For example, in a case where the infrared camera imaging data table described in FIG. 22B is transmitted to the CPU 81, the CPU 81 determines the classification of the dice 70 as "red" by comparing the infrared camera imaging data table with the dot pattern data classification table.

A number of dots-dot pattern data table is described with reference to FIG. 24B.

According to this table, numbers as the number of dots on the dice 70 are set so as to correspond to dot combinations to which the infrared absorption ink is applied, among the abovementioned dots 184 to 187 in FIG. 10B. "○" indicates that the infrared absorption ink is applied to the dot, and "X" indicates that the infrared absorption ink is not applied to the dot.

For example, in a case where the infrared camera imaging data table shown in FIG. 22B is transmitted from the infrared camera 15 to the CPU 81, the CPU 81 determines the number of dots on the dice 70 as "five" by comparing the infrared camera imaging data table thus received with the dot pattern data classification table.

A bet start instruction image is described with reference to FIG. 25B.

The bet start instruction image is displayed by the CPU 81 on the display screen 210a of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

A bet end not recommended image is described with reference to FIG. 26B.

This bet end not recommended image is displayed by the CPU 81 on the display screen 210a of the dealer used display 210 while the CPU 81 accepts a bet from each station 4.

This bet end not recommended image instructs the dealer not to touch a "bet end" button.

A bet end instruction image is described with reference to FIG. 27B.

The bet end instruction image is displayed by the CPU 81 on the display screen 210a of the dealer used display 210 after elapse of a predetermined time from when the CPU 81 starts accepting a bet from each station 4.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 283.

An image shown in FIG. 28B is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 29B.

The image shown in FIG. 29B is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Subsequently, with reference to FIGS. 30B to 34B, processing performed in the main control unit of a gaming machine according to the present embodiment is described.

Figure 30B:
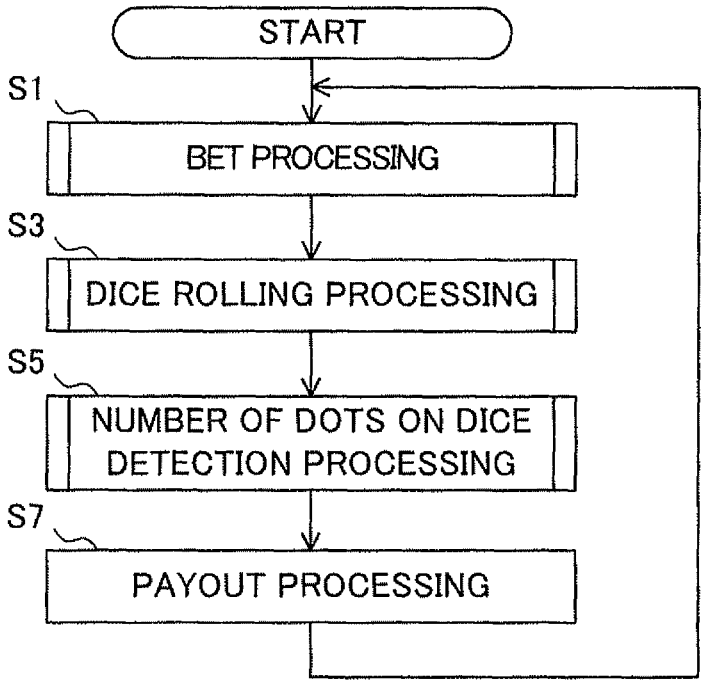
FIG. 30B is a flowchart showing dice game processing executed in a gaming machine according to the embodiment of the present invention.

FIG. 30B is a flowchart showing dice game execution processing. Initially, in Step S1, the CPU 81 executes bet processing, which is described later in FIG. 31B, and in Step S3, the CPU 81 executes dice rolling processing, which is described later in FIG. 33B. In Step S5, the CPU 81 executes number of dots on dice detection processing, which is described later in FIG. 34B and, in Step 7, executes payout processing corresponding to the number of dots, and then the flow returns to Step 1.

FIG. 31B is a flowchart showing bet processing.

In Step S11, the CPU 81 displays the bet start instruction image (see FIG. 25B) on the display screen 210a of the dealer used display 210. It should be noted that, whether or not the bet start instruction image is displayed may be determined according to a dealer's level with reference to the instruction image display determination (see FIG. 17B).

Thus, according to the dealer's level, it becomes possible to determine whether the bet start instruction image is displayed on the display screen 210a of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 27B) on the display screen 210a of the dealer used display 210. It should be noted that, whether or not the bet end instruction image is displayed may be determined according to a dealer's level with reference to the instruction image display determination (see FIG. 17B). In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 28B).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18B). Upon terminating the processing of Step S25, the CPU 81 terminates the bet processing.

With the bet processing of the present embodiment, even an inexperienced dealer can perform start operations for bet placement and end operations according to instructional images.

FIG. 32B is a flowchart showing subsequent game bet processing.

The subsequent game bet processing is started by the CPU 81 and executed parallel to the dice rolling processing in FIG. 30B when the bet processing described in FIG. 31B is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18B).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29B) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 33B is a flowchart showing dice rolling processing. In Step S41, the CPU 81 extracts an oscillation pattern (combinations of oscillation modes) data from the ROM 82. More specifically, the CPU 81 refers to an oscillation mode data table (see FIG. 19B) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20B) and extracts rendered effect data corresponding to an oscillation mode based on an oscillation pattern data thus extracted in Step S41.

In Step S45, the CPU 81 oscillates the playing board 3a and performs a rendered effect. More specifically, the CPU 81 oscillates the playing board 3a by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3a is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3a. More specifically, the CPU 81 ceases the oscillation of the playing board 3a by stopping the oscillation motor 300. Upon terminating the processing in Step S47, the CPU 81 terminates the dice rolling processing.

Figure 34B:
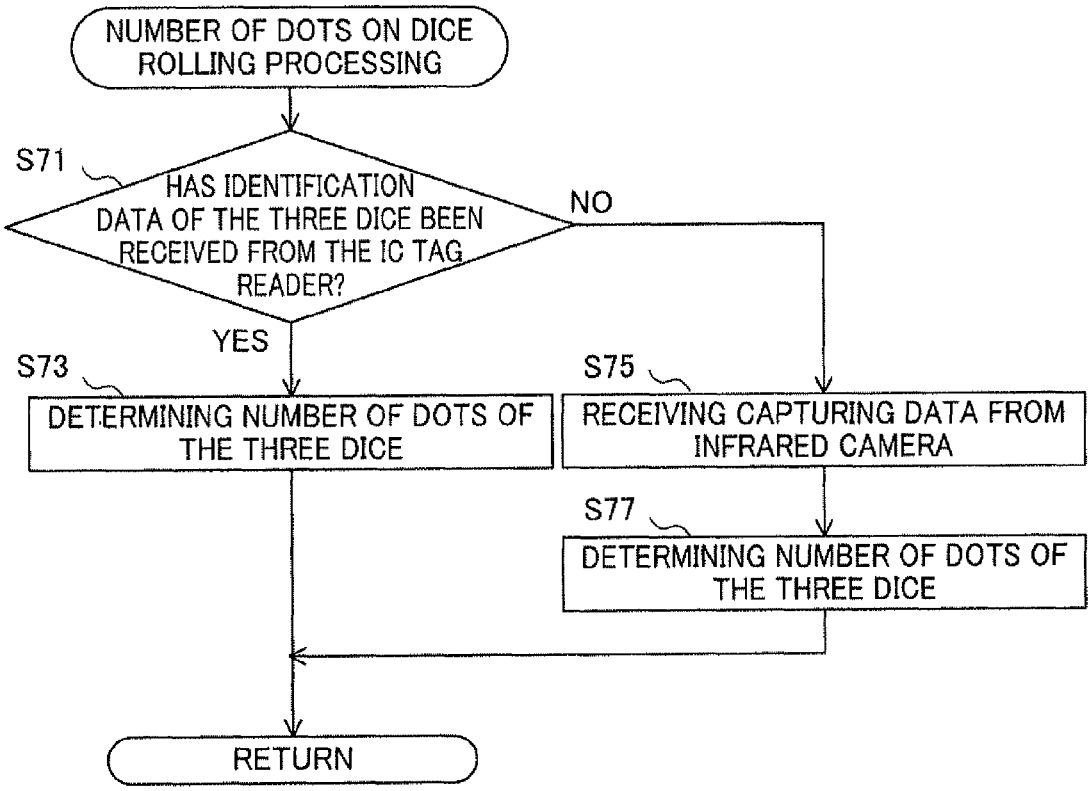
FIG. 34B is a flowchart showing dot detection processing executed in a gaming machine according to the embodiment of the present invention.

FIG. 34B is a flowchart showing number of dots on dice detection processing.

In Step S71, the CPU 81 determines whether identification data of the three dice has been received from the IC tag reader 16. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 21B) received from the IC tag reader 16. In Step S73, the CPU 81 determines the number of dots on the three dice. More specifically, the CPU 81 determines the number of dots of the three dice by analyzing the identification data 1 to 3. For example, in a case where the identification data is data as shown in FIG. 21B, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives imaging data from the infrared camera. More specifically, the CPU 81 receives the infrared camera imaging data table (see FIG. 22B) for each of the dice 70a, 70b, and 70c, from the infrared camera 15

In Step S77, the CPU 81 determines numbers of dots on the dice. More specifically, the CPU 81 determines positions of the dice on the playing board 3a based on the infrared camera imaging data table (see FIG. 22B), determines types (colors) of the dice based on the infrared camera imaging data table (see FIG. 22B) and the dot pattern data classification table (see FIG. 23B), and determines numbers of the dice based on the infrared camera imaging data table (see FIG. 22B) and the number of dots-dot pattern data table (see FIG. 24B). This processing is executed for the three dice 70a, 70b, and 70c. Upon terminating the processing in Step S77, the CPU 81 terminates the number of dots detection processing.

Thus, even in a case where, for example, a die is inclined and the number of dots thereof cannot be identified by the IC tag reader 16, since the number of dots can be determined using the infrared camera 15, the accuracy of detection and identification of numbers of dots can be improved.

Descriptions regarding the present embodiment have been provided above. Although a case has been described in which the number of dice 70 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified appropriately. Moreover, it should be understood that the advantages described in association with the embodiments are merely a listing of most preferred advantages, and that the advantages of the present invention are by no means restricted to those described in connection with the embodiments.

Embodiments of the present invention will be described below with reference to the accompanying drawings.

Although described in detail later, as shown in FIG. 1C, the CPU 81 starts a unit game, accepts a bet during a first predetermined time from each of a plurality of touch panels 35 respectively to a plurality of stations 4 (Step S100), when the first predetermined time elapses (Step S200), accepts a bet for a subsequent game during a second predetermined time from each of a plurality of the touch panels 35 (Step S300), and, when the second predetermined time elapses (Step S400), starts a subsequent game (Step S500).

FIG. 2C is a perspective view schematically showing an example of a gaming machine according to the embodiment of this invention. FIG. 3C is an enlarged view of a playing unit of the gaming machine shown in FIG. 2C. As shown in FIG. 2C, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70a, 70b, and 70c) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3a, which is formed to be a circular shape, to roll and then stop the dice 70. An IC tag reader 16, which is described later in FIGS. 6C to 9C, are provided below the playing board 3a.

Since the playing board 3a is formed to be substantially planar, as shown in FIG. 3C, the dice 70 are rolled by oscillating the playing board 3a substantially in the vertical direction with respect to the horizontal direction of the playing board 3a. Then, the dice 70 are stopped after the oscillation of the playing board 3a ceases. The playing board 3a is oscillated by a CPU 81 (described later) driving an oscillating motor 300.

Furthermore, as shown in FIG. 3C, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3a, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

FIG. 4C is an external perspective view of a die 70. As shown in FIG. 4C, the die 70 is a cube of which the length of a side is 100 mm.

FIG. 5C is a development view of the die 70. As shown in FIG. 5C, the combinations of two faces opposing each other are "1 and 6", "2 and 5", and "3 and 4".

FIGS. 6C to 9C show IC tag readable areas by an IC tag reader 16 disposed below the playing board 3a.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3a.

With reference to FIG. 6C, a face of the die 70 (for example, a face of which the number of dots is six) is in contact with the playing board 3a. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

With reference to FIG. 7C, a die 70 is inclined. However, since the IC tag 51 still exists in the readable area of the IC tag reader 16, the number of dots of the die 70 is determined as "one".

With respect to FIG. 8C, the die 70 is inclined at a greater angle than the case shown in FIG. 7C. Then, since there is no IC tag which exists in the readable area of the IC tag reader 16, the IC tag reader 16 cannot detect the number of dots of the die 70.

With reference to FIG. 9C, the die 70b is superimposed on the die 70a. In this case, neither of the IC tags 55, 56, 57, and 58, which are embedded in the die 70b, exists in the readable area of the IC tag reader 16. Therefore, in this case, the IC tag reader 16 cannot detect the number of dots of the die 70b.

FIG. 10C shows a sheet 140 attached to each face of the die 70.

As shown in FIG. 10C, on each face of the die 70, the sheet 140, to which infrared absorption ink is applied to identify the number of dots and the type of the die 70, is provided so as to be covered by a sheet on which the number of dots is printed. According to FIG. 10C, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

FIG. 11C shows an image in which the dice 70, which comes to rest on the playing board 3a, are captured substantially in the vertically upward direction using an infrared camera 15.

With reference to FIG. 11C, dots to which the infrared absorption ink is applied on each of the dice 70a, 70b, and 70c are captured in black. The type and the number of dots for each of the dice 70a, 70b, and 70c are determined based on a combination of the dots to which the ink is applied. In addition, the playing board 3a is formed in a disc shape having a radius a, and each position of the dice 70a, 70b, and 70c is detected as an x component and y component on an x-y coordinate.

FIG. 12C shows a sheet 150 which is attached to each face of the dice 70.

As shown in FIG. 12C, a circular profile 75 having a certain area on each face of the dice 70 in common is depicted by way of applying the infrared absorption ink on each face of the dice 70. The sheet 150 on which the circular profile 75 is depicted is provided so as to be covered by the abovementioned sheet 140.

Figure 13C:
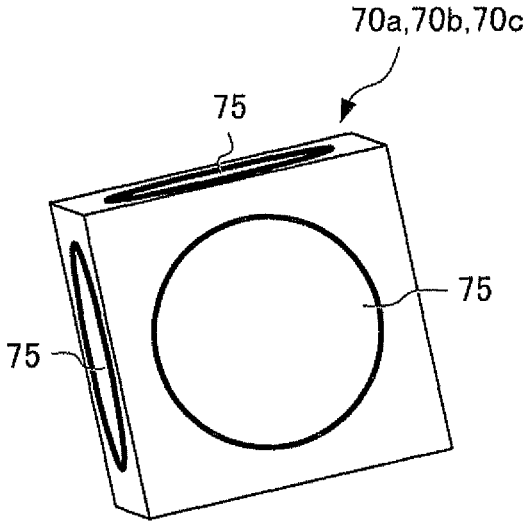
FIG. 13C shows an image in which a die according to the embodiment of the present invention that has come to rest at a tilt on a playing board, is captured substantially in the vertically upward direction by an infrared camera.

FIG. 13C shows an image in which the die 70, which comes to rest at a tilt on a playing board 3a, is captured substantially in the vertically upward direction using the infrared camera 15.

With reference to FIG. 13C, three faces of the die 70 are captured. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus captured, and distinguishes the number of dots of the face on which the circular profile 75 having the largest area among the areas thus calculated is printed as the correct number of dots.

Figure 14C:
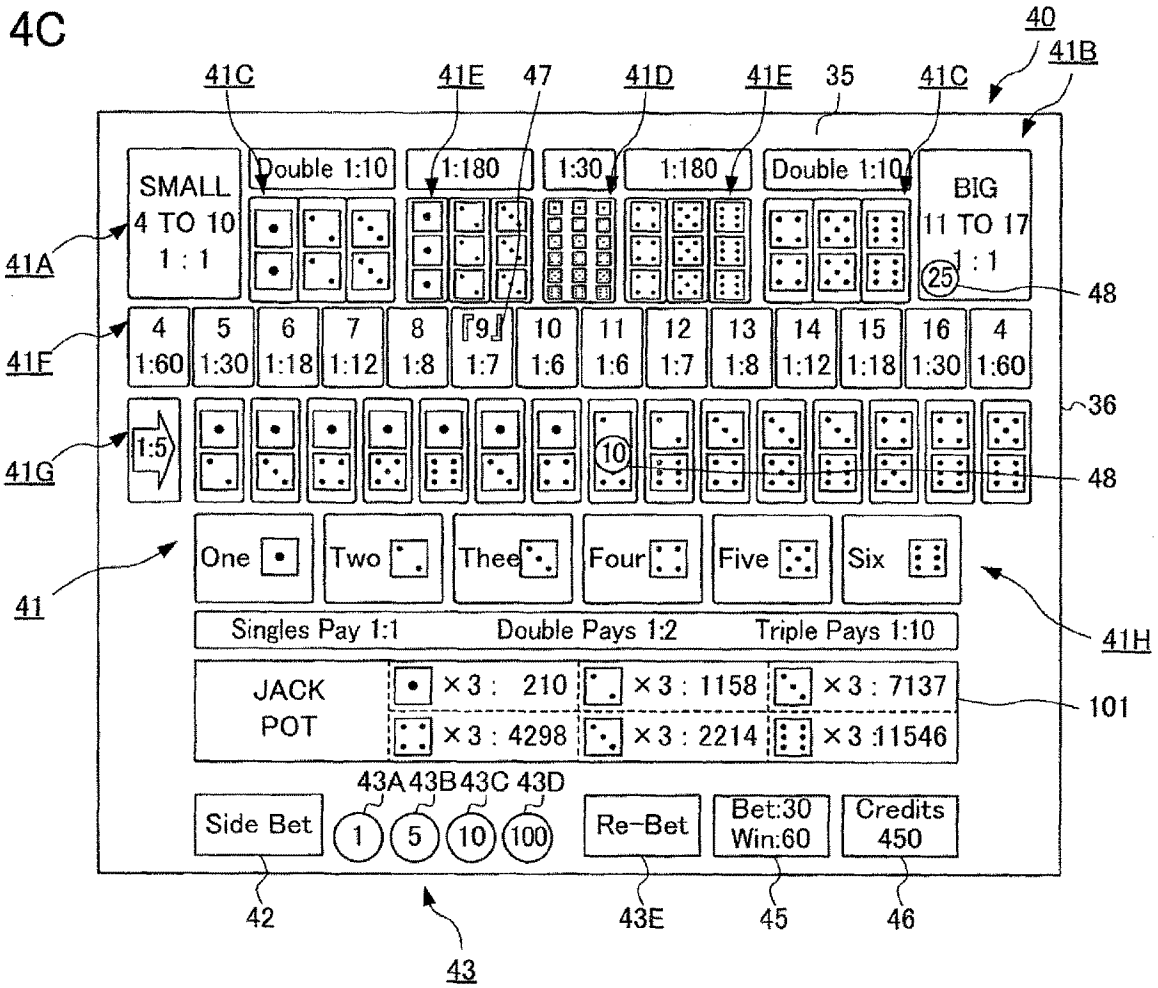
FIG. 14C shows an example of a display screen according to the embodiment of the present invention.

FIG. 14C shows an example of a display screen displayed on an image display unit. As shown in FIG. 14C, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15C:
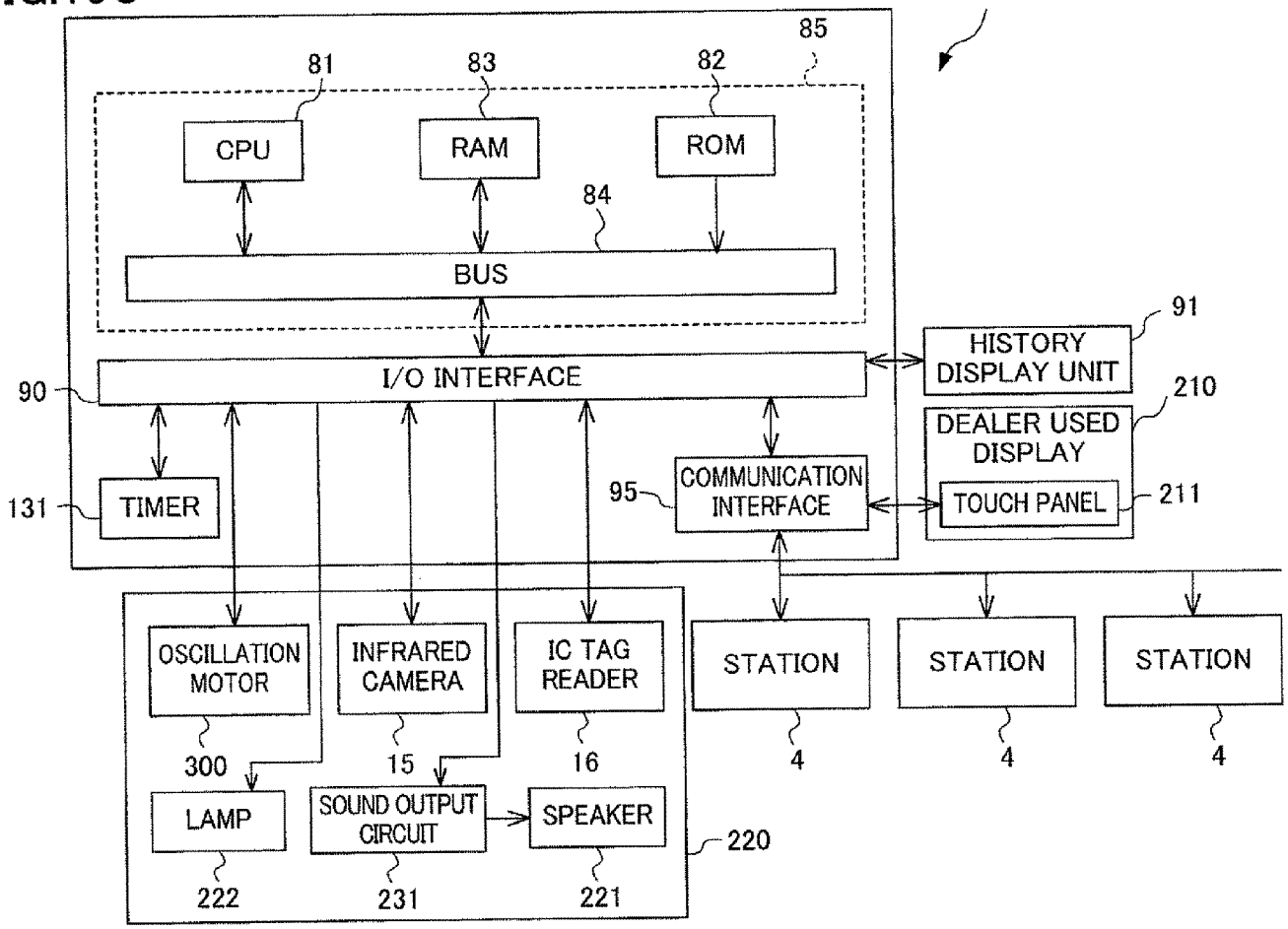
FIG. 15C is a block diagram showing the internal configuration of the gaming machine shown in FIG. 20.

FIG. 15C is a block diagram showing the internal configuration of the gaming machine shown in FIG. 2C. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an. I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3a, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3a of the playing unit 3. Furthermore, after oscillation of the playing board 3a ceases, a control processing associated with game progression, such as confirmation processing for confirming the number of dots on each of the dice 70 resting on the playing board 3a.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16C:
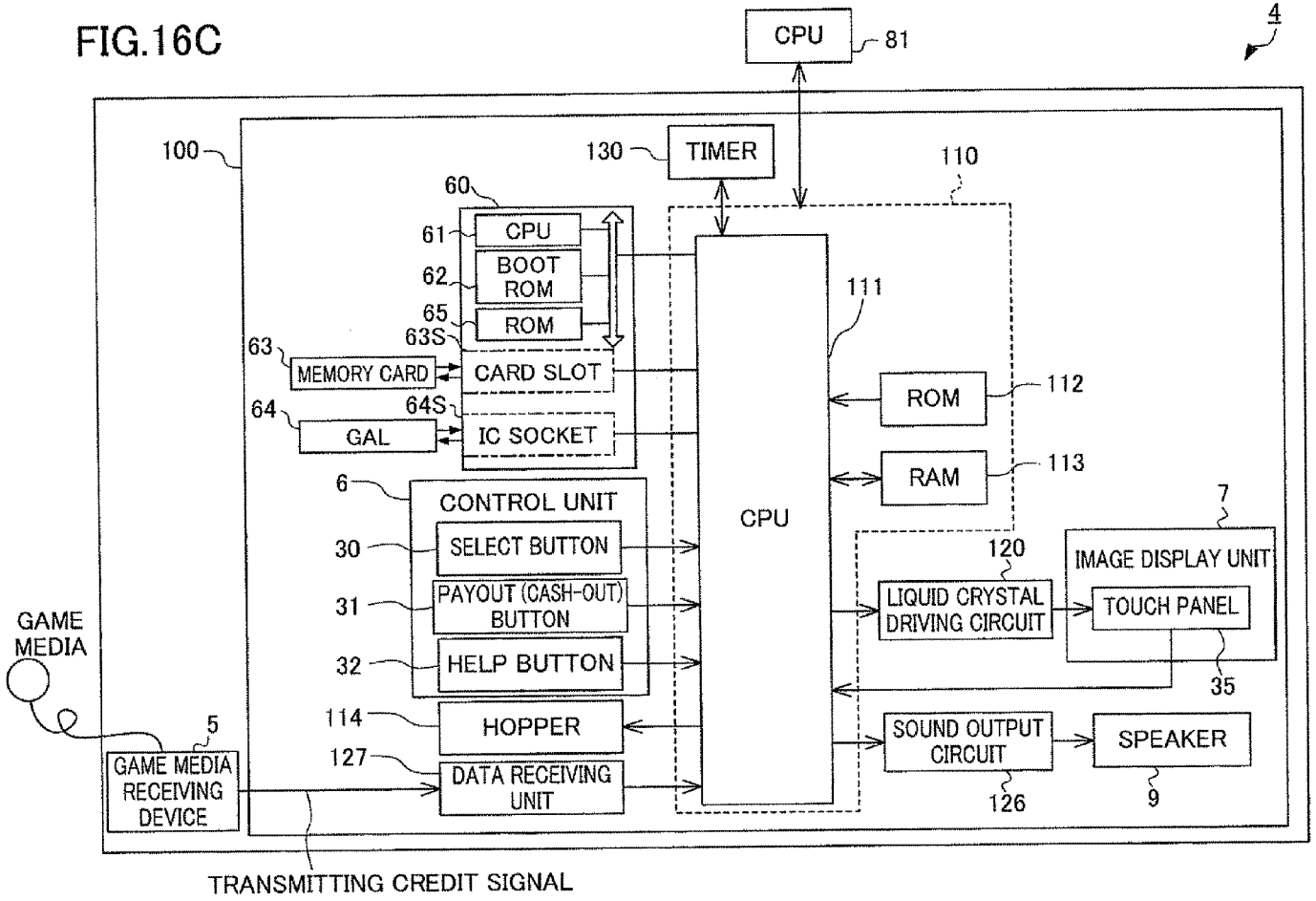
FIG. 16C is a block diagram showing the internal configuration of the station shown in FIG. 2C.

FIG. 16C is a block diagram showing the internal configuration of the station shown in FIG. 2C. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17C.

Figure 31C:
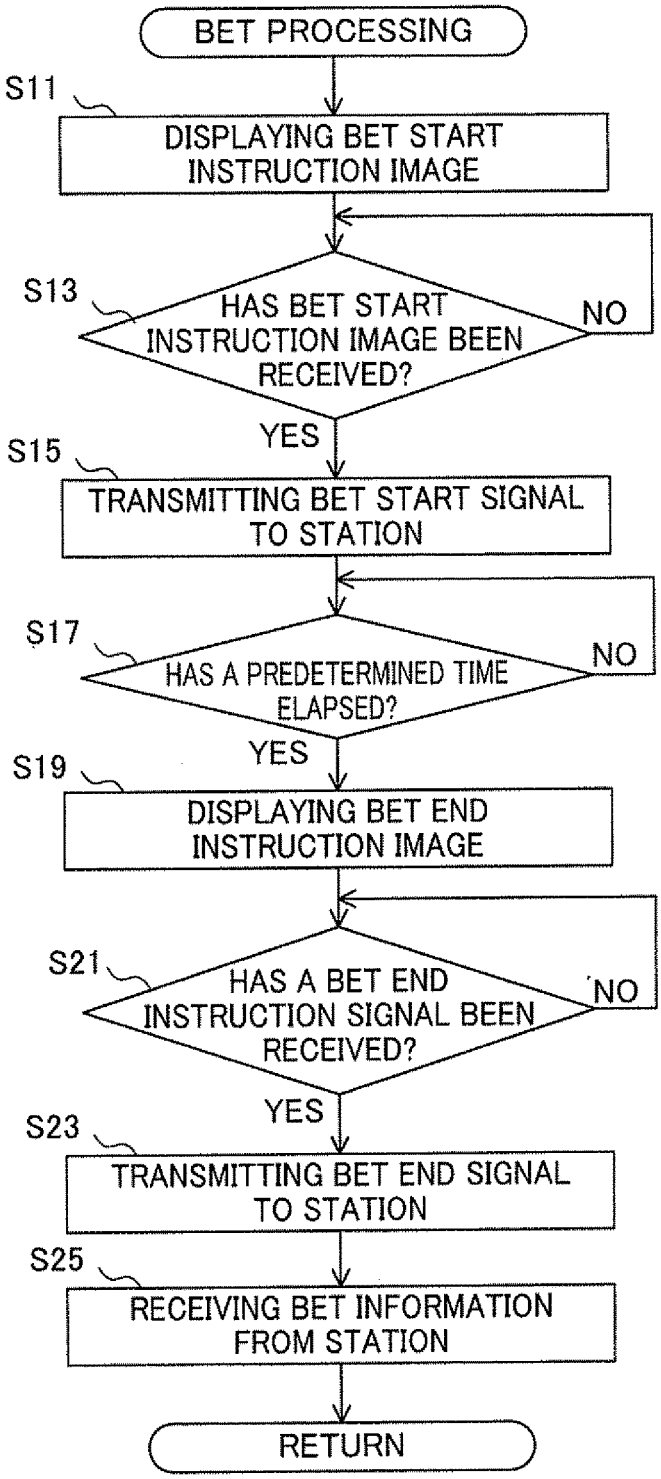
FIG. 31C is a flowchart showing bet processing executed in a gaming machine according to the embodiment of the present invention.

In Steps S11 and S19 of FIG. 31C, the instruction image display determination table is referred to by the CPU 81 upon determining whether a bet start instruction image or a bet end instruction image is displayed on the display screen 210a of the dealer used display 210.

According to this table, "X" is data for indicating that the bet start instruction image and the like is not displayed on the display screen 210a, and "O" is data for indicating that the bet start instruction image and the like is displayed on the display screen 210a. For example, in a case in which a dealer belongs to an intermediate level, the bet start instruction image is not displayed on the display screen 210a, but the bet end instruction image is displayed on the display screen 210a. In addition, this table is stored in the ROM 82.

The bet existence determination table is described with reference to FIG. 18C.

Figure 32C:
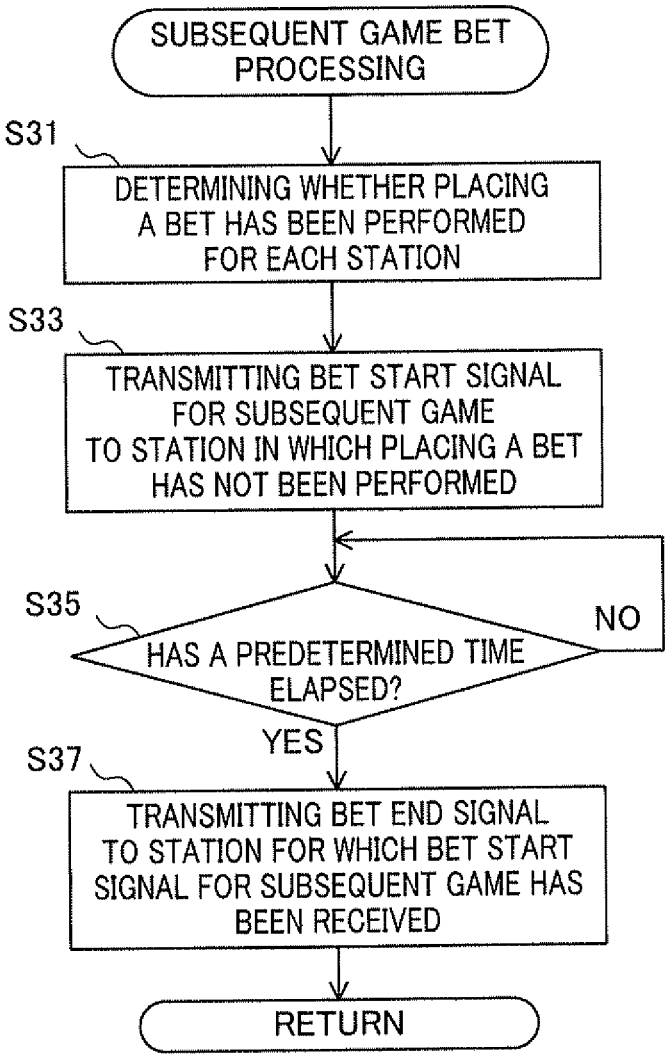
FIG. 32C is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 32C.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19C.

The CPU 81 refers to this oscillation mode data table upon determining combination patterns of the oscillation modes of the playing board 3a. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3a is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20C.

Figure 33C:
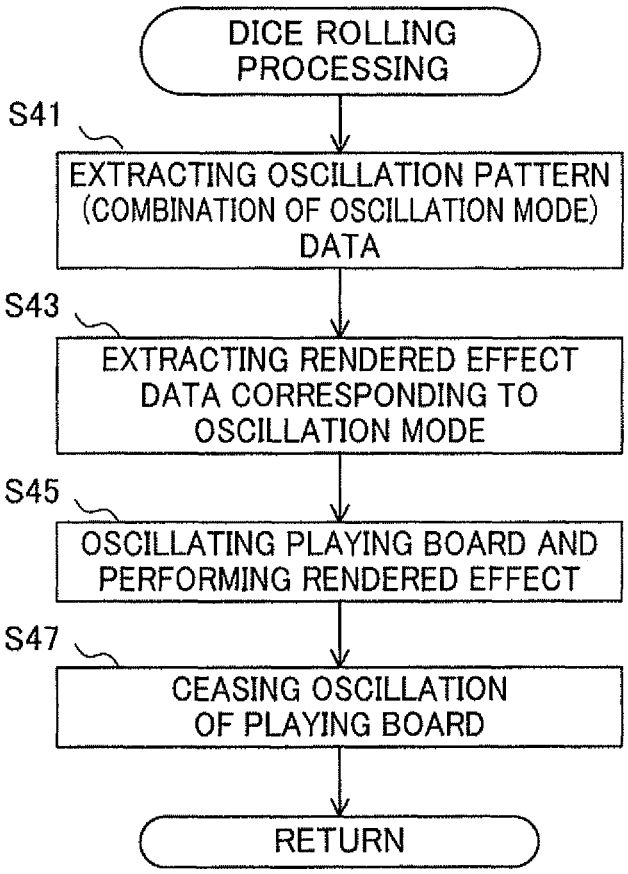
FIG. 33C is a flowchart showing dice rolling processing executed in a gaming machine according to the embodiment of the present invention.

The CPU 81 refers to this rendered effect table upon determining rendered effect data in response to an oscillation pattern of the playing board 3a in Step S43 of FIG. 33C. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21C.

The IC tag data table is a table showing data as identification data 1 to 3 which is created by the CPU 81 based on the results of the type of dice and the number of dots on the dice, when information stored in IC tags embedded in the dice 70a, 70b, and 70c is detected by the IC tag reader 16.

According to this table, for example, when an IC tag embedded in each die is detected in the order of 70c, 70a, and 70b, by the IC tag reader 16, the die 70c is associated with identification data 1 of which the type is "red" and the number of dots is "six", the die 70a is associated with identification data 2 of which the type is "white" and the number of dots is "three", and the die 70b is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera capturing data table is described with reference to FIG. 22C.

The infrared camera capturing data table is a data table showing dot patterns of the infrared absorption inks applied to the dice 70 and location data of the dice 70 on the playing board 3a.

For example, regarding the die 70a shown in FIG. 11C, in the infrared camera capturing data table, the CPU (not shown) inside the infrared camera 15 stores −50 for X and 55 for Y as location data, stores "O" for 181, 182, 184, 186, and 187, to which the infrared absorption inks are being applied, and stores "X" for 183 and 185, which are not being applied. The same is true of the dice 70b and 70c.

On the other hand, as shown in FIG. 13C, in a case where a plurality of faces of the dice 70 is captured, the number of dots cannot be specified uniquely. In this case, the CPU (not shown) inside the infrared camera 15 calculates the area of the profiles 75 on the plurality of faces thus captured, and generates the infrared camera capturing data table based on the dot patterns on the face that has a maximum area.

Therefore, even if the dice 70 come to rest at a tilt and a plurality of faces of the dice 70 is captured, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23C.

According to this table, colors as the classification for the dice 70 are set so as to correspond to dot combinations to which the infrared absorption ink is applied, among the abovementioned dots 181 to 183 in FIG. 10C. "O" indicates that the infrared absorption ink is applied to the dot, and "X" indicates that the infrared absorption ink is not applied to the dot.

For example, in a case where the infrared camera capturing data table described in FIG. 22C is transmitted to the CPU 81, the CPU 81 determines the classification of the dice 70 as "red" by comparing the infrared camera capturing data table with the dot pattern data classification table.

A number of dots-dot pattern data table is described with reference to FIG. 24C.

According to this table, numbers as the number of dots on the dice 70 are set so as to correspond to dot combinations to which the infrared absorption ink is applied, among the abovementioned dots 184 to 187 in FIG. 10C. "O" indicates that the infrared absorption ink is applied to the dot, and "X" indicates that the infrared absorption ink is not applied to the dot.

For example, in a case where the infrared camera capturing data table shown in FIG. 22C is transmitted from the infrared camera 15 to the CPU 81, the CPU 81 determines the number of dots on the dice 70 as "five" by comparing the infrared camera capturing data table thus received with the dot pattern data classification table.

A bet start instruction image is described with reference to FIG. 25C.

The bet start instruction image is displayed by the CPU 81 on the display screen 210a of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

A bet end not recommended image is described with reference to FIG. 26C.

This bet end not recommended image is displayed by the CPU 81 on the display screen 210a of the dealer used display 210 while the CPU 81 accepts a bet from each station 4.

This bet end not recommended image instructs the dealer not to touch a "bet end" button.

A bet end instruction image is described with reference to FIG. 27C.

The bet end instruction image is displayed by the CPU 81 on the display screen 210a of the dealer used display 210 after elapse of a predetermined time from when the CPU 81 starts accepting a bet from each station 4.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 28C.

An image shown in FIG. 28C is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 29C.

The image shown in FIG. 29C is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Subsequently, with reference to FIGS. 30C to 34C, processing performed in the main control unit of a gaming machine according to the present embodiment is described.

Figure 30C:
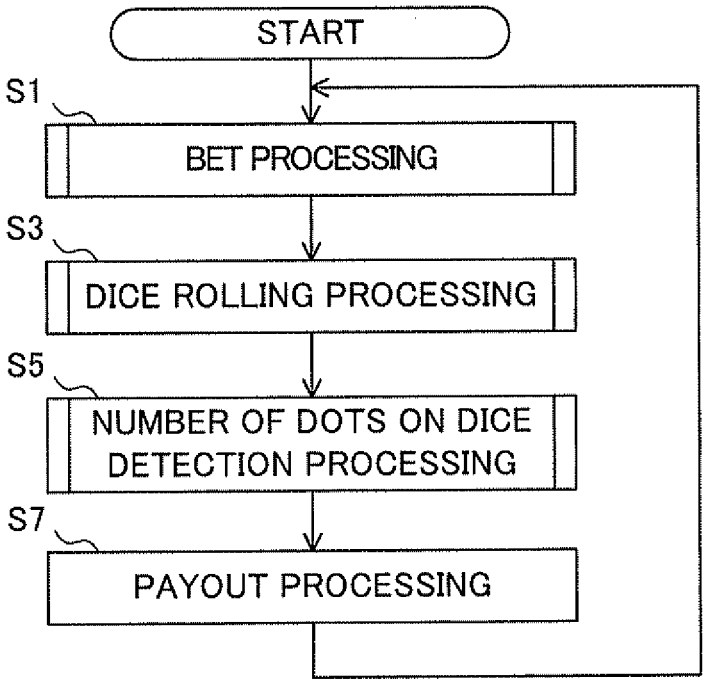
FIG. 30C is a flowchart showing dice game processing executed in a gaming machine according to the embodiment of the present invention.

FIG. 30C is a flowchart showing dice game execution processing. Initially, in Step S1, the CPU 81 executes bet processing, which is described later in FIG. 31C, and in Step S3, the CPU 81 executes dice rolling processing, which is described later in FIG. 33C. In Step S5, the CPU 81 executes number of dots on dice detection processing, which is described later in FIG. 34C and, in Step 7, executes payout processing corresponding to the number of dots, and then the flow returns to Step 1.

FIG. 31C is a flowchart showing bet processing.

In Step S11, the CPU 81 displays the bet start instruction image (see FIG. 25C) on the display screen 210a of the dealer used display 210. It should be noted that, whether or not the bet start instruction image is displayed may be determined according to a dealer's level with reference to the instruction image display determination (see FIG. 17C).

Thus, according to the dealer's level, it becomes possible to determine whether the bet start instruction image is displayed on the display screen 210a of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 27C) on the display screen 210a of the dealer used display 210. It should be noted that, whether or not the bet end instruction image is displayed may be determined according to a dealer's level with reference to the instruction image display determination (see FIG. 17C).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 28C).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18C). Upon terminating the processing of Step S25, the CPU 81 terminates the bet processing.

With the bet processing of the present embodiment, even an inexperienced dealer can perform start operations for bet placement and end operations according to instructional images.

FIG. 32C is a flowchart showing subsequent game bet processing.

The subsequent game bet processing is started by the CPU 81 and executed parallel to the dice rolling processing in FIG. 30C when the bet processing described in FIG. 31C is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18C).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29C) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 33C is a flowchart showing dice rolling processing.

In Step S41, the CPU 81 extracts an oscillation pattern (combinations of oscillation modes) data from the ROM 82. More specifically, the CPU 81 refers to an oscillation mode data table (see FIG. 19C) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20C) and extracts rendered effect data corresponding to an oscillation mode based on an oscillation pattern data thus extracted in Step S41.

In Step S45, the CPU 81 oscillates the playing board 3a and performs a rendered effect. More specifically, the CPU 81 oscillates the playing board 3a by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3a is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3a. More specifically, the CPU 81 ceases the oscillation of the playing board 3a by stopping the oscillation motor 300. Upon terminating the processing in Step S47, the CPU 81 terminates the dice rolling processing.

Figure 34C:
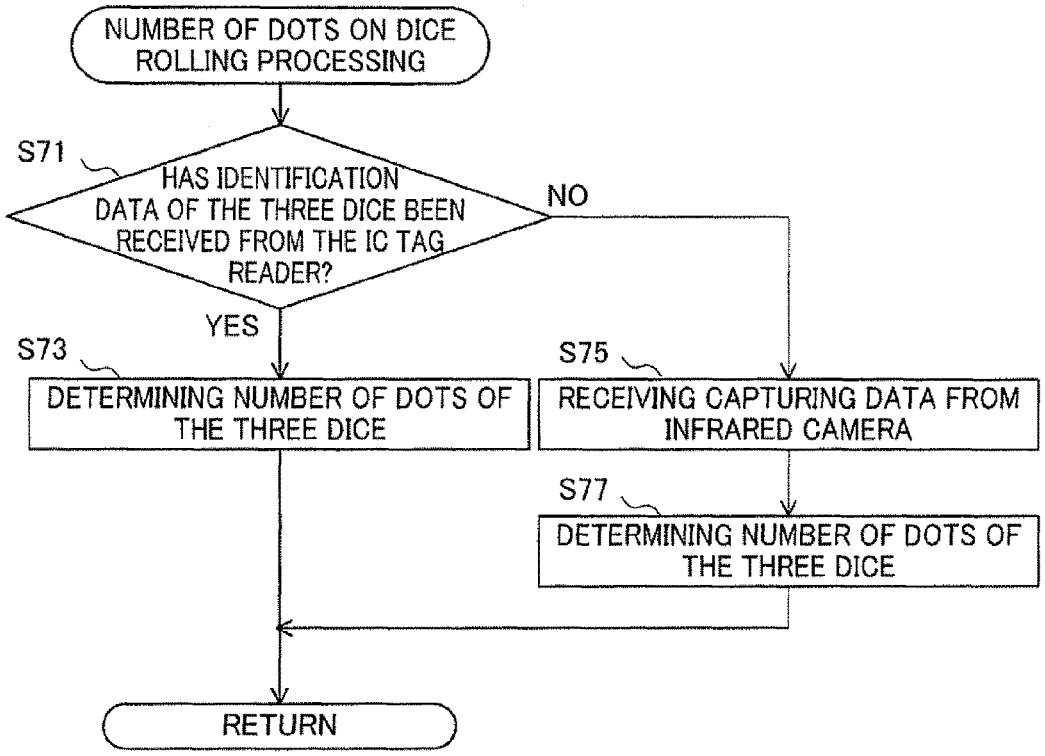
FIG. 34C is a flowchart showing dot detection processing executed in a gaming machine according to the embodiment of the present invention.

FIG. 34C is a flowchart showing number of dots on dice detection processing.

In Step S71, the CPU 81 determines whether identification data of the three dice has been received from the IC tag reader 16. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 21C) received from the IC tag reader 16. In Step S73, the CPU 81 determines the number of dots on the three dice. More specifically, the CPU 81 determines the number of dots of the three dice by analyzing the identification data 1 to 3. For example, in a case where the identification data is data as shown in FIG. 21C, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives capturing data from the infrared camera. More specifically, the CPU 81 receives the infrared camera capturing data table (see FIG. 22C) for each of the dice 70a, 70b, and 70c, from the infrared camera 15

In Step S77, the CPU 81 determines numbers of dots on the dice. More specifically, the CPU 81 determines positions of the dice on the playing board 3a based on the infrared camera capturing data table (see FIG. 22C), determines types (colors) of the dice based on the infrared camera capturing data table (see FIG. 22C) and the dot pattern data classification table (see FIG. 23C), and determines numbers of the dice based on the infrared camera capturing data table (see FIG. 22C) and the number of dots-dot pattern data table (see FIG. 24C). This processing is executed for the three dice 70a, 70b, and 70c. Upon terminating the processing in Step S77, the CPU 81 terminates the number of dots detection processing.

Thus, even in a case where, for example, a die is inclined and the number of dots thereof cannot be identified by the IC tag reader 16, since the number of dots can be determined using the infrared camera 15, the accuracy of detection and identification of numbers of dots can be improved.

Descriptions regarding the present embodiment have been provided above. Although a case has been described in which the number of dice 70 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified appropriately. Moreover, it should be understood that the advantages described in association with the embodiments are merely a listing of most preferred advantages, and that the advantages of the present invention are by no means restricted to those described in connection with the embodiments.

Embodiments of the present invention will be described below with reference to the accompanying drawings.

Although details are described later, as shown in FIG. 1D, a CPU 81 sets a bet time for accepting a bet by a plurality of touch panels 35 that are provided to a plurality of stations 4 (Step S100), accepts a bet from each of the plurality of touch panels 35 (Step S200), determines whether a game start signal has been received from a station 4 provided with a touch panel 35 that has received a bet among the plurality of touch panels 35 (Step S300), shortens the bet time in a case of accepting the game start signal (Step S400), determines whether or not the bet time has elapsed (Step S500), and starts a game when the bet time has elapsed (Step S600).

FIG. 2D is a perspective view schematically showing an example of a gaming machine according to the embodiment of this invention. FIG. 3D is an enlarged view of a playing unit of the gaming machine shown in FIG. 2D. As shown in FIG. 2D, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the tap face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70a, 70b, and 70c) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

As shown in FIG. 3D, the playing unit 3 includes a playing board 3a, which is formed to be a circular shape, and causes the dice 70 to roll and ultimately come to rest. An IC tag reader 16, which is described later in FIGS. 6D to 9D, are provided below the playing board 3a.

Since the playing board 3a is formed to be substantially planar, the dice 70 are rolled by oscillating the playing board 3a substantially in the vertical direction with respect to the horizontal direction of the playing board 3a. Then, the dice 70 are stopped after the oscillation of the playing board 3a ceases. The playing board 3a is oscillated by a CPU 81 (described later) driving an oscillating motor 300.

Furthermore, as shown in FIG. 3D, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3a, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

FIG. 4D is an external perspective view of a die 70. As shown in FIG. 4D, the die 70 is a cube of which the length of a side is 100 mm.

FIG. 5D is a development view of the die 70. As shown, in FIG. 5D, the combinations of two faces opposing each other are "1 and 6", "2 and 5", and "3 and 4".

FIGS. 6D to 9D show IC tag readable areas by an IC tag reader 16 disposed below the playing board 3a.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3a.

With reference to FIG. 6D, a face of the die 70 (for example, a face of which the number of dots is six) is in contact with the playing board 3a. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

With reference to FIG. 7D, a die 70 is inclined. However, since the IC tag 51 still exists in the readable area of the IC tag reader 16, the number of dots of the die 70 is determined as "one".

With respect to FIG. 8D, the die 70 is inclined at a greater angle than the case shown in FIG. 7D. Then, since there is no IC tag which exists in the readable area of the IC tag reader 16, the IC tag reader 16 cannot detect the number of dots of the die 70.

With reference to FIG. 9D, the die 70b is superimposed on the die 70a. In this case, neither of the IC tags 55, 56, 57, and 58, which are embedded in the die 70b, exists in the readable area of the IC tag reader 16. Therefore, in this case, the IC tag reader 16 cannot detect the number of dots of the die 70b.

FIG. 10D shows a sheet 140 attached to each face of the die 70.

As shown in FIG. 10D, on each face of the die 70, the sheet 140, to which infrared absorption ink is applied to identify the number of dots and the type of the die 70, is provided so as to be covered by a sheet on which the number of dots is printed. According to FIG. 10D, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

FIG. 11D shows an image in which the dice 70, which comes to rest on the playing board 3a, are captured substantially in the vertically upward direction using an infrared camera 15.

With reference to FIG. 11D, dots to which the infrared absorption ink is applied on each of the dice 70a, 70b, and 70c are captured in black. The type and the number of dots for each of the dice 70a, 70b, and 70c are determined based on a combination of the dots to which the ink is applied. In addition, the playing board 3a is formed in a disc shape having a radius a, and each position of the dice 70a, 70b, and 70c is detected as an x component and y component on an x-y coordinate.

FIG. 12D shows a sheet 150 which is attached to each face of the dice 70.

As shown in FIG. 12D, a circular profile 75 having a certain area on each face of the dice 70 in common is depicted by way of applying the infrared absorption ink on each face of the dice 70. The sheet 150 on which the circular profile 75 is depicted is provided so as to be covered by the abovementioned sheet 140.

Figure 13D:
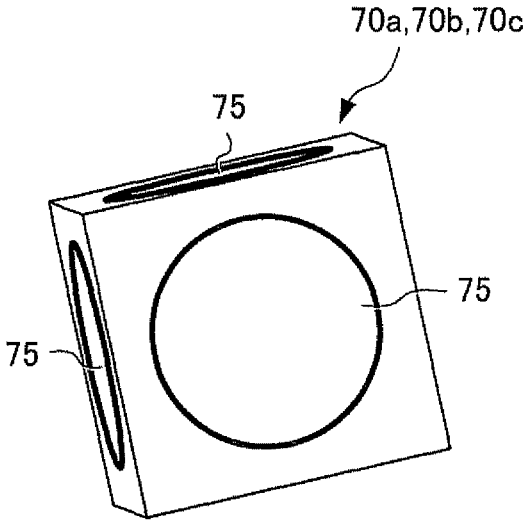
FIG. 13D shows an image in which a die according to the embodiment of the present invention that has come to rest at a tilt on a playing board, is captured substantially in the vertically upward direction by an infrared camera.

FIG. 13D shows an image in which the die 70, which comes to rest at a tilt on a playing board 3a, is captured substantially in the vertically upward direction using the infrared camera 15.

With reference to FIG. 13D, three faces of the die 70 are captured. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus captured, and distinguishes the number of dots of the face on which the circular profile 75 having the largest area among the areas thus calculated is printed as the correct number of dots.

Figure 14D:
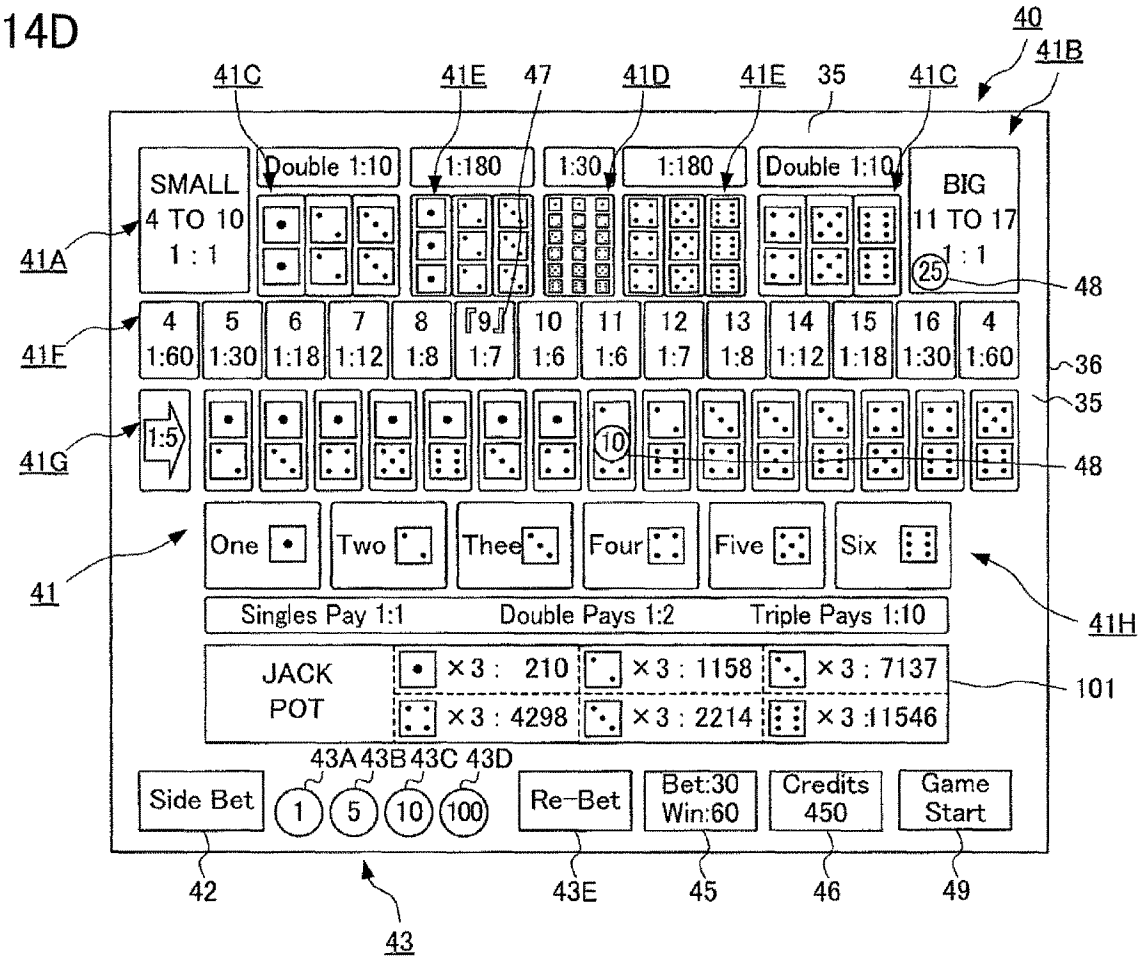
FIG. 14D shows an example of a display screen according to the embodiment of the present invention.

FIG. 14D shows an example of a display screen displayed on an image display unit. As shown in FIG. 14D, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, a credit amount display unit 46, and a start button 49 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E. Furthermore, the start button 49 is a button for transmitting a game start signal when a player ends a bet operation. The bet operation of the player is performed within a predetermined bet time (for example, 60 seconds). More specifically, at first, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips. Then, the player ends the bet operation by contacting the start button 49.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15D:
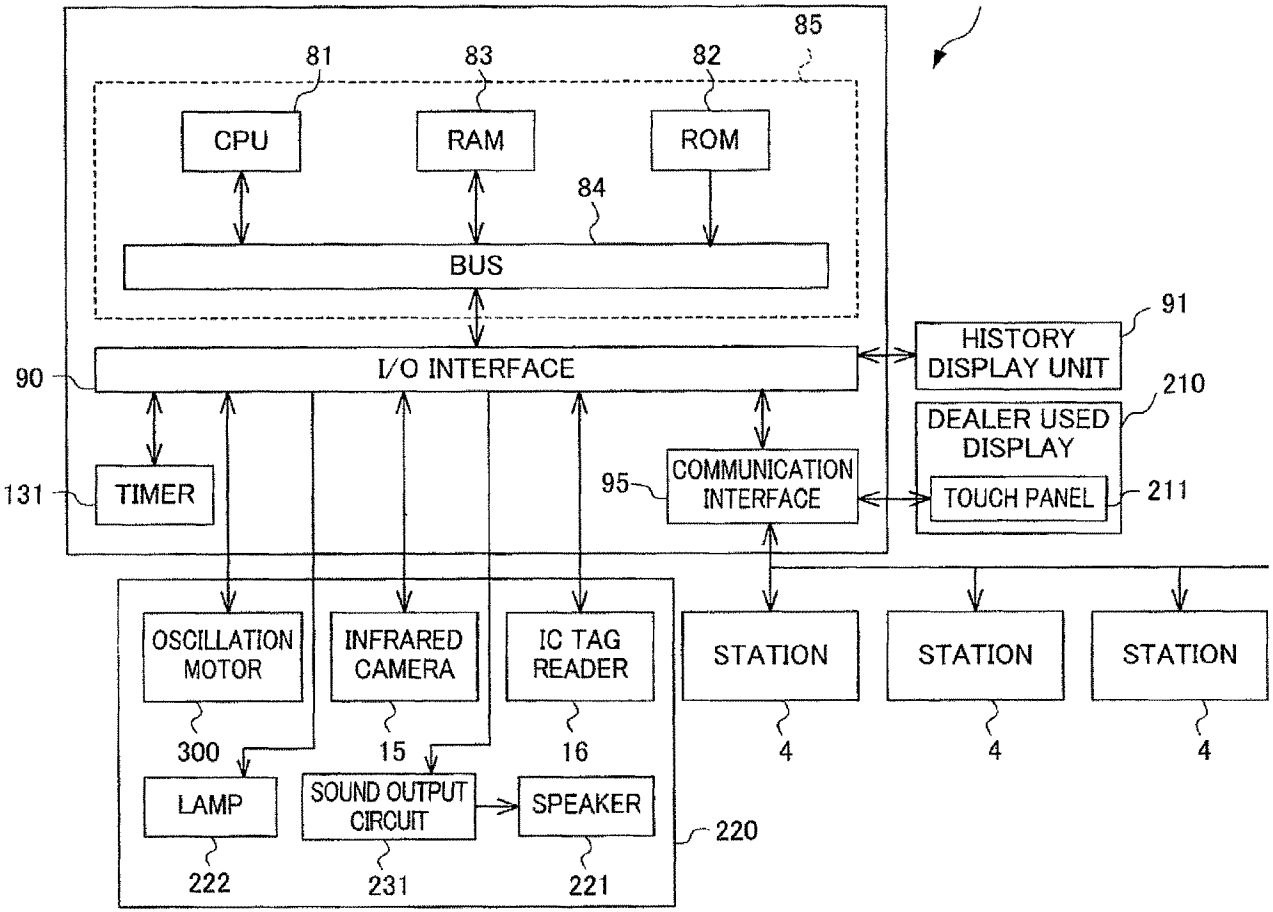
FIG. 15D is a block diagram showing the internal configuration of the gaming machine shown in FIG. 2D.

FIG. 15D is a block diagram showing the internal configuration of the gaming machine shown in FIG. 2D. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3a, between the infrared camera 15 and/or the IC tag reader 16.

Furthermore, the CPU 81 is connected with a timer 131, which can measure time via the I/O interface 90. The timer 131 measures a bet time by way of the CPU 81.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, a game start signal, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores bet information and a game start signal transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3a of the playing unit 3. Furthermore, after oscillation of the playing board 3a ceases, a control processing associated with game progression, such as confirmation processing for confirming the number of dots on each of the dice 70 resting on the playing board 3a.

In addition to the control processing described above, the CPU 81 performs transmission and reception of data between each station 4, and performs control processing to control each station 4 to cause a game to advance. More specifically, a bet time is set and the CPU 81 accepts bet information transmitted from each station 4. Then, in a case in which the game start signal has been received from the stations 4 that accepted the bet information, the bet time is shortened, and control is performed to start a game when the bet time has elapsed. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16D:
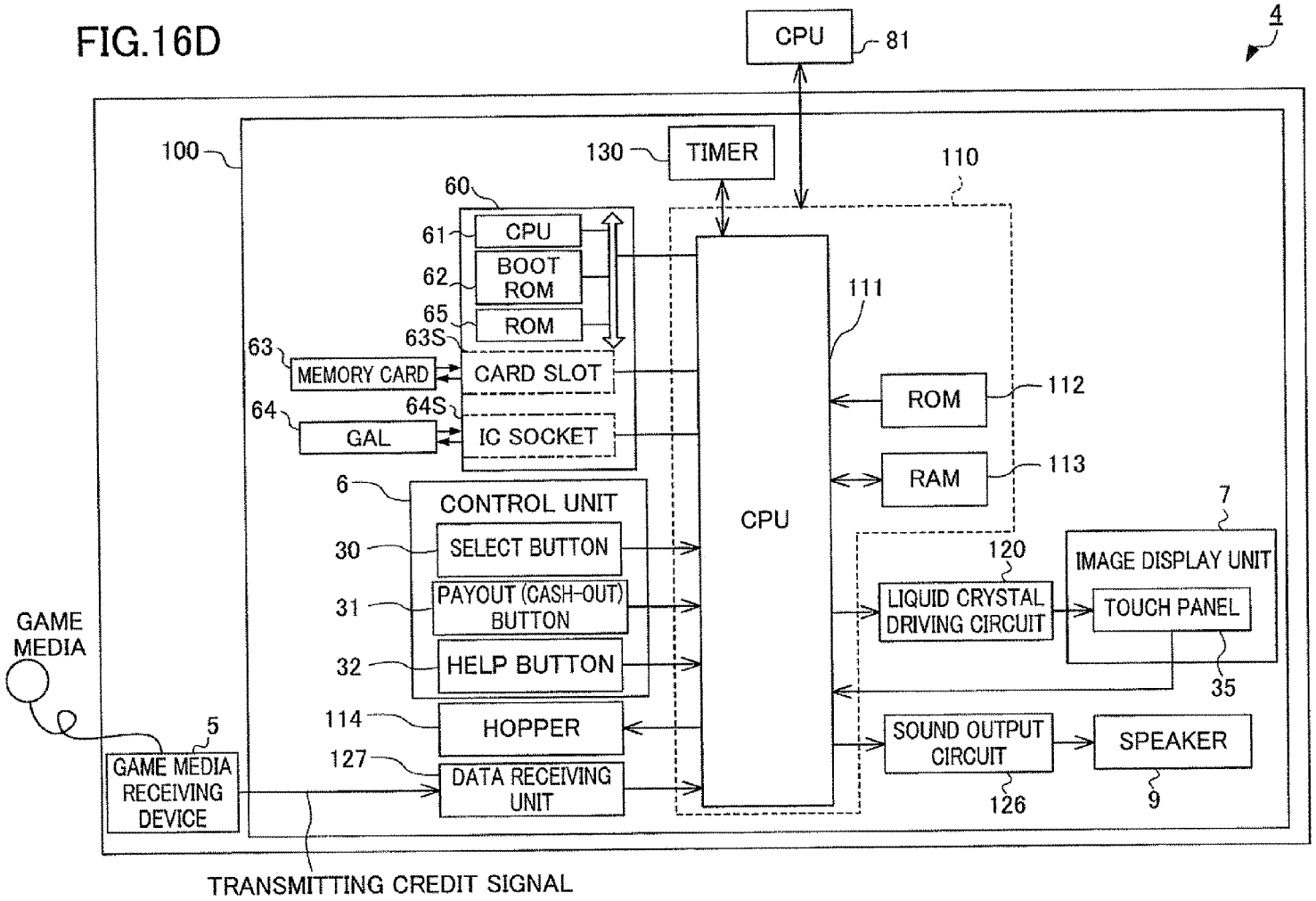
FIG. 16D is a block diagram showing the internal configuration of the station shown in FIG. 2D.

FIG. 16D is a block diagram showing the internal configuration of the station shown in FIG. 2D. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the start button 49, the bet button unit 43, and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU ill via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17D.

Figure 31D:
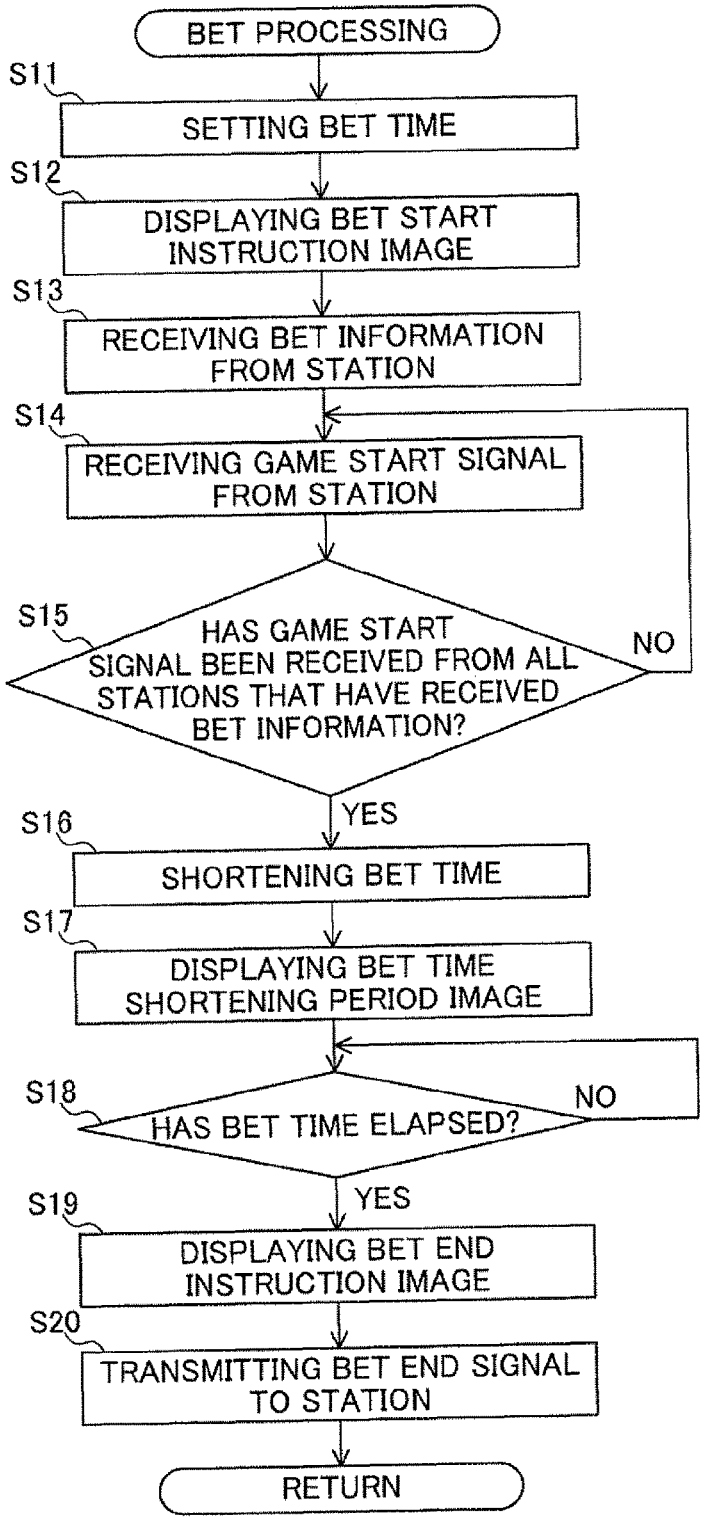

In Steps S11 and S19 of FIG. 31D, the instruction image display determination table is referred to by the CPU 81 upon determining whether a bet start instruction image or a bet end instruction image is displayed on the display screen 210a of the dealer used display 210.

According to this table, "X" is data for indicating that the bet start instruction image and the like is not displayed on the display screen 210a, and "O" is data for indicating that the bet start instruction image and the like is displayed on the display screen 210a. For example, in a case in which a dealer belongs to an intermediate level, the bet start instruction image is not displayed on the display screen 210a, but the bet end instruction image is displayed on the display screen 210a. In addition, this table is stored in the ROM 82.

The bet existence determination table is described with reference to FIG. 18D.

This bet existence determination table is updated in a case in which bet information has been received from each station 4 in Step S13 of FIG. 31D and in a case in which a game start signal has been received in Step S14, and the CPU 81 refers to the table upon determining whether game start signals have been received from all of the stations that received bet information in Step S15.

Data indicating whether or not the bet information has been received at each station number and data indicating whether or not a game start signal has been received at each station number is stored in this table. "P" is data indicating that the bet information or a game start signal has been received, and "A" is data indicating that the bet information or a game start signal has not been received. In addition, this table is updated in every game, and stored in the RAM 83.

An oscillation mode data table is described with reference to FIG. 19D.

The CPU 81 refers to this oscillation mode data table upon determining combination patterns of the oscillation modes of the playing board 3a. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3a is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20D.

The CPU 81 refers to this rendered effect table upon determining rendered effect data in response to an oscillation pattern of the playing board 3a in Step S43 of FIG. 33D. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21D.

The IC tag data table is a table showing data as identification data 1 to 3 which is created by the CPU 81 based on the results of the type of dice and the number of dots on the dice, when information stored in IC tags embedded in the dice 70a, 70b, and 70c is detected by the IC tag reader 16.

According to this table, for example, when an IC tag embedded in each die is detected in the order of 70c, 70a, and 70b, by the IC tag reader 16, the die 70c is associated with identification data 1 of which the type is "red" and the number of dots is "six", the die 70a is associated with identification data 2 of which the type is "white" and the number of dots is "three", and the die 70b is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera capturing data table is described with reference to FIG. 22D.

The infrared camera capturing data table is a data table showing dot patterns of the infrared absorption inks applied to the dice 70 and location data of the dice 70 on the playing board 3a.

For example, regarding the die 70a shown in FIG. 11D, in the infrared camera capturing data table, the CPU (not shown) inside the infrared camera 15 stores −50 for X and 55 for Y as location data, stores "O" for 181, 182, 184, 186, and 187, to which the infrared absorption inks are being applied, and stores "X" for 183 and 185, which are not being applied. The same is true of the dice 70b and 70c.

On the other hand, as shown in FIG. 13D, in a case where a plurality of faces of the dice 70 is captured, the number of dots cannot be specified uniquely. In this case, the CPU (not shown) inside the infrared camera 15 calculates the area of the profiles 75 on the plurality of faces thus captured, and generates the infrared camera capturing data table based on the dot patterns on the face that has a maximum area.

Therefore, even if the dice 70 come to rest at a tilt and a plurality of faces of the dice 70 is captured, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23D.

According to this table, colors as the classification for the dice 70 are set so as to correspond to dot combinations to which the infrared absorption ink is applied, among the abovementioned dots 181 to 183 in FIG. 10D. "O" indicates that the infrared absorption ink is applied to the dot, and "X" indicates that the infrared absorption ink is not applied to the dot.

For example, in a case where the infrared camera capturing data table described in FIG. 22D is transmitted to the CPU 81, the CPU 81 determines the classification of the dice 70 as "red" by comparing the infrared camera capturing data table with the dot pattern data classification table.

A number of dots-dot pattern data table is described with reference to FIG. 24D.

According to this table, numbers as the number of dots on the dice 70 are set so as to correspond to dot combinations to which the infrared absorption ink is applied, among the abovementioned dots 184 to 187 in FIG. 10D. "O" indicates that the infrared absorption ink is applied to the dot, and "X" indicates that the infrared absorption ink is not applied to the dot.

For example, in a case where the infrared camera capturing data table shown in FIG. 22D is transmitted from the infrared camera 15 to the CPU 81, the CPU 81 determines the number of dots on the dice 70 as "five" by comparing the infrared camera capturing data table thus received with the dot pattern data classification table.

A bet start instruction image is described with reference to FIG. 25D.

The bet start instruction image is displayed by the CPU 81 on the display screen 210a of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95. Furthermore, at the upper left portion of the bet start instruction image, "BET TIME" indicating a bet time is displayed. The "BET TIME" indicates a time (in seconds) for which a bet is possible, and in this bet start instruction image, 60 is displayed as an initial setting time. Furthermore, the "BET TIME" is displayed as an image in which the time left decreases over time.

A bet time shortening period image is described with reference to FIG. 26D.

The bet time shortening period image is an image that the CPU 81 displays on the display screen 210a of the dealer used display 210 when the game start signals has been received from all of the stations 4 that have received bet information.

This bet time shortening period image instructs the dealer not to touch a "bet end" button. Furthermore, in the "BET TIME" of a bet end not recommended image, by the processing in Step S16 of FIG. 31D (described later), 10 is displayed as the time for which a bet is possible after the bet time is shortened.

A bet end instruction image is described with reference to FIG. 27D.

The bet end instruction image is displayed by the CPU 81 on the display screen 210a of the dealer used display 210 after elapse of a predetermined time from when the CPU 81 starts accepting a bet from each station 4. Furthermore, 0 is displayed in the "BET TIME" of the bet end not recommended image. That is, it indicates that the bet time has ended.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 28D.

The image shown in FIG. 29D reports to each of the stations 4 that it is possible to bet in a game. A player can recognize that a bet on a game is possible by confirming that a message "ABLE TO PLACE THE BET" is displayed.

A display example on the image display unit 7 of each station 4 is described with reference to FIG. 29D.

An image shown in FIG. 29D is configured to report to each station 4 that accepting of bets has ended. A player can recognize that the accepting of bets has ended by confirming that a message "NO MORE BETS" is displayed.

Subsequently, with reference to FIGS. 30D to 34D, processing performed in the main control unit of a gaming machine according to the present embodiment is described.

Figure 30D:
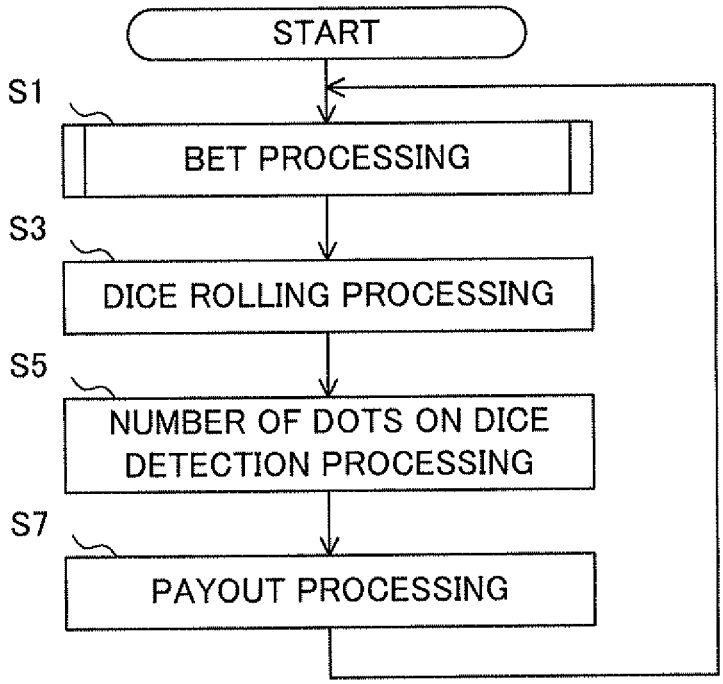

FIG. 30D is a flowchart showing dice game play execution processing for which advancement is controlled by the CPU 81.

Initially, in Step S1, the CPU 81 executes bet processing, which is described later in FIG. 31D. Next, as game execution processing in dice game play, the CPU 81 executes dice rolling processing of Step S3 and number of dots detection processing of Step S5. Next, in Step S7, the CPU 81 executes payout processing corresponding to the number of dots, and then returns to Step 1.

The CPU 81 refers to the oscillation mode data table (see FIG. 19D) and randomly extracts oscillation pattern data in the game execution processing of Step S3 for the dice game play, and based on the oscillation pattern data thus extracted, refers to the rendered effect table (see FIG. 20D) and extracts rendered effect data corresponding to an oscillation mode. Then, the CPU 81 oscillates the playing board 3a by controlling the oscillation motor 300 based on the oscillation pattern data thus extracted, and performs a rendered effect with sounds and/or lights based on rendered effect data corresponding to an oscillation mode.

In the number of dots on dice detection processing in Step S5 in dice game play, the CPU 81 determines whether or not three sets of identification data (the identification data 1 to 3) exist in the IC tag data table received from the IC tag reader 16, and in a case of a determination that 3 sets of identification data are present, the CPU 81 determines the number of dots on each of the three dice by analyzing the identification data 1 to 3. In a case of a determination that 3 sets of identification data are present, the CPU 81 receives infrared camera capturing data of each of the dice 70a, 70b, and 70c from the infrared camera 15. Then, the CPU 81 determines positions of the dice on the playing board 3a based on the infrared camera capturing data table (see FIG. 22D), determines types (colors) of the dice based on the infrared camera capturing data table (see FIG. 22D) and the dot pattern data classification table (see FIG. 23D), and determines numbers of dots on the dice based on the infrared camera capturing data table (see FIG. 22D) and the number of dots-dot pattern data table (see FIG. 24D).

FIG. 31 is a flowchart showing bet processing.

In Step S11, the CPU 81 sets a bet time. More specifically, the CPU 81 performs processing that sets a predetermined bet time (for example, 60 seconds) which is compared with an elapsed time t of the timer 131, in a certain area of the RAM 83.

In Step S12, the CPU 81 performs control to display the bet start instruction image (see FIG. 25D) on the display screen 210a of the dealer used display 210. Furthermore, the CPU 81 starts subtracting the bet time in a case in which the bet start instruction signal has been received from the touch panel 211 by an operation of the dealer. Then, a bet operation by a player becomes possible at each of the stations 4.

It should be noted that, whether or not the bet start instruction image is displayed may be determined according to a dealer's level with reference to the instruction image display determination (see FIG. 17D). Thus, according to the dealer's level, it becomes possible to determine whether the bet start instruction image is displayed on the display screen 210a of the dealer used display 210.

In Step S13, the CPU 81 performs processing to receive bet information from the station 4. More specifically, the CPU 81 performs control to receive the bet information from each of a plurality of touch panels 35 that are provided to each of a plurality of stations 4. Furthermore, the CPU 81 performs control to update the bet existence determination table (see FIG. 18D) in each of the stations 4 that have received bet information.

In Step S14, the CPU 81 performs processing to receive the game start signal from the station 4. More specifically, the CPU 81 performs control to receive the game start signal from the touch panel 35 provided to each of the plurality of the stations 4. Furthermore, the CPU 81 performs control to update the bet existence determination table (see FIG. 18D) in each of the stations 4 that have received the game start signal.

In Step S15, the CPU 81 performs processing to determine whether a game start signal has been received from each of the stations 4 that have received bet information. More specifically, the CPU 81 refers to the bet existence determination table (see FIG. 18D) and performs processing to determine whether a game start signal has been received from each of the stations 4 that have received bet information. In a case of a YES determination, the CPU 81 advances the processing to Step S16, and in a case of a NO determination, returns the processing to Step S14, In Step S16, the CPU 81 performs processing to shorten the bet time. More specifically, the CPU 81 performs processing to subtract a predetermined number (for example, 20 seconds) from the bet time set in the RAM 83 in Step S11.

Thus, according to the present embodiment, in a mass game, a gaming machine can be provided which can shorten a bet time while waiting for bets from all of the players.

It should be noted that, in the present invention, although the bet time is shortened when a game start signal has been received from each of the stations that have received bet information, the present invention is not limited thereto and, for example, the bet time can be shortened when a game start signal has been received from a station 4 that first transmits bet information. Furthermore, the bet time can be shortened when a game start signal has been received from a station 4 that won the highest award in a previous game. According to this, it is possible to add a novel game property in that game leadership is pursued.

In Step S17, the CPU 81 performs control to display the bet time shortening period image (see FIG. 26D) on the display screen 210a of the dealer used display 210.

In Step S18, the CPU 81 determines whether or not a bet time has elapsed. More specifically, the CPU 81 starts measurement of a lapse of time t using the timer 131, compares the lapse of time t with data that indicates a bet time stored in the RAM 83, and determines whether the lapse of time t measured by the timer 131 has reached the bet time. In the case of a NO determination, the CPU 81 returns the processing to Step S18, and in the case of a YES determination, the CPU 81 advances the processing to Step S19.

In Step S19, the CPU 81 displays the bet end instruction image (see FIG. 27D) on the display screen 210a of the dealer used display 210. It should be noted that, whether or not the bet end instruction image is displayed may be determined according to a dealer's level with reference to the instruction image display determination (see FIG. 17D).

In Step S20, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 29D).

Descriptions regarding the present embodiment have been provided above. Although a case has been described in which the number of dice 70 is three according to the present embodiment, the number of in the present invention is not limited to three and, for example, the number of the dice may be five.

Furthermore, in the present embodiment, although a dice game such as SIC BO is described, the present invention is not limited thereto, and can be applied to a roulette game, card games such as baccarat, and the like.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified appropriately. Moreover, it should be understood that the advantages described in association with the embodiments are merely a listing of most preferred advantages, and that the advantages of the present invention are by no means restricted to those described in connection with the embodiments.

Embodiments of the present invention are described below with reference to the accompanying drawings.

FIG. 1E is a flowchart showing a general outline of an embodiment of the present invention. Although details are described later, a game terminal 3 accepts a bet and performs transmission there of to a controller 2 (Step S100). Then, a CPU 81 of the controller 2 determines a game terminal 3 to operate a shake button 301 (Step S101). When the CPU 81 of the controller 2 detects that the game terminal 3 has operated the shake button 301 (Step S102), the CPU 81 causes a dice movable unit 4 to perform a shaking motion (Step S103). After performing the shaking motion, when the dice come to rest, the dice movable unit 4 detects a number of dots on the dice (Step S104), and the CPU 81 of the controller 2 determines an award according to the number of dots on the dice and causes the game terminal 3 to perform payout processing (Step S105).

<Overall Outline>

With reference to FIG. 2E, a gaming system 1 of the present embodiment is described. FIG. 2E is a perspective diagram schematically showing an example of the gaming system 1.

The gaming system 1 of the present embodiment is configured by a controller 2, game terminals 3, and a dice movable unit 4. Furthermore, a history display unit 91 is provided at a position visually recognizable by players playing at a plurality of game terminals 3. In the present embodiment, a gaming system that performs a Sic Bo game is explained.

The controller 2 controls the overall gaming system 1. Furthermore, in the present embodiment, the controller 2 includes a dealer used display 210, which is used by a dealer 5 present as a facilitator of a game, and a touch panel 211 provided at the dealer used display 210, and executes a control for the overall gaming system 1 according to an operation of the dealer 5.

The game terminals 3 are terminals that players operate. The game terminals 3 accept bet operations by players sitting on chairs (not shown) provided in front of the game terminals 3, and pay out awards of games. Details thereof are described later.

The dice movable unit 4 rolls a plurality of the dice 40 used in a Sic Bo game. The plurality of dice 40 is caused to roll, and an award is determined based on a combination of numbers showing on an upper face (hereinafter, a number of dots on dice) when the dice 40 come to rest. In other words, a random number can be obtained by rolling a plurality of the dice 40.

The history display unit 91 displays a history of a game, mainly a number of dots on the dice. Details thereof are described later.

<Game Terminal>

The game terminals 3 are described with reference to FIG. 3E. FIG. 3E is a perspective diagram of the game terminals 3.

The game terminals 3 are configured with; a cabinet 32 that makes a housing holding a circuit board and the like; an upper door 33 on which a display device 330, an operation unit 332, and the like are disposed; a hopper unit 34 that can be a retaining device for medals or coins, and discharge medals or coins; and a detachable application unit 35 at which speakers 351, a lamp unit 352 and the like are disposed.

The cabinet 32 holds the circuit board and the like therein, and configures a main body of the game terminal 3. The cabinet 32 includes: a sub holding portion 321 that is formed below the upper door 33 (hereinafter, a lower direction shown in the drawing is a lower side B); a main holding portion 322 that is formed at the lower side B of the sub holding portion 321; and a support portion 323 that is also formed at the further lower side B of the main holding portion 322.

At the front side F (hereinafter, a front direction shown in the drawing is a front side F) of the cabinet 32 and the sub holding portion 321, a card insertion opening 326 into which a player card which is an information storage medium of a Player Tracking System (PTS) is inserted and a player information display unit 327 for displaying information stored in the player card thus inserted are provided. In the player card, information relating to a player such as a player's ID is stored, and history information of a player as a holder of the player card which is inserted into the card insertion opening 326 is displayed on the player information display unit 327. It should be noted that, in the present embodiment, play history is also stored in the player card.

Furthermore, the cabinet 32 includes a foot lamp 325 on the front side F of the cabinet 32 and at the lower side B of the main holding portion 322. In addition, the foot lamp 325 is disposed at the front side F of the support portion 323. Then, the foot lamp 325 irradiates light toward the lower side B so as to irradiate a region corresponding to a player's feet while the player is sitting in front of the game terminal 3.

A support board 324 is provided at the lower side B of the cabinet 32. This support board 324 is disposed at the lowest side B of the cabinet 32 and is formed to protrude from an end of the lower side B of the support portion 323 to the front side F.

Furthermore, at the rear side R (hereinafter, a direction of a rear face side is a rear side R) of the cabinet 32, a housing light emitting unit (not shown) is provided. The housing light emitting unit 24 emits light or changes a light emitting mode according to a control signal from the CPU ill.

The upper door 33 is disposed at the upper side T of the cabinet 32 so as to cover the upper side T of the cabinet 32, and opens and closes so as to rotate around the end of the rear side R.

Furthermore, the upper door 33 includes: a display device 330 that mainly displays an image relating to a game; an operation unit 332 in which a player performs an operation relating to a game; a coin insertion opening 333 into which a coin is inserted; and a bill insertion opening 334 into which a bill is inserted. In addition, a shake button 301 that causes the dice to roll and a select button 302 that is pushed when selecting a bet operation after the bet operation are provided in the operation unit 332. Moreover, in a case other than the bet operation, the select button 302 is pushed when confirming an input that a player performed.

Furthermore, a payout button 303 and a help button 304 are disposed on the right side R2 of the display device 330 on the upper door 33. The payout button 303 is a button which is usually pushed at the end of a game, and when the payout button 303 is pushed, game media corresponding to credits that the player possesses are paid out from the coin payout opening 342. Another operation is performed by the player touching a display screen displayed on the display device 330. That is, since a touch-sensitive sensor is installed on the surface of the display device 330, various operations are recognized by the player touching by way of a so-called touch panel type.

The help button 304 is a button that is pushed in a case where a method of operating the game is unclear, and upon the help button 304 being pushed, a help screen showing various types of operation information is displayed immediately thereafter on the display device 330.

A hopper unit 34 is disposed closer to the right side (hereinafter, a direction of a right side is a right side R2) at the lower side B of the upper door 33 and the sub holding portion 321. The hopper unit 34 forms a side face of the right side R2 of the game terminal 3 along with the right side R2 of the cabinet 32. This hopper unit 34 is provided as a separate body from the cabinet 32 and is connected to the cabinet 32 through a hopper opening portion (not shown) which is opened at a face of the lower side B of the sub holding portion 321.

The hopper unit 34 is formed in a vertically long shape in a thickness direction (a F-R direction). Then, at the front side F of the hopper unit 34, the coin payout opening 342, which pays out coins, is formed, and the coins paid out from the coin payout opening are retained in a coin tray 343.

The application unit 35 is disposed at a face of the upper side T of the cabinet and at the end of the rear side R. The application unit 35 is formed as a separate body from the cabinet 32 and can be detached from the cabinet (the details thereof are described later).

In the present embodiment, the application unit 35 includes speakers 351 and a lamp unit 352. That is, the speakers 351 and the lamp unit 352 are detachably formed as a single unit in the game terminal 3.

<Dice movable unit>

A dice movable unit 4 is described with reference to FIGS. 2E and 4E. FIG. 4E is a perspective diagram showing a dice movable unit 4.

The dice movable unit 4 is configured so as to allow a plurality of the dice 40 to roll and stop. This dice movable unit 4 includes a shaking device 41, which is configured so that the dice 40 rolling can be visually recognized, and a unit body 47 that holds the shaking device 41. In the present embodiment, the three dice 40 (the die 40a, the die 40b, and the die 40c) are also used in the shaking device 41.

Lamps 42 are disposed at the dice movable unit 4. The lamps 42 perform rendered effects by emitting light while the dice 40 are being rolled. Furthermore, a speaker 46 is disposed at a side of the dice movable unit 4.

The shaking device 41 is formed in a circular shape and includes a playing board 41a that supports a plurality of the dice 40, an IC tag reader 43 that is embedded in the playing board 41a, and a cover member 44 that is disposed so as to enclose the playing board 41a from above.

Since the playing board 41a is formed to be substantially planar, as shown in FIG. 4E, the dice 40 are rolled by oscillating the playing board 41a substantially in the vertical direction with respect to the horizontal direction of the playing board 41a. Then, when the oscillation of the playing board 41a stops, the dice 40 rolling come to rest. The playing board 41a is oscillated by a CPU 81 (described later) driving the shaking device 41.

Furthermore, the IC tag reader 43 is embedded in the surface of the playing board 41. This IC tag reader 43 recognizes an IC tag embedded in each of the faces of the dice 40. It should be noted that it is preferable for the IC tag reader 43 to be embedded in the surface of the playing board 41a so as not to be visually recognized from the outside of the playing board 41a. For example, the playing board 41a is formed by disposing the IC tag reader 43 at the surface of a member as a base of the playing board 41a, and then placing a member as a cover thereover.

The cover member 44 is disposed so as to cover the entire top face of the playing board 41a. In addition, the cover member 44 is made of a transparent member in a substantially hemispherical shape and limits an area in which the dice 40 roll. In the present embodiment, an infrared camera 45 is provided at the top of the cover member 44 to detect the numbers of dots and the like (such as positions of the dice 40 on the playing board 41a, classification of the dice 40, and numbers of dots of the dice 40) of the dice 40. Furthermore, the cover member 44 is covered with a special film (not shown) which blocks infrared radiation.

Thus, it can prevent the infrared camera 45 from incorrectly detecting the numbers of dots on the dice 40.

A plurality of the dice 40 is disposed at a space formed by the playing board 41a and the cover member 44. In the present embodiment, the dice 40 are substantially hexahedral and the IC tags are embedded in each face thereof. It should be noted that it is preferable for this IC tag to be embedded in the surface of the dice 40 so as not to be visually recognized from the outside of the dice 40. For example, the dice 40 are formed by disposing the IC tag at the surface of a member as a base of the dice 40, and then placing a member as a cover thereover.

The IC tag reader 43 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 43. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader.

In addition, reading the IC tags may not only be done by the non-contact type, but also a contact type. In addition, the IC tag reader is not limited thereto, and anything that is appropriately designed with the object of being read may be employed.

Here, in the present embodiment, the number of dots of a face, opposing the face on which the IC tag is embedded, is determined as the number of dots of the dice 40.

More specifically, "one" is stored as data of the number of dots in the IC tag on the face of which the number of dots is "six". "Two" is stored as data of the number of dots in the IC tag on the face of which the number of dots is "five". "Six" is stored as data of the number of dots in the IC tag on the face of which the number of dots is "one". "Five" is stored as data of the number of dots in the IC tag on the face of which the number of dots is "two". "Three" is stored as data of the number of dots in the IC tag on the face of which the number of dots is "four". Finally, "four" is stored as data of the number of dots in the IC tag on the face of which the number of dots is "three".

Then, in a state in which the dice 40 have come to rest, the IC tag reader 43 reads an IC tag on a face that is in contact with the playing board 41a (in other words, a face facing toward the lower side of the dice 40). Then, since data of a number of dots for a face opposite to the face is stored in the IC tag of the face thus read, the face presently facing the upper side is recognized as a number of dots.

For example, in the dice 40, in a case in which a face that is in contact with the playing board 41a is a face of which the number of dots is "six", the IC tag reader 43 reads data of an IC tag which is embedded in the face of "six". Data of the number of dots stored in the IC tag of the face "six" is "one", which is the number of dots on the face opposing the face of "six", and thus the number of dots on the dice 40 is recognized as "one".

FIG. 5E is a diagram showing a sheet 401 attached to each face of the dice 40.

As shown in FIG. 5E, on each face of the dice 40, the sheet 401, to which infrared absorption ink is applied to identify the number of dots and the classification of the dice 40, is provided so as to be covered by a sheet on which the number of dots is printed. According to FIG. 5E, the infrared absorption ink can be applied to dots 181, 182, 183, 184, 185, 186, and 187.

The number of dots of the dice 40 can be identified by a combination of the dots to which the infrared absorption ink is applied among the dots 184, 185, 186, and 187. In addition, the classification of the dice 40 can be identified by a combination of the dots to which the infrared absorption ink is applied among the dots 181, 182, and 183.

FIG. 6E shows an image in which the dice 40, which come to rest on the playing board 41a, are captured substantially in the vertically upward direction using an infrared camera 45.

With reference to FIG. 6E, dots to which the infrared absorption ink is applied on each of the dice 40a, 40b, and 40c are captured in black. The classification and the number of dots for each of the dice 40a, 40b, and 40c are determined based on a combination of the dots to which the ink is applied. In addition, the playing board 41a is formed in a disc shape having a radius a, and each position of the dice 40a, 40b, and 40c is detected as an x component and y component on an x-y coordinate.

<History Display Unit>

FIG. 7E is a diagram showing an example of an image displayed on a display screen of a history display unit.

On the display screen of the history display unit 91, display areas 91a, 91b, 91c, and 91d are set for displaying cumulative amounts of four types of progressive awards. Display areas 91e, 91f, 91g, and 91h displays game histories, and in the display area 91e, information such as a number of dots in the last game before a present game is displayed.

"1", "2", "3", "6", and "Small" are displayed in the order from left as a displayed content in the display area 91e. The leftmost "1" represents a number of dots on a blue die by being displayed in blue. The second "2" from the left represents a number of dots on a red die by being displayed in red. The third "3" from the left represents a number of dots on a white die by being displayed in white. The fourth "6" from the left represents a sum total value of each of the dice (blue, red, and white). The display areas 91f to 91h are similar to the display areas 91e. In addition, "Small" is displayed, for example, in a case in which a sum total value of numbers of dots on the dice belongs to a numeral range of 4 to 10 among tow numeral ranges 4 to 10 and 11 and 17. "Big" is displayed in a case in which a sum total value of numbers of dots on the dice belongs to a numeral range of 11 to 17.

It should be noted that a plurality of luminous bodies (LEDs) (not shown) is disposed around the history display unit 91, and this plurality of LEDs emits light in various light emitting modes according to game advancement.

Example of Display Screen

An example of a display screen displayed on the display device 300 of the game terminal 3 is described with reference to FIG. 8E. FIG. 8E shows an example of a display screen displayed on the display device 330.

As shown in FIG. 14E, the display device 330 in the present embodiment is a touch-panel type of liquid crystal display, on the front surface of which a touch panel 331 is attached, allowing a player to perform selection such as of icons displayed on the display device 330 by contacting the touch panel 331, e.g., with a finger.

A table-type betting board (a bet screen), as shown in FIG. 8E, for predicting the number of dots of the dice 40 is displayed in a game at a predetermined timing on the display device 330.

A detailed description is now provided regarding the bet screen. On the bet screen are displayed a plurality of normal bet areas 441 and a side bet area 442. The plurality of normal bet areas 441 includes a normal bet area 441A, a normal bet area 441B, a normal bet area 441C, a normal bet area 441D, a normal bet area 441E, a normal bet area 441F, a normal bet area 441G, and a normal bet area 441H. By contacting the touch panel 331, e.g., with a finger, the normal bet area 441 is designated, and by displaying chips in the normal bet area 441 thus designated, a normal bet operation is performed. Furthermore, by contacting the touch panel 331, e.g., with a finger, the side bet area 442 is designated, and by displaying chips in the side bet area 442 thus designated, a side bet operation is performed.

A unit bet button 443, a re-bet button 443E, a payout result display unit 445, and a credit amount display unit 446 are displayed at the right side of the side bet area 442 in order from the left side.

The unit bet button unit 443 is a group of buttons that are used by a player to bet chips on the normal bet area 441 and the side bet area 442 designated by the player. The bet button 443 is composed of a 1 bet button 443A, a 5 bet button 443B, a 10 bet button 443C, and a 100 bet button 443D. It should be noted that in the case of an incorrect bet operation, the player can start a bet operation again by touching a re-bet button 443E.

Firstly, the player designates the normal bet area 441 or the side bet area 442 using a cursor 447 by way of contacting the touch panel 331, e.g., with a finger. At this time, contacting the 1 bet button 443A, e.g., with a finger, allows for betting one chip at a time (number of chips to be bet increases one by one in the order of 1, 2, 3, every time the 1 bet button 443A is contacted, e.g., by a finger). Similarly, when contacting the 5 bet button 443B, e.g., with a finger, five chips at a time can be bet (number of chips to be bet increases five by five in the order of 5, 10, 15, every time the 5 bet button 443B is contacted, e.g., by a finger). Similarly, when contacting the 10 bet button 443C, e.g., with a finger, ten chips at a time can be bet (number of chips to be bet increases ten by ten in the order of 10, 20, 30, every time the 10 bet button 443C is contacted, e.g., by a finger). Similarly, when contacting the 100 bet button 443D, e.g., with a finger, a hundred chips at a time can be bet (number of chips to be bet increases hundred by hundred in the order of 100, 200, 300, . . . every time the 100 bet button 443D is contacted, e.g. by a finger). The number of chips bet up to the current time is displayed as a chip mark 448, and the number displayed on the chip mark 448 indicates the number of bet chips.

The number of bet chips and payout credit amount for a player in a previous game are displayed in the payout result display unit 445. A number obtained by subtracting the amount bet from the payout credits is the credits which the player has newly obtained by the previous game.

The credit amount display unit 446 displays the credit amount which the player possesses. The credit count decreases according to the number of bet chips (1 credit count for 1 chip) when the player bets chips. If the bet chips are entitled to an award and credits are paid out, the credit amount increases in accordance with the number of paid out chips. It should be noted that the game is over when the player's credit count becomes zero.

The normal bet area 441 in the bet screen is described next. The normal bet areas 441A and 441B are portions where the player places a bet on a predicted sum of dots appearing on the dice 40A to 40C. In other words, the player selects the normal bet area 441A if the predicted sum falls in a range of 4 to 10, or the normal bet area 441B if the predicted sum falls in a range of 11 to 17. Odds are set to 1:1 (2 chips are paid out for 1 chip bet).

The normal bet area 441C is a portion where the player places a bet, predicting that two dice 40 have the same number of dots. In other words, the player wins an award if one of the combinations occurs, such as (1, 1), (2, 2), (3, 3), (4, 4), (5, 5), and (6, 6), and the odds are set to 1:10.

The normal bet area 441D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5), and (6, 6, 6), and the odds are set to 1:30.

The bet area 441E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 441F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 441G is a portion where the player places a bet on predicted dots appearing on the two dice selected from the three, and the odds are set to 1:5.

The normal bet area 441H is a region where the player places a bet on the number of dots appearing on the dice 40, and the odds are set according to the number of dots of the dice 40 matching the predicted number of dots.

<Internal Configuration>

FIG. 9E is a block diagram showing an internal configuration of the controller 2. A main control unit 80 of the gaming machine 1 includes a microcomputer 85, which is configured with a CPU 81, ROM 82, RAM 83, and a bus 84 that transfers data therebetween.

The CPU 81 is connected with a shaking device 41 via an I/O interface 90. Furthermore, the CPU 81 is connected with a timer 131, which can measure time via the I/O interface 90. In addition, the CPU 81 is connected with a lamp 42. The lamp 42 emits various colors of light for performing various types of rendered effects, based on output signals from the CPU 81. Furthermore, the CPU 81 is connected with a speaker 46 via a sound output circuit 461. The speaker 46 emits various sound effects for performing various types of rendered effects, based on output signals from the sound output circuit 461. Furthermore, the I/O interface 90 is connected with the abovementioned infrared camera 45 and/or the IC tag reader 43, thereby transmitting and receiving information in relation to the number of dots of the three dice 40, which comes to rest on the playing board 41a, between the infrared camera 45 and/or the IC tag reader 43. In addition, via a communication interface 95 connected to the I/O interface 90, the main control unit 80 transmits and receives data such as bet information, payout information, and the like to and from each game terminal 3, as well as data such as bet start instruction images, bet start instruction signals, and the like to and from the dealer used display 210.

ROM 82 in the main control unit 80 is configured to store a program for implementing basic functions of the gaming system 1; more specifically, a program for controlling various devices which drive the dice movable unit 4, a program for controlling each tame terminal 3, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each game terminal 3, information on respective number of dots that appear on the dice 40 transmitted from the infrared camera 45 and/or the IC tag reader 43, data relating to the results of processing executed by CPU 81, and the like.

A jackpot storage area is provided in the RAM 83. In the jackpot storage area, the data indicating the number of playing media stored cumulatively is stored so as to correspond to each number of dots of matching dice. The data is provided to the game terminal 3 at a predetermined timing, and a jackpot image is displayed.

The CPU 81 controls the shaking device 41 of the dice movable unit 4 based on data or a program stored in the ROM 82 or the RAM 83, and oscillates the playing board 41a (shaking motion) of the dice movable unit 4. Furthermore, after the shaking motion of the playing board 41a ceases, a control processing associated with game progression, such as confirmation processing for confirming the number of dots on each of the dice 40 resting on the playing board 41a is executed.

Furthermore, the I/O interface 90 is connected with a history display unit 91, and the main control unit 80 transmits and receives information in relation to the number of dots on the die as game history, to and from the history display unit 90.

Furthermore, an external large-size monitor is connected to the I/O interface 90 through the controller 400, and the main controller 80 transmits and receives image data and the like to/from the external large-size monitor 500. On the external large-monitor 500, a game advancement, a game result, a live image of dice rolling, a demonstration screen, and the like are displayed. This attracts interest of people around the external large-size monitor 500.

In addition to the control processing described above, the CPU 81 has a function of executing a game by transmitting and receiving data to and from each station 4 so as to control each game terminal 3. More specifically, the CPU 81 accepts bet information transmitted from each game terminal 3. Furthermore, the CPU 81 performs win determination processing based on the number of dots on the dice 40 and the bet information transmitted from each game terminal 3, and calculates the amount of an award paid out in each game terminal 3 with reference to the payout table stored in the ROM 82.

FIG. 10E is a block diagram showing an internal configuration of the game terminal 3. The game terminal 3 includes a main body 100 in which the display device 330 and the like are provided and a coin sensor 341 that is attached to the main body 100. The main body 100 further includes a terminal control unit 110 and some peripheral devices.

The terminal control unit 110 includes ROM 112 and RAM 113.

ROM 112 stores a program for implementing basic functions of the game terminal 3, other various programs needed to control the game terminal 3, a data table, and the like.

Moreover, a shake button 301, a select button 302, a payout button 303, and a help button 304 are connected to the CPU 111, respectively. The CPU 111 controls the execution of various corresponding operations in accordance with manipulation signals, which are generated in response to each button pressed by a player. More specifically, the CPU 111 executes various processing, based on input signals provided from the shake button 301, the select button 302, the payout button 303, and the help button 304 in response to a player's operation, and data or programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the game terminal 3. The CPU 111 performs various kinds of processing based upon the input signals supplied from the shake button 301, the select button 302, the payout button 303, the help button 304, and the touch panel 331, and the data or the programs stored in the ROM 112 and the RAM 113. Then, the CPU 111 controls the peripheral devices which configure the game terminal 3 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

A hopper unit 34, which is connected to the CPU 111, pays out a predetermined number of game media through the coin payout opening 342 by way of the instruction signals from CPU 111.

The display device 330 is connected to the CPU 111 via a liquid crystal driving circuit 120. The liquid crystal driving circuit 120 includes program ROM, image ROM, an image control CPU, work RAM, a video display processor (VDP), video RAM, and the like. The program ROM stores an image control program with respect to a display on the display device 330 and various kinds of selection tables. The image ROM stores dot data for creating an image to be displayed on the display device 330, and dot data for displaying a jackpot image, for example. In addition, the image control CPU determines an image to be displayed on the display device 330, selected from the dot data previously stored in the image ROM according to the image control program previously stored in the program ROM based on parameters specified by the CPU 111. The work RAM is configured as a temporary storage means when executing the image control program by the image control CPU. The VDP is a component for creating an image corresponding to the display contents determined by the image control CPU and for outputting the image thus created to the display device 330. It should be noted that the video RAM is configured as a temporary storage device used by the VDP for creating an image.

As mentioned above, the touch panel 331 is attached to the front side of the display device 330, and the information related to operation on the touch panel 331 is transmitted to CPU 111. The touch panel 331 detects an input operation by the player on a bet screen and the like. More specifically, selection of the normal bet area 441 and the side bet area 442 in the bet screen (see FIG. 8E), manipulation of the bet button unit 443 and the like, are performed by touching the touch panel 331, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 351 are connected to the CPU 111. The speaker 351 emits various sound effects for performing various kinds of rendered effects, based on output signals from the sound output circuit 126. In addition, the hopper unit 34, into which game media such as coins or medals are inserted, is connected to the CPU 111 via a data receiving unit 127. The data receiving unit 127 receives credit signals transmitted from the hopper unit 34, and the CPU 111 increases a player's credit amount stored in the RAM 113 based on the credit signals transmitted. A timer 130, which can measure time, is connected to the CPU 111.

<Each Table>

An instruction image display determination table is described with reference to FIG. 11E.

In Step S1 of FIG. 22E and Step S7 of FIG. 23E, the instruction image display determination table is referred to by the CPU 81 upon determining whether a bet start instruction image or a bet end instruction image is displayed on the display screen 210a of the dealer used display 210.

According to this table, "X" is data for indicating that the bet start instruction image and the like is not displayed on the display screen 210a, and "O" is data for indicating that the bet start instruction image and the like is displayed on the display screen 210a. For example, in a case in which a dealer belongs to an intermediate level, the bet start instruction image is not displayed on the display screen 210a, but the bet end instruction image is displayed on the display screen 210a. In addition, this table is stored in the ROM 82.

The bet existence determination table is described with reference to FIG. 12E.

The CPU 81 refers to this bet existence determination table upon determining for each game terminal 3 whether a bet operation is performed at each game terminal 3 in Step S18 of FIG. 24E.

Data indicating whether the bet operation has been performed or not at each game terminal number is stored in this table. "P" is data indicating that a bet operation was performed, and "A" is data indicating that a bet operation was not performed.

Furthermore, regarding the number of the game terminals at which the data "P" which indicates that a bet operation has been performed, a value indicating a bet amount is stored in a row of "Value". In this value, a sum total of the bet amounts is stored in a case in which a plurality of bets is placed at the game terminal 3. Then, in Step S18 of the FIG. 24E, the CPU 81 performs processing of comparing the values indicating the bet amounts in the "Value", recognizing a game terminal 3 that has been bet of the largest amount among the game terminals 3 that have bet, and entitling the game terminal 3 to cause a shaking motion to be started. The details of this processing are described later.

In addition, this table is updated in every game, and stored in the RAM 83.

An IC tag data table is described with reference to FIG. 13E.

The IC tag data table is a table showing data as identification data 1 to 3 which is created by the CPU 81 based on the results of the type of dice and the number of dots on the dice, when information stored in IC tags embedded in the dice 40a, 40b, and 40c is detected by the IC tag reader 43.

According to this table, for example, when an IC tag embedded in each die is detected in the order of 40c, 400a, and 40b, by the IC tag reader 43, the die 40c is associated with identification data 1 of which the type is "red" and the number of dots is "six", the die 40a is associated with identification data 2 of which the type is "white" and the number of dots is "three", and the die 40b is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 43 to the CPU 81, and then the CPU 81 receives it to analyze the number of dots on a die and the like.

An infrared camera capturing data table is described with reference to FIG. 14E.

The infrared camera capturing data table is a data table showing dot patterns of the infrared absorption inks applied to the dice 40 and location data of the dice 40 on the playing board 41a.

For example, regarding the die 40a shown in FIG. 6E, in the infrared camera capturing data table, the CPU (not shown) inside the infrared camera 45 stores −50 for X and 55 for Y as location data, stores "O" for 181, 182, 184, 186, and 187, to which the infrared absorption inks are being applied, and stores "X" for 183 and 185, which are not being applied. The same is true of the dice 40b and 40c.

In addition, this data table is transmitted from the infrared camera 45 to the CPU 81, and then the CPU 81 receives it to analyze the number of dots on a die and the like.

A dot pattern data classification table is described with reference to FIG. 15E.

According to this table, colors as the classification for the dice 40 are set so as to correspond to dot combinations to which the infrared absorption ink is applied, among the abovementioned dots 181 to 183 in FIG. 6E. "O" indicates that the infrared absorption ink is applied to the dot, and "x" indicates that the infrared absorption ink is not applied to the dot.

For example, in a case where the infrared camera capturing data table described in FIG. 14E is transmitted to the CPU 81 from the infrared camera 45, the CPU 81 determines the classification of the dice 40 as "red" by comparing the infrared camera capturing data table with the dot pattern data classification table.

A number of dots-dot pattern data table is described with reference to FIG. 16E.

According to this table, numbers as the number of dots on the dice 40 are set so as to correspond to dot combinations to which the infrared absorption ink is applied, among the abovementioned dots 184 to 187 in FIG. 5E. "O" indicates that the infrared absorption ink is applied to the dot, and "X" indicates that the infrared absorption ink is not applied to the dot.

For example, in a case where the infrared camera capturing data table shown in FIG. 14E is transmitted from the infrared camera 45 to the CPU 81, the CPU 81 determines the number of dots on the dice 40 as "five" by comparing the infrared camera capturing data table thus received with the dot pattern data classification table.

Display Example

A bet start instruction image is described with reference to FIG. 17E.

The bet start instruction image is displayed by the CPU 81 on the display screen 210a of the dealer used display 210 before the CPU 81 accepts a bet from each game terminal 3.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

A bet end not recommended image is described with reference to FIG. 18E.

This bet end not recommended image is displayed by the CPU 81 on the display screen 210a of the dealer used display 210 while the CPU 81 accepts a bet from each game terminal 3.

This bet end not recommended image instructs the dealer not to touch a "bet end" button.

A bet end instruction image is described with reference to FIG. 19E.

The bet end instruction image is displayed by the CPU 81 on the display screen 210a of the dealer used display 210 after elapse of a predetermined time from when the CPU 81 starts accepting a bet from each game terminal 3.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

With reference to FIG. 20E, a display example of the display device 30 of each of the game terminals 3 is described.

An image displayed on FIG. 20E reports to each of the game terminal 3 that acceptance of bets has ended. A player can recognize that the acceptance of bets has ended by recognizing that a message "NO MORE BETS" is displayed.

With reference to FIG. 21E, a display example on the display device 330 of each of the game terminals 3 is described.

An image shown in FIG. 21E shows a case in which a controller 2 entitles a predetermined game terminal 3 to perform a second shaking motion, the game terminal 3 is operated by pushing the shake button 301, and then the dice movable unit 4 performs the second shaking motion.

More specifically, a display is performed in which an image that is displayed while the shake button 301 is operated is shaken. In the present embodiment, it is shown that the display screen illustrated in FIG. 20E is shaken.

Since almost as soon as the second shaking motion is performed, a display is performed in which a display screen of the display device 330 of the game terminal 3 is shaken, a player can feel an effect that has been caused by the one's operation, and another player also can simultaneously know that the dice are being shaken.

<Flow of Processing>

Subsequently, with reference to FIGS. 22E to 27E, processing of a gaming system 1 according to the present embodiment is described. FIGS. 22E to 26E are flowcharts showing processing of the gaming system 1. Furthermore, FIG. 27E is a flowchart showing number of dots on dice detection processing of FIG. 26E.

First, in Step S1, the CPU 81 displays the bet start instruction image (see FIG. 17E) on the display screen 210a of the dealer used display 210. It should be noted that, whether or not the bet start instruction image is displayed may be determined according to a dealer's level with reference to the instruction image display determination (see FIG. 11E).

Thus, according to the dealer's level, it becomes possible to determine whether the bet start instruction image is displayed on the display screen 210a of the dealer used display 210.

In Step S2, the CPU 81 determines whether the bet start instruction signal has been received from the touch panel 211 disposed on the dealer used display 210. In the case of a NO determination, the CPU 81 returns the processing to Step S2, and in the case of a YES determination, the CPU 81 advances the processing to Step S3. In Step S3, the CPU 81 transmits the bet start signal to each of the game terminals 3. Then, the CPU 111 of each of the game terminals 3 starts accepting bets upon receiving the bet start signal (Step S4).

In Step S6, the CPU 81 of the controller 2 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S6, and in the case of a YES determination, the CPU 81 advances the processing to Step S7 of FIG. 23E.

In Step S7 of FIG. 23E, the CPU 81 displays the bet end instruction image (see FIG. 18E) on the display screen 210a of the dealer used display 210. It should be noted that, whether or not the bet end instruction image is displayed may be determined according to a dealer's level with reference to the instruction image display determination (see FIG. 11E).

In Step S8, the CPU 81 determines whether the bet end instruction signal has been received from the touch panel 211 disposed on the dealer used display 210. In the case of a NO determination, the CPU 81 returns the processing to Step S8, and in the case of a YES determination, the CPU 81 advances the processing to Step S9. In Step S9, the CPU 81 transmits the bet end signal to each game terminal 3. At each of the game terminals 3, the CPU 81 performs bet acceptance end processing (Step S11) upon receiving the bet end signal (Step S10). The bet acceptance end processing is processing that makes betting not possible, and in which the CPU 111 in the terminal control unit 110 displays on the display device 330 an image that notifies that the acceptance of bets shown in FIG. 20E has ended.

In Step S12, the CPU 111 of the game terminal 3 transmits bet data to the controller 2. Here, the bet data is information relating to a normal bet input and a side bet input that have been performed in each of the game terminals 3. In addition, information is included that indicates whether a bet, which is stored in the bet existence determination table shown in FIG. 12E, has been performed or not. That is, in a case in which a bet has been performed at a game terminal 3, a CPU 111 of the game terminal 3 transmits data indicating that a bet has been performed and data indicating an amount of the bet to the controller 2.

In Step S13, the CPU 81 of the controller 2 receives bet information from each of the game terminals 3. Then, the CPU 81 of the controller 2 stores the bet data thus received in the RAM 83 (Step S14 of FIG. 24E).

This is the processing relating to a bet so far. Herewith, even an inexperienced dealer can perform start operations for bet placement and end operations according to instructional images.

In Step S15, the CPU 81 of the controller 2 transmits a first shaking motion start signal to the dice movable unit 4. Here, in the present embodiment, the first shaking motion indicates that a subtle oscillation of an extent the does not roll the dice 40 is applied to the playing board 41a, and the first shaking motion start signal is a signal that orders starting of the first shaking motion.

Then, in Step S16, the shake device 41 of the dice movable unit 4 receives the first shaking motion start signal from the controller 2 and starts the first shaking motion (Step S17). That is, by oscillating the playing board 41a subtly, the dice 40 are oscillated subtly. It should be noted that the first shaking motion is executed continuously until a second shaking motion (described later) is performed.

In Step S18, the CPU 81 of the controller 2 which transmitted the first shaking motion start signal in Step S15 reads the bet data stored in the RAM 83, and compares the value. More specifically, the CPU 81 compares the value indicating the amount of the bet included in the bet data and obtains the number of the game terminal 3 which represents the largest value. Then, the CPU 81 determines the game terminal 3 representing the largest value as the game terminal 3 that performs the second shaking motion (Step S19).

Here, the second shaking motion refers to an oscillation of which the amplitude is larger than that of the first shaking motion and enough to be able to roll the dice 40.

In Step S20, the CPU 81 of the controller 2 transmits a second shaking motion permission signal to the game terminal 3 thus determined in Step S19.

Then, the CPU 111 of the game terminal 3 which has received the second shaking motion permission signal from the controller 2 (Step S21) turns on a shake button lamp 305 (Step S22). Thus, the player can recognize that the entitlement to perform the second shaking motion is given to the player. It should be noted that, at this time, it is preferable for an operation of the shake button 301 in the game terminals 3 to which the entitlement to perform the second shaking motion is not given to become ineffective.

In Step S23 of FIG. 25E, the CPU 111 of the game terminal 3 determines whether the shake button 301 has been operated. In a case of a NO determination, the CPU 111 returns the processing to Step S23. In a case of a YES determination, the CPU 111 advances the processing to Step S24.

In Step S24, the CPU 111 of the game terminal 3 transmits an operation signal that indicates that the shake button 301 has been operated. Then, the CPU 81 of the controller 2 which has received the operation signal from the game terminal 3 (Step S25) transmits the second shaking motion start signal to the dice movable unit 4 and the game terminal 3 (Step S26). Here, in the present embodiment, the CPU 81 of the controller 2 transmits the second shaking motion start signal to all of the game terminals 3.

Then, the dice movable unit 4 that has received the second shaking motion start signal from the controller 2 (Step S27) performs the second shaking motion (Step S28). Here, in the present embodiment, the second shaking motion rolls the dice 40 by causing the playing board 41a to momentarily move larger than that in the first shaking motion.

On the other hand, the CPU 111 of the game terminal 3 that has received the second shaking motion start signal from the controller 2 (Step S29) performs image shaking processing (Step S30). As shown in FIG. 21E, this image shaking processing is processing that gives an impression such as a momentary shake of the display device 330 to the player, almost as soon as the dice movable unit 4 performs the second shaking motion. In this case, it is preferable to perform this processing longer than a necessary time that the second shaking motion is performed so as not to be recognized as a display defect of the display device 330. It should be noted that a change may be performed in conjunction with the second shaking motion.

This allows the player who operated to feel their own operation having been actually reflected, and can psychologically lead the other players so as to raise their expectations for a result of their bet after performing the second shaking motion. Thus, this can give the players the feeling that they share live aspects.

In Step S31, the shaking device 41 of the dice movable unit 4 performs a shake end motion. More specifically, the shake end motion is an oscillation of which the amplitude is smaller than that of the second shake motion and in which an oscillation of an extent that the dice 40 are not rolled is performed for a predetermined time. For example, in a case in which the dice 40 are overlapping each other or leaning at a tilt against the cover member 44, the numbers of dots on the dice 40 cannot be identified correctly. Therefore, by providing an oscillation of an extent that the dice 40 are not rolled, the overlapping or tilting can be corrected, and thus the numbers of dots can be identified correctly.

In Step S32 of FIG. 26E, the dice movable unit 4 performs number of dots on dice detection processing. The details thereof are described later. In Step S33, the dice movable unit 4 transmits dice information. This dice information includes information of a number of dots on the dice 40 thus detected in Step S32.

When the CPU 81 of the controller 2 receives dice information from the dice movable unit 4 (Step S34), the CPU 81 performs award determination processing based on the dice information (Step S35). More specifically, the CPU 81 of the controller 2 refers to bet data included in the bet existence determination table stored in the RAM 83 and a multiplication ratio of the bet in the game, and determines an award for each of the game terminals 3.

In Step S36, the CPU 81 of the controller 2 transmits the award data thus determined in Step S35 to the game terminal 3 and ends the present flowchart.

The CPU 111 of a game terminal 3 that has received the award data from the controller 2 (Step S37) performs payout processing based on the award data, and ends the present flowchart.

FIG. 27E is a flowchart showing number of dots on dice detection processing.

In Step S71, the CPU 81 determines whether identification data of the three dice has been received from the IC tag reader 43. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 13E) received from the IC tag reader 43.

In Step S73, the CPU 81 determines the number of dots on the three dice. More specifically, the CPU 81 determines the number of dots of the three dice by analyzing the identification data 1 to 3. For example, in a case where the identification data is data as shown in FIG. 13E, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives capturing data from the infrared camera. More specifically, the CPU 81 receives the infrared camera capturing data table (see FIG. 14E) for each of the dice 40a, 40b, and 40c, from the infrared camera 45.

In Step S77, the CPU 81 determines numbers of dots on the dice. More specifically, the CPU 81 determines positions of the dice on the playing board 3a based on the infrared camera capturing data table (see FIG. 14E), determines types (colors) of the dice based on the infrared camera capturing data table (see FIG. 14E) and the dot pattern data classification table (see FIG. 15E), and determines numbers of the dice based on the infrared camera capturing data table (see FIG. 14E) and the number of dots-dot pattern data table (see FIG. 16E). This processing is executed for the three dice 40a, 40b, and 40c. Upon terminating the processing in Step S77, the CPU 81 terminates the number of dots detection processing.

Thus, even in a case where, for example, a die is inclined and the number of dots thereof cannot be identified by the IC tag reader 43, since the number of dots can be determined using the infrared camera 45, the accuracy of detection and identification of numbers of dots can be improved. Descriptions regarding the present embodiment have been provided above. Although a case has been described in which the number of dice 40 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the game terminal 3 includes, the controller of the present invention may be configured by only a single CPU.

Furthermore, as shown in FIG. 2E, in the present embodiment, although the game terminals 3 are disposed so as to face the controller 2 that the dealer 5 operates, the present invention is not limited thereto. For example, a configuration as shown in FIGS. 28E and 29E may be arranged.

FIG. 28E is a block diagram showing a modified example relating to arrangement. A gaming machine 1 according to the present embodiment includes a dice movable unit 4, a history display unit 91, and a plurality of game terminals 3 (for example, 8). Then, as shown in FIG. 28E, the game terminals 3 are disposed circularly and the dice movable unit 4 is disposed in the center thereof. Furthermore, the history display unit 4 is disposed above the dice movable unit. That is, the game terminals 3 are disposed around the dice movable unit 4 so as to surround the dice movable unit 4. Then, although the history display unit 4 is disposed above the dice movable unit 4 so as to be visually recognized by each player playing at each of a plurality of the game terminals 3 and around the gaming system 1, in this case, it is preferable to install a display device that can display a screen on both sides thereof.

FIG. 29E is a block diagram showing a modified example of arrangement. In the arrangement shown in FIG. 29E, two history display units 91 are disposed behind the plurality of the game terminal 3 so as to be visually recognizable by each player at a plurality of the game terminal 3 or around the game device. A plurality of the game terminals 3 is disposed so as to surround the dice movable unit 4. More specifically, two station groups are provided, each of which has four game terminals, and these are disposed at locations facing each other across the dice movable unit 4. That is, players at the one four stations visually recognize the one history display unit 91 disposed behind the other four stations, and players at the other four stations visually recognize the other history display unit 91 disposed behind the one four stations 4.

Furthermore, in the present embodiment, although the history display unit 91 is installed to be separate from the external large-size monitor 500, the present invention is not limited thereto. For example, a display screen which is displayed on the history display unit 91 and a display screen which is displayed on the external large-size monitor 500 may be displayed simultaneously, and it may also be configured so that a dealer switches those alternately depending on situations.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

Embodiments of the present invention are described below with reference to the accompanying drawings.

Although details are described later, as shown in FIG. 1F, dice 70 (70a, 70b, and 70c) are configured in three-piece structure including a core portion 71 of a substantially cubic shape, an intermediate portion 72 which covers the overall core portion 71, and a covering portion 73 which covers the overall intermediate portion 72. The core portion 71 and the intermediate portion 72 are made of foam members, and in particular, the intermediate portion 72 is made of a form member with a higher foam expansion ratio than the core portion 71, i.e. a hard foam member.

Moreover, the RFID tags 51 to 56 are disposed at six faces of the core member 71 in a substantially cubic shape, respectively (see FIG. 4F with respect to the RFID tags 54 and 56), and the RFID tags 51 to 56 are held in a contacted state between the core portion 71 and the intermediate portion 72.

FIG. 2F is a perspective view schematically showing an example of a gaming machine according to the embodiment of this invention. FIG. 3F is an enlarged view of a playing unit of the gaming machine shown in FIG. 2F. As shown in FIG. 2F, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. A bet start instruction image or a bet end instruction image, for example, is displayed on the display screen 210a of the dealer used display 210. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and come to rest, a plurality of stations 4 (ten in the present embodiment) disposed so as to surround the playing unit 3, and a dealer used display 210 that is positioned so as not to be visually recognizable by a player seated at each station 4.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70a, 70b, and 70c) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3a to roll and then stop the dice 70. An RFID tag reader 16 is provided below the playing board 3a.

Since the playing board 3a is formed to be substantially planar, as shown in FIG. 3F, the dice 70 are rolled by oscillating the playing board 3a substantially in the vertical direction with respect to the horizontal direction of the playing board 3a. Then, the dice 70 are stopped after the oscillation of the playing board 3a ceases. The playing board 3a is oscillated by a CPU 81 (described later) driving an oscillating motor 300.

Furthermore, as shown in FIG. 3F, the playing unit 3 is covered with a cover member 12 of which the entire upper area is made of a transparent acrylic material formed in a hemispherical shape, and regulates the rolling area of the dice 70. In the present embodiment, an infrared camera 15, which detects a number of dots on the dice 70, is provided at the top of the cover member 12. In addition, an RFID system using an RFID tag (described later) is provided in order to detect a number of dots on the dice 70.

FIG. 4F is an exploded perspective view of a die 70 and FIG. 5F is a cross sectional of a die 70. The core portion 71 is a substantially cubic member which is formed by cutting off corners of the cube. At the substantially central portions of each of the faces of the die 70 of the core portion 71, concave portions are formed in order to embed the RFID tags, and the RFID tags 51 to 56 are disposed at each of the six concave portions. Thus, the core portion 71 is an example of a first foam member.

The intermediate portion 72 is configured by combining a first intermediate portion 72a with a second intermediate portion 72b which are larger than the core portion 71 and are formed by dividing a substantially cubic body in half. The first intermediate portion 72a and the second intermediate portion 72b have concave portions formed on the insides thereof that each fit half of the core portion 71. Then, for example, by covering the core portion 71 on which the RFID tags are embedded, by the first intermediate portion 72a from above and the second intermediate portion 72b from below, the core portion 71 is covered by the intermediate portion 72. Thus, the intermediate portion 72 is an example of the second foam member that covers the outside of the first foam member (the core portion 71).

The covering portion 73 is configured by combining a first covering portion 73a and a second covering portion 73b, which are slightly larger than the intermediate portion 72 and are formed by dividing a substantially cubic body in half. The first covering portion 73a and the second covering portion 73b have concave portions formed on the insides thereof that each fit half of the intermediate portion 72. For example, by covering the intermediate portion 72 by the first covering portion 73a from left and the second covering portion 73b from right, the intermediate portion 72 is covered by the covering portion 73. Thus, the covering portion 73 is an example of a covering member that covers the outside of the second foam member (the intermediate portion 72).

As a foam member for configuring the core portion 71 and the intermediate portion 72, polystyrene foam, polyurethane foam, and the like can be utilized. In this case, both the core portion 71 and the intermediate portion 72 may be made of polystyrene foam or polyurethane foam, or the one may be made of polystyrene foam and the other may be made of polyurethane foam. Furthermore, in the present embodiment, the foam expansion ratio of the core portion 71 is 40 times to 50 times, which is soft, and foam expansion ratio of the intermediate portion 72 is 3 to 4 times and a relatively hard foam member is used. Here, the foam expansion ratio is a value that indicates a multiple of expansion relative to an original volume. That is, when insert molding, for example, if the foam expansion ratio is only 40 to 50 times, the foam member cannot resist heat. Therefore, in the present embodiment, a foam expansion ratio of the outer foam member, i.e. the intermediate portion 72, is set to be relatively hard at 3 to 4 times.

Thus, the core portion 71 and the intermediate portion 72 are an example of the first foam member (the core portion 71) and the second foam member (the intermediate portion 72) made of urethane. Furthermore, the core portion 71 and the intermediate portion 72 are an example of the first foam member (the core portion 71) and the second foam member (the intermediate portion 72) made of polystyrene foam. In addition, the intermediate portion 72 is an example for the second foam member having a lower foam expansion ratio than the first foam expansion ratio with respect to the original volume. Moreover, the core portion 71 is an example for the first foam member of which the foam expansion ratio is 40 to 50 times. Additionally, the intermediate portion 72 is an example for the second foam member of which the foam expansion ratio is 3 to 4 times.

Furthermore, as a member configuring the covering portion 73, ABS resin, polypropylene, urethane, and the like are applicable. Also, in the present embodiment, an object configured into a coin by covering an RFID tag with a hard member such as epoxy resin is utilized as the RFID tags 51 to Therefore, since the RFID tags 51 to 56 have high rigidity, a member with flexibility such as urethane is applicable to members that configure the core portion 71, the intermediate portion 72, and the covering portion 73. In addition, by applying urethane, it is possible to roll the dice 70 easily.

It should be noted that it is possible to apply a film-type tag as the RFID tag. In this case, it is not necessary to form concave portions in the core portion 71, and it is possible to mount by attaching directly on the core portion 71. On the other hand, in order to reduce flexure of the RFID tag in the dice 70, it is particularly preferable that a hard plastic member such as ABS resin is applied to the covering portion 73.

When integrating the core portion 71 with which the RFID tags 51 to 56 are mounted, the intermediate portion 72, and the covering portion 73, as shown in FIG. 5F, the RFID tags 51 to 56 are retained in a state held between the core portion 71 and the intermediate portion 72. In the present embodiment, the dice 70 are cubic bodies having beveled sides of 88 mm, and the RFID tags 51 to 56 are disposed interiorly 10 mm from the surface of the dice 70, i.e. the surface of the covering portion 73. Thus, the RFID tags 51 to 56 are an example of an RFID tag that is disposed at each face of the first foam member (the core portion 71) and held between the first foam member (the core portion 71) and the second foam member (the intermediate portion 72).

The RFID tags 51 to 56 are read by the RFID tag reader 16 disposed below the playing board 3a.

FIG. 6F shows an RFID tag readable areas by the RFID tag reader 16 disposed below the playing board 3a.

Here, a way of reading information stored in the RFID tag by the RFID tag reader 16 is described below.

The RFID tag reader 16 is a non-contact type RFID tag reader. For example, it is possible to read information stored in the RFID tag by RFID system (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of RFID tags is read by a single RFID tag reader 16. Under the abovementioned RFID system, an anti-collision function can be employed which can read a plurality of RFID tags by a single reader. The anti-collision function includes FIFO (first in first out) type, multi-access type, and selective type, and communicates with a plurality of the RFID tags sequentially. The FIFO type is a mode to communicate with a plurality of the RFID tags sequentially in the order that each RFID tag enters an area in which an antenna can communicate therewith. The multi-access type is a mode that is able to communicate with all the RFID tags, even if there is a plurality of the RFID tags simultaneously in the area in which an antenna can communicate with the RFID tags. The selective type is a mode that is able to communicate with a specific RFID tag among a plurality of the RFID tags in the area in which an antenna can communicate therewith. By employing the abovementioned modes, it is possible to read a plurality of the RFID tags with a single RFID tag reader.

In addition, reading the RFID tags may not only be done by the non-contact type, but also a contact type. In addition, the RFID tag reader is not limited thereto, and anything that is appropriately designed with the object of being read may be employed.

In the present embodiment, a readable area of the RFID tag reader 16 is 10 mm in substantially a vertical direction from substantially an entire horizontal face on the playing board 3a. Therefore, in a case in which the dice come to rest, the RFID tag that is readable is only the RFID tag of the die 70 corresponding to a face that faces and contacts the playing board 3a, and it is physically impossible for information of other RFID tags to be read by the RFID tag reader 16.

More specifically, with reference to FIG. 6F, a face of the die 70 (for example, a face of which the number of dots is six) is in contact with the playing board 3a. Furthermore, the RFID tag is embedded substantially at the center of each face of the die 70 (the RFID tags for the faces on which the numbers of dots are "3" and "4" are not shown). An RFID tag 51 is embedded substantially at the center of a face on which the number of dots is six. An RFID tag 52 is embedded substantially at the center of a face on which the number of dots is five. An RFID tag 53 is embedded substantially at the center of a face on which the number of dots is one. An RFID tag 54 is embedded substantially at the center of a face on which the number of dots is two.

Furthermore, since the number of dots of a face, opposing a face on which an RFID tag is embedded, is determined as the number of dots of the die 70, "one" is stored, as data of the number of dots, in the RFID tag 51 on the face of which the number of dots is "six". "Two" is stored, as data of the number of dots, in the RFID tag 52 on the face of which the number of dots is "five". "Six" is stored, as data of the number of dots, in the RFID tag 53 on the face of which the number of dots is "one". "Five" is stored, as data of the number of dots, in the RFID tag 54 on the face of which the number of dots is "two". "Three" is stored, as data of the number of dots, in the RFID tag (not shown) on the face of which the number of dots is "four". Finally, "four" is stored, as data of the number of dots, in the RFID tag (not shown) on the face of which the number of dots is "three".

Here, only the RFID tag 51 exists in the readable area of the RFID tag reader 16. Therefore, the number of dots (in this case, "one") of a face, opposing the face on which the RFID tag 51 is embedded, is determined as the number of dots of the die 70.

The infrared camera 15 in the present embodiment includes an imaging device (CCD camera) for shooting the dice 70 as an object of shooting, and detects the number of dots appearing on the dice 70 based on an imaging signal from the imaging device. Therefore, it is not possible to detect the number of dots appearing on the dice 70 accurately in a state in which a plurality of the dice 70 are overlapping each other. However, in the present embodiment, by moving the table 3a with subtle oscillation and then ceasing the table 3a, even if a plurality of the dice 70 is overlapping each other, it is possible to make the dice come to rest after breaking up the overlapping state of the dice. As a result of this, it is possible to detect the number of dots appearing on the dice 70 accurately. Thus, in the present embodiment, accurate detections of a number of the dots can be achieved by using both the infrared camera 15 and the RFID tag reader 16.

FIG. 7F shows an example of a display screen displayed on an image display unit. As shown in FIG. 7F, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5. The normal bet area 41H is a region where the player places a bet on the number of dots appearing on the dice 70, and the odds are set according to the number of dots of the dice 70 matching the predicted number of dots.

FIG. 8F is a block diagram showing an internal configuration of the gaming machine shown in FIG. 2F. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the RFID tag reader 16, thereby transmitting and receiving information in relation to the number of dots of the three dice 70, which comes to rest on the playing board 3a, between the infrared camera 15 and/or the RFID tag reader 16.

Here, the oscillating motor 300, the infrared camera 15, the RFID tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

The bet start instruction image is displayed by the CPU 81 on the display screen 210a of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

Furthermore, the I/O interface 90 is connected with a history display unit 91, and the main control unit 80 transmits and receives information in relation to the number of dots on the die, to and from the history display unit 90. It should be noted that, although the history display unit 91 is not shown in FIG. 2F, it is installed at a position, which allows viewing by all of the players, or at a plurality of locations.

Furthermore, an external large-size monitor is connected to the I/O interface 90 through the controller 400, and the main controller 80 transmits and receives image data and the like to and from the external large-size monitor 500.

On the external large-monitor 500, game advancement, game results, live images of dice rolling, a demonstration screen, and the like are displayed. This attracts the interest of people around the external large-size monitor 500.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the RFID tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed. The CPU 81 controls the oscillating motor 300, which oscillates the playing unit 3, based on data and a program stored in the ROM 82 and the RAM 83, and oscillates the playing board 3a of the playing unit 3. Furthermore, after oscillation of the playing board 3a ceases, a control processing associated with game progression, such as confirmation processing for confirming the number of dots on each of the dice 70 resting on the playing board 3a.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

FIG. 9F is a block diagram showing an internal configuration of a station shown in FIG. 2F. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like more specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

FIG. 10F is a block diagram showing an example of a different configuration of the game device according to the present invention. It should be noted that identical numerals are used for the same members or members with the similar functions to those in the embodiments illustrated in FIGS. 1F to 9F. The game device 1 shown in FIG. 10F is provided with a composite unit 220, the history display unit 91, and a plurality of stations 4 (e.g., 8). The composite unit 220 is provided with various devices (not shown) for rolls dice. The history display unit 91 is disposed above the composite unit 220 so as to be visually recognizable by each player at a plurality of the stations 4 or from around the game device. The plurality of the stations 4 is disposed to be connected with each other around the composite unit 220.

FIG. 11F is a block diagram showing another example of another configuration of the game device according to the present invention. The arrangement of the plurality of the stations 4 and the history display unit 91 is different from the arrangement shown in FIG. 10F. In the game device 1 shown in FIG. 11F, two history display units 91 are disposed behind the plurality of the stations 4 so as to be visually recognizable by each player at a plurality of the stations 4 or from around the game device. The plurality of stations 4 is respectively disposed so as to surround the composite unit 220. More specifically, two station groups are provided, each of which has four stations, and these are disposed at locations facing each other across the composite unit 220. That is, players at the one of four stations 4 visually recognize the history display unit 91 disposed behind the other four stations 4, and players at the other four stations 4 visually recognize the other history display units 91 disposed behind the one of four stations 4.

FIG. 12F is a diagram showing an example of an image displayed on a display screen of a history display unit. On the display screen of the history display unit 91, display areas 91a, 91b, 91c, and 91d are set for displaying cumulative amounts of four types of progressive awards. Display areas 91e, 91f, 91g, and 91h are display areas for displaying the game history, and in the display area 91e, information such as a number of dots in the last game before a present game is displayed.

"1", "2", "3", "6", and "Small" are displayed in order from the left as a display content of the display area 91e. The leftmost "1" represents a number of dots on a blue die by being displayed in blue. The second "2" from the left represents a number of dots on a red die by being displayed in red. The third "3" from the left represents a number of dots on a white die by being displayed in white. The fourth "6" from the left represents a sum total value of each of the dice (blue, red, and white). The display areas 91f to 91h are similar to the display areas 91e. In addition, "Small" is displayed, for example, in a case in which a sum total value of numbers of dots on the dice belongs to a numeral range of 4 to 10 among two numeral ranges 4 to 10 and 11 and 17, and "Big" is displayed in a case in which a sum total value of numbers of dots on the dice belongs to a numeral range of 11 to 17.

It should be noted that a plurality of LED luminous bodies (not shown) is disposed around the history display unit 91 and the plurality of LED luminous bodies emit light in various light emitting modes according to game advancement and the like.

According to the present embodiment as described above, since the core portion 71 and the intermediate portion 72 are made of foam members, weight reduction of the dice is possible. Furthermore, since the RFID tags 51 to 56 are disposed in the vicinity of the foam member with the three-piece structure of the core portion 71, the intermediate portion 72, and the covering portion 73, buffering shock transmitted to the RFID tags 51 to 56 due to shock to the dice is possible by way of the foam member, whereby the RFID tags 51 to 56 can be protected. Furthermore, the RFID tags 51 to 56 are disposed between the core portion 71 and the intermediate portion 72, and the intermediate portion 72 is made of a foam member that is relatively harder than the core member 71. Therefore, an amount of deformation of the intermediate portion 72 due to a shock to the dice is reduced, and the shock is absorbed into the core portion 71. As a result of this, it is possible to prevent failure such as by damage to an RFID tag due to deformation of the RFID tag along with deformation of the intermediate portion 72. Thus, it is possible to provide a weight reduction in dice and dice that realize protection of the RFID tags thereof.

Furthermore, by configuring the core portion 71 and the intermediate portion 72 using urethane, as well as applying a foam member for a weight reduction, elasticity of the dice 70 is improved due to a property of urethane easily elastically deforming, thereby enabling dice to be provided which can be easily rolled. In this case, in particular, it is possible to provide dice that roll easily as a result of being made to bounce, by using a flexible member also for the covering member 73. Furthermore, a weight reduction becomes possible by applying a foam member by configuring the core portion 71 and the intermediate portion 72 using polystyrene foam, and rigidity of the dice 70 is improved due to polystyrene foam, which is difficult to deform, whereby it is possible to provide dice in which internal RFID tags can be reliably protected. Thus, by applying specific materials such as urethane or polystyrene foam for the material properties of the core portion 71 and the intermediate portion 72, an effect dependent on a specific material can be included as well as a weight reduction.

Furthermore, using a member with a foam expansion ratio of 40 to 50 times for the core portion 71 and the member with foam expansion ratio of 3 to 4 times for the intermediate portion 72, the outside of the dice becomes superior in rigidity and the inside thereof superior in shock-absorbing property, whereby it is possible to provide dice of reduced weight that can reliably protect internal RFID tags thereof.

Descriptions regarding the present embodiment have been provided above. Although a case has been described in which the number of dice 70 is three according to the present embodiment, the number of in the present invention is not limited to three and, for example, the number of the dice may be five. Furthermore, the shape of dice is not limited to a cubic body. For example, it is also possible to be adapted to an eight-faceted dice, and the core portion 71 and the intermediate portion 72 can be designed appropriately according to a shape of the dice.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

First Embodiment

Embodiments of the present invention will be explained hereinafter with reference to the accompanying drawings.

FIG. 1G is a flowchart showing an outline of an embodiment according to the present invention.

As described later in detail, first, a CPU 81 of a controller 2 transmits a start signal for reading a wireless IC tag 401 to a reader 62 (Step S100).

Then, the CPU 81 of the controller 2 that receives data of the wireless IC tag 401 read by the reader 62 calculates address information according to the unique ID of the wireless IC tag 401 and a predetermined function (Step S200).

Based on the address information thus calculated, the reader 62 reads number of dots information and a CRC value as error detection information from the wireless IC tag 401, and sends it to the controller 2 (Step S300).

The CPU 81 of the controller 2 calculates the CRC value with the unique ID, number of dots information, and serial information stored in the wireless IC tag 401 as seed values (Step S400).

Furthermore, the CPU 81 compares the CRC value of the wireless IC tag 401 with the CRC value calculated in Step S400 (Step S500). If the values are identical, it can be recognized that reading was correctly performed, and the CPU 81 performs processing of number of dots information (Step S600, Step S700). If those values are not identical, it can be recognized that reading was not correctly performed, and read error processing is performed (Step S600, Step S800).

FIG. 2G is an overall view of a gaming machine 1 that provides a dice game.

The gaming machine 1 of the present embodiment includes the controller 2, stations 3, and a dice movable unit 4.

Furthermore, a history display unit 91 and an external large-size monitor 500 are provided at a location visually recognizable from where players are playing at the stations 3.

The controller 2 controls the entire gaming machine 1.

In addition, in the present embodiment, the controller 2 includes a dealer used display 210 that is used by a dealer 5 who advances a game and a touch panel 211 provided at the dealer used display 210, and executes control of the overall gaming machine 1 according to an operation of the dealer 5.

The stations 3 are terminals that players operate.

The stations 3 accept bet operations by players sitting on chairs (not shown) provided in front of the stations 3 and perform processing to payout awards of games.

The station 3 includes an image display device 31, a game media acceptance device that accepts game media such as medals inserted to an insertion opening 321 and used for a game, an operation unit 33 composed of a shake button 331 to which a predetermined instruction is inputted by a player, a game information display unit 34 for displaying information related to a game, and the like.

The player may participate in a game by operating the operation unit 33 or the like while viewing the image displayed on the image display device 31.

In the present embodiment, a shake button 331 and a select button 332 are provided at the operation unit 33.

The shake button 331 is a button for performing an instruction that allows a player to start rolling dice at a predetermined timing.

Furthermore, in a case other than the bet operation, the select button 332 is pushed for confirming the input that a player performed.

In addition, a speaker 35, which can output sound, is disposed on the upper right of the image display device 31 on each of the stations 3.

A plurality of buttons is provided on the side part of the image display device 31 on each of the stations 3.

More specifically, a payout button 36 and a help button 37 are disposed there.

The payout button 36 is a button which is usually pressed at the end of a game, and when the payout button 36 is pressed, game media corresponding to credits that the player has acquired is paid out from the payout opening 322.

The help button 37 is a button that is pressed in a case where a method of operating the game is unclear, and upon the help button 37 being pressed, a help screen showing various kinds of operation information is displayed immediately thereafter on the image display device 31.

Another operation is performed by the player touching a display screen displayed on the image display device 31.

Since a touch-sensitive sensor is installed on the surface of the image display device 31, various operations are recognized by the player touching through a so-called touch panel system.

The dice movable unit 4 rolls a plurality of the dice 40 used in a Sic Bo game.

An award is determined based on a combination of numbers appearing on an upper face (hereinafter, defined as a number of dots) when a plurality of the dice 40 is caused to roll and stop.

In other words, a random number can be obtained by rolling a plurality of the dice 40.

The history display unit 91 is a display on which the history of a game including the number of dots of the dice is displayed.

Details thereof are described later.

The external large-size monitor 500 is a display on which live images such as for advancement of a game, a demonstration screen, and the like are displayed.

<Dice Movable Unit>

The dice movable unit 4 will be explained with reference to FIGS. 3G and 7G.

FIG. 3G is a perspective diagram showing the dice movable unit 4.

FIG. 4G is a diagram illustrating a cross-section along the line A-A of the dice movable unit 4.

FIG. 5G is a perspective view showing a schematic representation of an antenna 63 of a playing board 41a.

FIG. 6G is a configurational diagram of a detection device 61.

FIG. 7G is a block diagram showing an internal configuration of the reader 62.

The dice movable unit 4 is configured so as to allow a plurality of the dice 40 to roll and stop.

This dice movable unit 4 includes a shaking device 41 that is configured so as to cause the dice 40 to roll, a cover member 42 that covers an upper side of the shaking device 41 and is formed in a dome shape, and a unit main body 43 that houses the shaking device 41.

In the present embodiment, the shaking device 41 causes the three dice 40 (the die 40a, the die 40b, and the die 40c) to roll.

The cover member 42 is disposed so as to cover the entire top face of the playing board 41a.

Furthermore, the cover member 42 is made of a transparent member in a substantially hemispherical shape and limits the area in which the dice 40 roll.

A plurality of the dice 40 is disposed in the space formed by the playing board 41a and the cover member 42.

In the present embodiment, the dice 40 are substantially hexahedral and the wireless IC tags are embedded in each face thereof.

It should be noted that this wireless IC tag 401 is embedded in a surface of a die 40 so as not to be visually recognized from the outside of the die 40.

For example, the die 40 can be formed by disposing the wireless IC tag 401 at the surface of a member as a base of the die 40, and then placing a member as a cover thereover. Details thereof are described later.

The dice movable unit 4 includes lamps 44.

The lamps 44 perform various rendered effects by emitting light while the dice 40 are rolling.

The shaking device 41 is formed in a substantially circular shape as viewed in a plane, supports a plurality of the dice 40, and includes the playing board 41a as a field on which a plurality of the dice 40 are rolled and a cylinder portion 45 that oscillates the playing board 41 vertically.

Since the playing board 41a is formed to be substantially planar, as shown in FIG. 4G, the dice 40 are rolled by oscillating (shaking) the playing board 41a substantially in the vertical direction with respect to the horizontal direction of the playing board 41a by way of the cylinder portion 45 that supports the playing board 41a from a lower face side of the playing board 41a.

Then, when the oscillation of the playing board 41a comes to rest, the dice 40 rolling come to rest.

Furthermore, the playing board 41a includes a playing board main body 411, a cushion member 412 that is disposed on the top face of the playing board main body 411, an antenna base portion 413 that is disposed between the playing board main body 411 and the cushion member 412 and in which the antennas 63a, 63b, and 63c are disposed.

It is preferable for the members forming these to be made of a non-metallic member.

Since radio waves are susceptible to the interference of metal, if metal exists near the wireless IC tag 401, the communication range between the reader 62 and the wireless IC tag 401 will be reduced, and thus it may prevent the wireless IC tag 401 from being read by the reader 62.

Then, the antennas 63a, 63b, and 63c that are disposed at the antenna base portion 413 are connected to first communication portions 65a, 65b, and 65c through wires, respectively.

The first communication portions 65a, 65b, and 65c are each disposed on a lower face side of the playing board main body 411.

In addition, second communication portions 66 are disposed so as to oppose the first communication portions 65a, 65b, and 65c.

The second communication portions 66a, 66b, and 66c are disposed on a unit main body 43 side of the dice movable unit 4.

In other words, the first communication portion 65 and the second communication portion 66 are disposed so as to being respectively facing at the lower face side of the playing board 41a.

This enables a stable communication state to be maintained without the relative position between the first communication portion 65 and the second communication portion 66 being shifted when the playing board 41a moves along with the vertical motion of the cylinder portion 45.

Assuming a case of the first communication portion 65 and the second communication portion 66 being disposed on a side face of the playing board 41, after the playing board 41a has moved, the first communication portion 65 and the second communication portion 66 may not be at opposing positions, and it may not be possible to communicate therebetween.

It is possible to prevent such a state from arising by disposing the first communication portion 65 and the second communication portion 66 so as to be facing on a lower face side of the playing board 41a.

The detection device 61 will be explained while referring to FIGS. 5G and 6G.

The detection device 61 according to the present invention is provided at the dice movable unit 4 that rolls a plurality of the dice 40 in a dice game of so-called Sic Bo, and is used for detecting the numbers of dots on the plurality of the dice 40.

This detection device 61 is mainly configured with the reader 62 that reads information stored in the wireless IC tags 401 which are disposed on each of the faces of the dice 40.

The reader 62 includes a control circuit that can be connected to a higher-level device such as a PC, a plurality of loop-shaped antennas 63 that are disposed on the playing board 41a serving as a field on which the plurality of dice 40 rolls, the first communication portion 65 that is connected to the antenna 63, and the second communication portion 66 that communicates with the first communication portion 65.

Furthermore, a switch portion 67 that switches whether electrical current is supplied to the antenna 63 is provided between the antenna 63 and the first communication portion 65.

In addition, the reader 62 is connected to the controller 2.

The reader 62 reads information stored in the wireless IC tag 401, and decodes and transmits the information thus read to the controller 2.

In the present embodiment, communication between the reader 62 and the wireless IC tag 401 is performed by way of electromagnetic induction.

That is, the reader 62 flows current to the antenna 63 based on an instruction signal from the controller 2 and transmits a predetermined command to the wireless IC tag 401.

When this is done, a magnetic field is altered within the area surrounded by the loop-shaped antenna 63 in which the current flows.

Accompanying the alteration of magnetic flux in this magnetic field, an electromotive force is generated within the loop antenna that is included in the wireless IC tag 401, which is disposed within the area.

Herewith, electric power is transmitted to the wireless IC tag 401, whereby communication with the wireless IC tag 401 is performed.

In the present embodiment, three antennas 63 of the reader 62 are provided and disposed so that at least a portion of each of the detection areas thereof is mutually superimposed (see FIG. 5G).

In addition, among the three antennas 63, the antenna 63a as a first antenna portion is disposed substantially at the center of the playing board 41a and is formed so as to depict a substantially circular shape.

Furthermore, the antennas 63b and 63c serving as second antenna portions are formed so that four areas of substantially triangular shape depict a cross shape around an apex thereof, and bottom portions of substantially triangular shape are formed with a curve so as to follow the circumference of the playing board 41a.

Therefore, the antennas 63b and 63c are formed so that the width of the edges thereof is larger at the outer side than the center portion of the playing board 41a.

Then, the antennas 63b and 63c are disposed so that the areas of substantially triangular shape thereof are disposed alternately and portions of the areas of substantially triangular shape are disposed to be mutually superimposed.

More specifically, a lateral portion of the area of substantially triangular shape of an antenna is disposed so as to be superimposed with a portion of the area of substantially triangular shape of another antenna.

In this way, the antennas 63b and 63c are loop antennas formed in a loop-shape so as to be the abovementioned shape.

In the present embodiment, each of the wireless IC tags 401 disposed in the plurality of the dice 40 is read by a single reader 62.

Under the abovementioned RFID system, an anti-collision function can be employed which can read a plurality of wireless IC tags with a single reader.

For the anti-collision function, there are FIFO (first in first out) type, multi-access type, and selective type, which communicate with a plurality of the wireless IC tags sequentially.

FIFO type is a mode to communicate with a plurality of the wireless IC tags sequentially in the order in which each wireless IC tag enters an area in which an antenna can communicate therewith. Multi-access type is a mode that is able to communicate with all of the wireless IC tags, even if there is a plurality of the wireless IC tags simultaneously in the area in which the antenna can communicate with the wireless IC tags. Selective type is a mode that is able to communicate with a specific wireless IC tag among a plurality of the wireless IC tags in the area in which the antenna can communicate therewith.

By employing the above-mentioned modes, it is possible to read a plurality of the wireless IC tags with a single reader.

The wireless IC tag 401 is configured so as to be read by the reader 62 by way of radio waves or electromagnetic induction.

The wireless IC tag 401 is configured with a loop antenna and an IC chip having a control circuit, memory, a rectifying circuit, and a transmission/reception circuit, and number of dots information of the die 40 is stored in the memory.

Details thereof are described later.

The first communication portion 65 and the second communication portion 66 can mutually transmit and receive wirelessly.

The first communication portion 65 and the second communication portion 66 are provided between the antenna 63 and the reader 62.

The first communication portion 65 is connected to the antenna 63, and the second communication portion 66 is connected to the reader 62.

Accordingly, various commands transmitted from the reader 62 to the wireless IC tag 401, and reply information from the wireless IC tag 401 received by the antenna 63 are mutually transmitted and received between the first communication portion 65 and the second communication portion 66.

The reply information from the wireless IC tag 401 is information different from the number of dots information that is stored in the memory of the wireless tag 401, for example.

The first communication portion 65 also has a transmission circuit for transmitting electric power to the antenna 63.

In addition, a switch portion 67 is provided between the first communication portion 65 and the antenna 63. This switch portion 67 switches whether electrical current is supplied to the antenna 63.

When the switch portion 67 enters an ON state, electric power is transmitted from the transmission circuit of the first communication portion 65 to the antenna 63.

In addition, in a case of the switch portion 67 being in an OFF state, the electric power transmitted from the transmission circuit of the first communication portion 65 is turned OFF.

The switch portion 67 is configured by a photo MOSFET (Metal Oxide Semiconductor Field Effect Transistor) in the present embodiment.

In a photo MOSFET, a photovoltaic cell charges the gate capacitance of the FET from the light of a light emitting diode to raise the gate-to-source voltage, and the FET conducts, whereby the switch portion 67 enters the ON state.

When the light emitting diode (LED) goes out, the photovoltaic cell does not simply stop charging, but rather a discharge switch inside thereof automatically activates to forcibly discharge the gate charge, and the gate-to-source voltage immediately declines, whereby the switch portion 67 enters the OFF state.

If electric power were transferred to the three antennas 63a, 63b, and 63c simultaneously at this time, these antennas may interfere with each other since the detection areas thereof are mutually superimposed.

For this reason, the antenna 63 detecting the wireless IC tag 401 is switched by transferring the electric power to each of the three antennas 63a, 63b, and 63c in a predetermined order based on the instruction signal from the controller 2.

In addition, the ON/OFF state of each switch portion 67 of the antennas 63a, 63b, and 63c is switched by the reader 62 accompanying the switching of the three antennas 63a, 63b, and 63c.

In other words, in a case of an instruction signal to supply electric power to the antenna 63a is transmitted from the controller 2 to the reader 62, for example, the reader 62 first sets the switch portion 67a to ON through the first communication portion 65a and the second communication portion 66a.

Then, electric power is supplied to the antenna 63a.

Furthermore, in a case of supplying electrical current to the antenna 63b, the controller 2 transmits an instruction signal to set the antenna 63a to OFF and to set the antenna 63b to ON.

The reader 62 thereby wirelessly communicates this signal by way of the first communication portion 65a and second communication portion 66a, and sets the switch portion 67a to OFF.

In addition, the reader 62 wirelessly communicates this signal by way of the first communication portion 65b and second communication portion 66b to set the switch portion 67b to ON.

Then, the antenna 63a is turned OFF, and electric power is supplied to the antenna 63b.

The configuration of the reader 62 will be explained while referring to FIG. 7G.

FIG. 7G is a functional block diagram of the reader 62.

The reader 62 is configured by a control circuit 621, oscillation circuit 622, modulation circuit 623, transmitting circuit 624, receiving circuit 625, and demodulating circuit 626.

The control circuit 621 performs overall control of the reader 62, such as communication control with the controller 2 and intercommunication control with the wireless IC tags 401.

More specifically, it outputs encoded commands to be transmitted to the wireless IC tags 401, data for writing to the memory, and the like to the modulation circuit at the required timing.

In addition, it encodes and transmits replies from the wireless IC tags 401 input from the modulation circuit, memory data, and the like, to the controller 2.

A memory circuit that stores a control program, data for applications, and the like is also included in this control circuit 621.

The oscillation circuit 622 is a circuit that produces the carrier wave required in the intercommunication with the wireless IC tags 401.

For example, this circuit causes oscillation at a precise frequency using a crystal oscillator or the like.

This circuit causes oscillation at a high frequency, and produces a synchronized signal with the carrier wave used by frequency dividing the high frequency.

The operating timing of the various circuits is made to be synchronous with this synchronized signal.

The modulation circuit 623 is a circuit for modulating and transmitting commands, data and the like being transmitted from the control circuit 621 to be overlapped on the carrier wave generated by the oscillation circuit 622, to the transmitting circuit 624.

For example, amplitude shift keying, frequency shift keying, phase shift keying or the like can be employed as the modulation method.

The transmitting circuit 624 is a circuit for transmitting commands and data overlapped with the carrier wave being transmitted from the modulation circuit 623 to the antenna.

The transmitting circuit 624 is further configured by an amplifier circuit for amplifying signals and a filter circuit that causes unwanted frequencies to decay and allows only the frequency to be transmitted to pass therethrough.

The receiving circuit 625 is a circuit that receives the weak carrier wave from the wireless IC tag 401 entering via the antenna 63, and cuts out the received carrier wave and unwanted noise.

The receiving circuit 625 is also configured by a filter circuit that allows only required signals to pass therethrough, and an amplifier circuit that amplifies only the input signals.

Therefore, in the present embodiment, communication is performed between the antenna 63 and the reader 62 via the first communication portion 65 and the second communication portion 66, which carry out wireless communication.

Consequently, it is configured to transmit and receive the signals from these communication portions in the communication performed by the transmitting circuit 624 and the receiving circuit 625.

In a case of there not being a first communication portion 65 and second communication portion 66, transmission or reception would be performed directly through the antenna 63.

The demodulating circuit 626 demodulates and transmits commands and data from the wireless IC tags 401 input from the receiving circuit 625, to the control circuit 621.

The demodulating circuit 626 demodulates commands and data according to the modulation method adopted by the modulation circuit 623.

In this way, the control circuit 621 of the reader 62 modulates commands and the like with the modulation circuit 623 and transmits from the transmitting circuit 624 through the antenna 63, based on the instruction signals from the controller 2.

In addition, while receiving, the carrier wave from the wireless IC tag 401 is received by the antenna 63, encoded data is demodulated with the demodulating circuit 626 to make a format processable by the controller 2, and the data is transmitted to the controller 2.

<Die>

The die 40 will be explained with reference to FIG. 8G.

FIG. 8G is an exploded perspective view of the die 40.

The die 40 is composed of a core portion 402, an intermediate portion 403, and a covering portion 404, and the wireless IC tags 401 are disposed between the core portion 402 and the intermediate portion 403.

These wireless IC tags 401 are disposed in each face of the die 40, which have 6 faces.

The core portion 402 is a substantially cubic member which is formed by cutting off the corners of a cube.

At the substantially central portions of each of the faces of the core portion 402, concave portions are formed in order to embed the wireless IC tags 401, and the wireless IC tags 401a, 401b, 401c, 401d, 401e, and 401f are disposed in each of the six concave portions.

The intermediate portion 403 is configured by combining a first intermediate portion 403a with a second intermediate portion 403b, which is larger than the core portion 402 and formed by dividing a substantially cubic body in half.

The first intermediate portion 403a and the second intermediate portion 403b have concave portions formed on the insides thereof that each fit half of the core portion 402.

Then, for example, by covering the core portion 402 on which the wireless IC tags 401 are embedded, by the first intermediate portion 403a from above and the second intermediate portion 403b from below, the core portion 402 is covered by the intermediate portion 403.

The covering portion 404 is configured by combining a first external portion 404a and a second external portion 404b, which is slightly larger than the intermediate portion 403 and formed by dividing a substantially cubic body in half.

The first covering portion 404a and the second covering portion 404b have concave portions formed on the insides thereof that each fit half of the intermediate portion 403.

For example, by covering the intermediate portion 403 by the first covering portion 404a from the left and the second covering portion 404b from the right, the intermediate portion 403 is covered by the covering portion 404.

It should be noted that it is possible to apply a film-type tag as the wireless IC tag 401.

In this case, it is not necessary to form concave portions in the core portion 402, and it is possible to mount by attaching directly on the core portion 402.

On the other hand, in order to reduce the flexure of the wireless IC tags in the dice 40, it is particularly preferable that a hard plastic member such as ABS resin is applied as the covering portion 404.

The wireless IC tag 401 can appropriately employ an active tag which embeds a battery, a passive tag operated using electric power transferred from a reader/writer, and a semi-passive tag using electric power of a battery for a sensor operation.

Furthermore, appropriate combinations for the wireless IC tag 401 as a reader can be employed.

In the present embodiment, a passive tag is employed.

In addition, reading the wireless IC tags 401 may not only be done by non-contact type, but also contact type.

In addition, the reader is not limited thereto, and anything that is appropriately designed with the object of being read may be employed.

The configuration of the wireless IC tag 401 will be explained with reference to FIG. 9G.

FIG. 9G is a functional block diagram of the wireless IC tag 401.

The wireless IC tag 401 is configured by an antenna 421, voltage limiting circuit 422, rectifying circuit 423, demodulating circuit 424, modulation circuit 425, control circuit 426, and memory circuit 427.

The antenna 421 is a portion that transmits and receives electric power, commands, and data transmitted from the reader 62.

The antenna for the wireless IC tag 401 used must be tuned to the frequency of the carrier wave.

In addition, the format of the antenna is also different according to the form of the wireless IC tag 401 adopted, such as radio waves and electromagnetic induction.

For example, in a case of being electromagnetic induction type, a loop antenna that easily obtains the energy of a magnetic field is used.

In addition, in the case of being radio wave type, a dipole antenna, flat antenna, or the like that easily obtain the energy of an electric field is used.

The voltage limiting circuit 422 is a circuit for protecting the internal circuitry of the wireless IC tag 401 from excessive input.

This is because the input to the antenna 421 changes from a small input near the limit at which the IC chip operates to an excessive input.

More specifically, the voltage limiting circuit 422 prevents damage to the internal circuitry by converting the surplus amount of the excessive input into heat, and dissipating to outside.

The rectifying circuit 423 converts alternating current to direct current, and supplies an electrical source to all of the circuits of the wireless IC tag 401.

This is because, although at the time of antenna input of the wireless IC tag 401, it is alternating current, the IC chip operates with direct current.

The demodulating circuit 424 is a circuit that restores commands and data overlapping the carrier wave input from the reader 62 to a signal sequence of "1" or "0".

The signal sequence thus demodulated is transmitted to the control circuit 426, and operations of the wireless IC tag 401 are executed according to the commands from the reader 62.

The modulation circuit 425 is a circuit that modulates the carrier wave with data to transmit to the reader 62.

The carrier wave modulated with a reply to a command accepted from the control circuit 426 and data in the memory is transmitted from the antenna 63 to the reader 62.

The control circuit 426 controls transmission and reception with the reader 62 and all of the operations in the wireless IC tag 401 such as batch reading and read/write to the internal memory.

In the wireless IC tag 401, the modulation circuit 425 encodes information stored in the memory circuit 427 (source coding), and further encodes it for complying with a transmission channel (transmission coding).

Upon transmitting the information to the reader 62, it is transmitted by modulating into an analog waveform.

Then, the reader 62 demodulates the data thus modulated and returns it to digital waveform, and further decodes it to the original state and transmits the information to the controller 2. The memory circuit 427 is a circuit in which the unique ID of the wireless IC tag 401 (described later), number of dots information, and other information are stored.

For example, EPROM (Electrically Programmable Read Only Memory) which is of read only type, write once read many (WORM) type EEPROM (Electrically Erasable and Programmable Read Only Memory), rewritable EEPROM, FeRAM (Ferroelectric Random Access Memory), SRAM (Static Random Access Memory), and the like can be suitably applied as the memory circuit 427.

Data such as that shown in FIG. 10G is stored in the memory space of the memory circuit 427 of the wireless IC tag 401 embedded in each face of the die 40.

In other words, the data is the unique ID, the number of dots information of a die including color information of the die 40, the CRC value as error detection information, and the die serial information indicating the serial number of the die.

FIG. 10G is a table showing a summary of information stored in the memory circuit 427 of the wireless IC tag 401.

The wireless IC tags 401 are embedded in each face of the die 40, as described above.

Furthermore, in the present embodiment, there are three dice 40 rolled on the playing board 41a, each given a different color.

The table shown in FIG. 10G shows the information of the wireless IC tag 401 embedded in each face of the die 40 that is red.

Although only one table is shown in FIG. 10G, a similar table is stored in the memory circuit 427 in the other dice.

The column of "die face" indicates the number of dots depicted on the die face in which the wireless IC tag 401 is embedded.

In a case of the number of dots being "1", when the face on which "1" is depicted comes to be the top face, it is recognized that the number of dots is "1".

In the present embodiment, the dice 40 are six-sided bodies; therefore, from one to six dots are depicted on the respective faces, and dot number value indicates the number of dots.

In the column of "unique ID", the unique ID number assigned to the wireless IC tag 401 is stored.

This unique ID number is assigned by the maker that manufactured the wireless IC tag 401 or the tag chip, and is written so as to be unmodifiable.

The columns of "00" to "06" indicate the addresses of the memory space.

In the present embodiment, the number of dots information and CRC value of the die are stored in any region from address "00" to "05".

In addition, die serial information is stored in the region of the address "06".

In the table shown in FIG. 10G, the die serial information of "xxxxxxxx" is stored therein.

Which address the number of dots information and CRC value are stored depends on the value of the unique ID field.

In other words, when the value of the unique ID field stored in the wireless IC tag 401 is read by the reader 62, the controller 2 having received this information from the reader 62 uses a predetermined function stored in the ROM 82 serving as a storage unit of the control 2 to calculate the value indicating the address at which the number of dots information of the die 40 is stored.

Thereafter, based on the value thus calculated, the reader 62 reads the number of dots information of the address indicated by this value.

It should be noted that the value calculated by the controller 2 is the value indicating the address at which the number of dots information is stored.

In the present embodiment, the CRC value is stored in the next address to the address at which the number of dots information is stored.

Consequently, the address of the CRC value (second address information) stored in the adjacent address thereto is also identified simultaneously with the address of the number of dots information being calculated based on the unique ID.

In other words, by acquiring the unique ID, the controller 2 can also obtain information of the address at which the CRC value is stored based on the unique ID.

Based on the address calculated from this unique ID, the reader 62 reads the number of dots information of the address indicated by the value thus calculated, and further reads the value (CRC value) stored in the next address added thereto.

It should be noted that the CRC value is stored in the address "01" in the case of the number of dots information being stored in the address "05".

In the present embodiment, number of dots information of the die at least includes the color of the die and the number of dots on a face opposing a face of the die in which the wireless IC tag 401 is embedded.

That is, a value of "six" is stored in the wireless IC tag 401 on the face on which the number of dots is "one". A value of "five" is stored in the wireless IC tag 401 on the face on which the number of dots is "two". A value of "four" is stored in the wireless IC tag 401 on the face on which the number of dots is "three". A value of "three" is stored in the wireless IC tag 401 on the face on which the number of dots is "four". A value of "two" is stored in the wireless IC tag 401 on the face on which the number of dots is "five". Finally, a value of "one" is stored together with color information of die in the wireless IC tag 401 on the face on which the number of dots is "six".

For example, in a case in which a face of the die 40 that is in contact with the playing board 41a is the face on which number of dots is "six", the reader 62 reads the data of the IC tag 401 which is embedded in the face of "six".

Number of dots information stored in the wireless IC tag 401 on the face "six" is "one", which is the number of dots on the face opposing the face of "six"; therefore, the number of dots on the die 40 is recognized as "one".

In addition, the CRC value is a value calculated using a CRC value acquisition program with the unique ID, a numerical value indicating the number of dots of the die 40, and die serial information as seed values.

CRC value is a value calculated by the CRC method for verifying the authenticity of data. This CRC method generates a CRC value using a cyclic algorithm (generator polynomial).

This method has a characteristic of the detection accuracy of multiple-bit soft errors being high.

In the present embodiment, it is used to determine whether the number of dots information of the die 40 read by the reader 62 is correct.

In the present embodiment, CRC 32 method that calculates a 32-bit CRC value is used.

The CRC value acquisition program that calculates the CRC value is stored in the ROM 82 of the controller 2.

Then, the CPU 81 of the controller 2 calculates the CRC value using the CRC value acquisition program from the unique ID, number of dots information, and die serial information read from the wireless IC tag 401 by the reader 62 and transmitted to the controller 2.

In addition, the CPU 81 compares the CRC value read from the same wireless IC tag 401 and the CRC value newly calculated.

The CPU 81 recognizes the number of dots information thus read as being the correct value as a result of comparison, in the case of the two CRC values being the same value.

Controller

FIG. 11G is a block diagram showing an internal configuration of the controller 2.

The controller 2 performs control of the entire game and transmits to the reader 62 of the dice movable unit 4 an instruction signal to supply electric power to the antennas 63a, 63b, and 63c.

The controller 2 of the gaming machine 1 includes a microcomputer 85, which is mainly configured with a CPU 81, ROM 82, RAM 83, and a bus 84 that transfers data therebetween.

The CPU 81 is connected with the shaking device 41 via an I/O interface 90.

Furthermore, the CPU 81 is connected via the I/O interface 90 with a timer 131, which can measure time.

In addition, the CPU 81 is connected with a lamp 44.

The lamp 44 emits various colors of light for performing various types of rendered effects, based on output signals from the CPU 81.

Furthermore, the CPU 81 is connected with a speaker 46 via a sound output circuit 461.

The speaker 46 emits various sound effects for performing various types of rendered effects, based on output signals from the sound output circuit 461.

Furthermore, the reader 62 is connected to the I/O interface 90, whereby transmission and reception of number of dots information of the three dice 40 having come to rest on the playing board 41a is performed between the reader 62.

In addition, a communication interface 94 is connected to the I/O interface 90, and via this communication interface 95, the controller 2 transmits and receives data such as bet information, payout information, and the like to and from each station 3, as well as data such as bet start instruction images, bet start instruction signals, and the like to and from the dealer used display 210.

The ROM 82 in the controller 2 is configured to store a program for implementing basic functions of the gaming machine 1, i.e. a program for controlling various devices which drive the dice movable unit 4, a program for controlling each station 3, and the like, as well as a payout table, data indicating a predetermined time T, data indicating a specific value TT, and the like.

The RAM 83 is memory that temporarily stores various types of data calculated by the CPU 81 and, for example, temporarily stores data bet information transmitted from each station 3, number of dots information of the dice 40 transmitted from the reader 62, data relating to the results of processing executed by CPU 81, and the like.

A jackpot storage area is provided in the RAM 83.

In the jackpot storage area, the data indicating the number of playing media stored cumulatively is stored so as to correspond to each number of dots of matching dice.

The data is provided to the station 3 at a predetermined timing, and a jackpot image is displayed based on this data.

The CPU 81 controls the shaking device 41 of the dice movable unit 4 based on data or a program stored in the ROM 82 or the RAM 83, and to cause the playing board 41a (a shaking motion) of the dice movable unit 4 to oscillate.

Furthermore, after the shaking motion of the playing board 41a ceases, control processing associated with game progression, such as confirmation processing for confirming the number of dots on each of the dice 40 resting on the playing board 41a, is executed.

In addition, the history display unit 91 is connected to the I/O interface 90, and the controller 2 transmits and receives number of dots information as game history, to and from the history display unit 90.

Furthermore, an external large-size monitor 500 is connected to the I/O interface 90 through a controller 400, and the controller 2 transmits and receives image data and the like to and from the external large-size monitor 500.

On the external large-monitor 500, game advancement, a game result, a live image of dice rolling, a demonstration screen, and the like are displayed.

This attracts the interest of people around the external large-size monitor 500.

In addition to the control processing described above, the CPU 81 has a function of executing a game by transmitting and receiving data to and from each station 3 so as to control each station 3.

More specifically, the CPU 81 accepts bet information transmitted from each station 3.

Furthermore, the CPU 81 performs win determination processing based on the number of dots on the dice 40 and the bet information transmitted from each station 3, and calculates the amount of an award paid out in each station 3 with reference to the payout table stored in the ROM 82.

Reading Flow of wireless IC Tag

The flow of reading the wireless IC tags 401 will be explained based on FIG. 12G.

FIG. 12G is a flowchart showing the processing of performing reading of the wireless IC tags 401.

In Step S1, the CPU 81 of the controller 2 performs dice rolling completion processing.

Dice rolling completion processing is processing after the playing board 41a is caused to move greatly vertically by way of the cylinder portion 45, thereby causing the three dice 40a, 40b, and 40c to roll.

More specifically, the CPU 81 causes the playing board 41a to slightly oscillate vertically, by causing the cylinder portion 45 to slightly move vertically.

It is thereby possible, in a case in which the three dice 40a, 40b, and 40c come to rest in a state leaning against the cover member 42 and are overlapping, to eliminate such a state.

Then, the CPU 81 returns to the initial position prior to rolling the playing board 41a, and causes movement of the cylinder portion 45 to stop.

In Step S2, the CPU 81 of the controller 2 transmits an instruction signal to read the wireless IC tags 401 to the reader 62.

Then, the control circuit 621 of the read 62 having received the instruction signal from the controller 2 supplies electric power to each of the three antennas 63a, 63b, and 63c in a predetermined order, and initiates the switching of the ON state and OFF state thereof and reading (Step S3).

In Step S4, the control circuit 621 of the reader 62 reads, by way of the antenna 63 to which electric power is supplied, the wireless IC tag 401 on the face on the playing board 41a side (bottom face) among the six faces of the die 40 having come to rest, and transmits the information thereof to the controller 2.

It should be noted that the information reading at this time is die serial information indicating the unique ID and serial number of the die 40.

Then, the CPU 81 of the controller 2 stores this information in a predetermined storage region of the RAM 83.

In Step S5, the CPU 81 of the controller 2 performs a predetermined function calculation using the unique ID and acquires information showing the address at which the number of dots information is stored.

Furthermore, the CPU 81 transmits an instruction signal to read based on the information showing the address to the reader 62 (Step S6).

More specifically, the address is specified, and the instruction signal to read is transmitted to the reader 62.

In Step S7, the control circuit 621 of the reader 62 acquires number of dots information and the CRC value from the wireless IC tag 401.

More specifically, the control circuit 621 transmits to the wireless IC tag 401 a command to transmit the information stored at the address of the wireless IC tag 401 specified by the controller 2

Then, the control circuit 426 of the wireless IC tag 401 having received this transmits the information stored at the specified address of the memory circuit 427 (number of dots information) to the reader 62.

In addition, the control circuit 426 of the wireless IC tag 401 similarly transmits the CRC value stored at a subsequent number to the address number at which the number of dots information is stored to the reader 62 (Step S8).

In Step S9, the control circuit 621 of the reader 62 determines whether all of the wireless IC tags 401 on the lower face side of the three dice 40a, 40b, and 40c have been detected.

In a case of the information of the wireless IC tags 401 of all three of the dice 40a, 40b, and 40c have been read (in a case of this determination being YES), the control circuit 621 ends the processing of the present flowchart.

In addition, in a case of the information of the wireless IC tags 401 of all three of the dice 40a, 40b, and 40c not having been read (in a case of this determination being NO), Step S3 is advanced to.

In Step S10, the CPU 81 of the controller 2 calculates the CRC value with the unique ID, numerical value indicating the number of dots of the die 40, and the die serial formation as seed values.

More specifically, the CPU 81 reads a CRC value acquisition program from the ROM 82, and calculates the CRC value using the unique ID and die serial information stored in the RAM 83 acquired from the wireless IC tag 401 in Step S4, and the number of dots information (numerical value indicating the number of dots) of the die acquired in Step S7 and Step S8.

In Step S11, the CPU 81 of the controller 2 compares the CRC value stored in the wireless IC tag 401 acquired in Step S7 and Step S8, with the CRC value calculated in Step S10.

In Step S12, following the processing of Step S11, the CPU 81 of the controller 2 determines whether the CRC values are the same value.

In a case of being the same value (in a case of this determination being YES), Step S13 is advanced to.

In addition, in a case of the two CRC values being different values (in a case of this determination being NO), Step S14 is advanced to.

In Step S13, the CPU 81 of the controller 2 performs number of dots information processing.

More specifically, payout is performed in a case of winning, based on the combination of the number of dots of each of the three dice 40a, 40b, and 40c and the playing media bet. When this processing is completed, the present flowchart is completed.

In Step S14, the CPU 81 of the controller 2 performs read error processing.

For example, display of the fact that an error has occurred is performed on the dealer used display 210. In addition, the game prepares to be inactive, and performs processing such as of paying out the playing medium bet. When this processing is completed, the present flowchart is completed.

According to the present embodiment, the addresses in the memory circuit 427 differ at which information of the number of dots is stored in the wireless IC tags 401 embedded in each face of the dice 40.

In addition, in order to read the number of dots information, the value indicating the address is calculated using the unique ID of the wireless IC tag 401.

The unique ID is a unique value, and since the address at which the number of dots information is stored is calculated based on this, accidental reading of the number of dots information of another wireless IC tag 401 is eliminated.

The value indicating the address is calculated using one unique ID, and even if the data of other wireless IC tags 401 is called, since the number of dots information is not stored at this position, the erroneous number of dots information is not read.

Even in a case of performing batch reading, the number of dots information can be accurately acquired.

Therefore, in a case of a fraudulent act having been performed such as causing erroneous data to be read, since the fraudulent act would be revealed immediately, it becomes a deterrent to performing fraudulent acts, and thus can prevent fraudulent acts.

According to the present embodiment, the CRC value together with the number of dots information is stored in the memory circuit 427 of the wireless IC tag 401.

Then, the controller 2 calculates the CRC value, and compares.

Since the CRC value basically indicates an arbitrary value, in a case of the controller 2 calculating the CRC value based on the read data and being a different value, the data read is found not to be correct.

It can thereby be distinguished that the number of dots information is always the correct value.

According to the present embodiment, the CRC value is a value calculated with the number of dots information, unique ID and die serial information as seed values.

Since the die serial information is a characteristic value of the maker that manufactured the die, it is more difficult to predict than simply setting the number of dots information and unique ID as seed values; therefore, it is possible to prevent fake dice or wireless IC tags and fraudulent acts such as fabricating data and the like.

While an embodiment of the gaming machine according to the present invention has been described, it is to be understood that the above description is intended to be illustrative, and not restrictive, and any changes in the design may be made to specific configurations such as the various means.

Moreover, it should be understood that the advantages described in association with the embodiments are merely a listing of most preferred advantages, and that the advantages of the present invention are by no means restricted to those described in connection with the embodiments.

Although the value indicating the address is calculated by the controller 2 in the present embodiment, it is not limited thereto.

For example, a predetermined program may be stored in the reader 62, and the reader 62 may calculate the value indicating the address according to the program.

Although error detection is performed using the CRC method in the present embodiment, it is not limited thereto. It may be configured so as to perform error detection using another error detection method.

In addition, although it is configured to calculate a CRC32 value in the present embodiment, it is not limited thereto.

It may be configured to a method that calculates a value of another length.

Although it is configured to use an RFID system according to electromagnetic induction in order to detect the number of dots of the dice 40 in the present embodiment, it is not limited thereto.

For example, it can be configured to be radio waves, and use a method of reading data after executing a predetermined program in the wireless IC tag 401 or the like.

Although the present embodiment is configured such that, in the memory region of the memory circuit 427 of the wireless IC tags 401, the number of dots information is respectively stored at predetermined addresses, and the CRC values are stored at subsequent addresses to the predetermined addresses, it is not limited thereto.

For example, it may be configured so as to be an address before the predetermined address, and stored at an address separated by a number of addresses.

It should be noted that, in such a case, the CPU 81 of the controller 2 not only calculates the address at which the number of dots informed is stored using the unique ID, but preferably also calculates the address at which the CRC value is stored.

Then, the function calculating the address using the unique ID is not limited to being singular, and may be a plurality such as a function for calculating the address at which the number of dots information is stored and a function for calculating the address at which the CRC value is stored.

Although it is configured so that the reader 62 is only involved in transmission and reception with the wireless IC tags 401 in the present embodiment, it is not limited thereto.

More specifically, it may have a writer function that can change various data stored in the wireless IC tag 401.

With this function, it is possible to change the various data stored in the suitable wireless IC tag 401. In this case, the data for changing is preferably stored in the ROM 82 of the controller 2.

In addition, various data stored in the wireless IC tag 401 can be changed at periods of a predetermined interval. Since the data can be changed in a timely manner, it is possible to prevent a fraudulent act even if the game system 1 is mad to operate for an extended time period.

The invention claimed is:

1. A gaming system comprising:

a dice movable unit having a plurality of dice and a shaking device that causes the plurality of dice to roll;

a plurality of game terminals, each of the plurality of game terminals having an operation device that a player can operate; and a controller that executes processing of:

(a) receiving bet end signals from betted terminals among the plurality of game terminals, each of the bet end signals indicating betting in a corresponding betted terminal has ended;

(b) transmitting a first shaking motion start signal, which causes a first shaking motion by the shaking device to start, to the dice movable unit;

(c) transmitting a permission signal, which permits an operation by the operation device of a predetermined game terminal of the betted terminals, to the predetermined game terminal;

(d) receiving an operation signal, which indicates that the operation device has been operated, from the predetermined game terminal; and (e) transmitting a second shaking motion start signal, which causes a second shaking motion by the shaking device to start, to the dice movable unit in response to the operation signal;

wherein the dice movable unit (b1) starts the first shaking motion in response having received the first shaking motion start signal from the controller; and (e1) performs the second shaking motion, which has an amplitude larger than that of the first shaking motion, in response to having received the second shaking motion start signal from the controller.

2. A gaming system comprising:

a dice movable unit having a plurality of dice and a shaking device causes the plurality of dice to roll;

a plurality of game terminals, each of the plurality of game terminals having an operation device that a player can operate;

memory that stores bet data that indicates an amount of a bet that the game terminal has accepted; and a controller that executes processing of:

(a) receiving bet end signals and bet data from betted terminals among the plurality of game terminals, each of the bet end signals indicating that betting in a corresponding betted terminal has ended;

(b) storing the bet data in the memory;

(c) transmitting a first shaking motion start signal that causes a first shaking motion by the shaking device to start, to the dice movable unit;

(d) comparing the bet data stored in the memory and transmitting a permission signal, which permits an operation by the operation device of one of the betted terminals that has accepted a largest bet amount, to the one of the betted terminals;

(e) receiving an operation signal, which indicates that the operation device has been operated, from the one of the betted terminals; and (f) transmitting a second shaking motion start signal, which causes a second shaking motion by the shaking device to start, to the dice movable unit, wherein the dice movable unit:

(b1) starts a first shaking motion in response to having received the first shaking motion start signal from the controller; and (f1) performs the second shaking motion, which has an amplitude larger than that of the first shaking motion, in response to having received the second shaking motion start signal from the controller.

3. A gaming system comprising:

a dice movable unit having a plurality of dice and a shaking device that causes the plurality of dice to roll;

a plurality of game terminals, each of the plurality of game terminals having a display device that performs display relating to a game and an operation device that a player can operate;

memory that stores bet data indicating an amount of a bet that the game terminal has accepted; and a controller that executes processing of:

(a) receiving bet end signals and bet data from betted terminals among the plurality of game terminals, each of the bet end signals indicating that betting in a corresponding betted terminal has ended;

(b) storing the bet data in the memory;

(c) transmitting a first shaking motion start signal, which causes a first shaking motion by the shaking device to start, to the dice movable unit;

(d) comparing the bet data stored in the memory and transmitting a permission signal, which permits an operation by the operation device of one of the betted terminals that has accepted a largest bet amount, to the one of the betted terminals;

(e) receiving an operation signal indicating that the operation device has been operated from the one of the betted terminals; and (f) transmitting a second shaking motion start signal, which causes a second shaking motion by the shaking device to start, to the dice movable unit and the game terminal, wherein the dice movable unit (b1) starts a first shaking motion in response to having received the first shaking motion start signal from the controller; and (f1) performs the second shaking motion, which has an amplitude larger than that of the first shaking motion, in response to having received the second shaking motion start signal from the controller, wherein the game terminal (f1) performs processing of changing an image displayed on the display device when having received the second shaking motion start signal from the controller.

4. The gaming system according to claim 3, wherein the processing of changing the image in the processing (f2) is processing that causes an image to momentarily shake.

*5. A gaming system comprising:*

*a dice movable unit having a plurality of dice and a shaking device that causes the plurality of dice to roll;*

*a plurality of game terminals, each of the plurality of game terminals having an operation device that a player can operate; and*

*a controller that executes processing of:*

*(a) receiving bet end signals from betted terminals among the plurality of game terminals, each of the bet end signals indicating betting in a corresponding betted terminal has ended;*

*(b) transmitting a first motion start signal, which causes a first motion by the shaking device to start, to the dice movable unit;*

*(c) transmitting a permission signal, which permits an operation by the operation device of a predetermined game terminal of the betted terminals, to the predetermined game terminal;*

*(d) receiving an operation signal, which indicates that the operation device has been operated, from the predetermined game terminal; and*

*(e) transmitting a second motion start signal, which causes a second motion by the shaking device to start, to the dice movable unit in response to the operation signal;*

*wherein the dice movable unit*

*(b1) starts the first motion in response having received the first motion start signal from the controller; and*

*(e1) performs the second motion, which is different from the first motion, in response to having received the second motion start signal from the controller.*

*6. A gaming system comprising:*

*a dice movable unit having a plurality of dice and a shaking device causes the plurality of dice to roll;*

*a plurality of game terminals, each of the plurality of game terminals having an operation device that a player can operate;*

*memory that stores bet data that indicates an amount of a bet that the game terminal has accepted; and*

*a controller that executes processing of:*

*(a) receiving bet end signals and bet data from betted terminals among the plurality of game terminals, each of the bet end signals indicating that betting in a corresponding betted terminal has ended;*

*(b) storing the bet data in the memory;*

*(c) transmitting a first motion start signal that causes a first motion by the shaking device to start, to the dice movable unit;*

*(d) comparing the bet data stored in the memory and transmitting a permission signal, which permits an operation by the operation device of one of the betted terminals that has accepted a largest bet amount, to the one of the betted terminals;*

*(e) receiving an operation signal, which indicates that the operation device has been operated, from the one of the betted terminals; and*

*(f) transmitting a second motion start signal, which causes a second motion by the shaking device to start, to the dice movable unit,*

*wherein the dice movable unit:*

*(b1) starts a first motion in response to having received the first motion start signal from the controller; and*

*(f1) performs the second motion, which is different from the first motion, in response to having received the second motion start signal from the controller.*

*7. A gaming system comprising:*

*a dice movable unit having a plurality of dice and a shaking device that causes the plurality of dice to roll;*

*a plurality of game terminals, each of the plurality of game terminals having a display device that performs display relating to a game and an operation device that a player can operate;*

*memory that stores bet data indicating an amount of a bet that the game terminal has accepted; and*

*a controller that executes processing of:*

*(a) receiving bet end signals and bet data from betted terminals among the plurality of game terminals, each of the bet end signals indicating that betting in a corresponding betted terminal has ended;*

*(b) storing the bet data in the memory;*

*(c) transmitting a first motion start signal, which causes a first motion by the shaking device to start, to the dice movable unit;*

*(d) comparing the bet data stored in the memory and transmitting a permission signal, which permits an operation by the operation device of one of the betted terminals that has accepted a largest bet amount, to the one of the betted terminals;*

*(e) receiving an operation signal indicating that the operation device has been operated from the one of the betted terminals; and*

*(f) transmitting a second motion start signal, which causes a second motion by the shaking device to start, to the dice movable unit and the game terminal,*

*wherein the dice movable unit*

*(b1) starts a first motion in response to having received the first motion start signal from the controller; and*

*(f1) performs the second motion, which is different from the first motion, in response to having received the second motion start signal from the controller,*

*wherein the game terminal*

*(f2) performs processing of changing an image displayed on the display device when having received the second motion start signal from the controller.*

*8. The gaming system according to claim 7, wherein the processing of changing the image in the processing (f2) is processing that causes an image to momentarily shake.*

*9. A gaming system comprising:*

*a dice movable unit having a plurality of dice and a shaking device that causes the plurality of dice to roll;*

*a plurality of game terminals, each of the plurality of game terminals having an operation device that a player can operate;*

*a controller,*

*wherein*

*(a) the controller receives bet end signals from betted terminals among the plurality of game terminals, each of the bet end signals indicating betting in a corresponding betted terminal has ended;*

*(b) the controller transmits a shaking motion start signal, which causes a shaking motion by the shaking device to start, to the dice movable unit;*

*(c) the dice movable unit starts the shaking motion in response to the shaking motion start signal from the controller, to roll the plurality of dice;*

*(d) the controller receives an operation signal, which indicates that the operation device has been operated, from a predetermined game terminal, and transmits a*

*stop-causing signal, which causes stopping of the shaking motion, to the dice movable unit in response to the operation signal; and*

(*e*) *the dice movable unit stops the shaking motion after receiving the stop-causing signal.*

* * * * *